US 10,655,656 B2

(12) United States Patent
Franklin

(10) Patent No.: US 10,655,656 B2
(45) Date of Patent: May 19, 2020

(54) MOUNTING APPARATUS

(71) Applicant: Lee Christopher Franklin, Hampton, TX (US)

(72) Inventor: Lee Christopher Franklin, Hampton, TX (US)

(*) Notice: Subject to any disclaimer, the term of this patent is extended or adjusted under 35 U.S.C. 154(b) by 0 days.

(21) Appl. No.: 15/927,074

(22) Filed: Apr. 17, 2018

(65) Prior Publication Data

US 2019/0024683 A1 Jan. 24, 2019

Related U.S. Application Data

(63) Continuation of application No. 14/794,502, filed on Jul. 8, 2015, now abandoned, which is a continuation-in-part of application No. 14/209,534, filed on Mar. 13, 2014, now Pat. No. 9,689,527.

(60) Provisional application No. 61/798,054, filed on Mar. 15, 2013, provisional application No. 62/109,057, (Continued)

(51) Int. Cl.
| | |
|---|---|
| H01R 11/30 | (2006.01) |
| F16B 1/00 | (2006.01) |
| F16M 13/02 | (2006.01) |
| H01R 13/73 | (2006.01) |
| H01R 24/60 | (2011.01) |
| H01R 13/70 | (2006.01) |
| F16M 11/04 | (2006.01) |
| F16M 11/14 | (2006.01) |
| H01F 7/02 | (2006.01) |

(Continued)

(52) U.S. Cl.
CPC ............. *F16B 1/00* (2013.01); *B44C 5/02* (2013.01); *F16M 11/041* (2013.01); *F16M 11/14* (2013.01); *F16M 13/02* (2013.01); *F16M 13/022* (2013.01); *H01F 7/0221* (2013.01); *H01R 13/70* (2013.01); *H01R 13/73* (2013.01); *H01R 24/60* (2013.01); *F16B 2001/0035* (2013.01); *H01R 2107/00* (2013.01); *Y10T 29/49826* (2015.01)

(58) Field of Classification Search
CPC .... H01R 13/6205; H01R 13/625; A47K 5/05; E05C 19/16
USPC ........ 439/38, 39, 335; 248/309.4; 292/251.5
See application file for complete search history.

(56) References Cited

U.S. PATENT DOCUMENTS

| 3,521,216 A | * | 7/1970 | Tolegian | ............ H01R 13/6205 439/39 |
| 7,843,296 B2 | * | 11/2010 | Fullerton | .................. G09F 7/04 24/303 |

(Continued)

FOREIGN PATENT DOCUMENTS

EP 2672163 A1 12/2013

*Primary Examiner* — Thanh Tam T Le

(57) ABSTRACT

A mounting apparatus and system and method for making the same are provided. The mounting apparatus allows an object to be mounted to a mounting surface via magnetic attractions between different planes of engagement. Through the movement of planes of magnets, an object that is brought in proximity to the mounting apparatus may engage one of the magnetic planes and then be moved further to engage the other magnetic plane, with the combined magnetic force being configured to support the particular object for which the mounting apparatus is designed. The engagement and/or disengagement of the object from the mounting apparatus can thus occur in stages, by degrees, and/or in a tiered manner.

20 Claims, 54 Drawing Sheets

Related U.S. Application Data filed on Jan. 29, 2015, provisional application No. 62/022,130, filed on Jul. 8, 2014.

(51) Int. Cl.
*B44C 5/02* (2006.01)
*H01R 107/00* (2006.01)

(56) References Cited

U.S. PATENT DOCUMENTS

| | | | |
|---|---|---|---|
| 8,535,088 B2* | 9/2013 | Gao | H01R 9/03 439/490 |
| 8,672,228 B1* | 3/2014 | Saini | H01R 11/30 235/486 |
| 8,851,534 B2* | 10/2014 | Fiedler | A45C 13/1069 220/230 |
| 8,944,826 B1* | 2/2015 | Wilkolaski | H01R 13/6205 439/39 |
| 9,062,695 B2* | 6/2015 | Witter | H01R 13/6205 |
| 9,689,527 B2* | 6/2017 | Franklin | F16M 13/02 |
| 9,806,458 B1* | 10/2017 | Chiu | H01R 13/6205 |
| 9,848,071 B2* | 12/2017 | Thiers | H04M 1/0274 |
| 10,109,963 B2* | 10/2018 | Komoto | A41D 1/002 |
| 10,135,179 B2* | 11/2018 | Cooper | A47J 37/0611 |
| 10,297,950 B2* | 5/2019 | Wei | H01R 11/30 |
| 2007/0072443 A1 | 3/2007 | Rohrbach et al. | |
| 2013/0303000 A1 | 11/2013 | Witter et al. | |

* cited by examiner

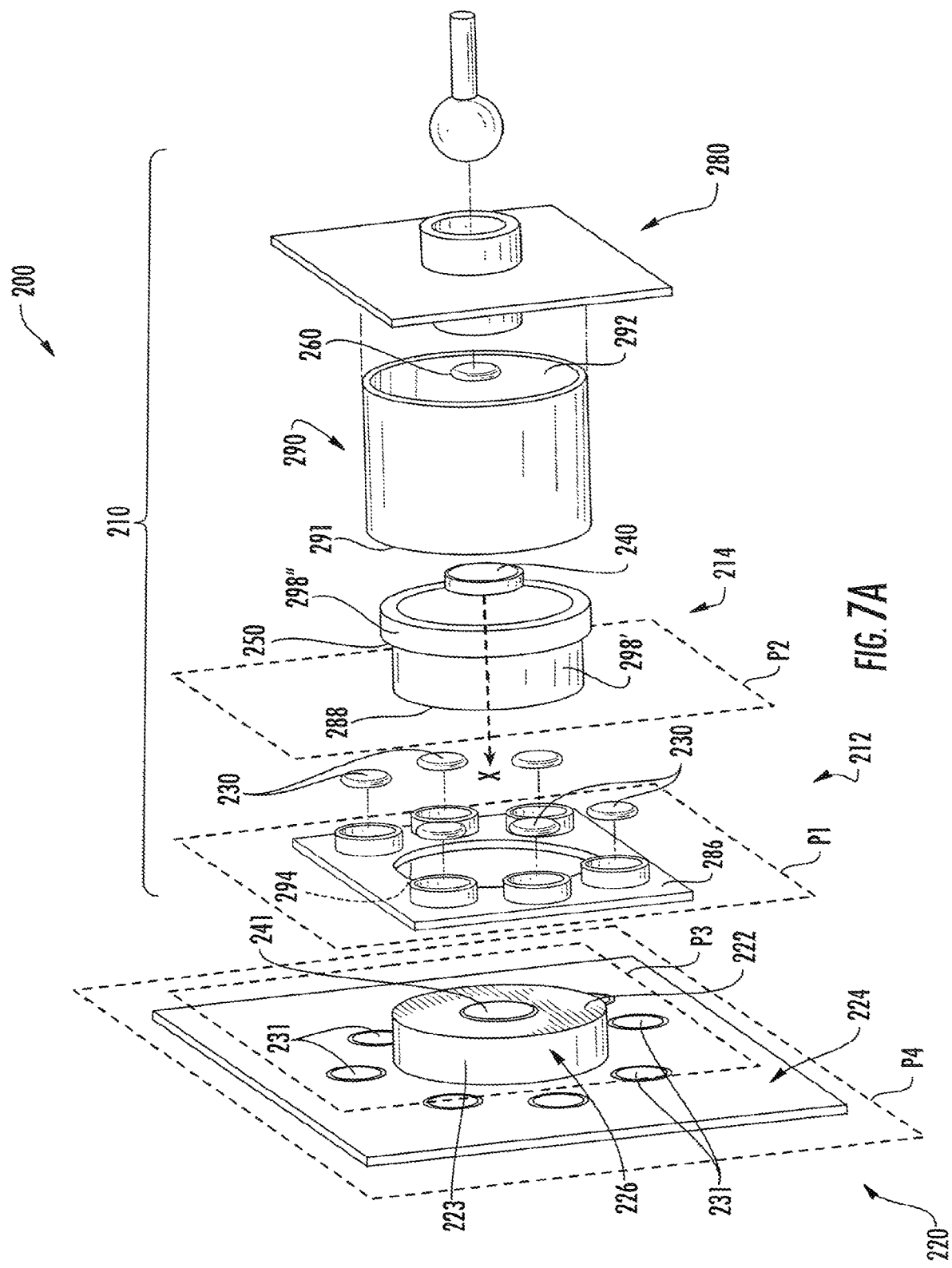

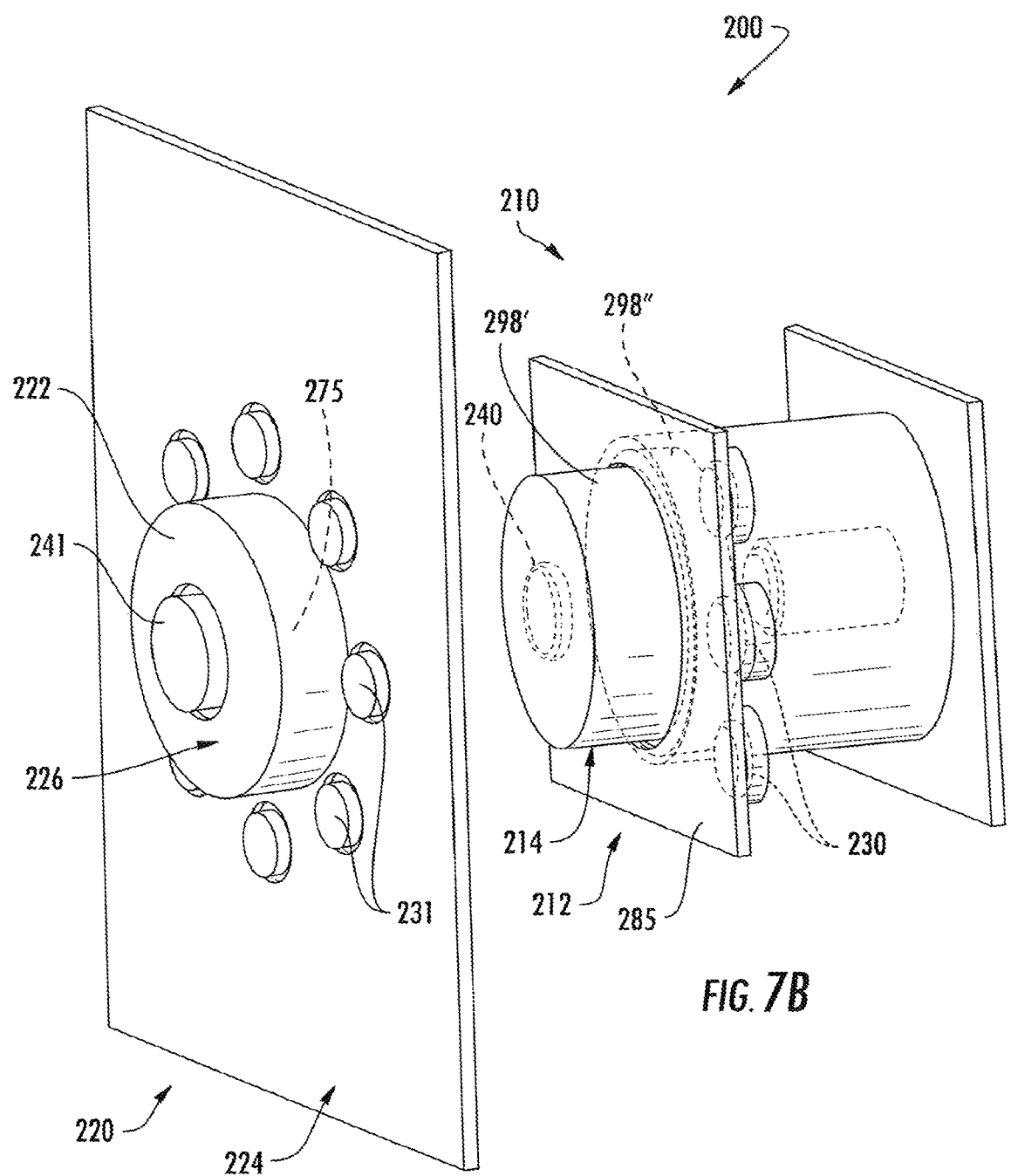

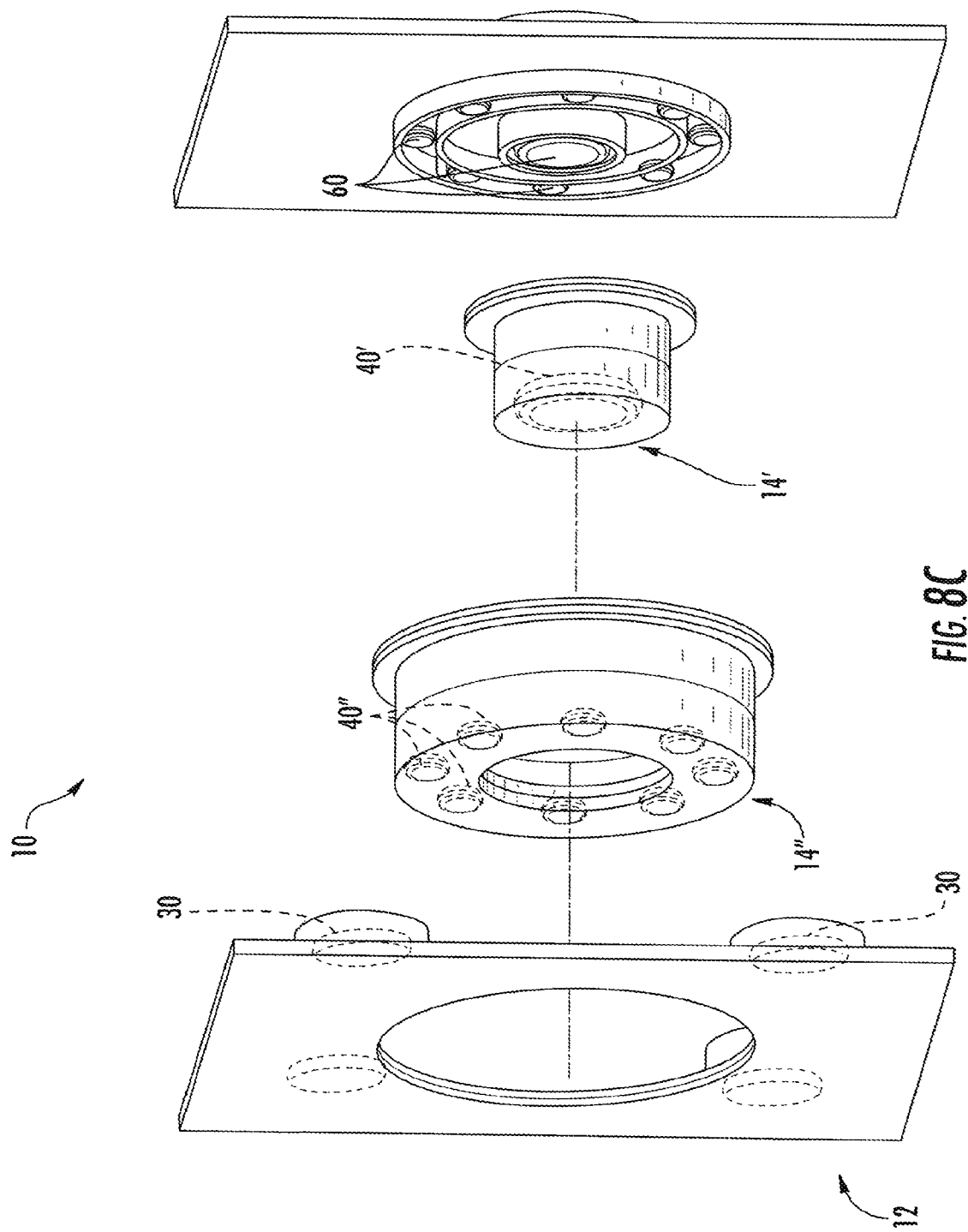

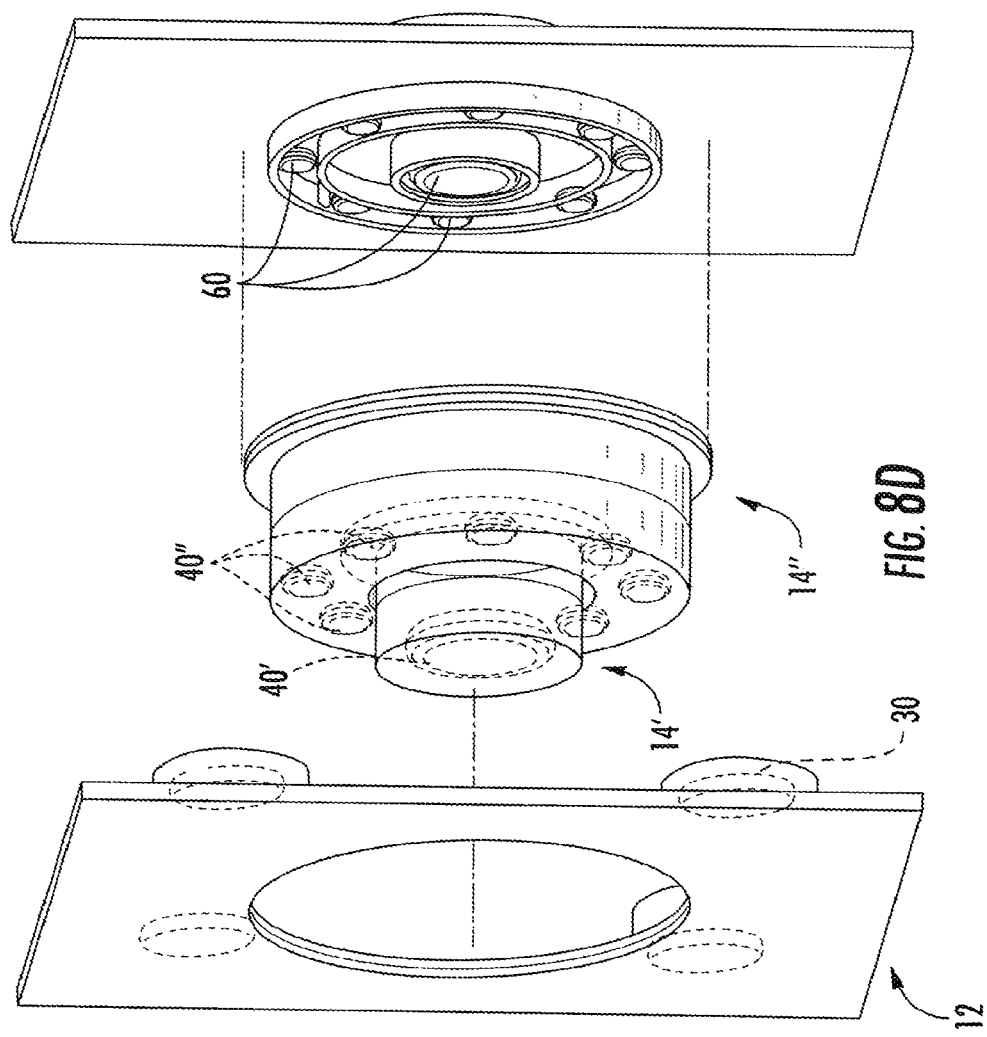

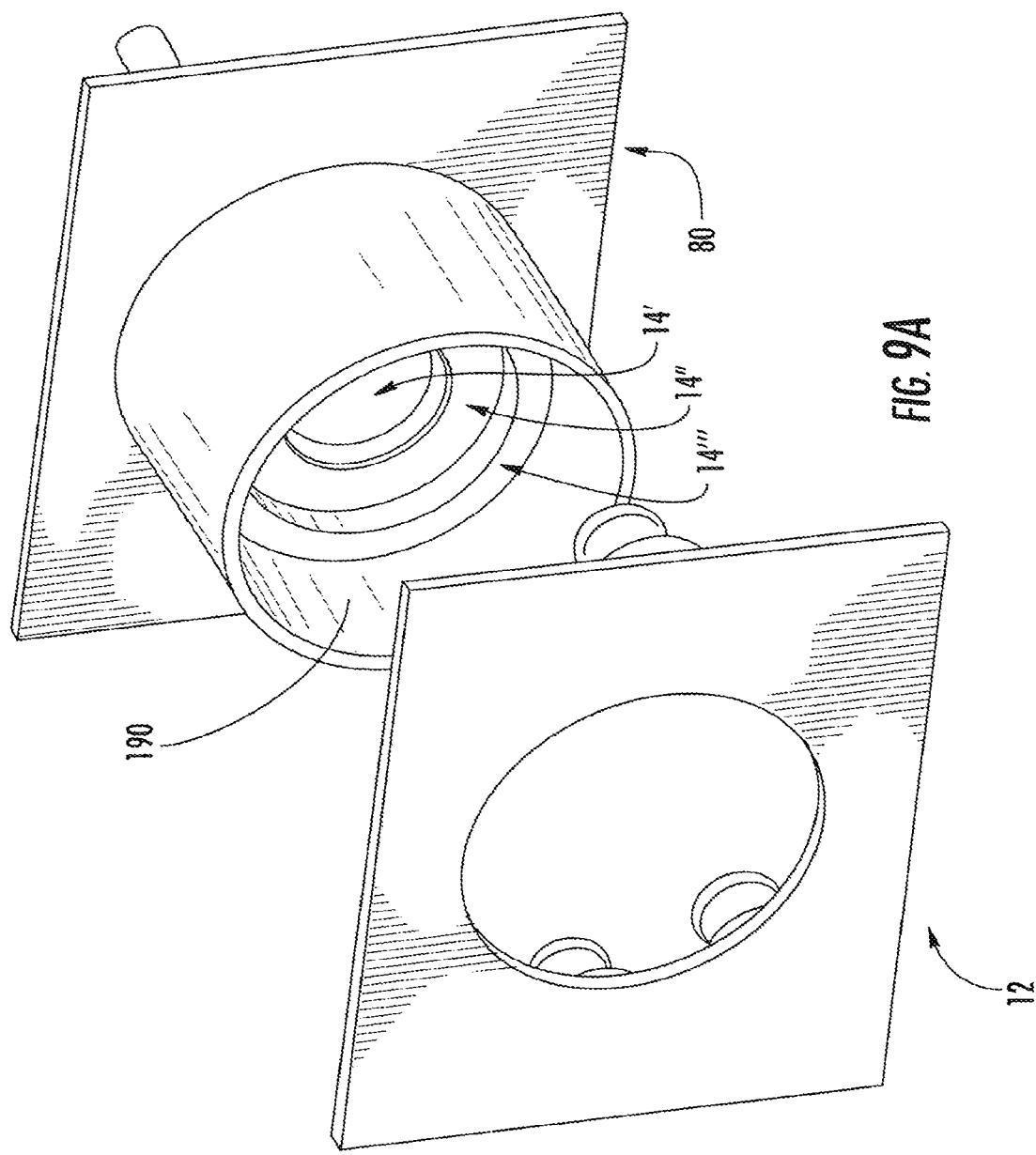

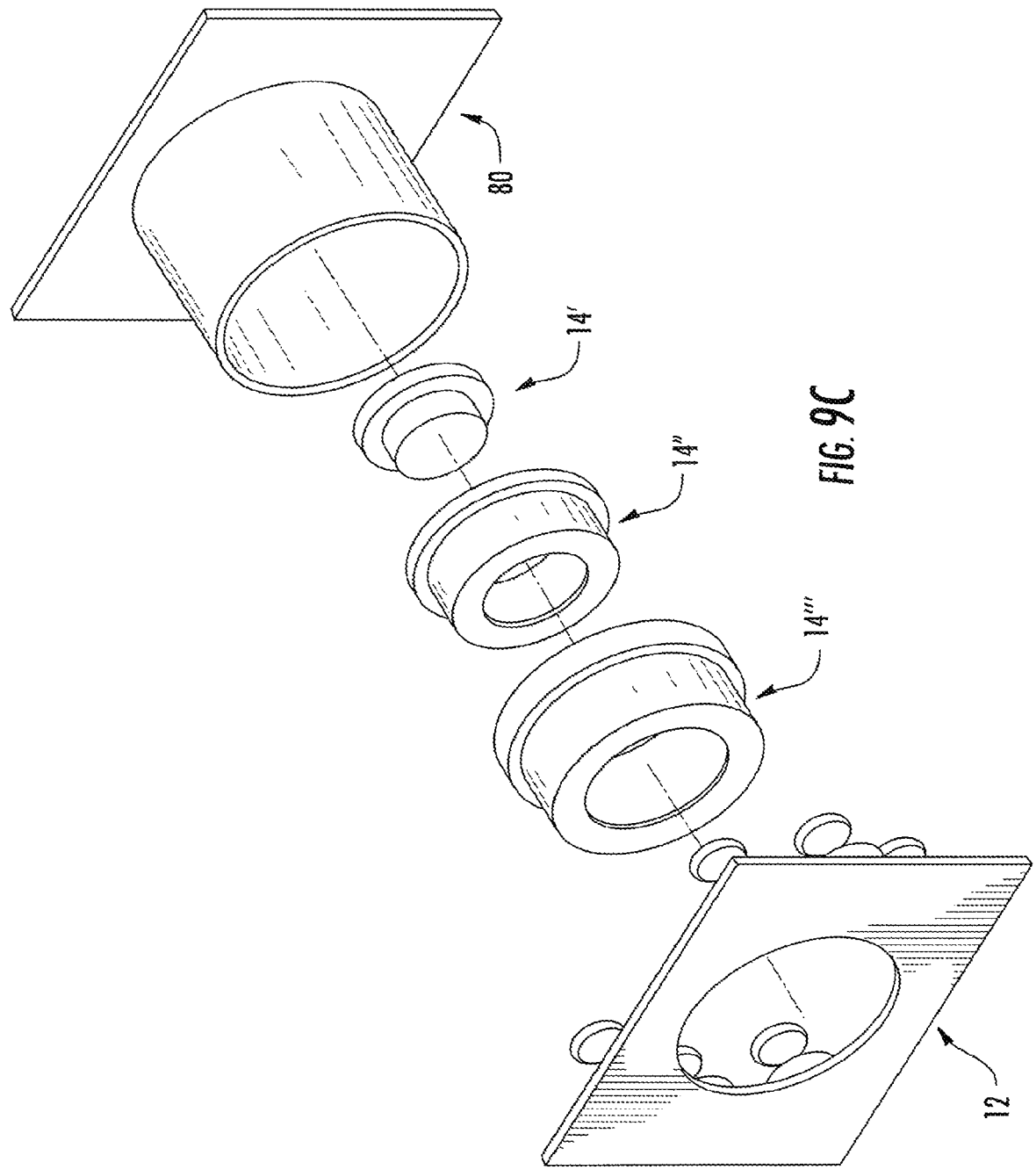

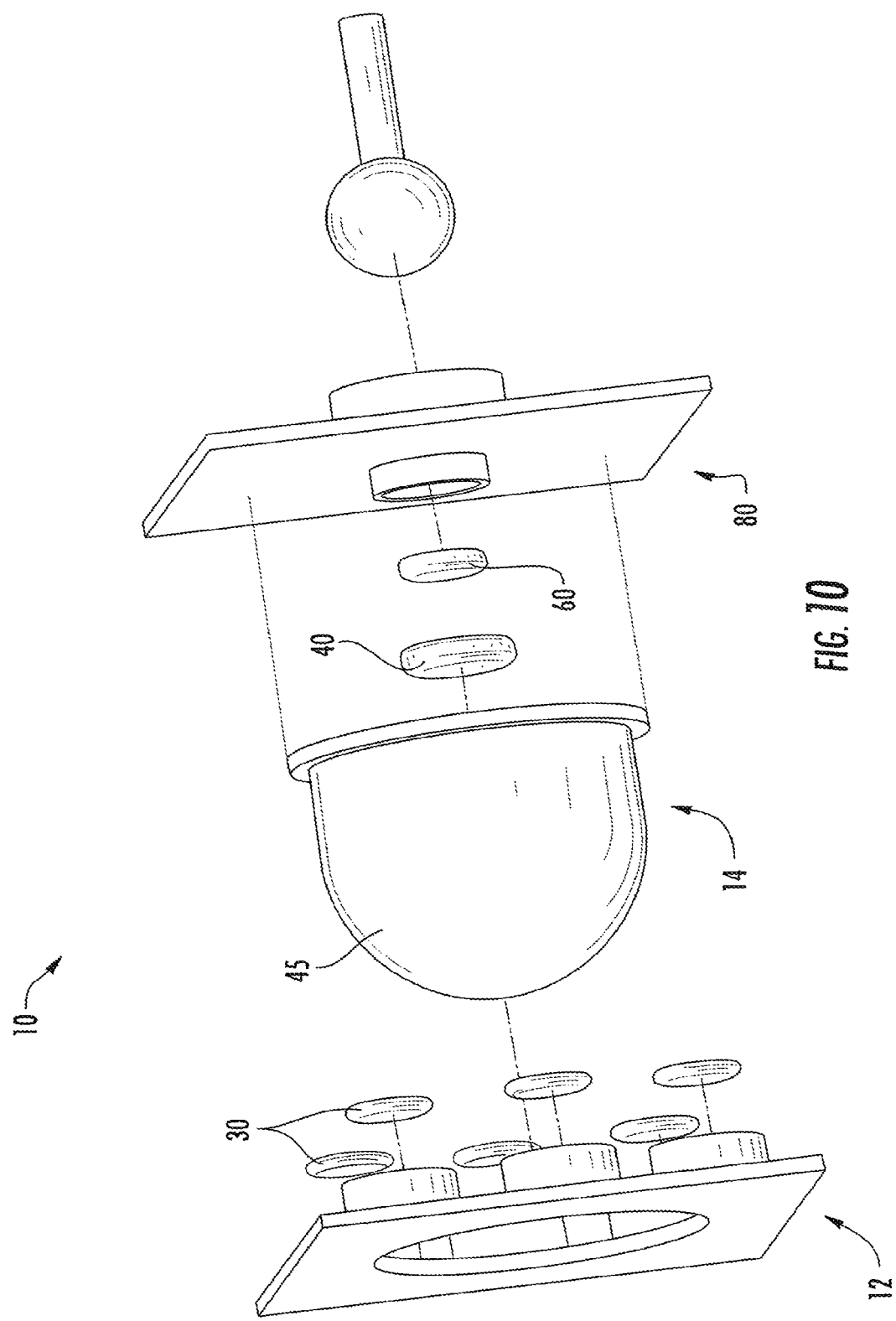

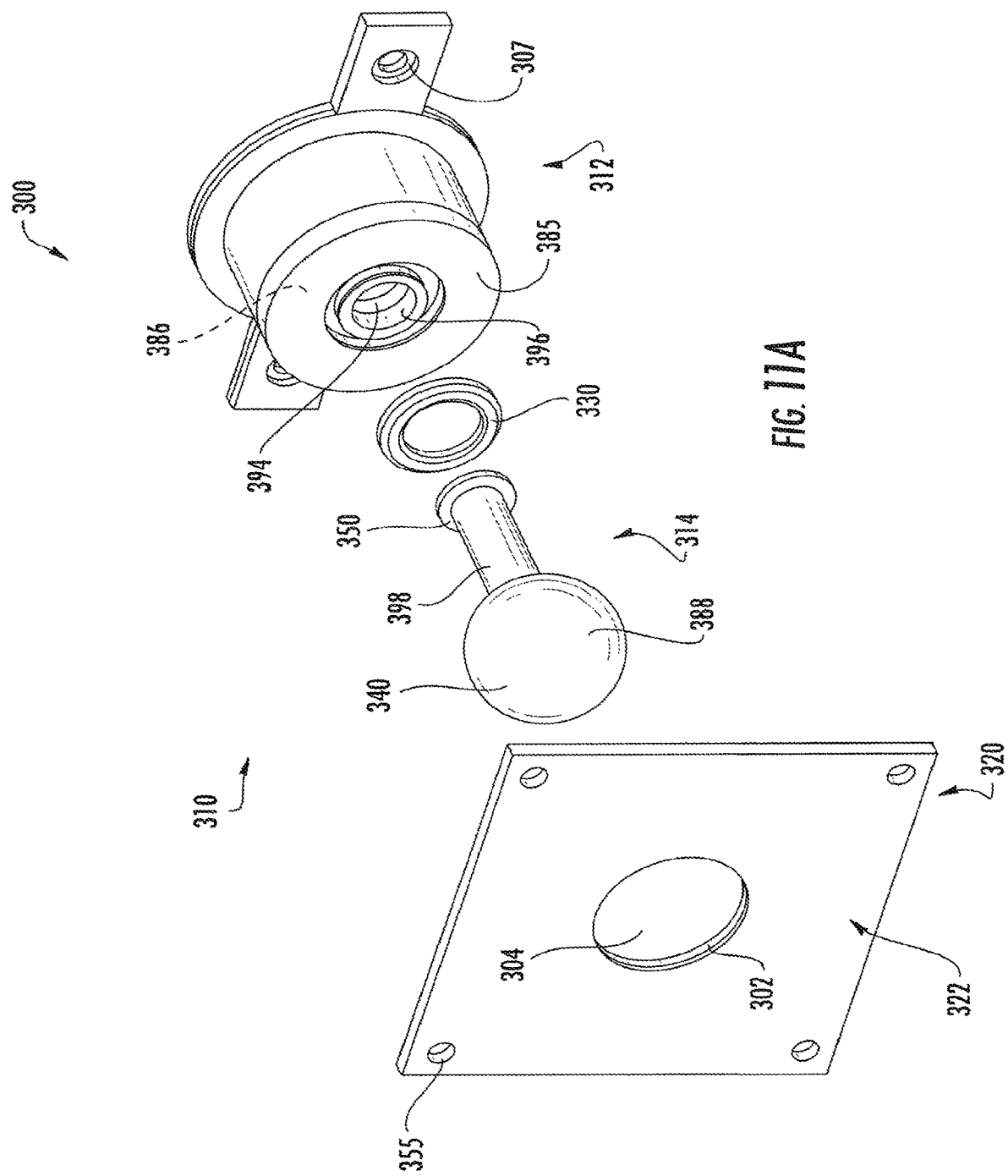

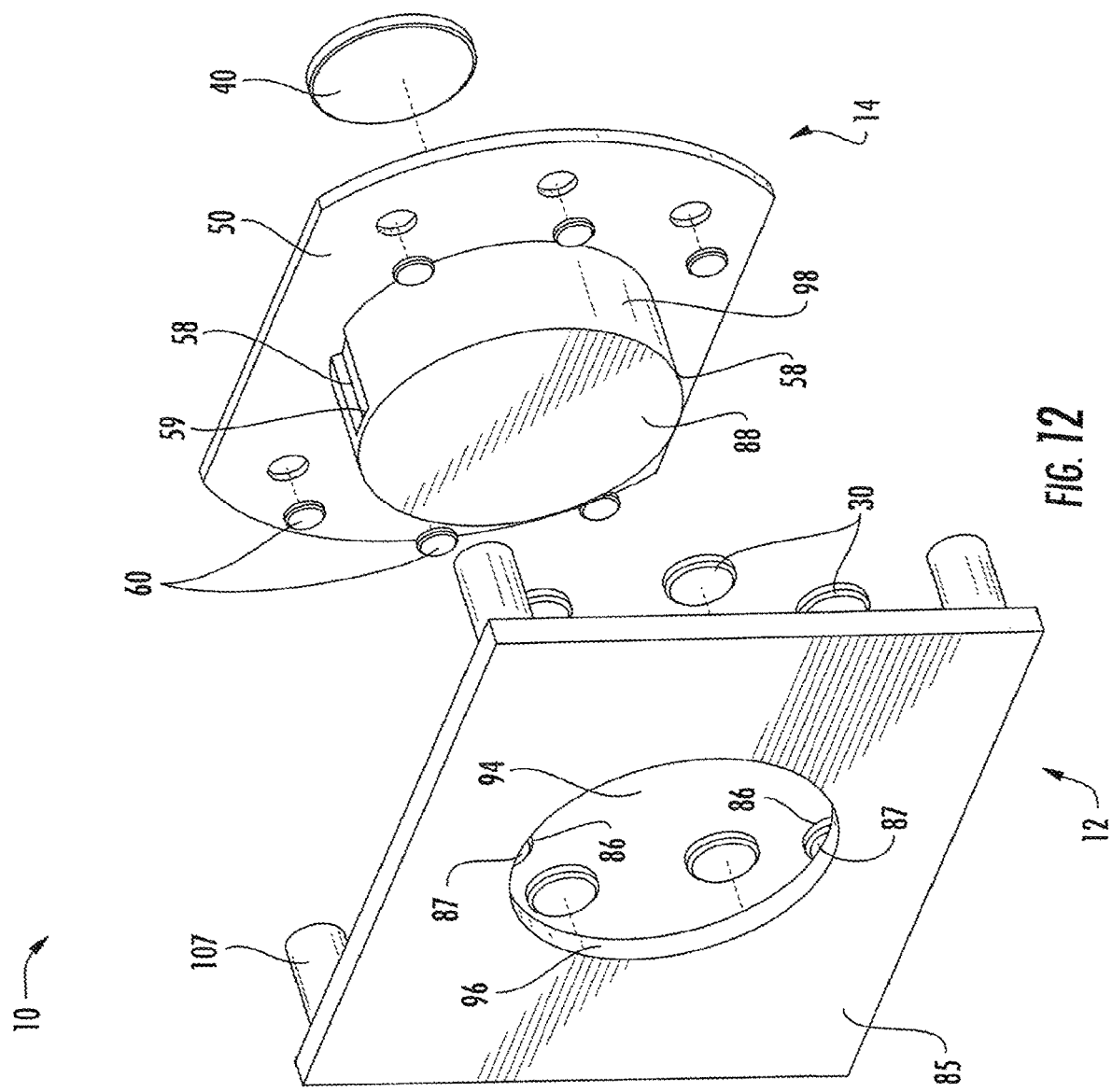

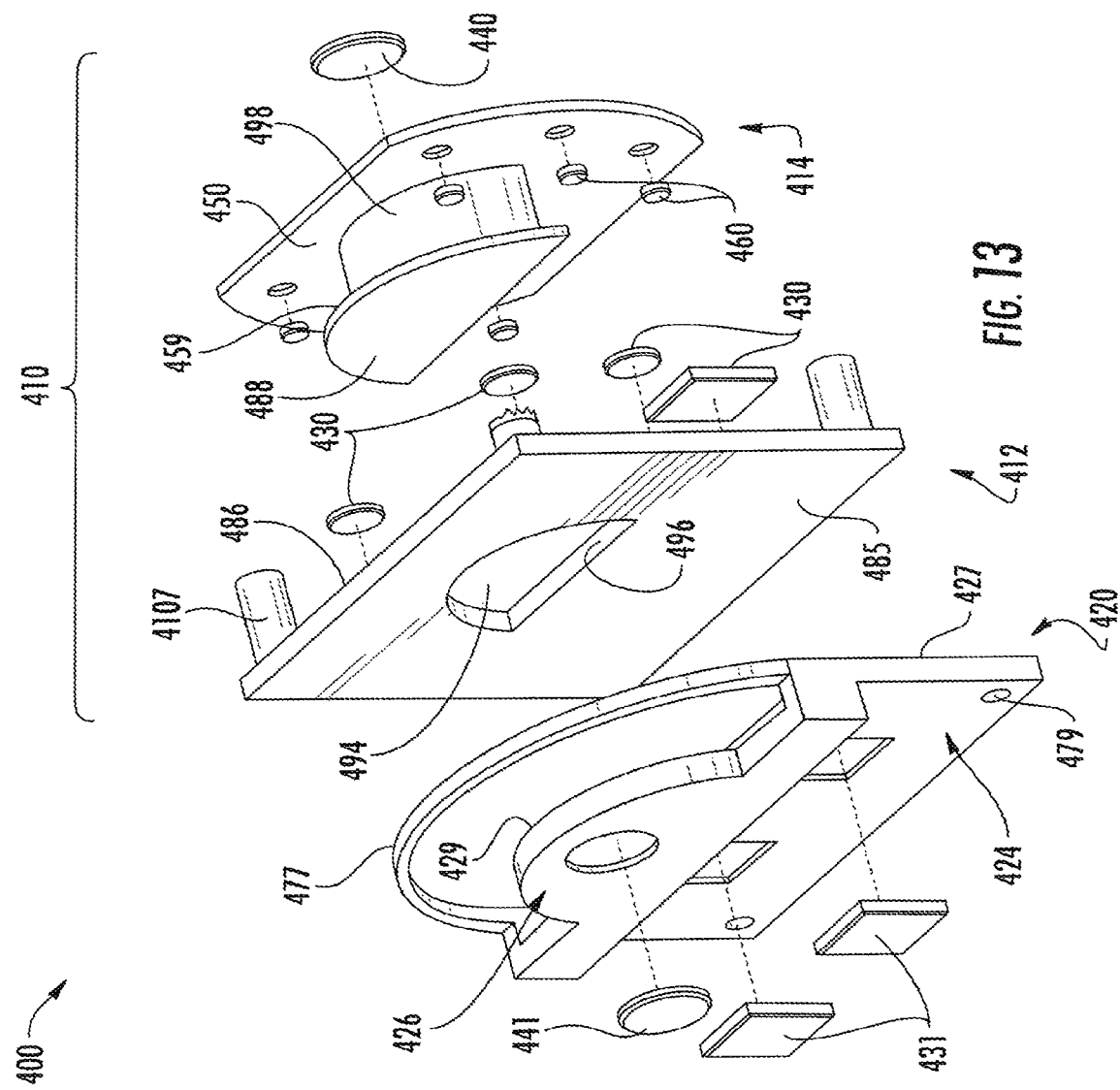

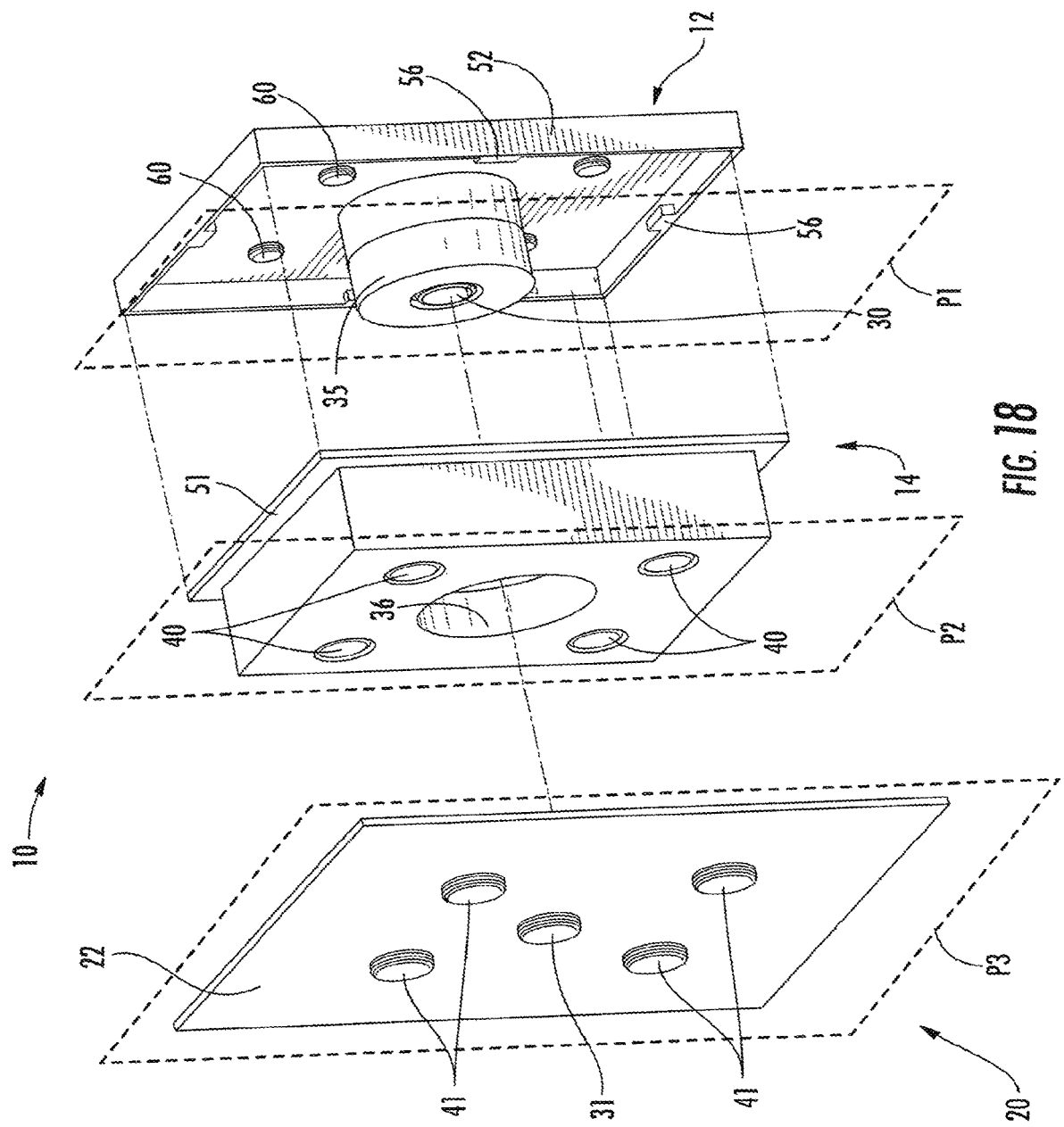

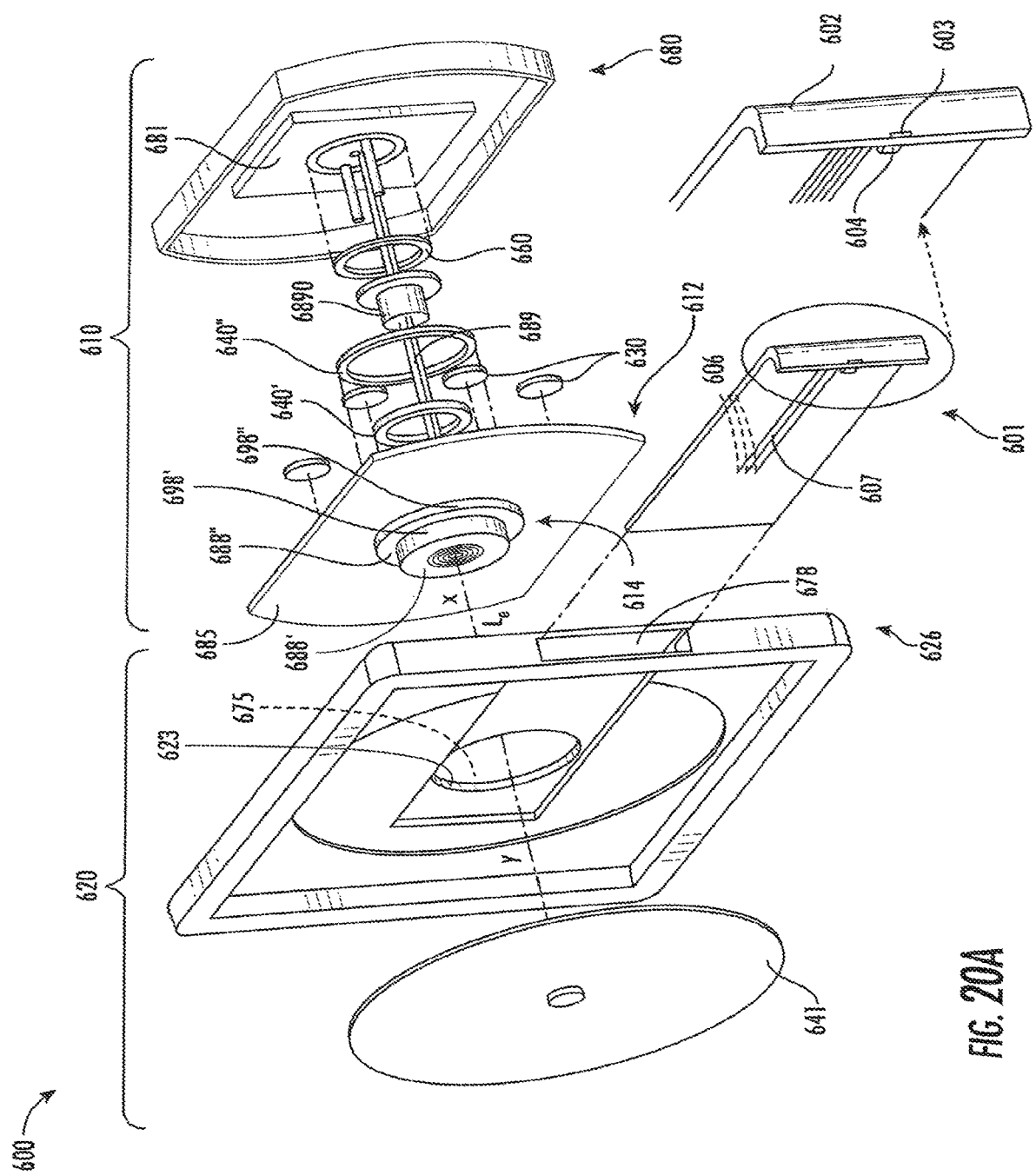

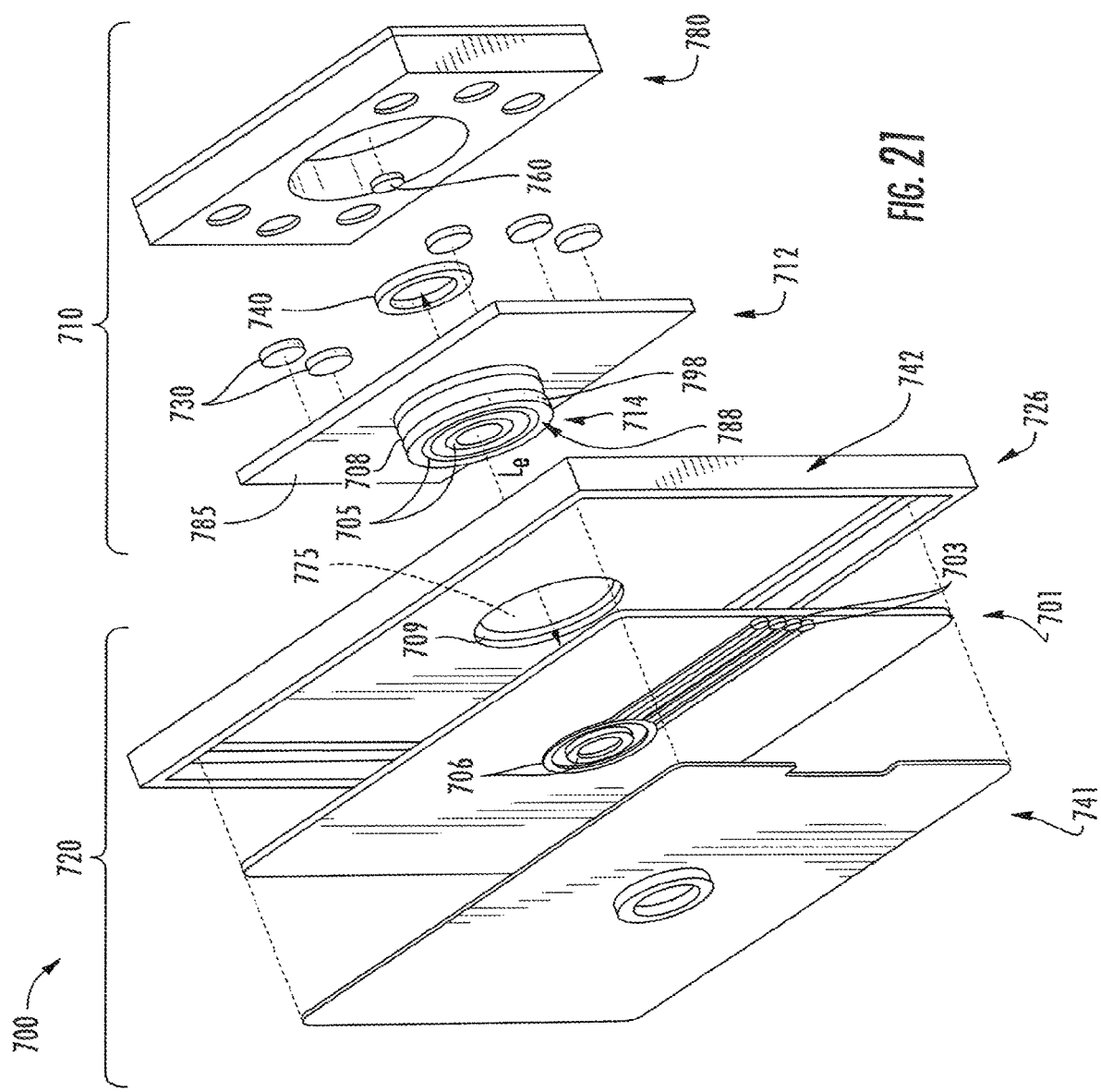

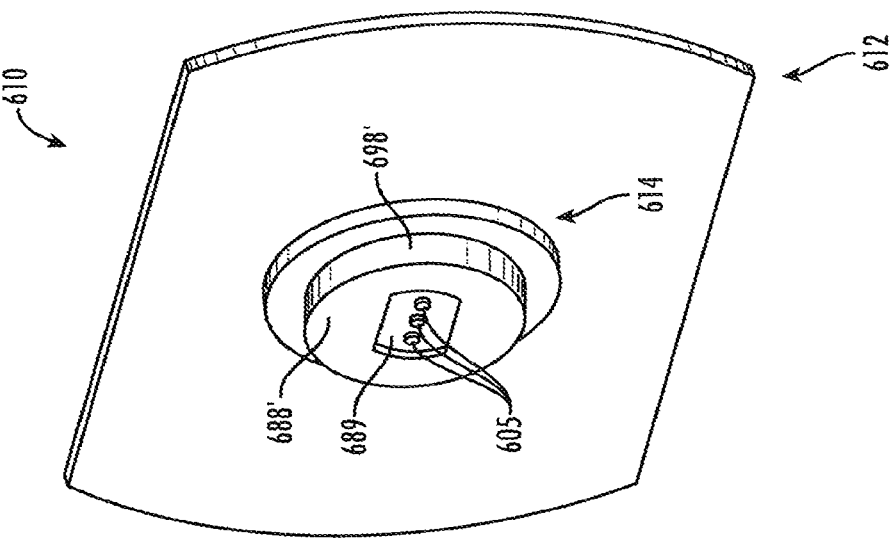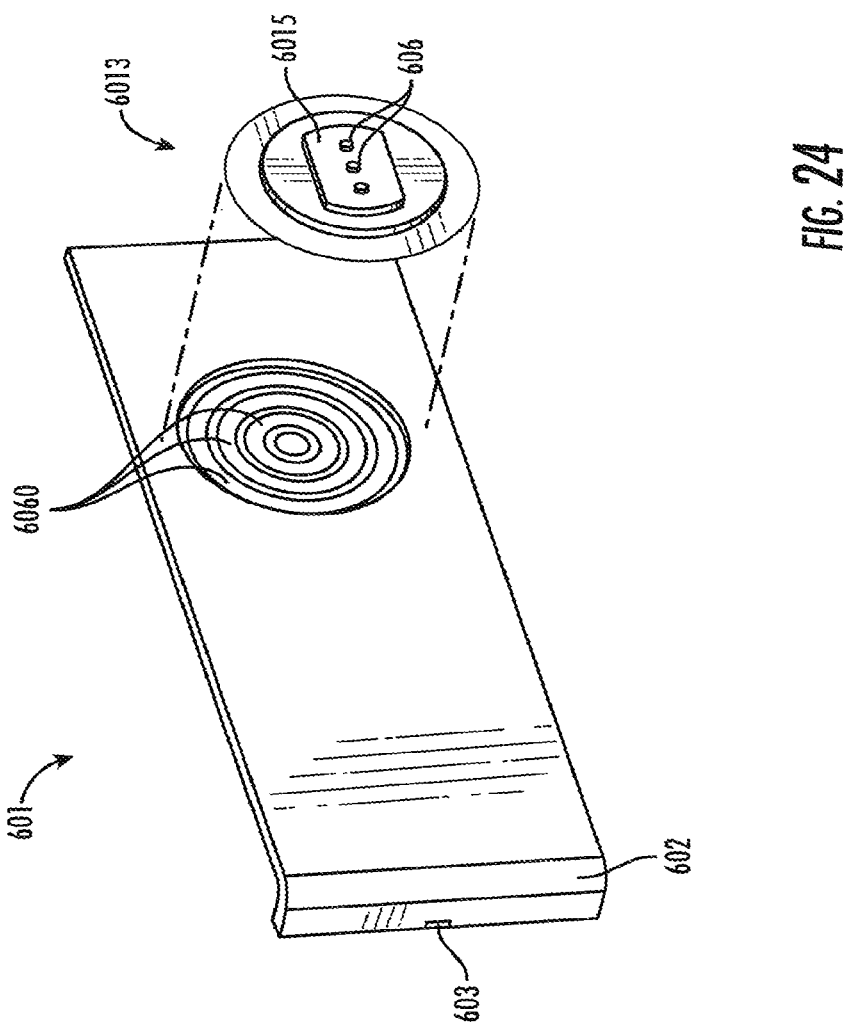
FIG. 24

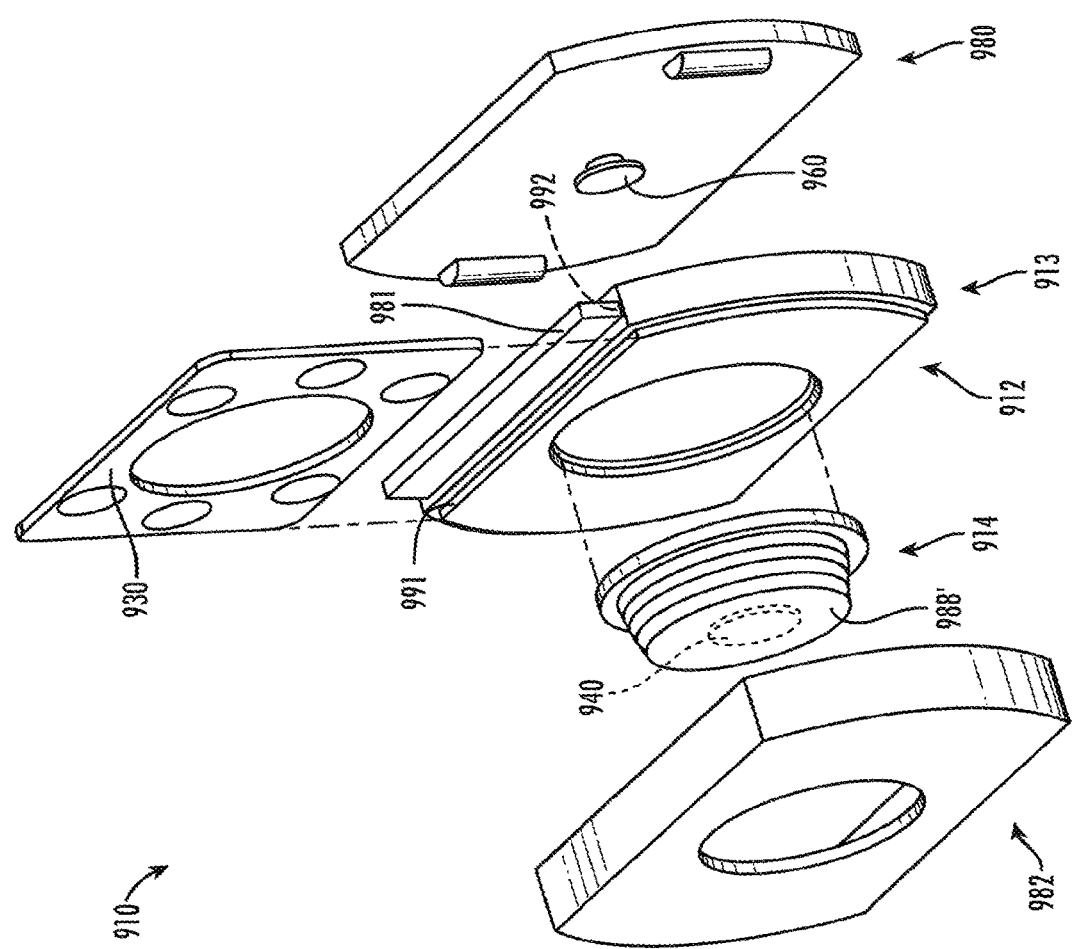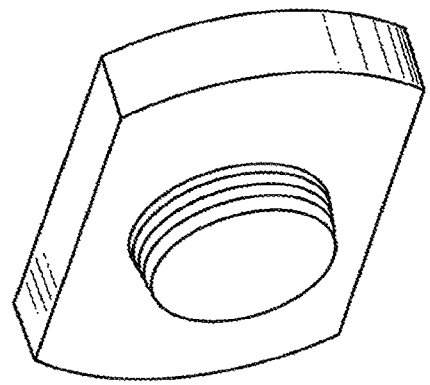

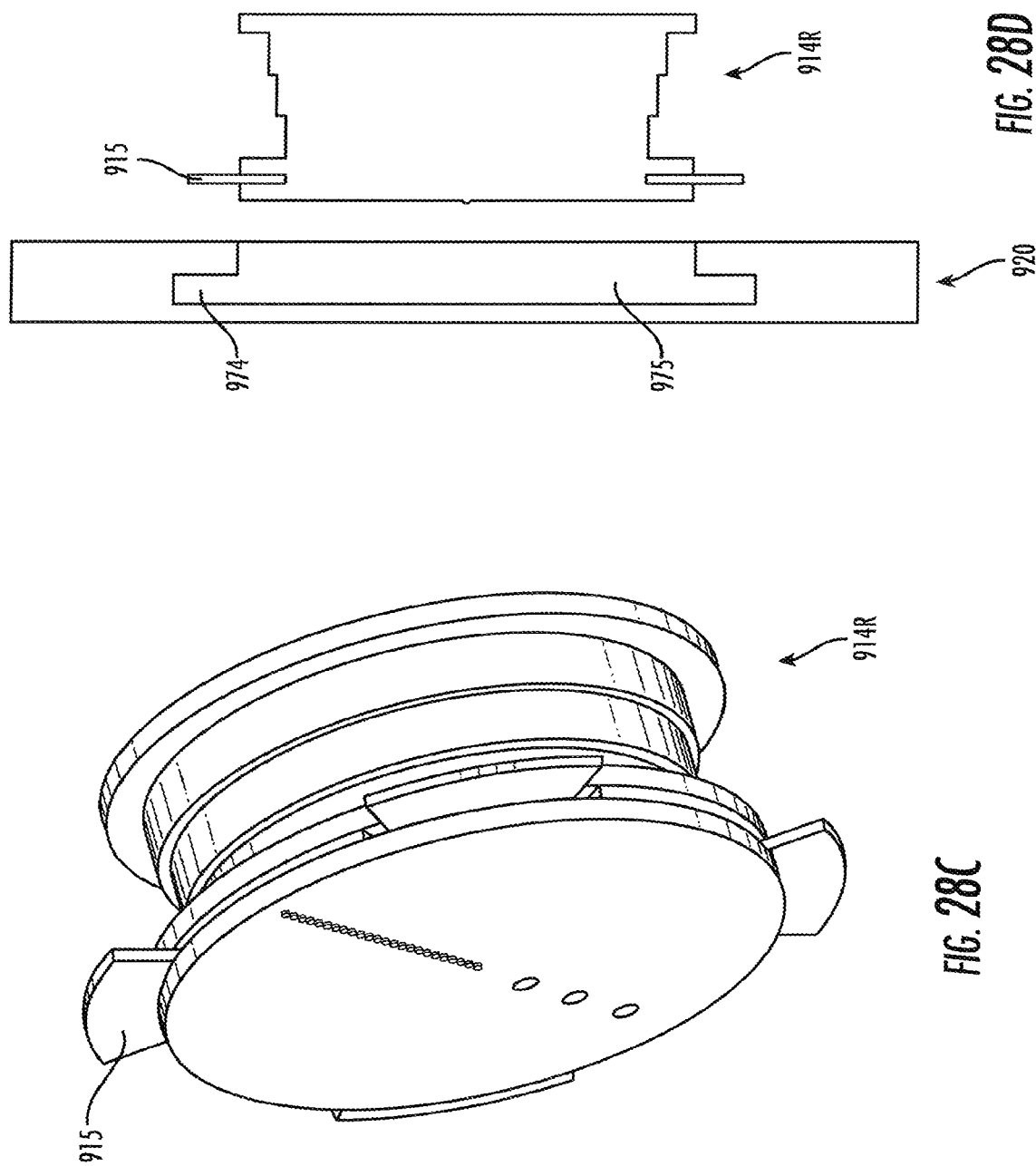

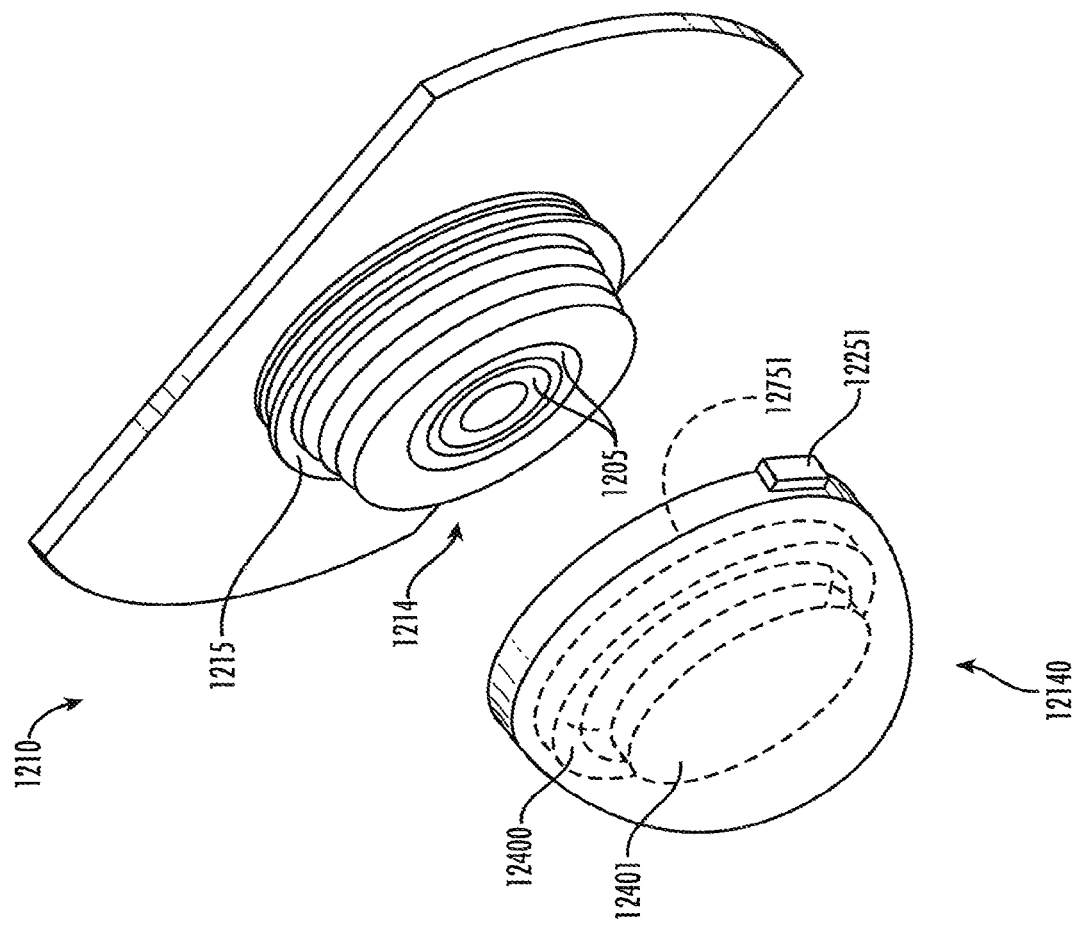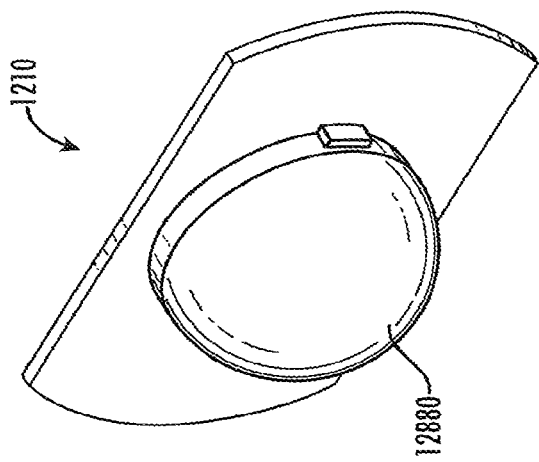

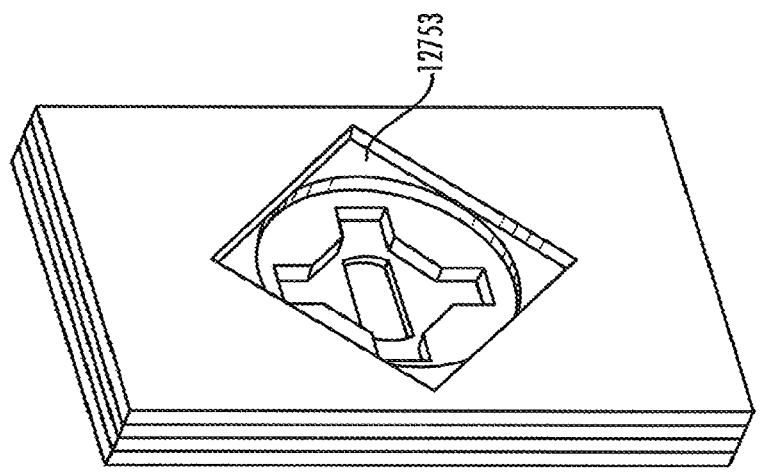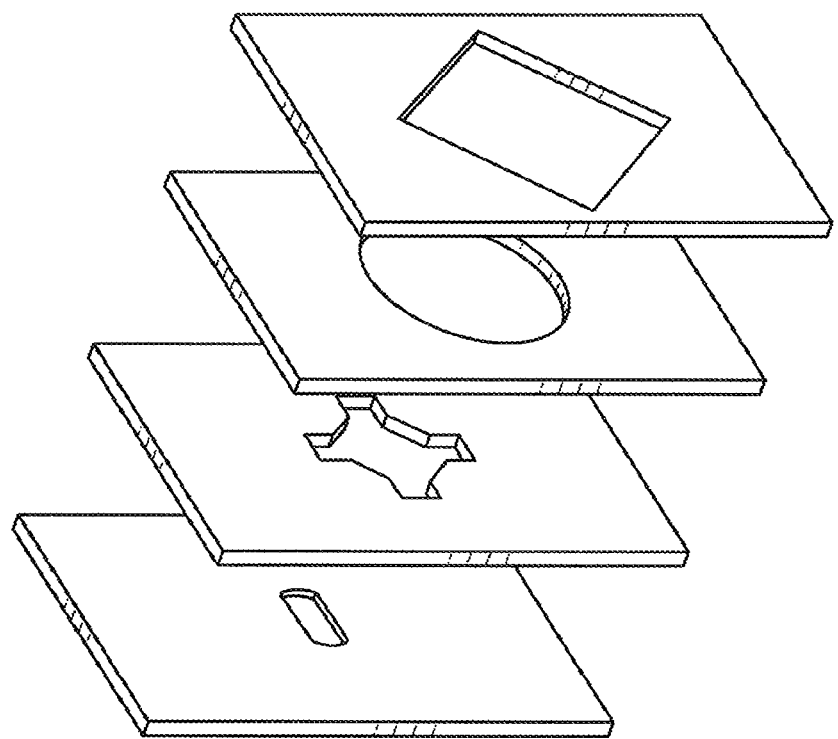
FIG. 35

MOUNTING APPARATUS

This application is a Continuation of pending U.S. patent application Ser. No. 14/794,502, filed Jul. 8, 2015, which claims priority to U.S. patent application Ser. No. 14/209,534, filed Mar. 13, 2014; U.S. Provisional Patent Application Ser. No. 62/109,057, filed Jan. 29, 2015; and U.S. Provisional Patent Application Ser. No. 62/022,130, filed Jul. 8, 2014. The disclosures of all of the aforementioned applications are incorporated by reference herein.

FIELD OF THE INVENTION

The present invention relates generally to methods, systems, and apparatuses for releasably engaging multiple bodies. In particular, various mechanisms for attaching and releasing objects in stages are described.

BACKGROUND

Numerous solutions exist for attaching, connecting, or otherwise joining two or more objects, as there are many reasons objects may need to be attached. Fewer solutions also provide mounting functionality.

Potentially mountable objects make up a variety of sizes, shapes, and weights, so common mounting methods vary widely in form and function. Generally, available mounting means require mechanical fasteners for attaching an object—particularly for relatively large or heavy objects—and often also require tools and installation time. Toolless mounting methods, such as those that rely on a snap-in mechanism, are faster but may require a user to apply precise and, often, concentrated pressure to the object during mounting. Similar intervention may also be required for release of the object. Quick-mount solutions, such as suction mounts and magnetic mounts, are typically useful for relatively light objects, but these mounts are often relatively insecure and are more prone to unintentional disengagement than are the aforementioned means. Additionally, if configured for heavier objects or to provide greater security, quick-mount solutions require a greater holding force than is necessary for attachment alone in order to bear the weight of the object, and such strong holding forces may cause users unnecessary difficulty in releasing or dismounting the object.

Accordingly, there is a need in the art for simple, scalable, and cost-effective apparatuses and systems for attaching and/or mounting objects of various sizes, shapes, and weights to different mounting surfaces that allow for quick and easy attachment and release of the objects.

BRIEF DESCRIPTION OF THE DRAWINGS

Figure 1:
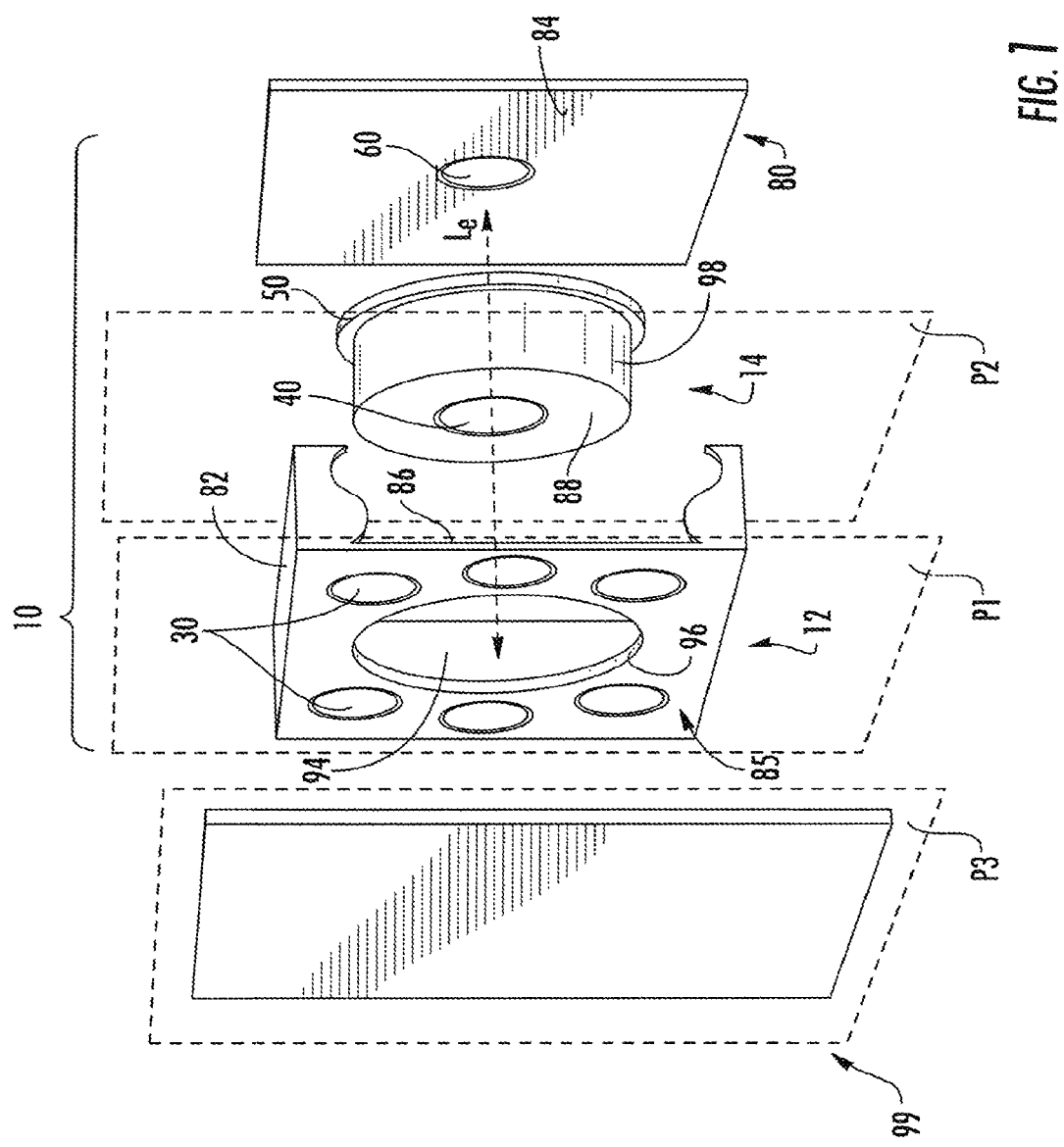
Figure 2:
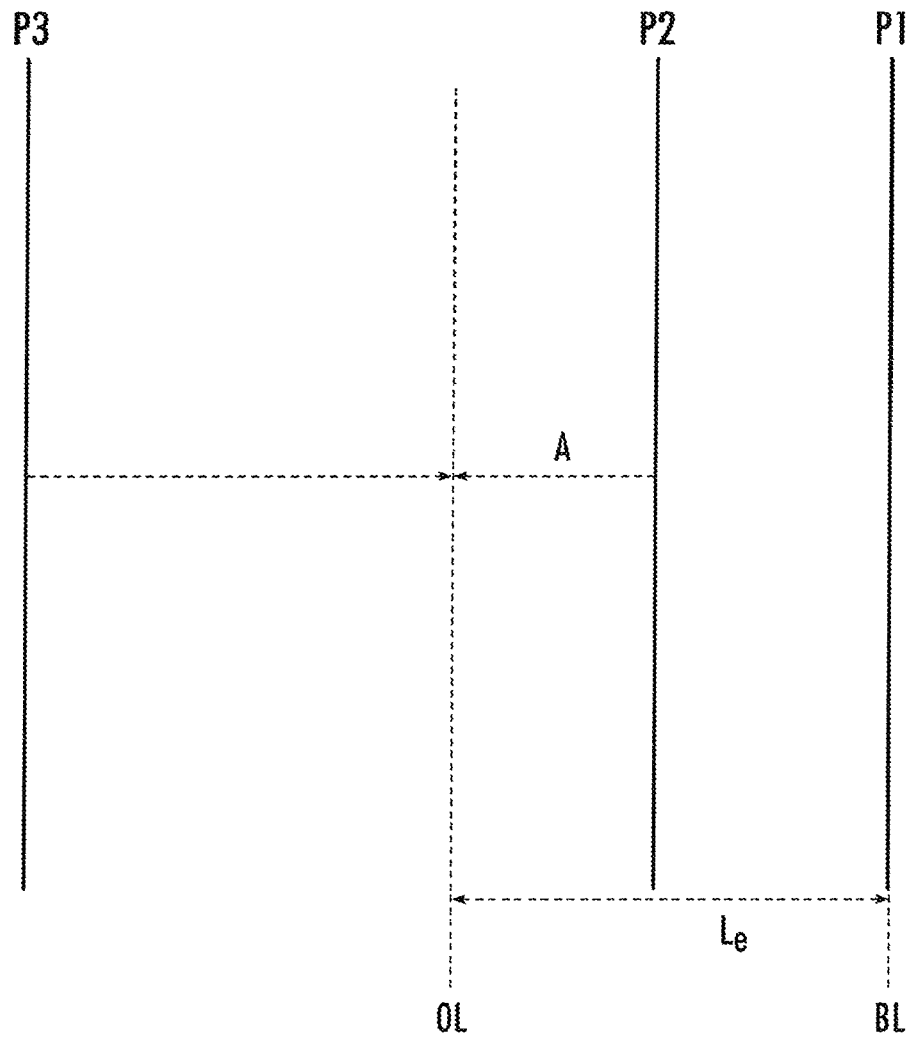
Figure 3:
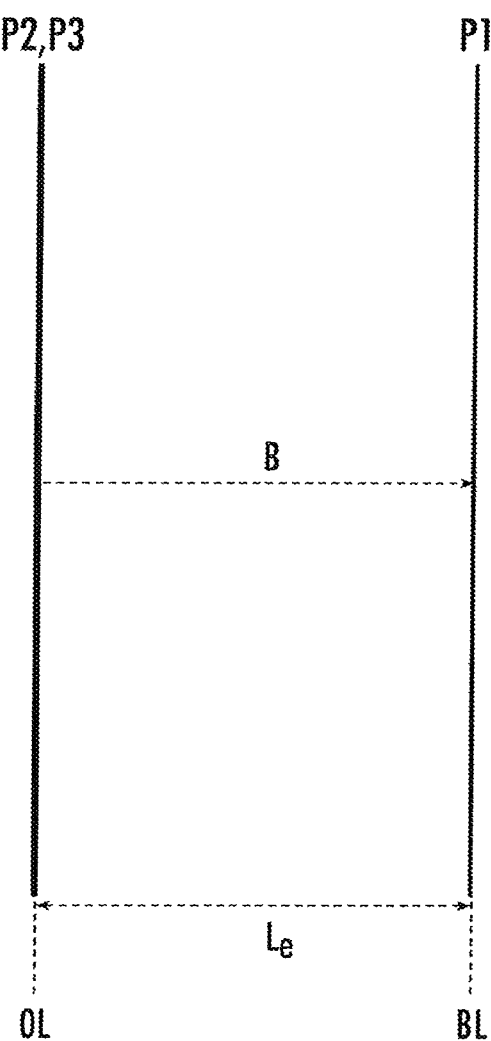
Figure 4:
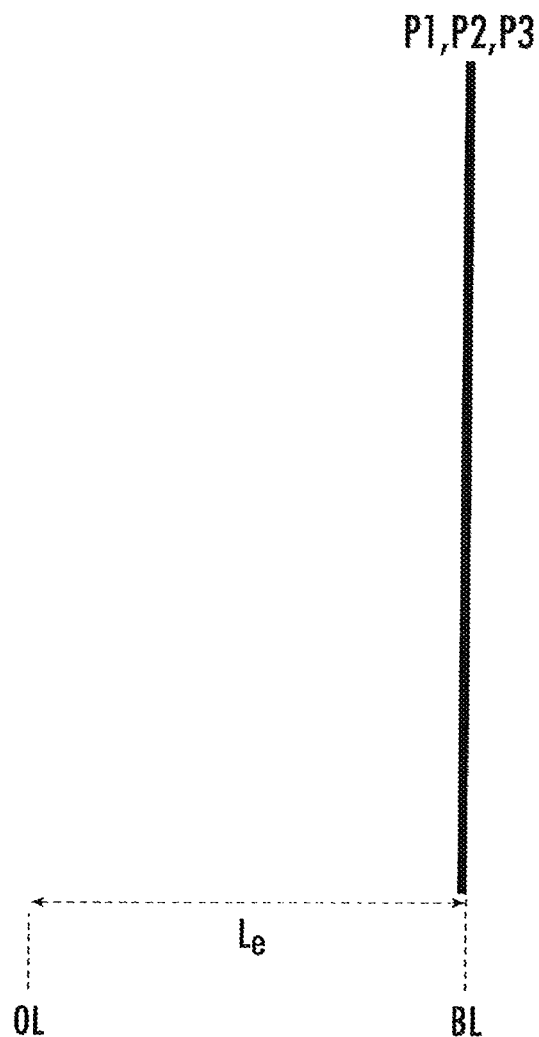
Figure 5:
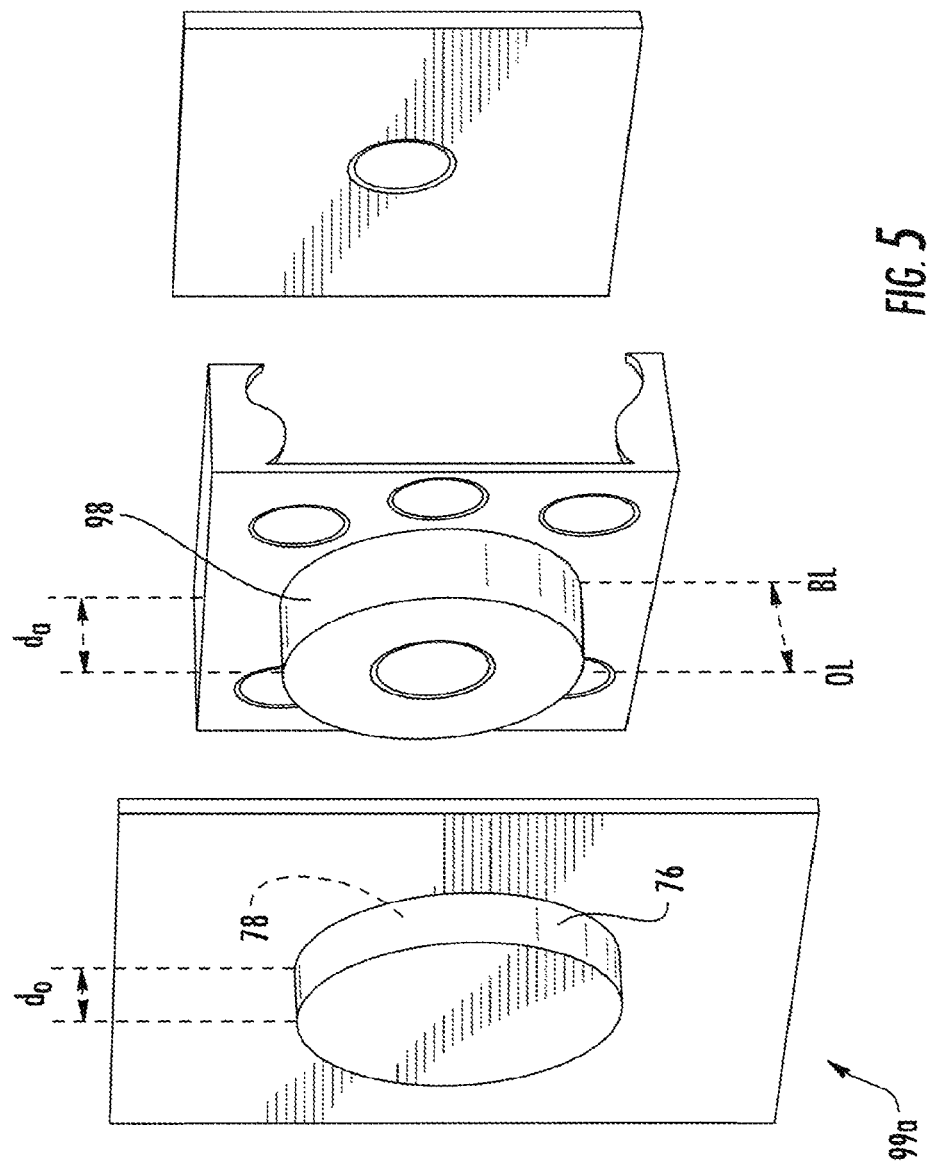
Figure 6A:
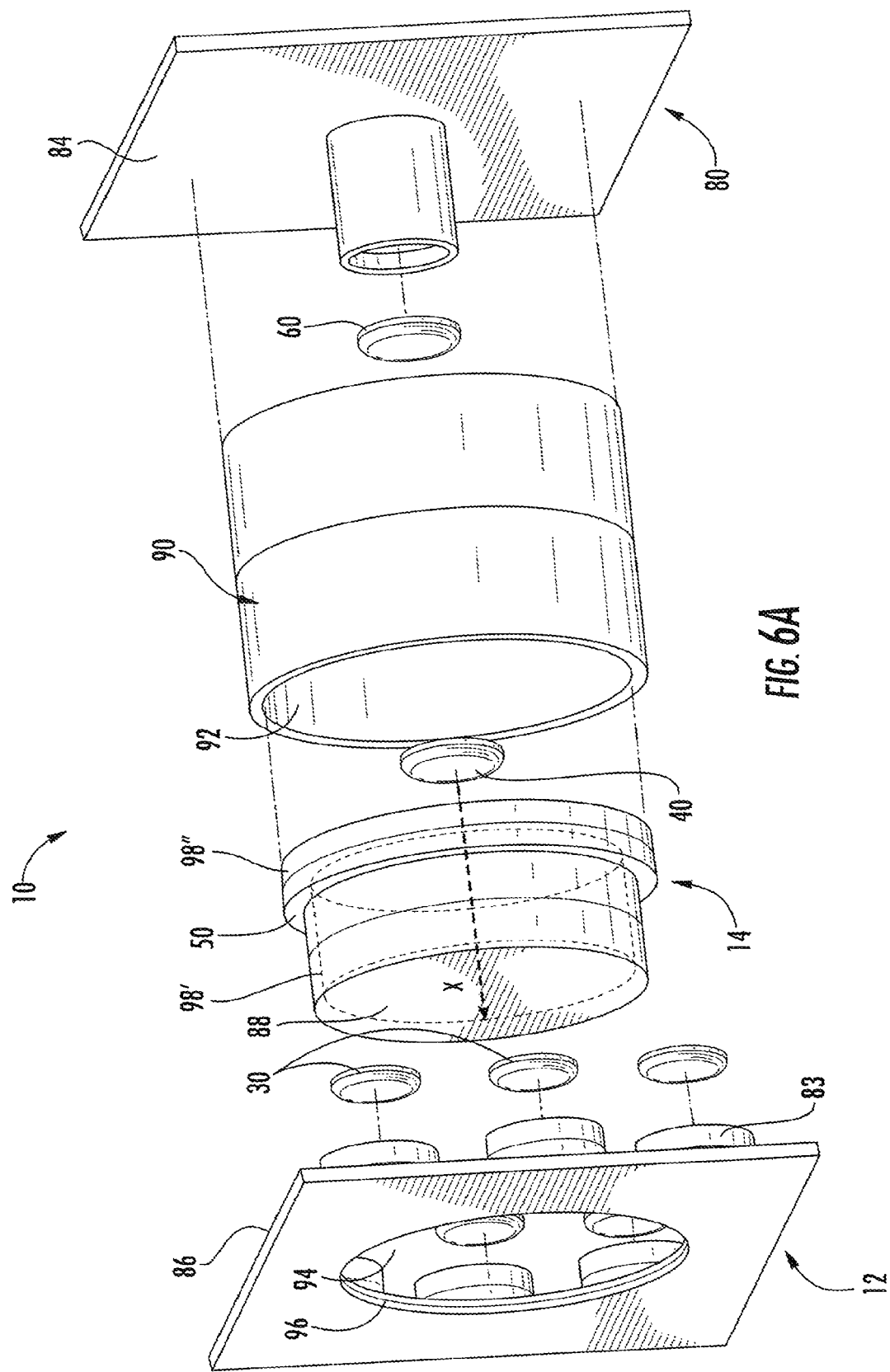
Figure 6B:
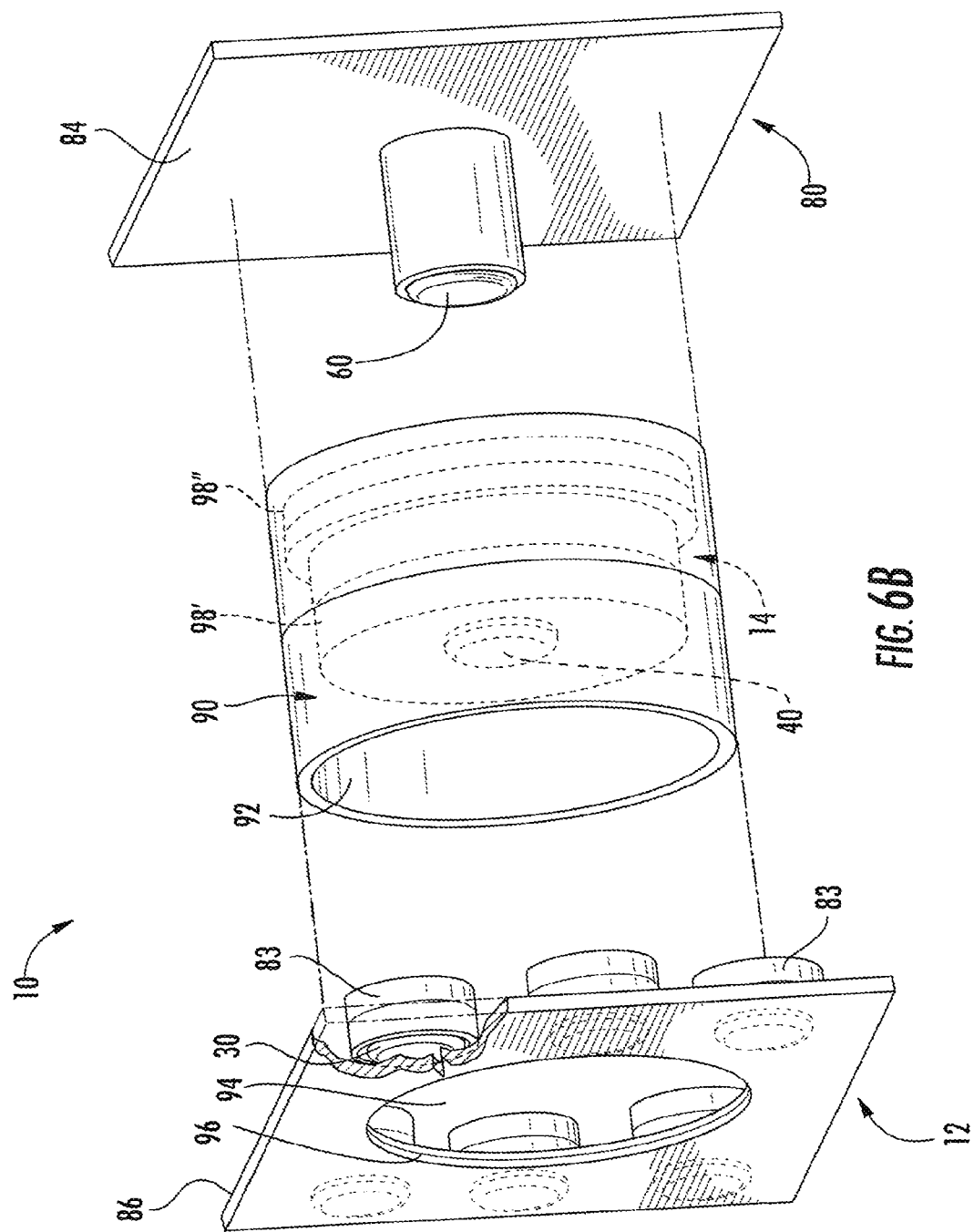
Figure 6C:
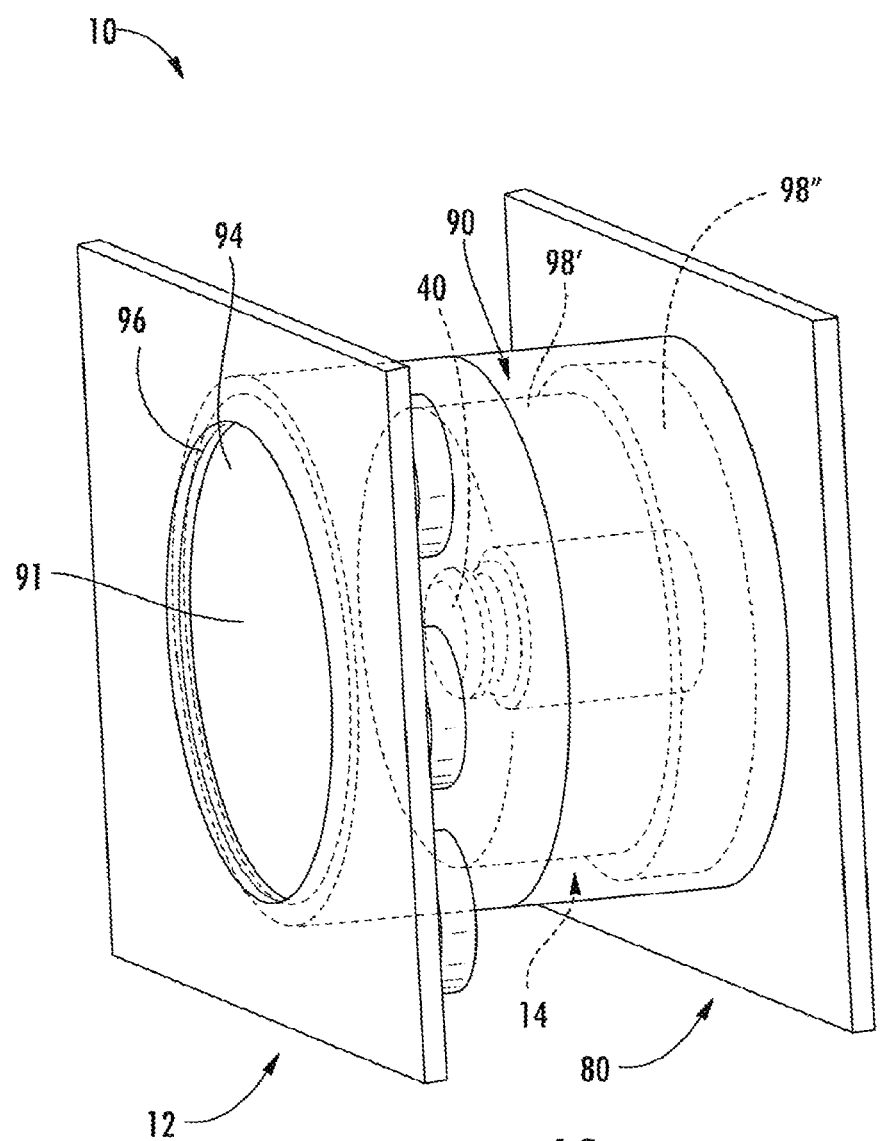
Figure 7C:
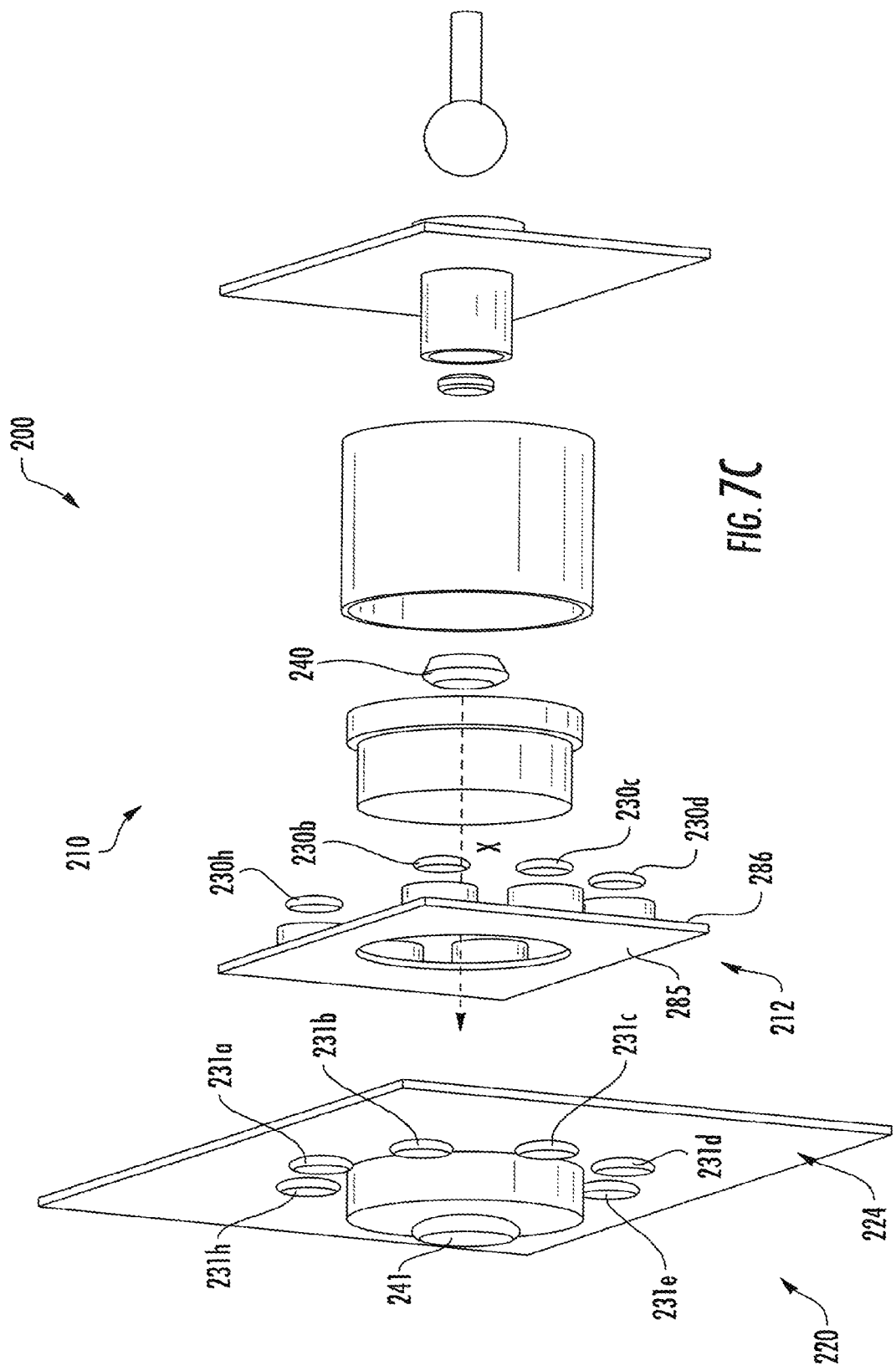
Figure 9B:
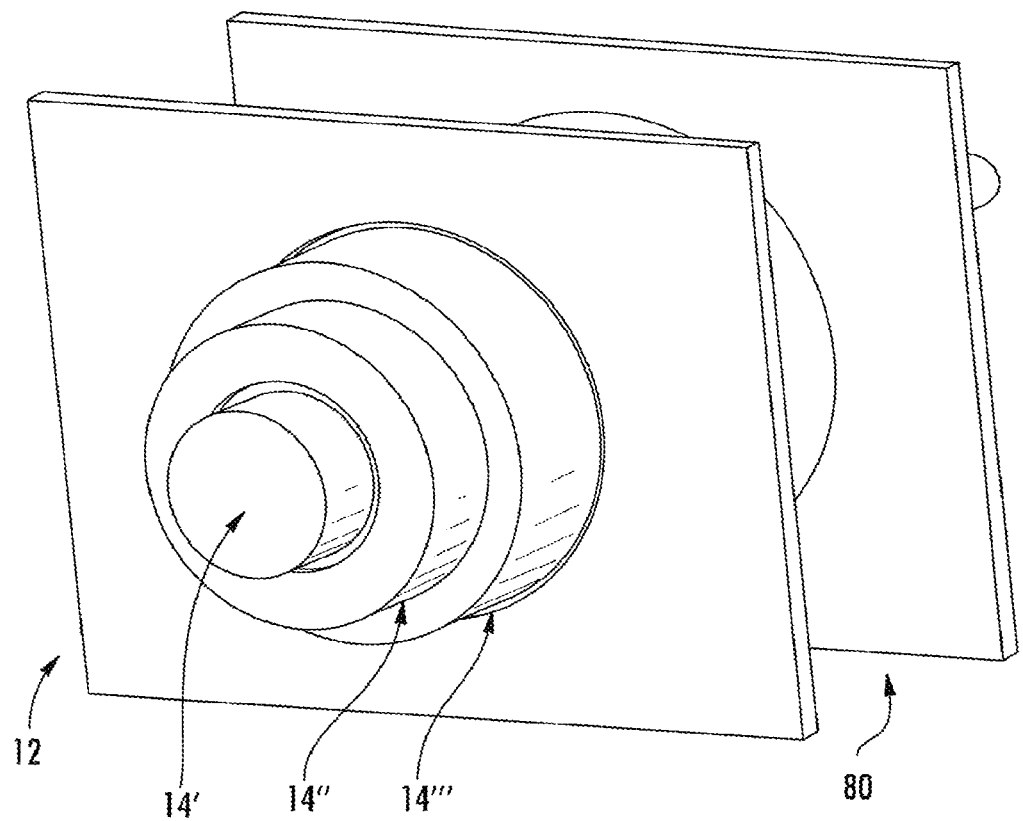
Figure 11B:
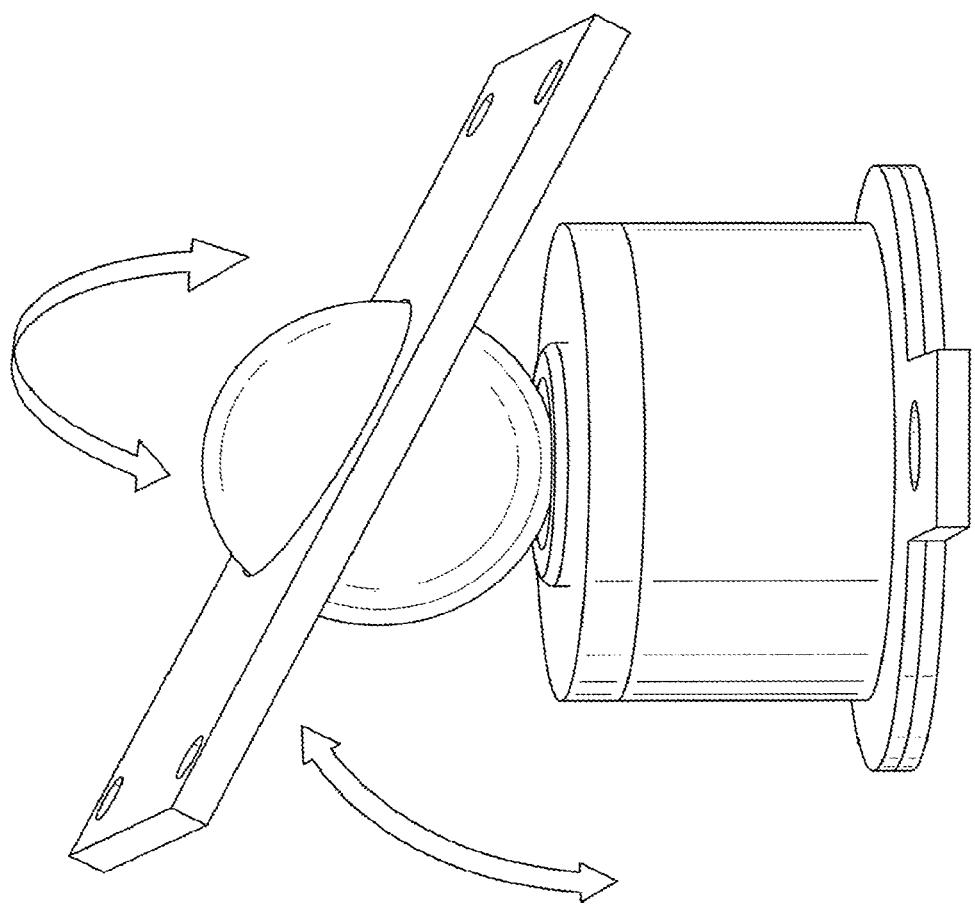
Figure 14:
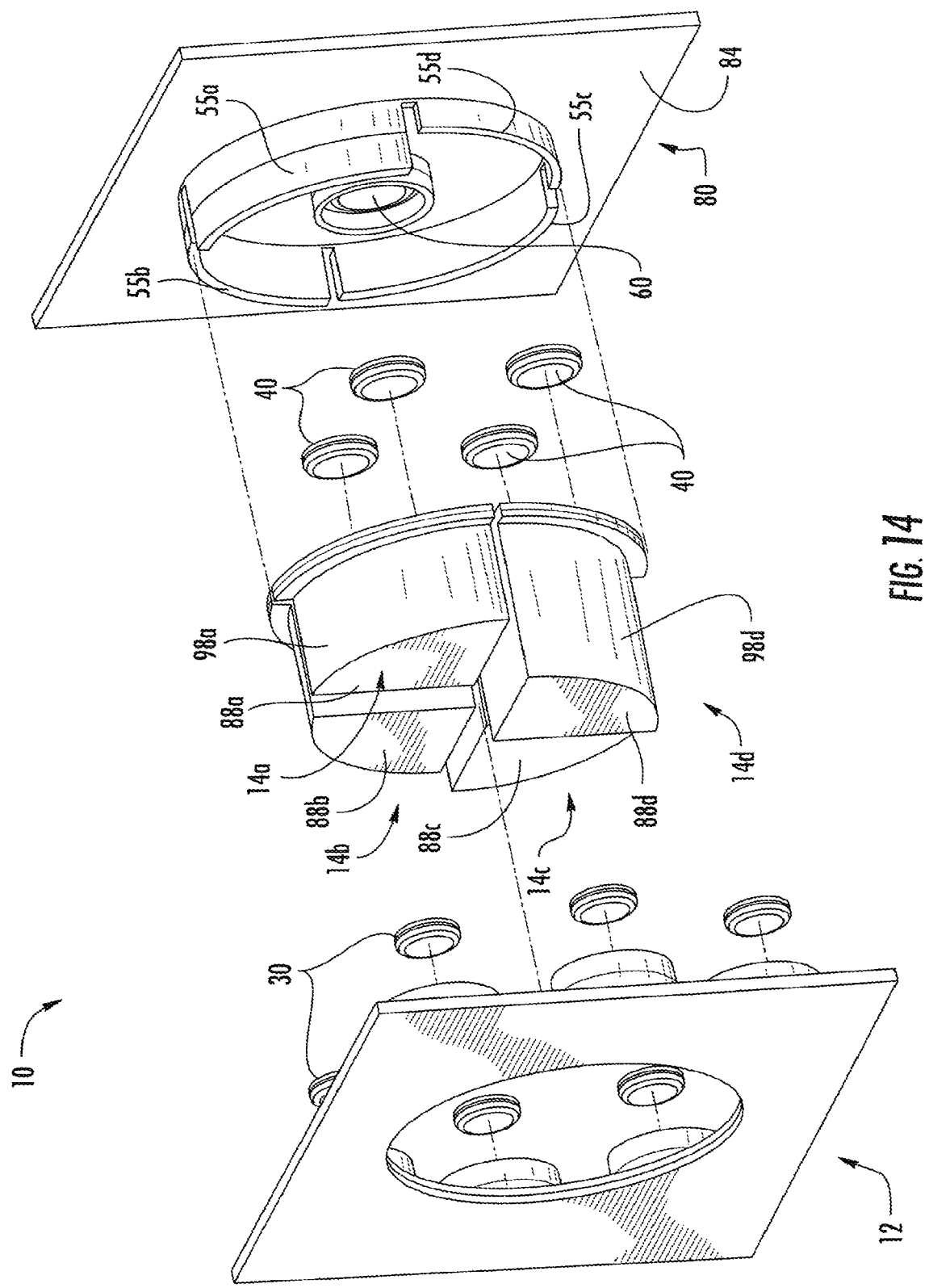
Figure 15:
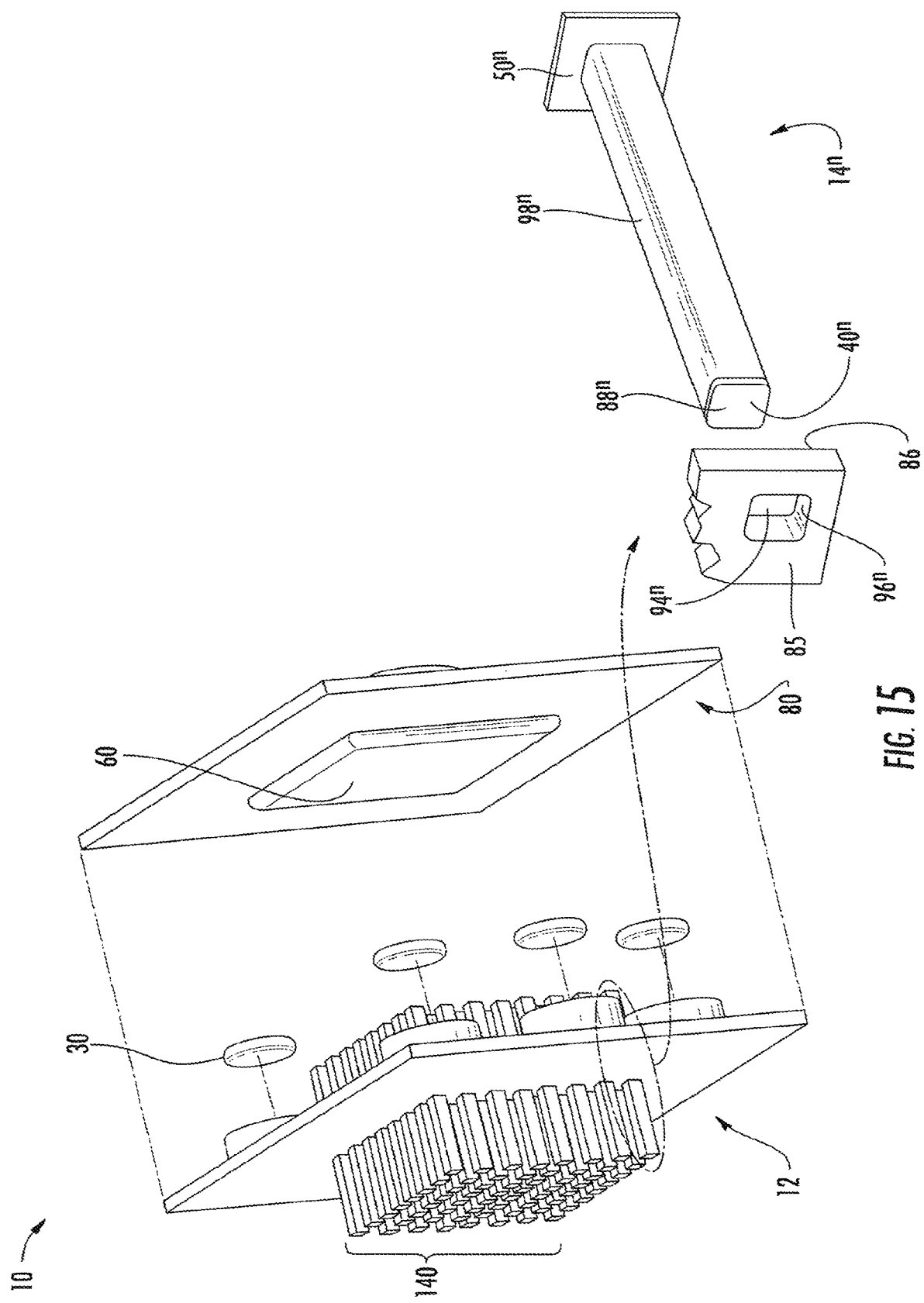
Figure 16A:
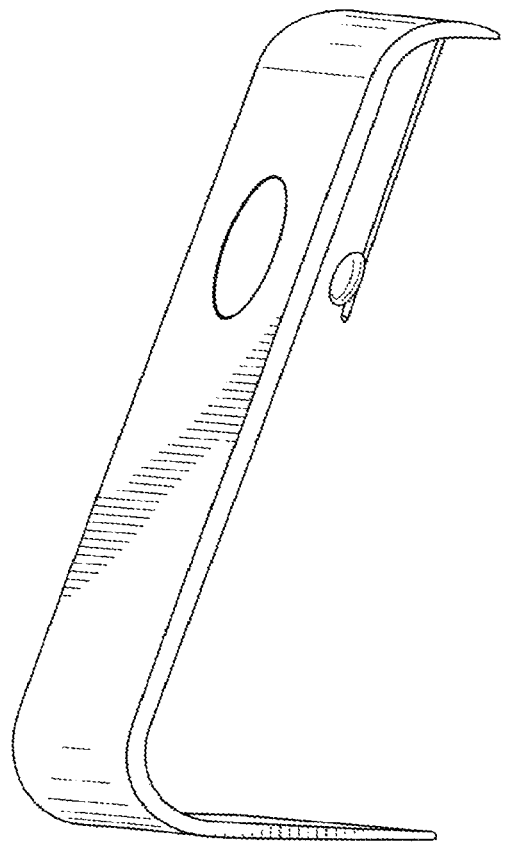
Figure 16B:
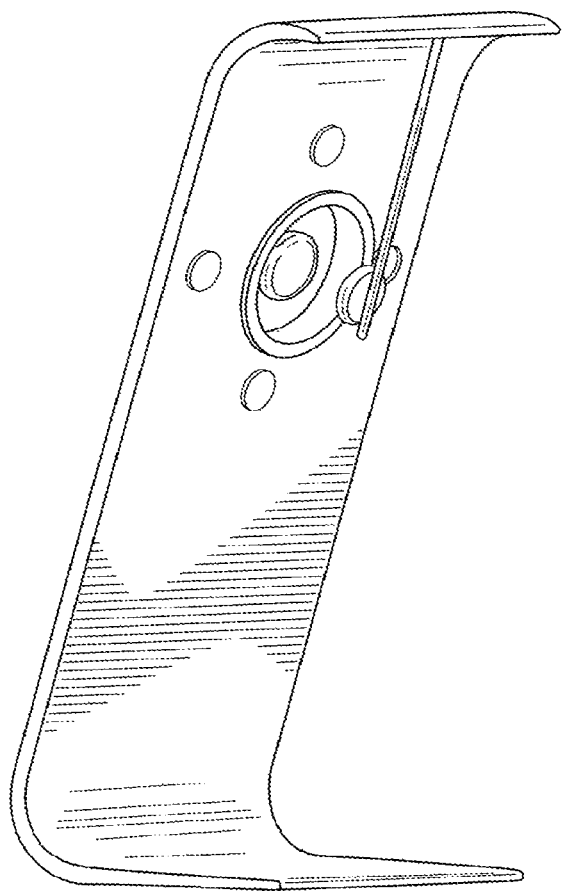
Figure 17A:
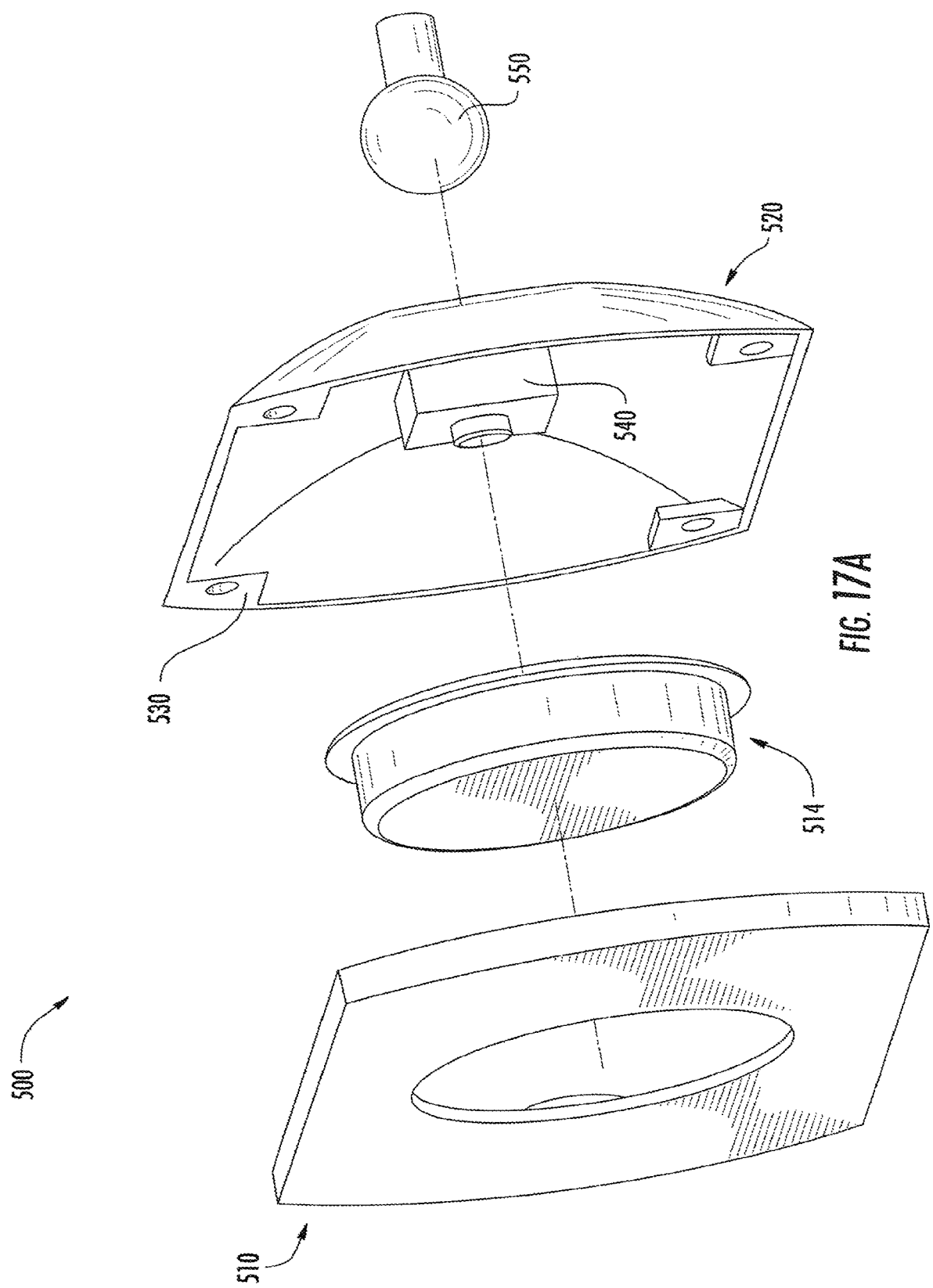
Figure 17B:
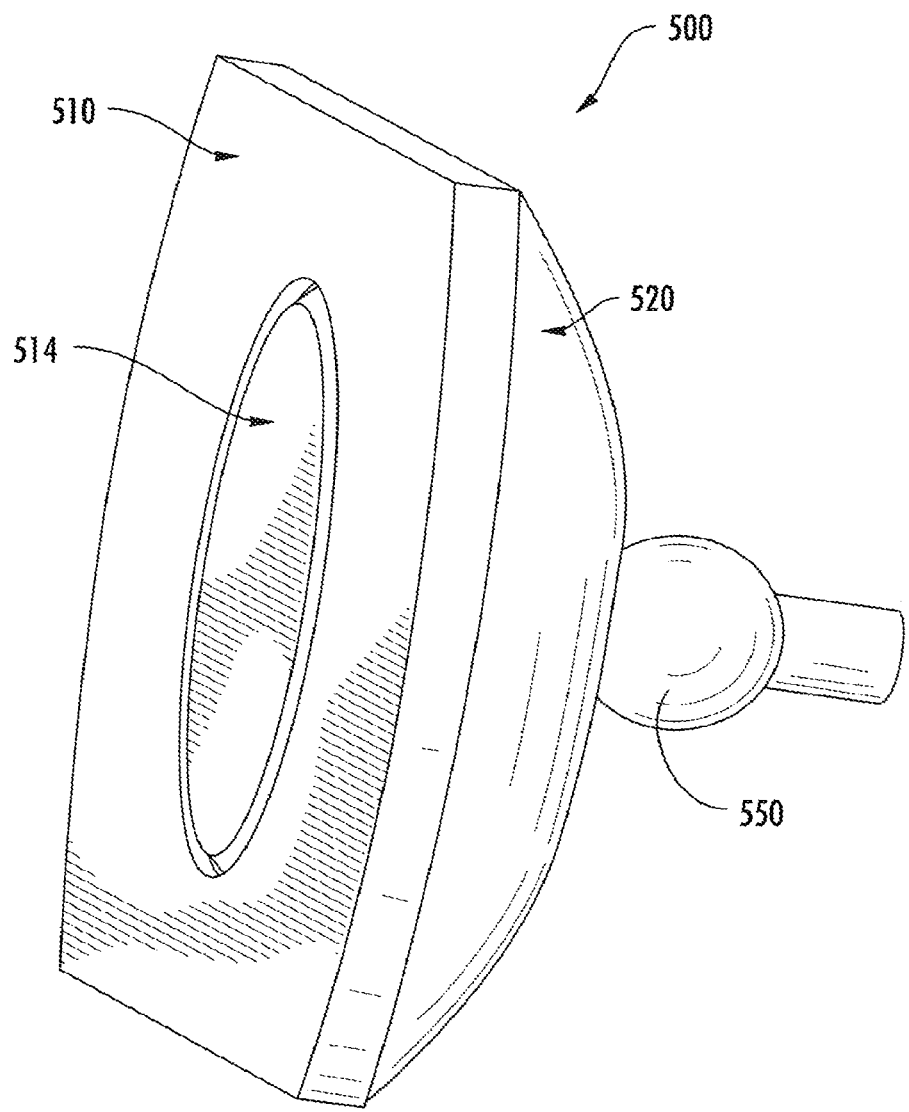
Figure 17C:
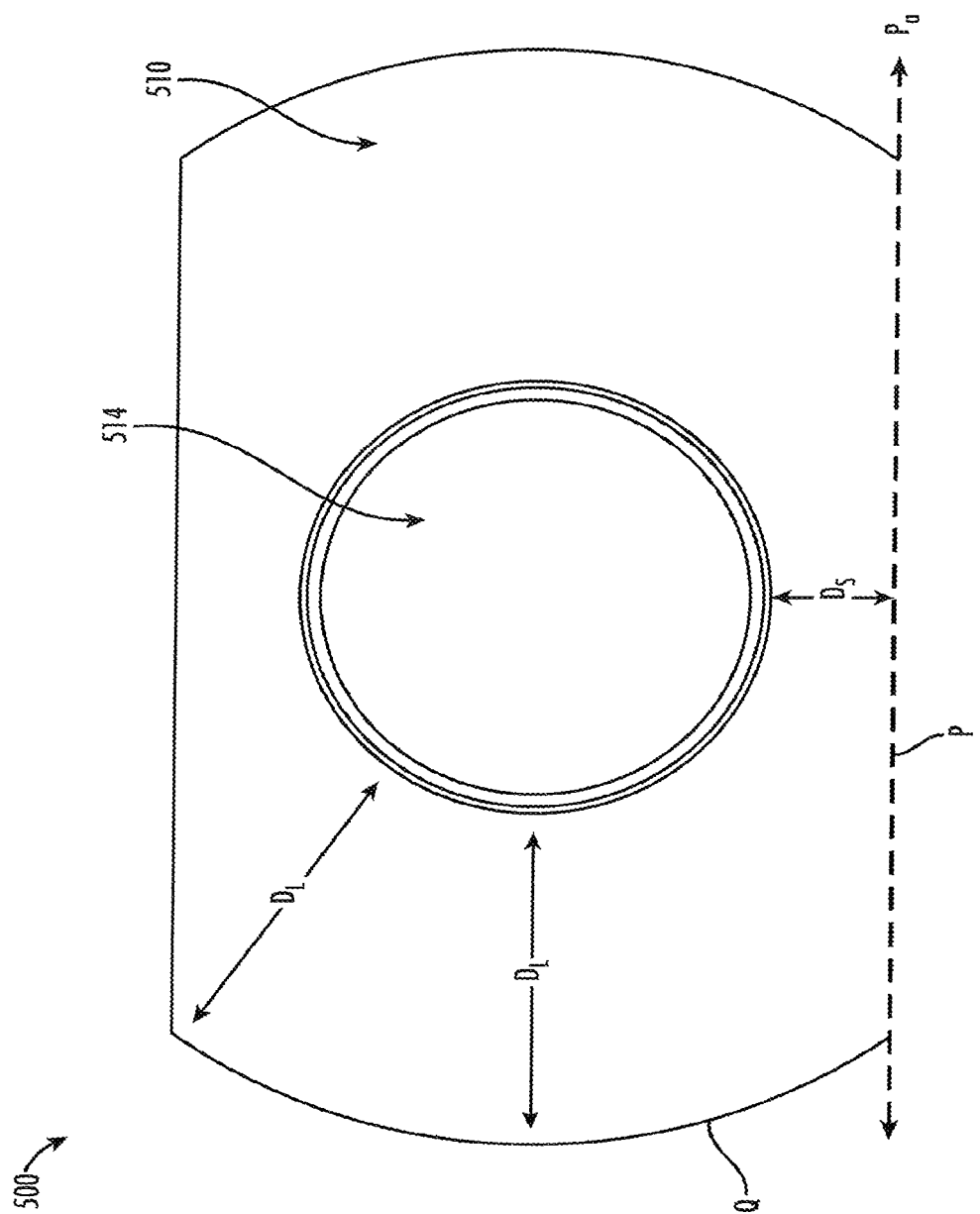
Figure 17D:
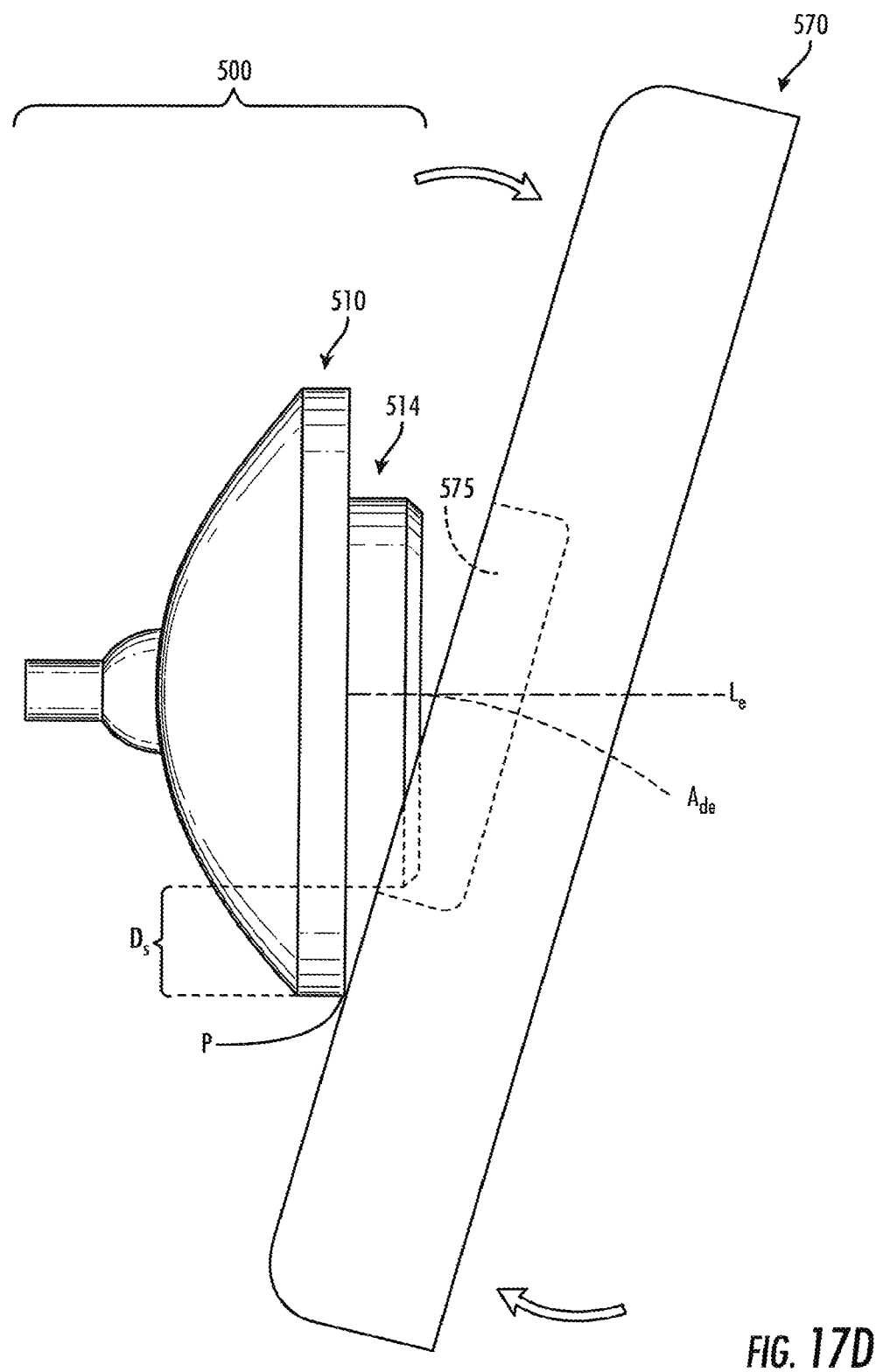
Figure 19:
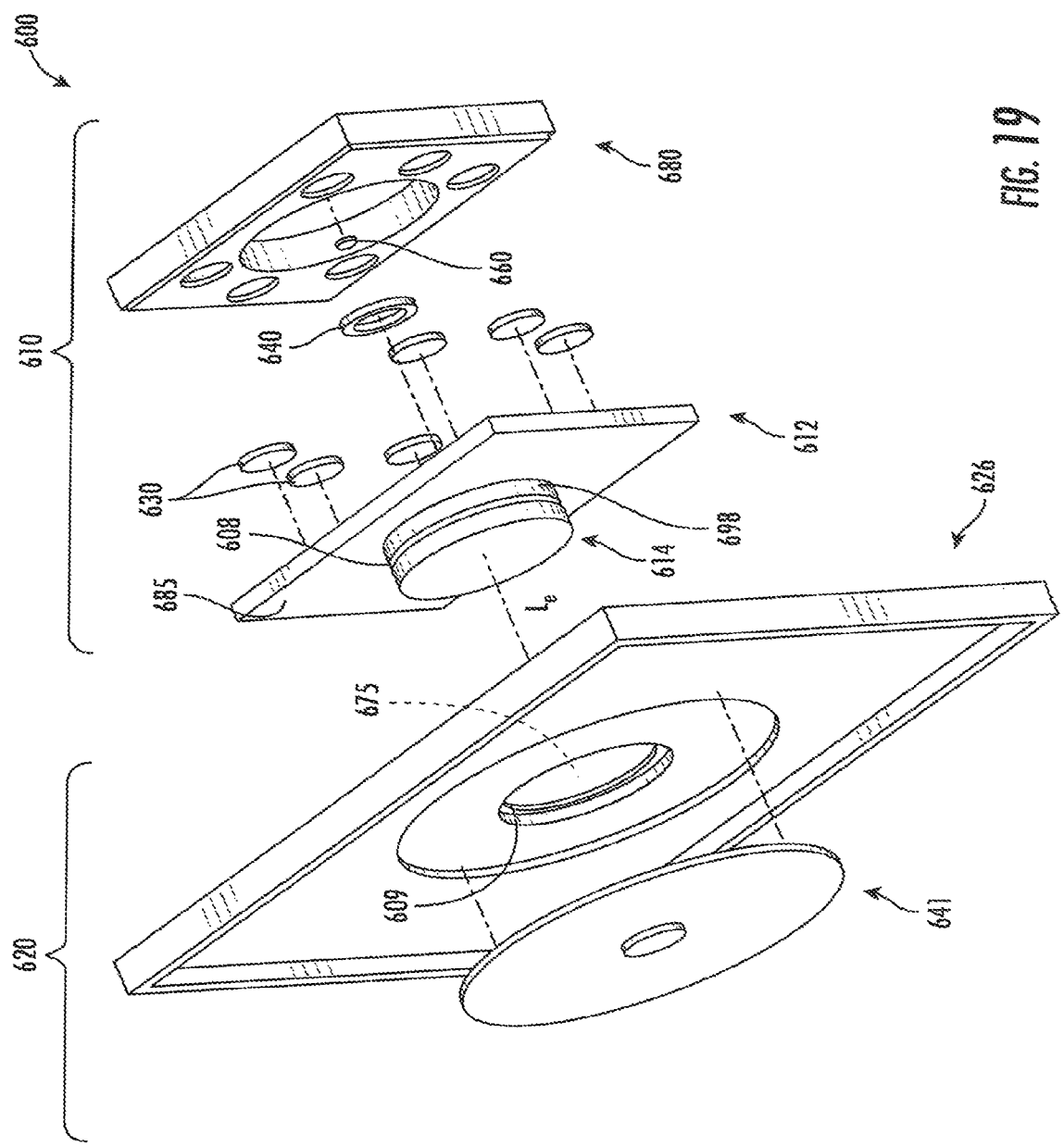
Figure 20B:
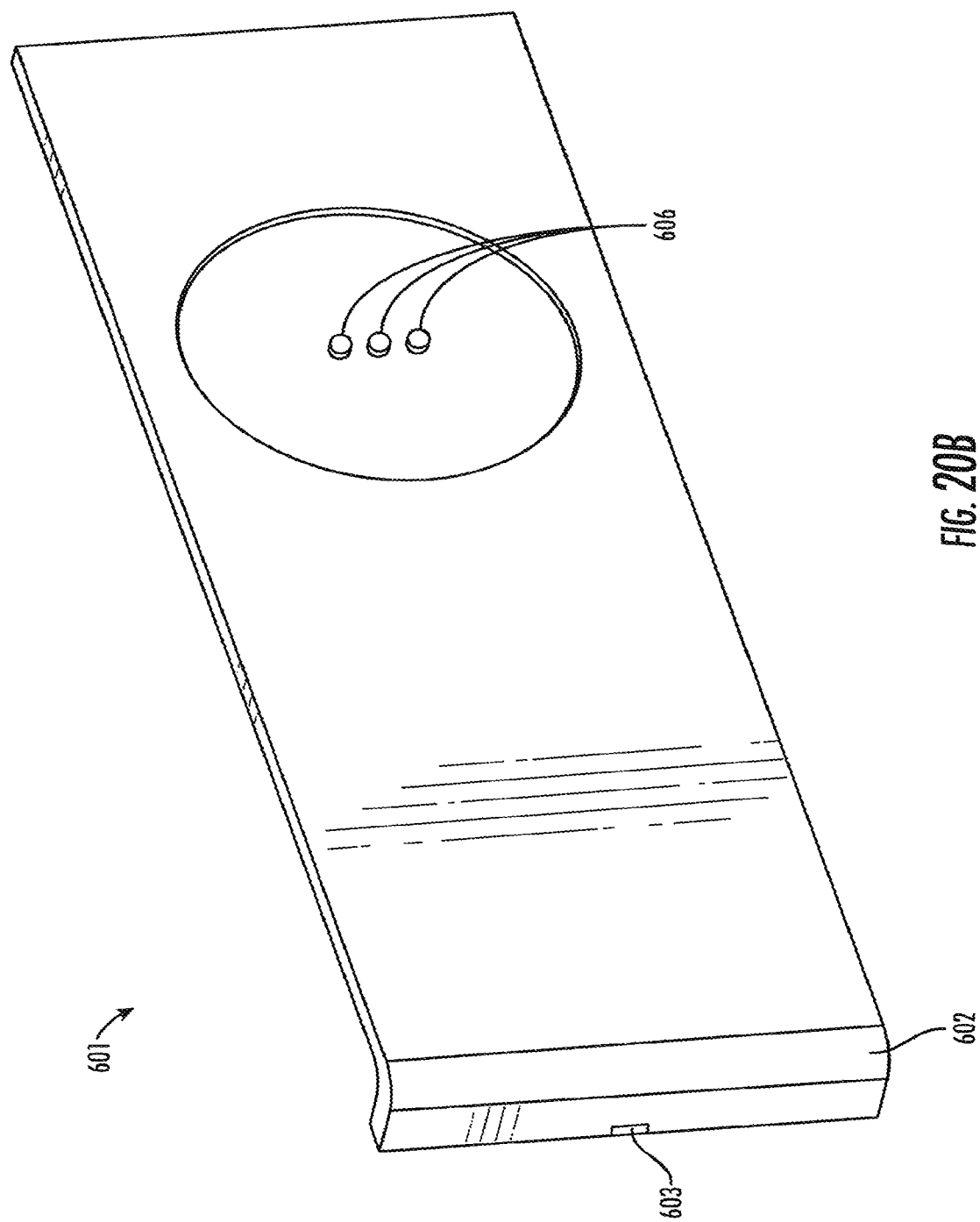
Figure 22:
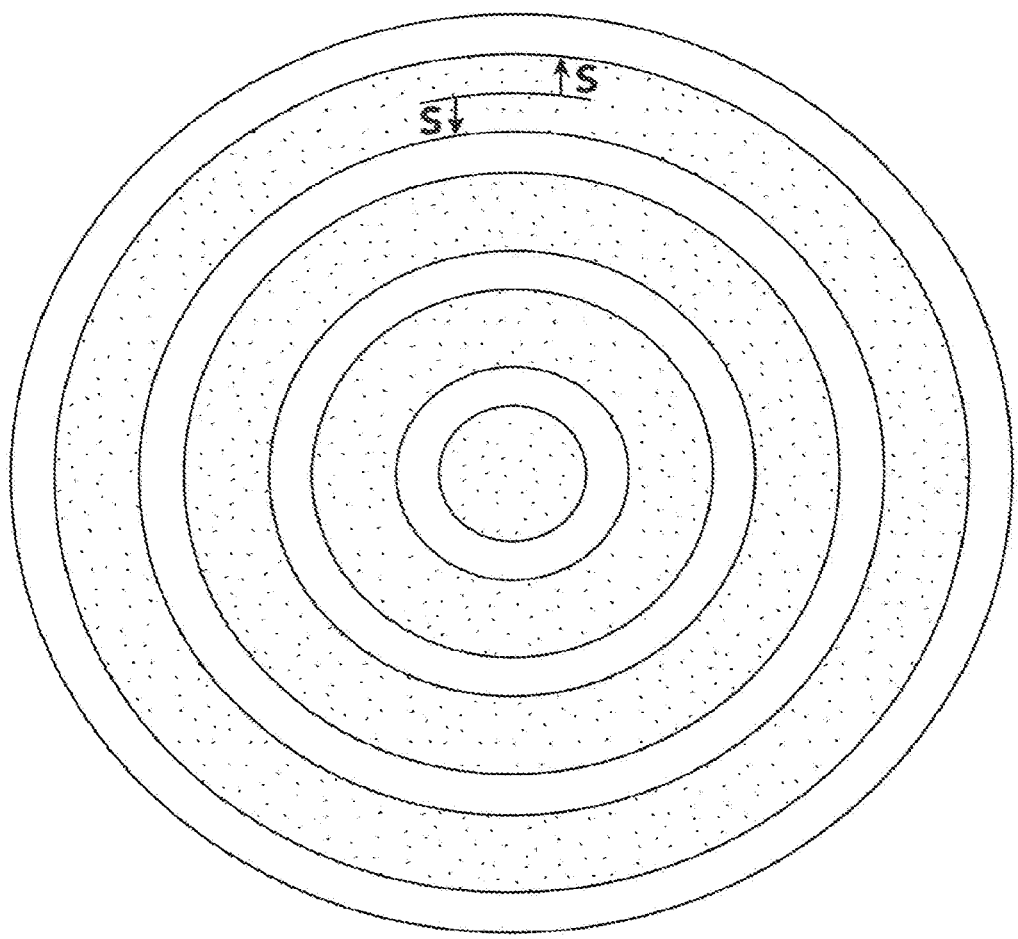
Figure 23:
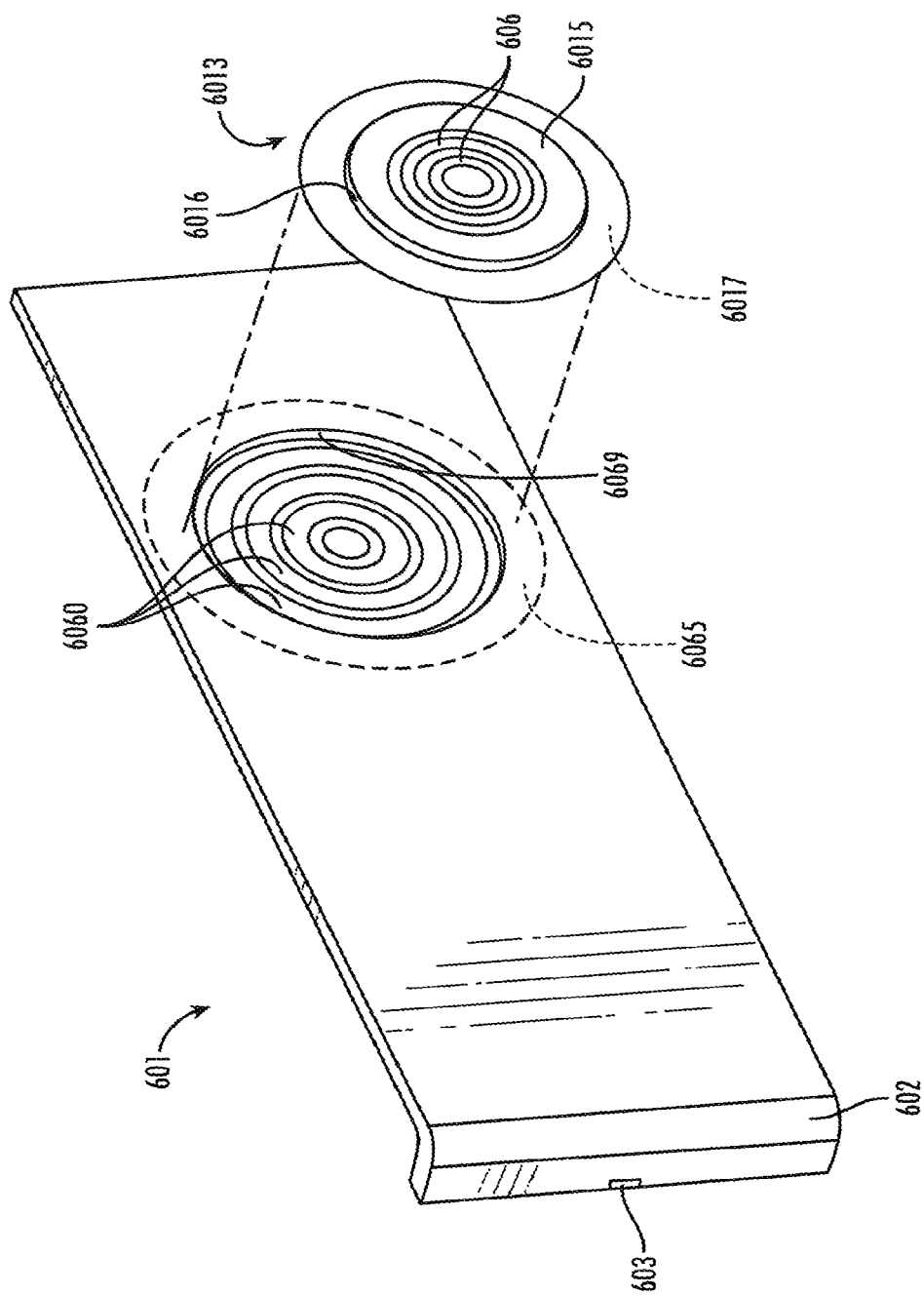
Figure 25:
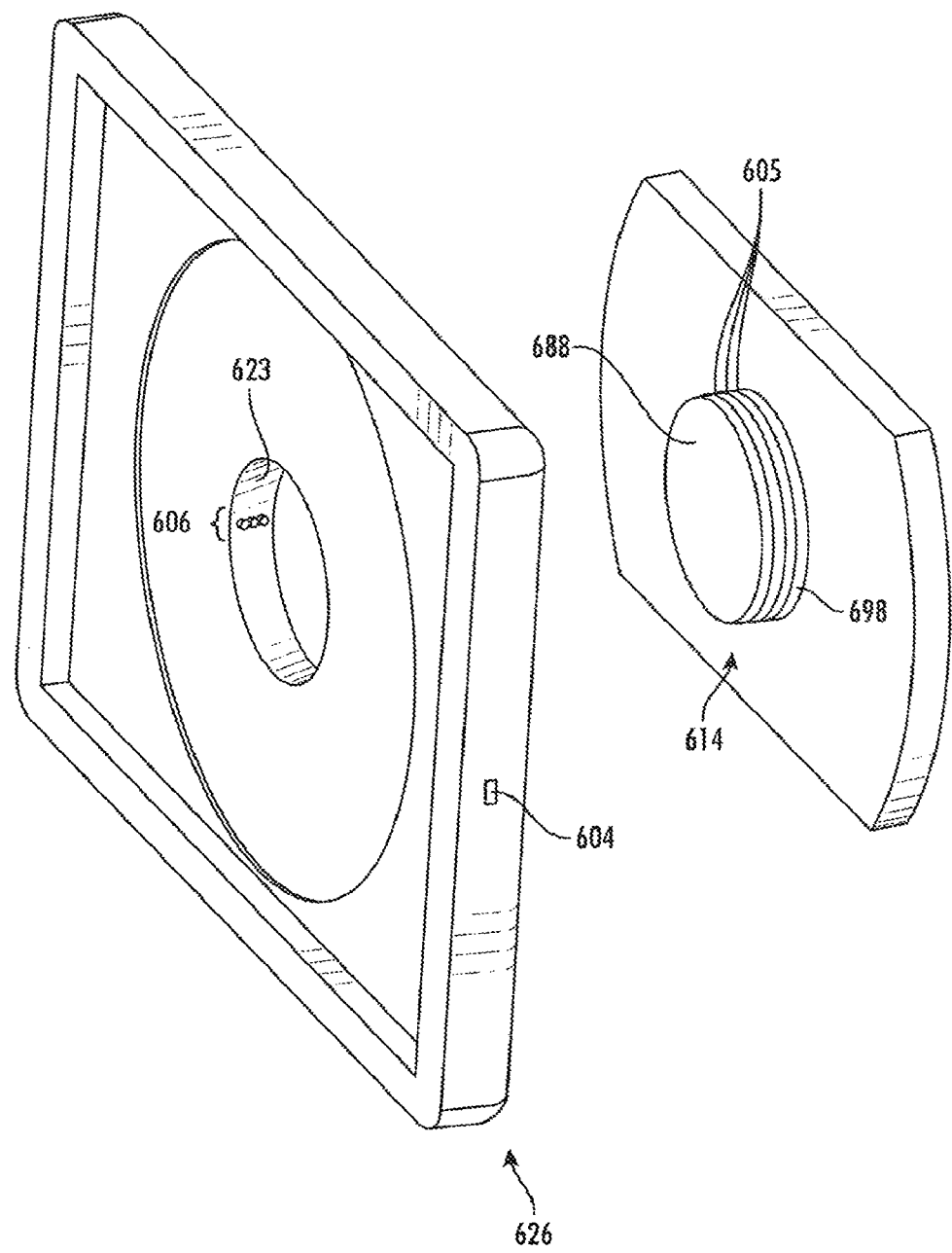
Figure 26:
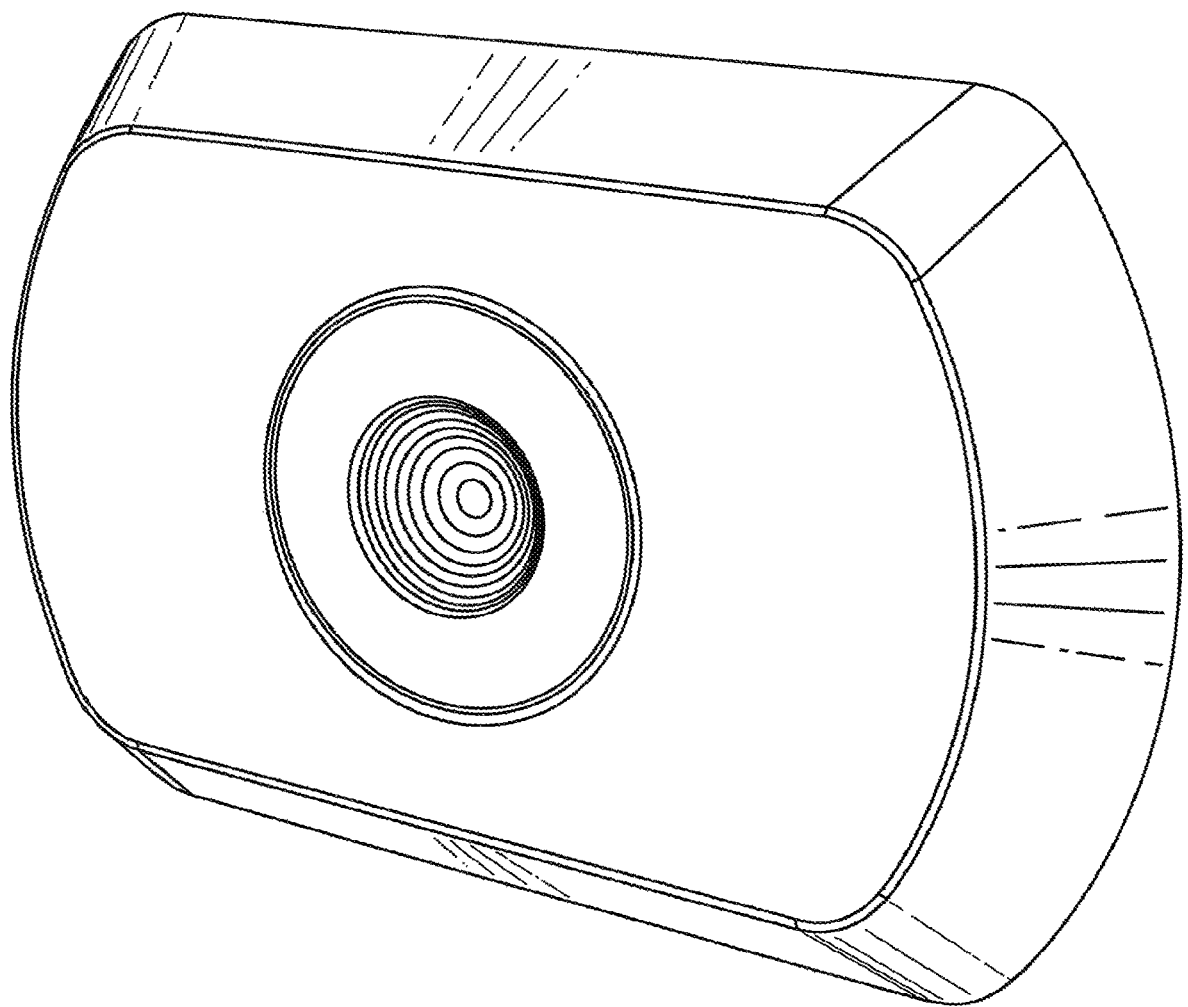
Figure 27A:
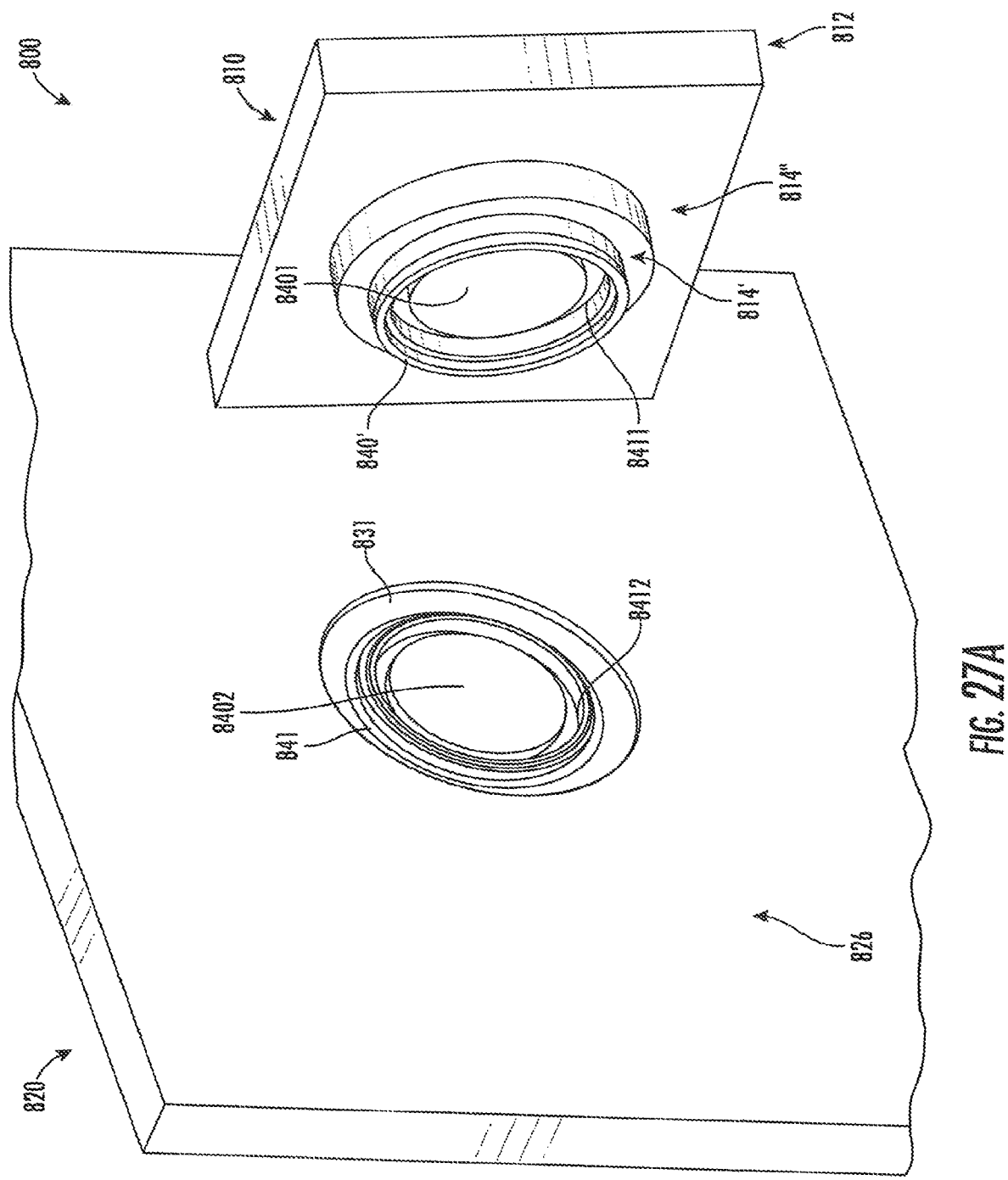
Figure 27B:
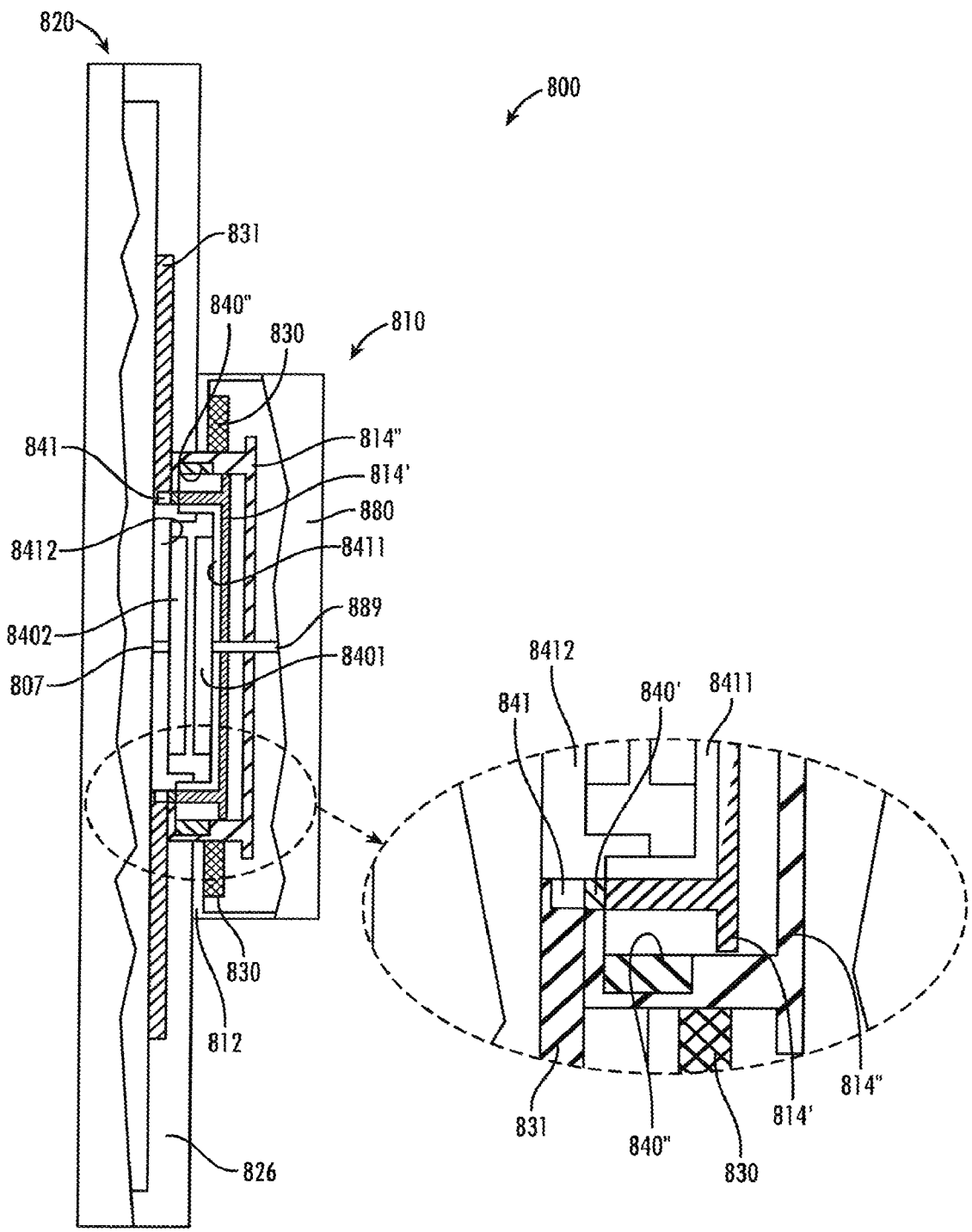
Figure 29:
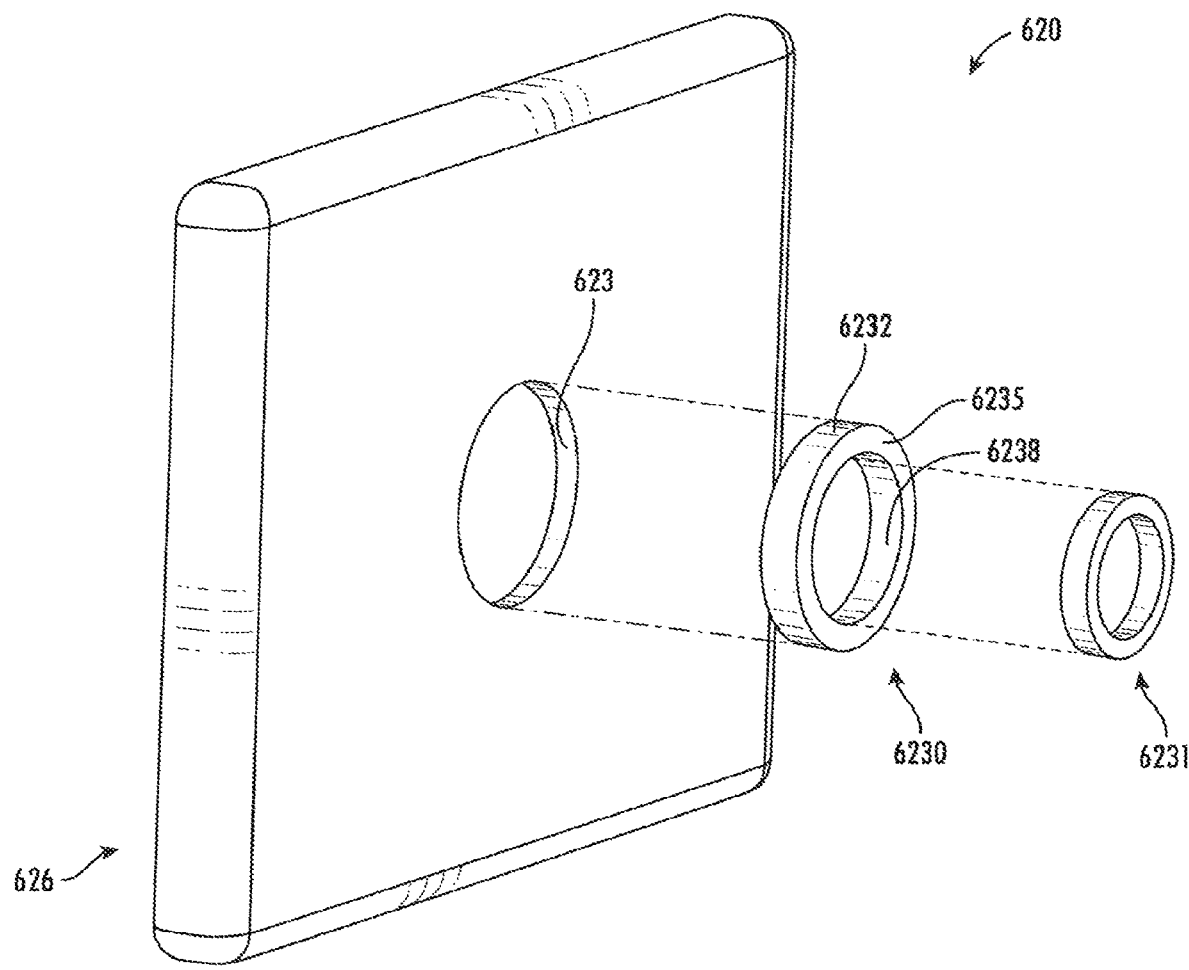
Figure 30:
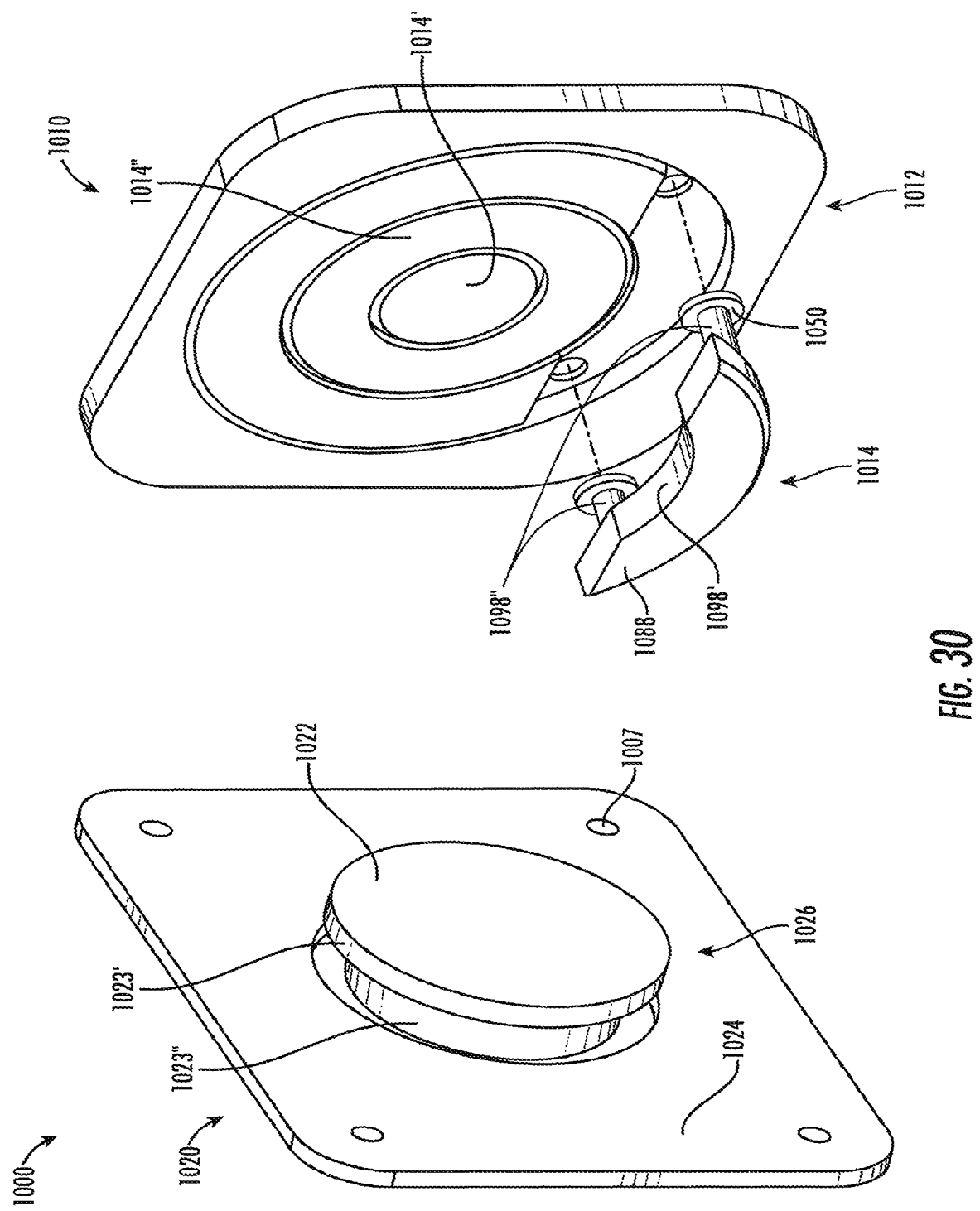
Figure 31:
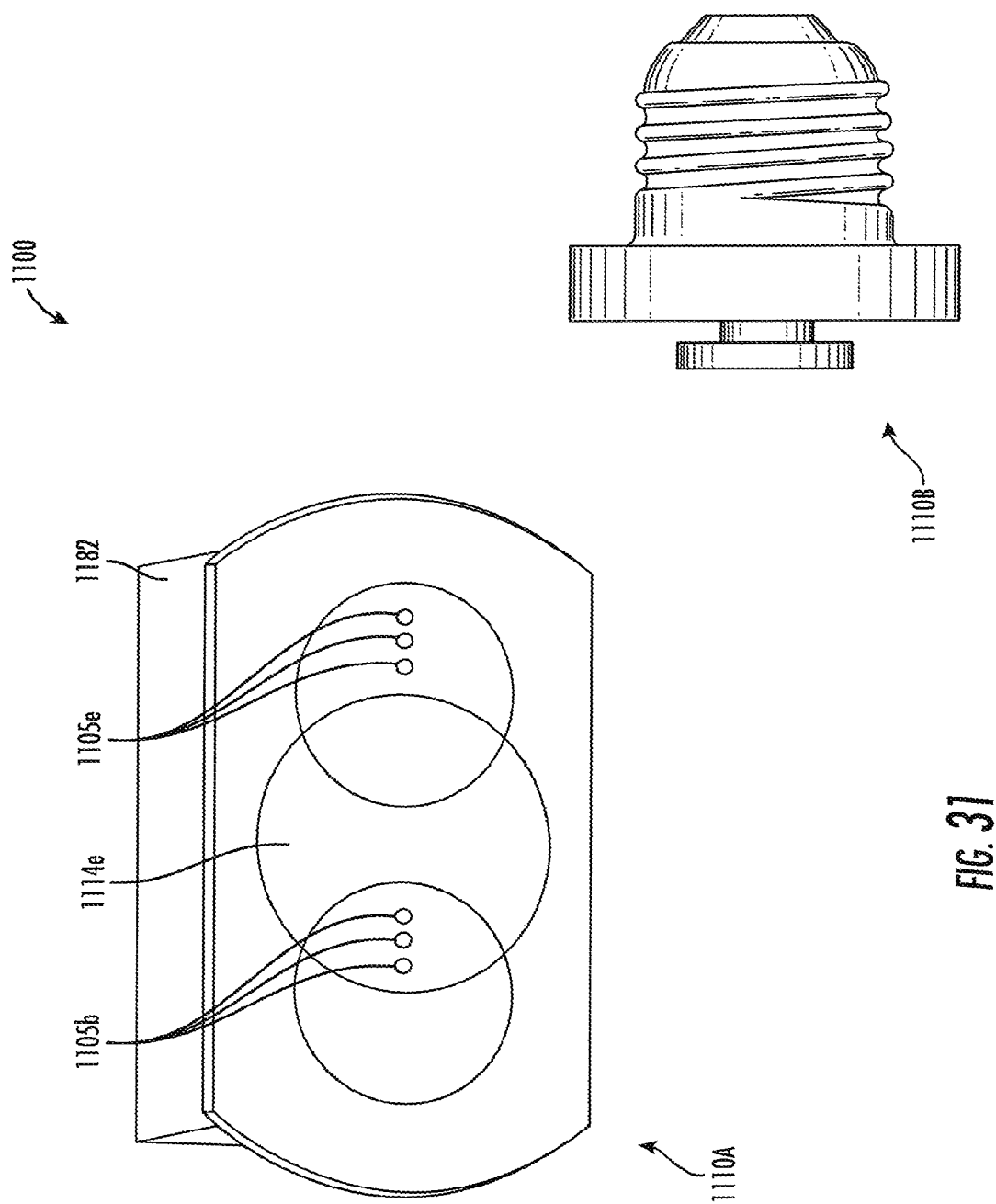
Figure 32A:
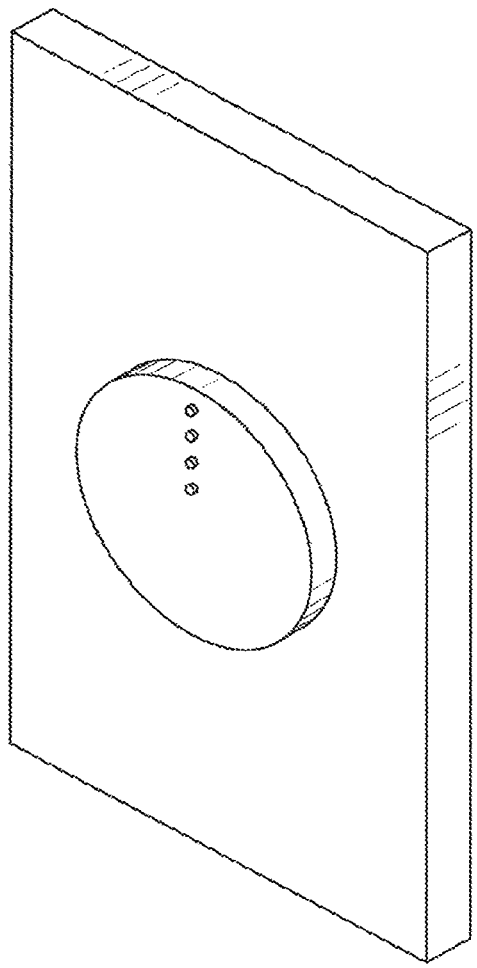
Figure 32B:
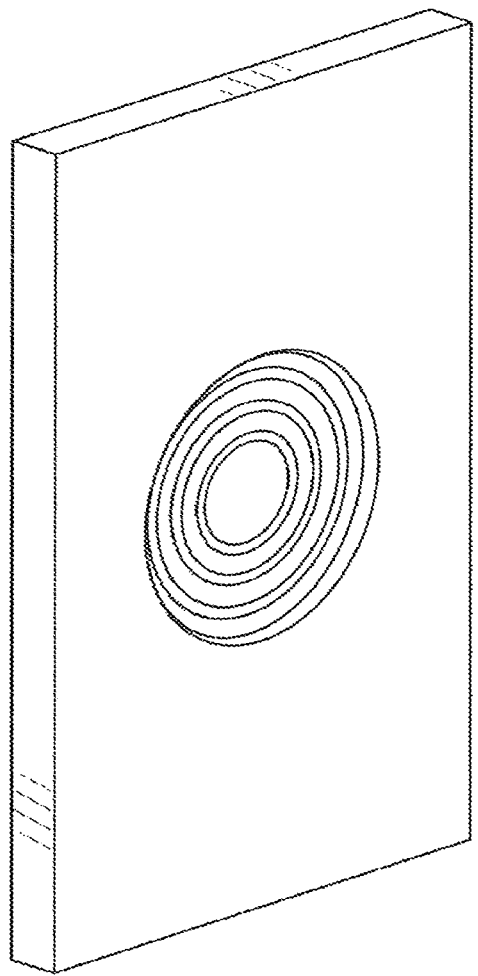
Figure 34:
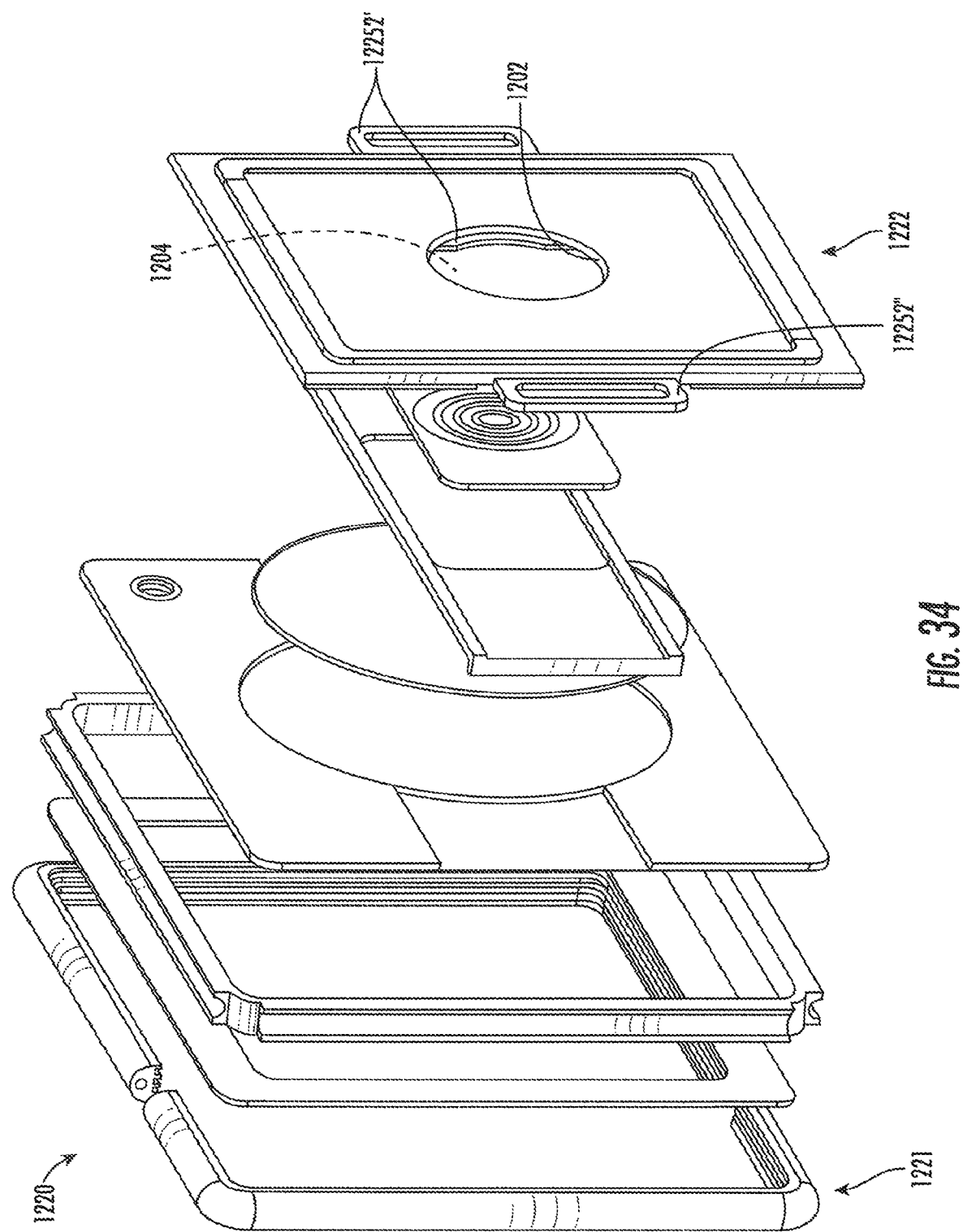
Figure 36:
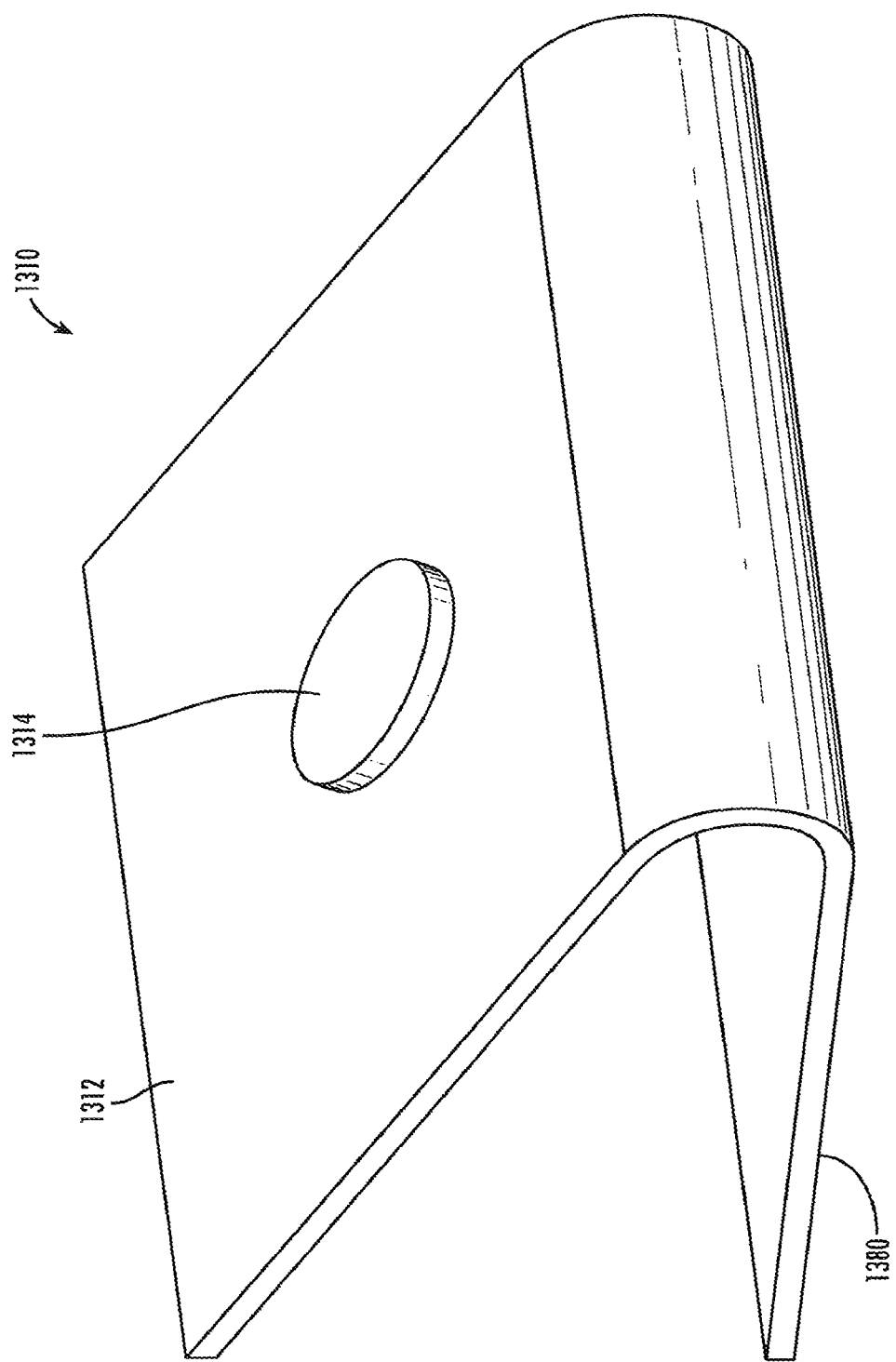
Figure 37:
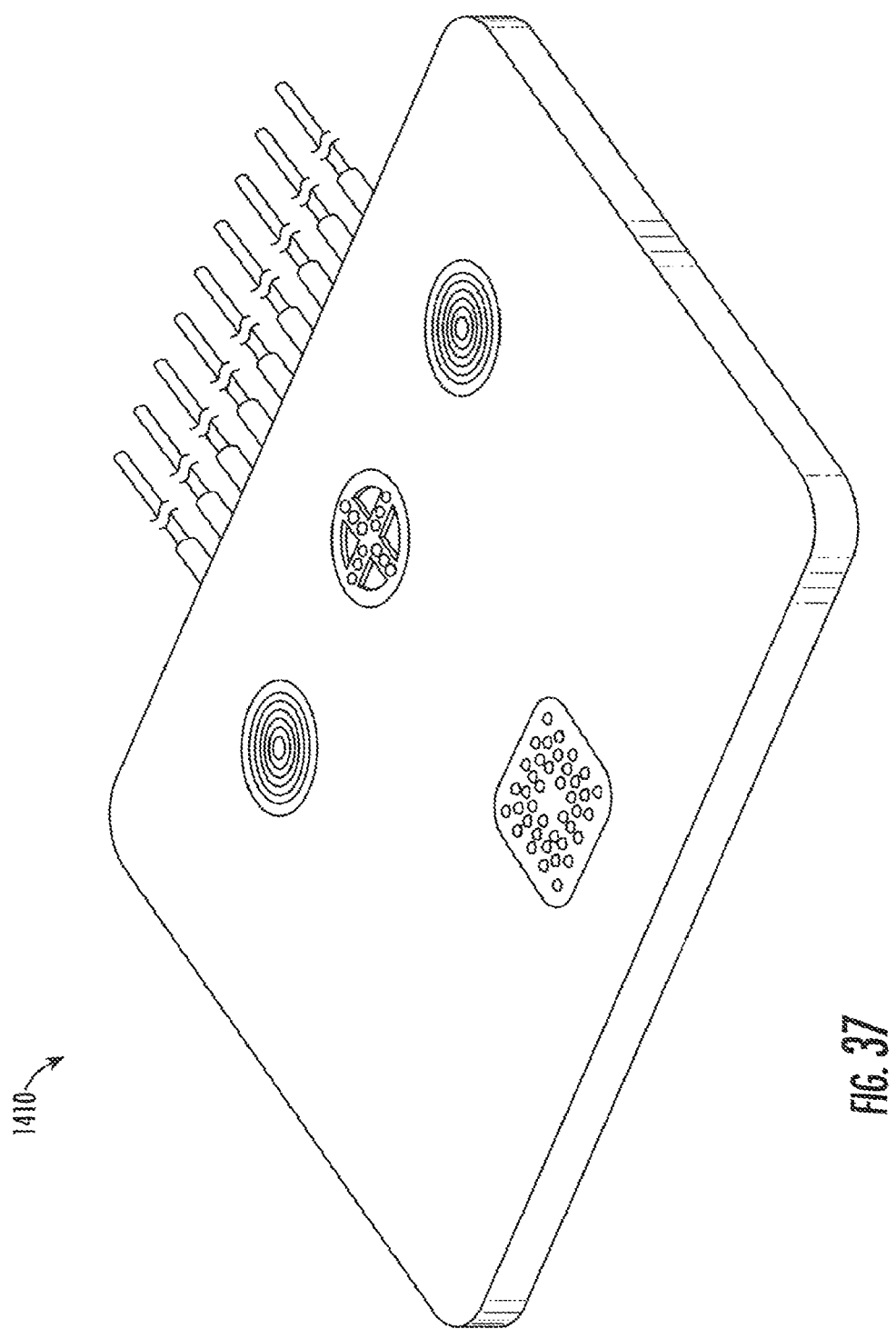
Figure 38:
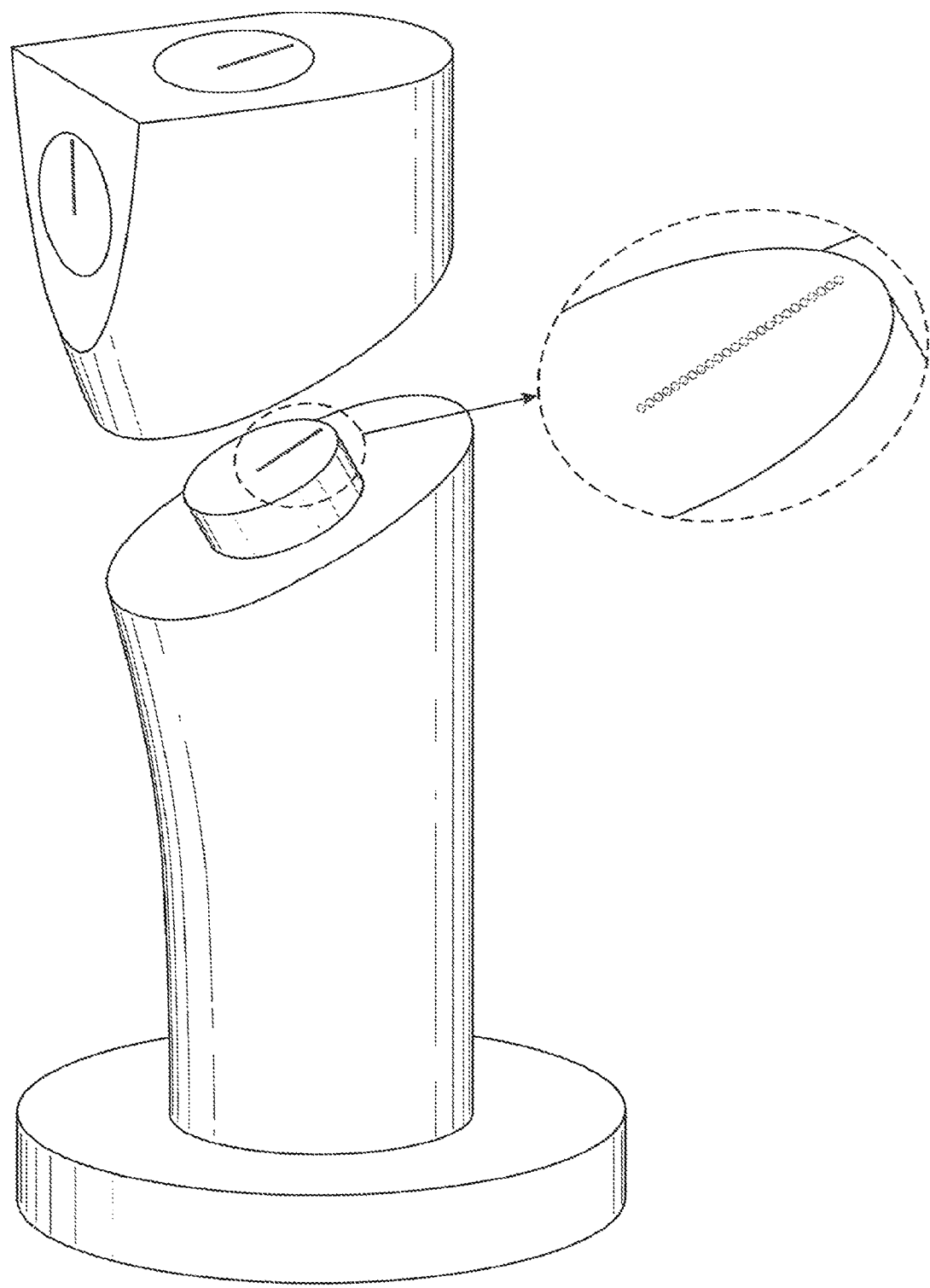

Having thus described the invention in general terms, reference will now be made to the accompanying drawings, which are not necessarily drawn to scale, and wherein:

FIG. 1 shows an exploded view of a mounting apparatus and a nominal object in an unengaged configuration according to an exemplary embodiment of the present invention;

FIGS. 2-4 illustrate relative movements of planes according to an exemplary embodiment of the present invention;

FIG. 5 shows an exploded view of a mounting apparatus and a nominal object in an unengaged configuration according to another exemplary embodiment of the present invention;

FIGS. 6A-6C illustrate a mounting apparatus according to another exemplary embodiment of the present invention;

FIGS. 7A-7C illustrate a system for mounting an object to a mounting surface comprising a mounting apparatus and an object interface according to another exemplary embodiment of the present invention;

FIGS. 8A-8D illustrate a mounting apparatus according to another exemplary embodiment of the present invention;

FIGS. 9A-9C illustrate a mounting apparatus according to another exemplary embodiment of the present invention;

FIG. 10 illustrates a mounting apparatus according to another exemplary embodiment of the present invention;

FIGS. 11A-11B illustrate a system for mounting an object to a mounting surface comprising a mounting apparatus and an object interface according to another exemplary embodiment of the present invention;

FIG. 12 illustrates a mounting apparatus according to another exemplary embodiment of the present invention;

FIG. 13 illustrates a system for mounting an object to a mounting surface comprising a mounting apparatus and an object interface according to another exemplary embodiment of the present invention;

FIG. 14 illustrates a mounting apparatus according to another exemplary embodiment of the present invention;

FIG. 15 illustrates a mounting apparatus according to another exemplary embodiment of the present invention;

FIGS. 16A-16B illustrate a mounting apparatus according to another exemplary embodiment of the present invention;

FIGS. 17A-17C illustrate a mounting apparatus according to another exemplary embodiment of the present invention;

FIG. 17D illustrates a mounting apparatus and an object interface according to another exemplary embodiment of the present invention;

FIG. 18 illustrates a system for mounting an object to a mounting surface comprising a mounting apparatus and an object interface according to another exemplary embodiment of the present invention;

FIG. 19 illustrates a system for mounting an object to a mounting surface comprising a mounting apparatus and an object interface according to another exemplary embodiment of the present invention;

FIG. 20A illustrates a system for mounting an object to a mounting surface comprising a mounting apparatus and an object interface according to another exemplary embodiment of the present invention;

FIG. 20B illustrates a modular component of an object interface according to another exemplary embodiment of the present invention;

FIG. 21 illustrates a system for mounting an object to a mounting surface comprising a mounting apparatus and an object interface according to another exemplary embodiment of the present invention;

FIG. 22 illustrates a schematic front view of a plurality of electrical connectors according to another exemplary embodiment of the present invention;

FIG. 23 illustrates a modular component of an object interface according to another exemplary embodiment of the present invention;

FIG. 24 illustrates a portion of a mounting apparatus and a modular component of an object interface according to another exemplary embodiment of the present invention;

FIG. 25 illustrates a system for mounting an object to a mounting surface comprising a mounting apparatus and an object interface according to another exemplary embodiment of the present invention;

FIG. 26 illustrates a mounting apparatus according to another exemplary embodiment of the present invention;

FIGS. 27A-27B illustrate a system for mounting an object to a mounting surface comprising a mounting apparatus and an object interface according to another exemplary embodiment of the present invention;

FIGS. 28A-28B illustrate a mounting apparatus according to another exemplary embodiment of the present invention;

FIG. 28C illustrates a modular component of a mounting apparatus according to another exemplary embodiment of the present invention;

FIG. 28D illustrates a cross-sectional view of a modular component of a mounting apparatus and a modular component of an object interface according to another exemplary embodiment of the present invention;

FIG. 29 illustrates an object interface according to another exemplary embodiment of the present invention;

FIG. 30 illustrates a system for mounting an object to a mounting surface comprising a mounting apparatus and an object interface according to another exemplary embodiment of the present invention;

FIG. 31 illustrates a plurality of mounting apparatuses according to other exemplary embodiments of the present invention;

FIGS. 32A-32B illustrate a mounting apparatus according to another exemplary embodiment of the present invention;

FIGS. 33A-33B illustrate a mounting apparatus according to another exemplary embodiment of the present invention;

FIG. 34 illustrates an object interface according to another exemplary embodiment of the present invention;

FIG. 35 illustrates portions of a plurality of modular components of an object interface according to another exemplary embodiment of the present invention;

FIG. 36 illustrates a mounting apparatus according to another exemplary embodiment of the present invention;

FIG. 37 illustrates a mounting apparatus according to another exemplary embodiment of the present invention; and FIG. 38 illustrates a plurality of mounting apparatuses according to other exemplary embodiments of the present invention.

DETAILED DESCRIPTION OF SELECTED EMBODIMENTS

Some embodiments of the present invention will now be described more fully hereinafter with reference to the accompanying drawings, in which some, but not all, embodiments of the invention are shown. Indeed, various and diverse embodiments are feasible within the scope and spirit of the invention and may be applied broadly in many technical fields across several industries for uses other than those outlined herein. Thus, the invention should not be construed as limited to the embodiments set forth herein; rather, these embodiments are provided so that this disclosure will satisfy applicable legal requirements.

The following disclosure generally describes a method for releasably engaging one physical body with another, as well as associated systems and apparatuses. For the purposes of explanation, the invention will be described in terms of a mounting process. While terminology within this context (e.g., mounting, mounting apparatus, etc.) is useful for explanatory purposes, the chosen course of explanation should not be construed to limit the scope of the described method or embodiments.

Accordingly, it should be noted that an embodiment termed a mounting apparatus in this disclosure may be functional for purposes other than mounting. For example, some mounting apparatuses described herein may be applied separately to two or more bodies (e.g., like embodiments of the invention applied to each body), and the apparatuses may be attached one to the other to join the bodies together. In such a scenario, the invention may be regarded as an attachment interface.

Additionally, like embodiments (such as those described above) may be configured with connectors that are compatible when joined one to the other so that joining the apparatuses may facilitate a connection between the bodies. Consequently, the invention may be thought of as a connection interface in certain contexts.

Moreover, some embodiments of the invention, which may be configured in a like or similar manner to some embodiments described herein, may themselves be mounted to other mounting apparatuses not described herein, thus enhancing the functionality of the known mounting apparatuses. Thus, in some situations, the invention may be considered to be a mounting interface.

In consideration of the variations outlined above, which are not exhaustive and should not be interpreted to limit the scope of the invention but instead are meant to illustrate the broad application and usefulness of the applied method, further description herein will use terminology within the context of a mounting process to facilitate explanation of the invention. For the purposes of this disclosure, the term "object" is used to refer to any physical body that is meant to engage a mounting apparatus. The term makes no reference to the role of the object in the mounting process. For example, a wall may be an object (e.g., it is meant to engage a mounting apparatus), but a wall cannot be, itself, mounted as an object in the traditional sense. In such contexts, the object may be described as an object interface that is capable of attaching to the wall so that the wall may engage the apparatus. In some contexts, the meaning of the term object may be extended to include an item or device a user ultimately wishes to mount (e.g., a television, painting, mobile phone, tablet computer, shelving unit, etc.).

The term "engagement" refers to the magnetic hold established between two or more components when a stage of attachment is complete (continuing until a corresponding stage of disengagement occurs) or when an object has attached to an apparatus via at least one completed stage of attachment (this may be referred to as, e.g., partial engagement), and the term may also refer to physical contact between two surfaces in some cases. The term "total engagement force" refers to a targeted (e.g., sought, required, etc.), and substantially peak, net magnetic force achieved between an object (or object interface) and an apparatus. The terms "attraction" or "attraction force" and "repel," "repulsion," or "repelling force" will refer to magnetic influence or interaction that may occur as part of a process of engagement (e.g., magnetic forces that are deemed to be in progress and are not engagement, as described above). The term "overall engagement force" is a sum of the respective engagement forces (of various stages of engagement) and/or attraction forces that may occur or be present during the mounting or dismounting process that leads up to (e.g., an increasing overall engagement force) or away from (e.g., decreasing), but does not include, a total engagement force, as described above (e.g., it is always less than a total engagement force).

The term "magnet" refers to any material or component that responds to a magnetic field, including a ferrous metal or other material that is configured to respond to magnetism, a permanent magnet, an electromagnet, a correlated magnet, a programmed/coded magnet, etc., or a combination of these.

The term "mounting magnet" may refer to a magnet or group of magnets, as defined above, or may reference a certain component of an apparatus or system that responds to a magnetic field.

The term "electrical connection" may refer to any connection established for the transmission or exchange of power, data, or both power and data.

The term "coil object" refers to an object (as defined above) that comprises a wireless charging component that is configured to participate in a wireless charging relationship (i.e., a wireless charging device, such as a wireless charging base station, a mobile device capable of being charged wirelessly, etc.). The term "non-coil object" refers to an object that is not configured to participate in a wireless charging relationship (i.e., an object that is incompatible with wireless charging devices). Unless specified, an object may be a coil object or a non-coil object.

The term "modular component" may refer to any component, piece, part, feature, etc. of a mounting apparatus, an object interface, a system, or a component of a mounting apparatus, an object interface, and/or a system that is configured to be removable, detachable, and/or replaceable. Correspondingly, the term "modular" may be used generally to indicate that a particular component, piece, part, feature, etc. or a group of components, pieces, parts, features, etc. may be removable, detachable, and/or replaceable.

The terms "locking engagement force", "lockably engaged", "lockable engagement", and similar terms refer to a state of engagement between the mounting apparatus and the object or the object interface that is established in addition to the total engagement force and that substantially prevents disengagement of the object from the mounting apparatus. A locking engagement force, etc. may be produced by magnetic or physical engagement and is typically brought about by a supplemental action that is intended to create the locking engagement force, etc. such as a rotational movement of the object, the activation of a mechanism such as a lock or latch, etc. Correspondingly, a locking engagement force, etc. typically persists until a second supplemental action, which may be a substantially opposite action, releases the locking engagement force, etc. so that the object may be disengaged from the mounting apparatus.

The term "peripheral object" may refer to any physical body that is not an object, as defined above. The term is used herein to provide context in selected embodiments, descriptions, and examples, and use of the term does not preclude a particular type or category of physical body from being an object. For example, the same type of physical body (e.g., a smartphone) may be both an object and a peripheral object in the same example (e.g., a first smartphone may be the object to be mounted and a second smartphone may be a peripheral object). Correspondingly, a single physical body (i.e. a first smartphone) will not be both an object and a peripheral object in the same embodiment, description, or example.

The term "smart" indicates that an item, such as a mounting apparatus, an object interface, a mounting system, a modular component, an object, a peripheral object, etc., is capable of performing at least one computational function. The at least one computational function may include, but is not limited to, functionality commonly associated with mobile computing devices such as running software, wired or wireless communication, participating as a node on one or more networks, etc. The term is used for succinctness, clarity, and purpose of explanation in selected embodiments, descriptions, and examples and, therefore, should not be construed to limit the scope of the capabilities or functionality of embodiments that are not specifically identified as smart. Moreover, a mounting apparatus, object interface, mounting system, modular component, peripheral object, etc. that is identified as smart is presumed to be configured to support at least the hardware and software components necessary per the application, including but not limited to a printed circuit board, integrated circuit, storage drive (e.g., flash memory, solid state drive, etc.), memory card reader (i.e. memory card slot, adapter, etc.), data port, power port, wireless data component (e.g., wireless radios such as WiFi, Bluetooth, NFC, etc.), cellular data component (e.g., GSM, CDMA, etc.), wireless data module, accelerometer, gyroscope, GPS chipset, etc.

The term "card" refers to a component or a modular component of a mounting apparatus, object interface, or mounting system that is configured to support a printed circuit board, motherboard, etc. and is presumed to be smart, as defined above, whether or not the component is specifically identified as being smart. Accordingly, a card may be configured to support at least the hardware and software components necessary per the application, and the term "card component" may refer to any component or feature of a smart device (e.g., a smartphone, tablet computer, etc.), including but not limited to an integrated circuit, storage drive (e.g., flash memory, solid state drive, etc.), memory card reader (i.e. memory card slot, adapter, etc.), data port, power port, wireless data component (e.g., wireless radios such as WiFi, Bluetooth, NFC, etc.), cellular data component (e.g., GSM, CDMA, etc.), wireless data module, accelerometer, gyroscope, GPS chipset, etc.

The term "standalone" indicates that that a modular component requires only an electrical connection or a power source (e.g., a battery, a receiver coil for wireless charging, etc.; which may be integrated into the modular component) in order to operate autonomously with at least partial functionality. The term is also used generally to indicate that a body, such as a mounting apparatus, exists independently and is not integrated within an existing body.

The term "input device" may refer to any component or feature of a mounting apparatus, an object interface, a mounting system, a modular component, an object, or a peripheral object that may be configured to receive physical or sensory input from, for example, a user or from the environment, including but not limited to a proximity sensor, tactile sensor, vibration sensor, motion detector, ambient light sensor, gas sensor, digital camera (e.g., photo, video, webcam, etc.), tactile button, switch, control knob, lever, etc. or a combination of these.

The term "tactile input" may refer to any input associated with the sense of touch, such as the push of a button or the activation of a touch sensor, such as a capacitive sensor, via touch.

The term "interchangeable component" refers to a nominal modular component of a mounting apparatus, an object interface, and/or a mounting system that is one of a plurality of modular components that are similarly configured relative to a structurally-defined area (e.g., a space, slot, receptacle, chamber, etc.) of a mounting apparatus, an object interface, and/or a mounting system or a component of a mounting apparatus, an object interface, and/or a mounting system so that each of the plurality of modular components may be interchangeably attached and detached via the structurally-defined area. For example, an available slot in a mounting apparatus may be configured to receive a ferrous metal plate, a card, or an input device per the desired functionality of the mounting apparatus, and each of the ferrous metal plate, the card, and the input device may be similarly configured relative to the structurally-defined area of the slot to interchangeably fit the slot. Thus, the term makes no reference to the functionality of the modular component other than the interchangeable nature of its form factor.

The term "field manipulation component" may refer to any component or feature of a mounting apparatus, an object interface, a mounting system, a modular component, or an object that is configured to manipulate, change, block, or otherwise influence a magnetic field associated with at least one component of a mounting apparatus, an object interface, a mounting system, or an object, including but not limited to a ferromagnetic metal plate, ferromagnetic metal cap or cover, a magnetic shielding component, flux guide, etc. The term generally refers to components or features that are intended to fine tune the magnetic field(s) associated with components of the mounting apparatus, object interface, or mounting system such as mounting magnets, ferromagnetic controlling components, etc. or that are intended to protect or shield other components or features of a mounting apparatus, an object interface, a mounting system, a modular component, or an object that may be adversely affected by a magnetic field, such as cards, input devices, etc.

The term "task" may refer to any function, series of functions, etc. that a mounting apparatus, an object interface, a mounting system, an object, or a peripheral object is configured to perform, including but not limited to mechanical functions, electrical functions, computing functions, communication functions, changes that may be perceived by the senses or sensory devices, or a combination of these.

The terms "card", "input device", "field manipulation component", and "task" are used in selected embodiments, descriptions, and examples in this disclosure for succinctness, clarity, and ease of explanation, and specific use of these terms in some embodiments, descriptions, and examples should not be construed to limit the scope of the capabilities, functionality, components, or features of embodiments wherein like or similar components are not specifically identified as "card", "input device", "field manipulation component", or "task".

The term "common" (e.g., "common component", "common modular component", etc.) identifies that a component or feature comprises a substantially identical configuration in each of a plurality of mounting apparatuses, object interfaces, mounting systems, modular components, or objects that may comprise the component or feature.

Furthermore, as used herein, the terms "bottom," "top," "upper," "lower," "inner," "outer," and similar terms are used for ease of explanation and refer generally to the position of certain components or parts of components of embodiments of the described invention at various points during the mounting or dismounting process. It is understood that such terms are not used in any absolute sense, and, as such, part of a component described as an "outer surface" at one point during the mounting process, for example, may be on an inner portion of the apparatus or system upon completion of the mounting process.

Objects of various types, sizes, shapes, weights, etc. have different mounting requirements. For example, a user may wish to mount a small, relatively lightweight object such as a GPS device to an irregular (e.g., sloped) surface of a vehicle dashboard. The user may further wish to mount the GPS device with one hand in one simple motion without necessarily having to concentrate on positioning the object with respect to the mounting apparatus. In a different scenario, however, the user may want to mount a large, heavy object to a relatively vertical surface, such as may be the case when the user wishes to mount a 52" plasma television to a wall in the user's home. In this case, the user may need to support the object with two hands and may want to accomplish the mounting operation as quickly as possible, while at the same time ensuring that the television is properly secured and will not accidentally fall and be damaged once mounted. When the time comes to take the object off the mounting apparatus, whether the object is large or small, heavy or light, the user may again wish to accomplish the task in a relatively simple manner by exerting as little effort as possible.

Accordingly, embodiments of the present invention provide for a mounting apparatus that is configured for mounting an object to a mounting surface using magnetism. As described below, embodiments of the mounting apparatus provide at least two magnets arranged in two different planes, with at least one of the planes being configured to be movable with respect to the other one. Through the movement of the planes of magnets, an object that is brought in proximity to the mounting apparatus may engage one of the magnetic planes and then be moved further to engage the other magnetic plane, with the combined magnetic force (e.g., total engagement force) being configured so that the mounting apparatus or system supports the particular object for which it is designed.

By dividing the total required magnetic force into two planes (or more, as described below), engagement and/or disengagement of the object from the mounting apparatus may occur in stages. As such, in some embodiments, a user bringing the object into proximity with the mounting apparatus during the mounting process may be able to gradually engage the object with the mounting apparatus. In other words, as the object is brought closer to the mounting apparatus, the magnetic force that is created between the object and the various magnetic planes of the mounting apparatus will, initially, be less than the total magnetic force that will ultimately provide support for the object and will gradually increase as the object fully engages the mounting apparatus.

Additionally or alternatively, in some embodiments, a user may be able to disengage the object from the mounting apparatus in stages by successively disengaging the object from each magnetic plane of engagement. Such a tiered release of the object may allow the user to apply a disengaging force to the mounted object that is less than the total engagement force that exists between the mounting apparatus and the object when the object is fully engaged (e.g., mounted to the surface). Thus, for example, in the case of a heavy object that is engaged with the mounting apparatus, the user need not pull the object off the mounting apparatus by applying an opposite force that is equal to the total (e.g., large) force that is used to keep the object engaged with the mounting apparatus. Rather, the user can apply a force that is sufficient to overcome the magnetic force between the object and one of the magnetic planes (e.g., less than the total engagement force of all the planes), such that the object is disengaged gradually (e.g., releasing from each plane separately).

In addition to the staged engagement and disengagement that is possible by way of embodiments of the invention described below, the mounting apparatus may be configured to provide other functions that facilitate a mounting and/or dismounting operation and/or functions that facilitate or enhance use of the mounted object. For example, in some embodiments, the mounting apparatus may be configured to allow the object to self-align with the mounting apparatus. The mounting apparatus may further be configured to structurally support objects of various weights and configurations (e.g., sizes and shapes), provide data and electrical connections with the object, and engage the object in different ways. Some embodiments may allow manipulation of an engaged object (e.g., various movements of the object) either by the user or by the apparatus acting on the object in a controlled manner. Further embodiments may provide an effective locking mechanism for the object. Other configurations may manage the functionality of an object by partially disengaging and re-engaging the object. Still other embodiments may ready the apparatus for engagement, change the appearance of the apparatus, and/or change the way the apparatus may be engaged. And in other configurations, the apparatus may remain unobtrusive or inconspicuous until it is meant to be used.

Accordingly, as will become apparent in light of the description below and with reference to the figures, the method disclosed herein may be embodied in multiple ways. A self-contained (e.g., standalone) apparatus may be constructed and configured to be affixed to a portable or fixed body (e.g., a mounting surface), some embodiments hereinafter described being examples of such. Additionally, the method may be applied to an existing body (e.g., a wall, a television, a frame for artwork), or a portion of an existing body, such that the body is modified to achieve the desired functionality of the invention (e.g., to incorporate embodiments of the invention), wherein existing components or features of the body are used as components or features of embodiments of the invention, so that such embodiments are partially or fully embedded within the body. Described another way, components that may be necessary for an embodiment of the invention and that are absent in the body may be added to the body, and components or features of the body already suitable for carrying out the needed roles of the prescribed components of the embodiment may be used as-is or may be altered as necessary; all components together being configured to achieve an apparatus comprised of both existing components and added components and residing at least partially within the body. The latter practice may be particularly beneficial, as modifying an existing body may often be less expensive and/or less invasive than embedding a self-contained apparatus, and, in some cases, an integrated embodiment may be more aesthetically appealing than would a self-contained apparatus affixed to the body. One example is that of a wall being modified, wherein the method is applied to a portion of the wall so that an object may be mounted to the wall, and wherein most of the components configured to create the embodiment of the invention are hidden within the wall so that the impact on the visual aesthetic of the wall is minimal as compared to affixing a self-contained apparatus to the wall. Moreover, in addition to the practices cited above, a system is provided, wherein an apparatus and an object interface (or two apparatuses) may be created for the bodies (by either construction or modification, as explained above) that are configured to agree with one another during the mounting process.

The method provided for mounting an object to a mounting surface comprises supporting a first mounting magnet in a first plane; supporting a second mounting magnet in a second plane; allowing at least one of the mounting magnets to move independently of the other mounting magnet along a line of engagement that intersects the first and second planes; limiting movement of the at least one of the mounting magnets that is movable between a respective outer limit position and a respective base limit position; configuring the mounting magnets to cooperate to engage the object to be mounted to produce a total engagement force; and configuring the respective outer limit position of the at least one of the mounting magnets that is movable such that a disengaging force that is less than the total engagement force and that is applied to a mounted object overcomes the total engagement force in stages by successively overcoming the respective engagement forces associated with the first and second mounting magnets to disengage the object.

At least one of the first or second planes may be defined by a curved surface. Also, one of the mounting magnets may have a fixed position. For example, the first mounting magnet may have a fixed position, and the second mounting magnet may be movable.

The first mounting magnet may comprise a plurality of magnets. Likewise, the second mounting magnet may comprise a plurality of magnets.

A controlling force may be applied to the at least one of the mounting magnets that is movable to control at least the movement or functionality of the at least one of the mounting magnets that is movable. The controlling force may be configured to bias the at least one of the mounting magnets that is movable away from the object to be mounted. The controlling force may be configured to bias the at least one of the mounting magnets that is movable toward the object to be mounted. Furthermore, the controlling force may be configured to move the at least one of the mounting magnets that is movable between its respective outer limit position and its respective base limit position.

The controlling force may be removable, may be configured to be adjustable, and/or may be configured to be dynamically adjusted so as to define a respective holding position of the at least one of the mounting magnets that is movable between the respective outer limit position and the respective base limit position of the at least one of the mounting magnets that is movable.

The controlling force may be configured to be managed remotely. Also, an interface may be configured for managing the controlling force. The controlling force may comprise a plurality of controlling forces, and each respective controlling force may be configured to control a corresponding mounting magnet.

At least one of the mounting magnets may be configured to receive a portion of the object to be mounted. And receiving the portion of the object to be mounted may comprise structurally supporting the object.

Structurally supporting the object may comprise limiting movement of the object to a direction along a single axis relative to the mounting apparatus. Alternatively or additionally, structurally supporting the object may comprise at least partially supporting a weight of the object. Moreover, receiving the portion of the object to be mounted may comprise guiding engagement of the object.

At least one short-range wireless data transfer device may be positioned in proximity to a target mounting area, and the at least one short-range wireless data transfer device may be configured to be within a communication range of a communication component associated with the object when the object is mounted. Alternatively or additionally, the at least one short-range wireless data transfer device may be within a communication range of a communication component associated with the object when the object is fully engaged and may be outside the communication range of the communication component when the object is partially disengaged or fully disengaged.

At least one wireless charging device may be positioned in proximity to a target mounting area, and the at least one wireless charging device may be configured to be within a charging range of a compatible wireless charging component when the object is partially or fully engaged with the mounting apparatus.

Furthermore, at least one connection interface may be supported in at least one of the first or second planes. The connection interface may be an electrical connector.

The first mounting magnet may be configured to have a first magnetic force, and the second mounting magnet may be configured to have a second magnetic force that is substantially opposite the first magnetic force.

The second mounting magnet may be movable, and a plurality of second mounting magnets may be supported in a plurality of respective second planes. The second mounting magnets may be configured such that the respective base limit position of each second mounting magnet is in substantially the same plane. The second mounting magnets may be arranged in a nested configuration. Also, the second mounting magnets may be arranged in a telescoping configuration.

The respective limit positions of the at least one of the mounting magnets that is movable may be configured such that the at least one of the mounting magnets that is movable is movable to a position in which the first and second planes substantially coincide.

In some embodiments, the second mounting magnet may be movable and the first mounting magnet may be in a fixed position.

The second mounting magnet may be configured such that the base limit position of the second mounting magnet substantially coincides with the first plane. Alternatively, the second mounting magnet may be configured such that the outer limit position of the second mounting magnet substantially coincides with the first plane.

In some embodiments, the first mounting magnet and second mounting magnet may be movable.

The respective base limit positions of the first mounting magnet and the second mounting magnet may be configured such that the respective base limit positions are in substantially the same plane. Also, the respective outer limit positions of the first mounting magnet and the second mounting magnet may be configured such that the respective outer limit positions are in substantially the same plane.

The outer limit position of the first mounting magnet and the base limit position of the second mounting magnet may be configured such that the outer limit position of the first mounting magnet and the base limit position of the second mounting magnet are in substantially the same plane.

At least the first mounting magnet or the second mounting magnet may be positioned relative to a target mounting area such that proximity of an object to be mounted to the target mounting area produces at least one attraction force with respect to at least one of the first or second mounting magnets. At least one of the mounting magnets that is movable may be configured to be moved toward the object to be mounted as a result of the at least one attraction force.

The positions of the mounting magnets and the respective limit positions of the at least one of the mounting magnets that is movable may be configured such that the at least one attraction force draws the at least one of the mounting magnets that is movable toward the respective outer limit position, thereby defining a range for the first engagement position.

Furthermore, the positions of the mounting magnets and the respective limit positions of the at least one of the mounting magnets that is movable may be configured such that engagement between the object and the respective mounting magnet within the range for the first engagement position results in a second attraction force that draws the object and the unengaged mounting magnet together for engagement such that a total engagement force is produced for mounting the object to the apparatus.

A retaining force may be configured to bias the at least one of the mounting magnets that is movable away from the object to be mounted. The retaining force may be less than the at least one attraction force.

A third mounting magnet may be supported in a third plane. The third mounting magnet may be configured to be attached to an object to be mounted to adapt the object to agree with at least one of the first or second mounting magnets.

The third mounting magnet may comprise a plurality of magnets. Also, the third mounting magnet may comprise a plurality of third mounting magnets in a plurality of third planes.

Furthermore, the third mounting magnet may be configured to apply an object controlling force to at least one of the first or second mounting magnets.

In one embodiment of the mounting apparatus, the apparatus comprises an intermediate surface configured to respond to magnetism and an engagement member disposed relative to the intermediate surface along a line of engagement. The engagement member is configured to respond to magnetism, and at least one of the engagement member or the intermediate surface is configured to be movable between an extended state and a retracted state. In the retracted state, the at least one of the engagement member or the intermediate surface that is movable is biased away from the object to be mounted. In the extended state, the at least one of the engagement member or the intermediate surface that is movable is biased toward the object to be mounted. Proximity of the object to the engagement member produces an attraction force between the object and the engagement member that causes engagement of the object with the engagement member, and proximity of the object to the intermediate surface produces an attraction force between the object and the intermediate surface that causes engagement of the object with the intermediate surface, such that the apparatus is configured to engage the object to be mounted in stages via the respective engagement forces.

At least the intermediate surface or the engagement member face may be defined by a curved surface. The intermediate surface may have a fixed position. Engagement of the object with the engagement member may cause the object to be in such proximity to the intermediate surface that an attraction force between the object and the intermediate surface is produced. Engagement of the object with the intermediate surface may cause the object to be in such proximity to the engagement member that an attraction force between the object and the engagement member is produced. The respective attraction forces associated with the engagement member and the intermediate surface may cooperate to engage the object and may produce a total engagement force between the apparatus and the object.

The apparatus may be configured such that a disengaging force that is applied to a mounted object successively overcomes the respective engagement forces associated with the intermediate surface and the engagement member to disengage the object. Therefore, the disengaging force may be less than the total engagement force.

The engagement member may be configured to be substantially flush with the intermediate surface (for example, in the retracted state).

The apparatus may comprise a controlling component configured to apply a controlling force to at least one of the engagement member or the intermediate surface to control at least the movement or functionality of the respective one of the engagement member or the intermediate surface. The controlling component may be configured to bias the engagement member toward the retracted state, or the controlling component may be configured to bias the engagement member toward the extended state. Additionally or alternatively, the controlling component may be configured to move the engagement member between a retracted position and an extended position.

The controlling component may be configured such that the controlling force is adjustable, may be capable of being managed remotely, and/or may be removable.

The controlling component may comprise a magnet. For example, the controlling component may comprise an electromagnet.

The controlling component may be configured to maintain the engagement member in an extended position. Also, the controlling component may be configured such that the engagement member automatically retracts after the object is disengaged from the apparatus.

The controlling component may be configured to be movable relative to the line of engagement. The controlling component may comprise a plurality of controlling components, wherein each controlling component may be configured to control at least the movement or functionality of a corresponding one of the engagement member or the intermediate surface.

The engagement member may comprise an extension and a face joined to the extension. The engagement member may be configured to structurally support the object via engagement of the object with at least a portion of the extension. Additionally or alternatively, the extension may be configured to bear at least a portion of a weight of the object.

The engagement member may be configured to limit movement of the object to a direction along a single axis relative to the apparatus. The extension may be configured to define a position of the engagement member in at least one of the extended state or the retracted state.

The intermediate surface of the apparatus may be configured to receive at least a portion of at least one of the engagement member or the object to be mounted. A portion of the intermediate surface may define an opening configured to slideably receive at least a first portion of the engagement member so as to substantially align the line of engagement along a central axis of the engagement member as the engagement member is moved between the extended and retracted states. The intermediate surface may comprise a chamber extending from the portion of the intermediate surface defining the opening, wherein the chamber may be configured to slideably receive a second portion of the engagement member, and wherein the first portion of the engagement member may have a different width than the second portion.

The chamber may define a first depth and the engagement member may define a second depth, and the first depth may be greater than the second depth.

The intermediate surface may be configured to structurally support the object. Additionally or alternatively, the intermediate surface may be configured to bear at least a portion of the weight of the object. Furthermore, the intermediate surface may be configured to limit movement of the object to a direction along a single axis relative to the apparatus.

The apparatus may comprise at least one short-range wireless data transfer device which may be supported by the intermediate surface or the engagement member. The at least one short-range wireless data transfer device may be supported by the intermediate surface and may be capable of wirelessly communicating with an electronic device that is brought into proximity with the short-range wireless data transfer device. Moreover, the engagement member may be configured such that the at least one short-range wireless data transfer device is capable of wirelessly communicating with the electronic device when the object is fully engaged with the apparatus and is incapable of wirelessly communicating with the electronic device when the object is partially disengaged or fully disengaged from the apparatus.

The apparatus may comprise at least one wireless charging device which may be supported by the intermediate surface or the engagement member. The at least one wireless charging device may be supported by the intermediate surface and may be capable of wirelessly charging an electronic device that is brought into proximity with the wireless charging device.

At least one of the engagement member or the intermediate surface of the apparatus may be configured to support at least one connection interface. The at least one connection interface may be configured to transmit at least data or electricity to the object to be mounted when the object is engaged with the apparatus.

At least one of the engagement member or the intermediate surface may be configured to bias the object to be mounted to a predefined mounting orientation prior to engagement of the object with the apparatus.

At least one of the engagement member or the intermediate surface may comprise at least one electromagnet.

The engagement member may comprise a plurality of engagement members. At least one of the engagement members may be configured to respond to magnetism, and each engagement member may be configured to be moved independently along a respective line of engagement with respect to other engagement members. Each engagement member may comprise an extension and a face joined to the extension, and the extension may be configured to define a position of the engagement member in at least one of the extended state or the retracted state.

The extension of each engagement member may define a depth, and the depth of at least two of the engagement members may be different.

The engagement member may comprise a plurality of engagement member components, and at least one engagement member component may be configured to respond to magnetism. The plurality of engagement member components may be configured relative to one another such that they are in a nested configuration. In the extended state, the plurality of engagement member components may form a telescoping engagement member which may extend toward an object to be mounted. In the retracted state, the plurality of engagement member components may be substantially flush with the intermediate surface. Alternatively, in the retracted state, the plurality of engagement member components may form a telescoping receptacle. Moreover, in the extended state, the plurality of engagement member components may be substantially flush with the intermediate surface.

In some embodiments, an object interface is also provided, as mentioned above, that is configured to be attached to an object (e.g., a device or item that the user wishes to mount) to facilitate engagement of the object with the mounting apparatus. The object interface may include one or more magnets that are configured to attract or be attracted to corresponding magnets of the mounting apparatus. As such, the object interface may, in some embodiments, be integral to the device or item to be mounted (e.g., such as a component of the device or item itself), be part of a covering or other attachment or accessory to the device or item, or otherwise be configured for attachment to the device or item. As with the mounting apparatus, the object interface may be configured in numerous ways, from being embodied by a simple plate that is configured to respond to magnetism to, in some cases, having the features and functionality of the mounting apparatus. As such, it is understood that the mounting apparatus is not limited to embodiments in which the mounting apparatus is attached to the mounting surface (e.g., wall, dashboard, tabletop, etc.) and is configured to receive the object (e.g., the device or item or the object interface), but also includes embodiments in which the mounting apparatus is attached (or otherwise associated) with the device or item to be mounted and is configured to engage a reciprocal structure that is associated with the mounting surface (e.g., a simple magnetic area on the mounting surface, etc., or an object interface).

Accordingly, a system is provided for mounting an object to a mounting surface. The system comprises a mounting apparatus and an object interface. The mounting apparatus comprises an intermediate surface configured to respond to magnetism, the intermediate surface defining a first plane; and an engagement member configured to respond to magnetism, the engagement member defining a second plane and being configured to be movable along a line of engagement that intersects the first plane. The object interface is configured to be attached to an object to be mounted and to the mounting apparatus, and the object interface comprises a central object surface configured to respond to magnetism and configured to agree with at least one of the engagement member or the intermediate surface, the central object surface defining a third plane. At least one of the engagement member or the intermediate surface of the mounting apparatus is configured to move between a respective outer limit position and a respective base limit position. When the at least one of the engagement member or the intermediate surface that is movable is in the respective outer limit position, a distance between the first and second planes defines an apparatus engagement depth, and the mounting apparatus is configured to engage the object interface via respective engagement forces associated with the engagement member and the intermediate surface such that the overall engagement force increases by degrees until a total engagement force is produced for mounting the object to the mounting surface.

The apparatus may be configured such that a disengaging force that is less than the total engagement force and that is applied to a mounted object attached to the object interface is capable of disengaging the object interface from the mounting apparatus in stages by successively overcoming the respective engagement forces associated with the engagement member and the intermediate surface.

The central object surface may comprise at least one electromagnet. Alternatively or additionally, the central object surface may comprise at least one correlated magnet, and the at least one correlated magnet comprised by the central object surface may be programmable.

The engagement member may comprise at least one correlated magnet, and the at least one correlated magnet comprised by the engagement member may be programmable.

Likewise, the intermediate surface may comprise at least one correlated magnet, and the at least one correlated magnet comprised by the intermediate surface may be programmable.

At least one of the first, second, or third planes may be defined by a curved surface.

The mounting apparatus may comprise an apparatus controlling component configured to apply an apparatus controlling force to at least one of the engagement member or the intermediate surface to control at least the movement or functionality of the respective one of the engagement member or the intermediate surface. The apparatus controlling force may be configured to bias the engagement member away from the object interface. Alternatively, the apparatus controlling force may be configured to bias the engagement member toward the object interface.

The object interface may be configured such that an attraction force produced between the engagement member and the object interface is greater than the apparatus controlling force.

The apparatus controlling component may be configured to move the engagement member between the outer limit position and the base limit position.

The central object surface may be configured to apply a first interface controlling force to at least the intermediate surface or the engagement member of the apparatus. The first interface controlling force may be configured to be adjustable. Additionally or alternatively, the first interface controlling force may be capable of being managed remotely.

At least the engagement member or the intermediate surface may comprise at least one connection interface. Likewise, the central object surface may comprise at least one connection interface.

The object interface may be configured to structurally enhance the object when attached to the object.

The engagement member may comprise a plurality of engagement members defining a plurality of second planes. Alternatively or additionally, the engagement member may comprise a plurality of engagement member components arranged in a nested configuration.

The central object surface may be configured to receive at least a portion of at least one of the engagement member or the intermediate surface. Likewise, at least one of the engagement member or the intermediate surface may be configured to receive at least a portion of the central object surface.

The object interface may comprise a secondary object surface spaced from the central object surface, and the secondary object surface may be configured to respond to magnetism. The secondary object surface may define a fourth plane. The fourth plane may be defined by a curved surface.

The distance between the third plane and the fourth plane may define an object interface depth, and the apparatus engagement depth and the object interface depth may be different.

The mounting apparatus may be configured to engage the object interface via an engagement force produced between the engagement member and the central object surface and an engagement force produced between the intermediate surface and the secondary object surface, and the overall engagement force may increase by degrees until a total engagement force is produced for mounting the object to the mounting surface.

The object interface depth may be configured such that a disengaging force that is less than the total engagement force and that is applied to a mounted object attached to the object interface is capable of disengaging the object interface from the mounting apparatus in stages by successively overcoming the respective engagement forces associated with the engagement member and the intermediate surface.

The secondary object surface may comprise a plurality of secondary object surfaces in a plurality of fourth planes. The secondary object surface may comprise at least one electromagnet. Alternatively or additionally, the secondary object surface may comprise at least one correlated magnet.

Furthermore, the secondary object surface may be configured to apply a second interface controlling force to at least the intermediate surface or the engagement member of the apparatus. The second interface controlling force may be configured to be adjustable. Alternatively or additionally, the second interface controlling force may be capable of being managed remotely.

Moreover, the second interface controlling force may be configured to repel the intermediate surface of the apparatus such that the at least one of the secondary object surfaces associated with the intermediate surface is separated from the intermediate surface. The distance between the at least one of the secondary object surfaces associated with the intermediate surface and the intermediate surface may define a third depth, and the third depth may be less than the apparatus engagement depth.

The mounting apparatus may be configured so that it is impervious to rust. Likewise, the object interface may be configured so that it is impervious to rust. For example, magnets may be sealed or encased in materials that are impervious to water and water vapor, such as plastics, thermoplastic elastomers, non-ferrous metals, etc., and other (e.g., non-magnet) components may be comprised of materials that resist rust or other corrosion. Configured in this way, embodiments of the mounting apparatus or system may be used in many environments, including wet environments.

The particular configurations that are illustrated and described below are included for purposes of explanation. In fact, numerous other configurations are possible based on the teachings provided in this disclosure, and the embodiments described herein have been chosen to illustrate one or more inventive concepts. Therefore, the configurations detailed herein do not provide an exhaustive list of the possible configurations for providing the staged engagement, disengagement, and/or other functionality described below.

Like reference numerals refer to like elements throughout. Some components of the mounting apparatus are not shown in one or more of the figures for clarity and to facilitate explanation of the embodiments.

Referring now to FIG. 1, one embodiment of a mounting apparatus 10 is shown for engaging and attaching to an object. In the depicted embodiment of FIG. 1, the object is a nominal object 99 that inherently responds to magnetism (e.g., a piece of ferrous sheet metal being mounted for storage, a picture frame with a magnetic backing, etc.).

The mounting apparatus 10 may be configured such that a first mounting magnet is supported in a first plane P1 and a second mounting magnet is supported in a second plane P2. Accordingly, an engagement member 14 and an intermediate surface 12 may each be configured to respond to magnetism. The second mounting magnet may comprise a plurality of magnets in some embodiments. Likewise, the first mounting magnet may comprise a plurality of magnets. In the depicted embodiment of FIG. 1, the first mounting magnet is supported in the first plane P1 by the intermediate surface 12, and the second mounting magnet is supported in the second plane P2 by a face 88 of the engagement member 14. In this embodiment, the second mounting magnet is comprised of a single magnet 40, and the first mounting magnet is comprised of six magnets 30 arranged with respect to each other and with respect to the second mounting magnet. The quantity, type, strength, arrangement, spacing, etc. of the magnets with respect to each other and with respect to other components of the mounting apparatus may be selected to accommodate the object to be mounted, the functionality required of the apparatus, and/or the requirements of the user. In the depicted embodiment of FIG. 1, the components of the intermediate surface 12 and the engagement member 14 other than magnets 30 and magnet 40 may be comprised of materials that neither influence nor respond to magnetism. Thus, in the embodiment of FIG. 1, the intermediate surface 12 and the engagement member 14 are each configured to respond to magnetism via magnets 30 and magnet 40, respectively.

Alternatively, in some embodiments, an apparatus may be configured without the presence of traditional magnets (i.e., magnets that, themselves, produce a magnetic field(s), such as permanent magnets). For instance, the mounting apparatus may be configured without traditional magnets when the object itself produces a magnetic field that allows mounting to occur. In such embodiments, the intermediate surface and the engagement member may be configured to respond to magnetism by other means, such as by attaching pieces of ferrous metal in lieu of traditional magnets or by configuring the intermediate surface or the engagement member to, in whole or in part, be made of material that responds to magnetism. Accordingly, in some embodiments, an intermediate surface or an engagement member may carry out the functions of a first mounting magnet or a second mounting magnet. Correspondingly or additionally, a first plane P1 or a second plane P2 may be a nominal plane that is defined by an intermediate surface or an engagement member of the mounting apparatus, or a surface of such.

In some embodiments, at least one of the mounting magnets (or groups of mounting magnets, as is the case in the depicted embodiment) may be configured to move independently of the other mounting magnet along a line of engagement $L_e$ that intersects the first and second planes P1 and P2. A schematic representation illustrating the movement of the planes P1 and P2 and the line of engagement $L_e$ is shown in FIGS. 2-4.

In the depicted embodiment of FIG. 1, an engagement member 14 may be configured to be movable with respect to a fixed intermediate surface 12 and the other components of the apparatus 10. Thus, the second mounting magnet 40 may be able to move independently of the first mounting magnets 30 along the line of engagement $L_e$.

The movement of the mounting magnet(s) that is moveable (which, in some embodiments, may be both the first and second mounting magnets) may be limited, such that each mounting magnet that is moveable is only able to move between a respective outer limit position OL and a respective base limit position BL (as shown in FIG. 5). Accordingly or additionally, at least one of the engagement member 14 or the intermediate surface 12 may be configured to be moved between an extended state and a retracted state. In the retracted state, the at least one of the engagement member or the intermediate surface that is moveable may be biased away from the object to be mounted (e.g., may be biased toward the base limit position BL). In the extended state, the at least one of the engagement member or the intermediate surface that is movable may be biased toward the object to be mounted (e.g., may be biased toward the outer limit position OL). In the embodiment of FIG. 1, the extended state and the retracted state reference the relative positions of the engagement member 14 when its associated mounting magnet (the second mounting magnet 40) is in its outer limit position OL and in its base limit position BL, respectively, because the second mounting magnet 40 is the mounting magnet that is moveable in this embodiment, and the first mounting magnet 30, of the intermediate surface 12, has a fixed position. The apparatus is shown in the extended state in FIG. 5.

The outer limit position OL and the base limit position BL may be defined in various ways. For example, stop features may be provided via one or more components of the mounting apparatus and may be positioned relative to the movable mounting magnet(s) to limit the movement of the mounting magnet(s). Alternatively or additionally, the engagement member may comprise an extension and a face joined to the extension, and the extension may be configured to define a position of the engagement member in at least one of the extended state or the retracted state. In the depicted embodiment of FIG. 1, a stop feature 50 is provided via an outward protrusion of an extension 98 joined to a face 88 of the engagement member 14, the extension 98 configured to define a depth of the engagement member 14. The stop feature 50 may be configured to contact an inner surface 86 of the intermediate surface 12 to stop movement of the engagement member 14 in a direction toward the object 99 (e.g., toward the extended state). Additionally, a base surface 80 is configured such that an interior surface 84 of the base surface 80 stops movement of the engagement member 14 in a direction away from the object 99 (e.g., toward the retracted state). Thus, the base surface 80 is configured to serve as a stop feature in this embodiment. Correspondingly, the positions of the stop feature 50 and the base surface 80 relative to the depth of the engagement member 14 as defined by the extension 98 may serve to define the outer limit position OL and the base limit position BL of the second mounting magnet 40. Specifically, the outer limit position OL of the second mounting magnet 40 may be defined by the placement of the stop feature 50 on the extension 98 relative to the depth of the extension 98, and the base limit position BL of the second mounting magnet 40 may be defined by the position of the base surface 80 relative to the depth of the engagement member 14 and to the position of the intermediate surface 12. Thus, the extension 98 may be configured to define the position of the engagement member 14 in the extended state.

Furthermore, while the outer limit position OL and base limit position BL may be defined by the relative positions of and features of the components of the mounting apparatus in a predefined configuration, the outer limit position OL and base limit position of the at least one of the mounting magnets that is movable may be dynamically redefined by adjusting components of the mounting apparatus, as described in more detail below.

Embodiments of the present invention may be configured such that a portion of the intermediate surface may define an opening configured to slideably receive at least a first portion of the engagement member. Receiving the at least a portion of the engagement member may substantially align the line of engagement along a central axis of the engagement member as the engagement member is moved between the extended and retracted states. In the embodiment of FIG. 1, a portion of the intermediate surface 12 may define an opening 94 that may be configured to slideably receive at least a first portion of the engagement member 14 (which, in this case, may be the extension 98) via a guide surface 96. As such, the movement of the second mounting magnet 40 and (correspondingly) the engagement member 14 may be guided via the intermediate surface 12 such that the line of engagement $L_e$ may be substantially aligned along a central axis X of the engagement member 14 as the engagement member 14 is moved between the extended and retracted states. Furthermore, the depth of the extension 98 may ensure that the engagement member 14 remains in contact with the guide surface 96 when the engagement member 14 is in the retracted position (e.g., in contact with the base surface 80, as described above). Therefore, the extension 98 may also serve to define the position of the engagement member 14 in the retracted state.

The respective limit positions (OL and BL) of the movable magnet(s) may be configured such that the first and second mounting magnet(s) (the second mounting magnet 40 in the embodiment of FIG. 1) are movable to a position in which the first and second planes substantially coincide. Accordingly, the second mounting magnet may be configured such that the base limit position of the second mounting magnet substantially coincides with the first plane. Referring again to FIG. 1, a housing 82 may connect the base surface 80 and the intermediate surface 12 and may enclose the apparatus 10 (a portion of a sidewall of the housing 82 has been removed in FIG. 1 for purpose of explanation). The depth of the engagement member 14 may be configured relative to the depth of the guide surface 96 and the length of the housing 82 such that the engagement member 14, which may be slideably received by the intermediate surface 12 (as described above), and, correspondingly, the second mounting magnet 40 may be movable to a position in which the second plane P2 and the first plane P1 substantially coincide. In the embodiment of FIG. 1, this position (P1=P2) is also the base limit position BL of the second mounting magnet 40 and the retracted state of the engagement member 14, such that the front surface of the mounting apparatus 10 is substantially flush when the engagement member is in the retracted state. In other embodiments, however, as will be described below, the stop features 50, base limit position BL, outer limit position OL, and extended state and retracted state may be defined by other components of the mounting apparatus 10 and/or other structures of those components.

The mounting magnets 30, 40 may be configured to cooperate to engage the object to be mounted (e.g., the object 99 in FIG. 1) such that a total engagement force is produced between the mounting magnets and the object that serves to hold the object to the mounting apparatus, as described in greater detail below. Accordingly, the respective outer limit position of the mounting magnets that are moveable (e.g., the second mounting magnet 40 in the depicted embodiment of FIG. 1) may be configured such that a disengaging force that is less than the total engagement force and that is applied to a mounted object may overcome the total engagement force in stages by successively overcoming the respective engagement forces associated with the first and second mounting magnets to disengage the object.

The relative positions and relative movement of the engagement member 14 and the intermediate surface 12, as described above, may also facilitate mounting of the object to the mounting apparatus. Proximity of the object (e.g., the object 99 in FIG. 1) to the engagement member may produce an attraction force between the object and the engagement member that causes engagement of the object with the engagement member. Likewise, proximity of the object to the intermediate surface may produce an attraction force between the object and the intermediate surface that causes engagement of the object with the intermediate surface, such that the mounting apparatus may be configured to engage the object to be mounted in stages via the respective engagement forces.

The succession and number of the stages of engagement (e.g., mounting) or disengagement (e.g., dismounting) may be configured as desired (per the application, the object, the requirements of the user, etc.) by the relative arrangement of the components of the apparatus, the inclusion of a component(s) that produces a magnetic field, the strength(s) of the magnetic field(s), and other factors, as will be described in more detail below.

Additionally, at least the first mounting magnet or the second mounting magnet may be positioned relative to a target mounting area such that proximity of an object to be mounted to the target mounting area produces at least one attraction force with respect to at least one of the first or second mounting magnets. The mounting magnet(s) that is movable may be configured to move toward the object to be mounted as a result of the attraction force(s). Thus, the attraction force(s) may draw the movable mounting magnet(s) toward the respective outer limit position(s) to define a range for a first engagement position (e.g., establish range in which a first stage of engagement may take place). Furthermore, the apparatus may be configured such that engagement between the object and the mounting magnet within the range for the first engagement position results in a second attraction force that draws the object and the unengaged mounting magnet together for engagement such that a total engagement force is produced for mounting the object to the apparatus. The mounting magnet(s) may be positioned in this way to facilitate engagement of the object and/or to produce an automatic succession of stages of engagement to produce the total engagement force (e.g., the first stage of engagement results in an attraction force that produces the second stage of engagement, and so on, so that the application force required from the user for mounting the object after the first stage of engagement begins may be substantially null). Furthermore, the mounting magnet(s) may be positioned as described above to produce a desired engagement order, produce a desired result prior to engagement (such as extension of the engagement member, for example), or for other reasons described below.

In the depicted embodiment of FIG. 1, for example, a nominal object 99 is provided that occupies substantially one plane (P3) and is inherently configured to respond to magnetism (e.g., the object has not been altered to accommodate the mounting apparatus 10) such that any portion of the object 99 may interact with the first or second mounting magnets 30, 40. In this embodiment, the first mounting magnet 30 and the second mounting magnet 40 may be positioned relative to a facade 85 of the intermediate surface that may be a desirable target mounting area for the object 99. As described above, in this embodiment, the front surface of the mounting apparatus 10 may be substantially flush when the engagement member 14 is in the retracted position. Also, as previously described, the engagement member 14 may extend beyond the intermediate surface 12. Thus, in the depicted embodiment of FIG. 1, due to the configuration of the mounting apparatus 10 and the configuration of the object 99 (e.g., substantially planar), the second mounting magnet 40 may always be in a position at least as close to the object to be mounted (e.g., object 99) as the position of the first mounting magnet 30, so a staged engagement for the object 99 (P3) may be predetermined to be P2, then P1 because P2 may be the movable plane (e.g., engagement may occur between the object 99 and the second mounting magnet 40 followed by engagement between the object 99 and the first mounting magnet 30). Likewise, a staged disengagement may be predetermined to be P1, then P2 in the embodiment of FIG. 1. It should be noted that these outcomes are specific to the embodiment of FIG. 1 and with respect to the object 99, as these predefined outcomes may not apply to irregularly shaped objects or objects with multiple surfaces or planes, as will be discussed in additional embodiments below. Correspondingly and additionally, when the object 99 is brought into proximity of the facade 85 of the intermediate surface 12 (e.g., the target mounting area), at least one attraction force may be produced between the object 99 and at least one of the first or second mounting magnets 30, 40 as a result of proximity of the object 99, and the second mounting magnet 40 (e.g., the mounting magnet that is movable) may move toward the object to be mounted (object 99) as a result of the at least one attraction force (e.g., the second mounting magnet 40 may be drawn toward its outer limit position OL). Thus, automatic extension of the engagement member 14 may occur, and, thus, the first engagement position may be defined in one of two ways. The second mounting magnet 40 may engage the object 99 to produce a first engagement, if the object 99 is in closer proximity to the intermediate surface 12 than the outer limit position OL of the second mounting magnet 40. Alternatively, the second mounting magnet 40 may reach its outer limit position OL and remain there, with the engagement member 14 held in the extended state by the attraction force between the object 99 and the second mounting magnet 40, until the first engagement occurs (e.g., via movement of the object 99 toward the apparatus 10). Therefore, the range for the first engagement position (e.g., first stage of engagement) may be defined by the range between the outer limit position OL and the base limit position BL of the second mounting magnet 40. In either case, a first engagement position may be established (e.g., a first stage of engagement). As previously described, the object 99, in the first engagement position, may be in a position that results in a second attraction force that may draw the object 99 and the unengaged mounting magnet (in this case, the first mounting magnet 30) together so that the resulting engagement (e.g., a second stage of engagement) may produce a total engagement force for mounting the object 99 to the mounting apparatus 10. Thus, the first and second mounting magnets 30, 40 in FIG. 1 may be positioned relative to one another such that a first stage of engagement may produce an automatic succession of stages of engagement to produce the total engagement force (in the case of the depicted embodiment of FIG. 1, one successive stage of engagement).

FIG. 2 schematically illustrates the described embodiment depicted in FIG. 1 in which the second mounting magnet 40 is movable and the first mounting magnet 30 has a fixed position. The second plane P2 (represented by a line in the figure), defined by the second mounting magnet 40 supported in the engagement member 14, may be movable between its base limit position BL and its outer limit position OL along the line of engagement $L_e$. As the object (e.g., the object 99 of FIG. 1, which in the depicted embodiment defines a third plane P3) is positioned in proximity to the mounting apparatus and an attraction force is created between the second mounting magnet 40 of the engagement member 14 and the object 99, the engagement member 14, in this example, may be drawn toward the object 99 in the direction A, as shown in FIG. 2, so that the second mounting magnet 40 and, correspondingly, plane P2 may move until the object is engaged or until the second mounting magnet 40 reaches the outer limit position OL and can move no further in the direction A. FIG. 3 schematically shows the first stage of engagement between the object 99 and the second mounting magnet 40 of engagement member 14, represented by coinciding planes P2 and P3. In this illustration (FIG. 2), the first stage of engagement is shown at the outer limit position OL of the second mounting magnet, but the first stage of engagement may occur at any point along the line of engagement $L_e$ between the outer limit position OL and the base limit position BL in this example. After the first stage of engagement (P2, P3), the engagement member and the object interface 12 may be moved in the direction B. This movement in the direction B may be due to a second magnetic attraction that exists between the object 99 and the first mounting magnet 30. Alternatively or additionally, movement in the direction B may occur as a result of application of, or continued application of, a force applied to the object by a user in the direction B. FIG. 4 shows the result of the second magnetic attraction, wherein the first plane P1, the second plane P2, and the third plane P3 may substantially coincide and may be disposed in proximity to the base limit position BL. At this point, a total engagement force may exist between the mounting apparatus and the object as a result of the combined engagement forces between the first mounting magnet 30 and the object 99 and the second mounting magnet 40 and the object 99, and this total engagement force may serve to secure the object to the mounting apparatus in the engaged and mounted configuration.

The opposite process may be implicated when the object is removed from the mounting apparatus in some embodiments. Referring again to the embodiment of FIG. 1 as represented by FIGS. 2-4, a user applying a disengaging force to the object may initially overcome one of the engagement forces (e.g., the force between the object 99 and the first mounting magnet 30 of the first plane P1), and continued application of the disengaging force may thus move the second mounting magnet 40 of the engagement member 14 (and the second plane P2 via movement of the engagement member 14) and the object 99 (and the third plane P3) in the direction A from the position shown in FIG. 4 to the position shown in FIG. 3. Further application of a disengaging force may overcome the engagement force between the object 99 and the second mounting magnet 40 of the second plane P2 to fully disengage the object 99 (FIG. 2).

It is noted that, although in the embodiment depicted in FIGS. 1-5 the engagement member 14 is movable with respect to a fixed intermediate surface 12, in other embodiments the intermediate surface may be movable with respect to a fixed engagement member, or both the intermediate surface and the engagement member may be movable with respect to each other. Thus, in some embodiments, engagement of the object with the intermediate surface may occur first and may cause the object to be in proximity to the engagement member, which may result in an attraction force between the object and the engagement member. Regardless of the order of engagement, the respective engagement forces associated with the engagement member and the intermediate surface may thus cooperate to engage the object and produce a total engagement force between the mounting apparatus and the object. Furthermore, a disengaging force that is applied to the object may successively overcome the respective engagement forces associated with the intermediate surface and the engagement member to disengage the object, and the disengaging force may be less than the total engagement force, as noted above.

The mounting apparatus may further include a controlling force that may be applied to the at least one of the mounting magnets that is moveable to control at least the movement or the functionality of the at least one of the mounting magnets that is moveable. For example, with reference to FIG. 1, the mounting apparatus 10 may further comprise a controlling component 60 configured to apply the controlling force. The controlling component 60 may comprise a magnet, such as a material configured to respond to magnetism or a component capable of producing a magnetic field (e.g., a permanent magnet, electromagnet, programmable magnet, etc.). In other embodiments, the controlling component may comprise a plurality of controlling components configured to apply a plurality of controlling forces, and each respective controlling force may be configured to control a corresponding mounting magnet. In yet other embodiments, the controlling component may be a spring or another component or combination of components that is configured to apply the controlling force to the respective one of the engagement member or the intermediate surface that is moveable.

The controlling component may be configured to bias the at least one of the mounting magnets that is moveable away from the object to be mounted. For example, the controlling component 60 may be configured to bias the second mounting magnet 40 away from the object 99 so that the engagement member 14 may be biased toward the retracted state. In such a case, the controlling component may be construed to be a retaining force, serving to retain the engagement member 14 so that the second mounting magnet 40 is substantially in the base limit position BL. Thus, in FIG. 1, the engagement member 14, when in the retracted state, may be substantially flush with the intermediate surface 12, as described above and the benefits of which are described in greater detail below (and also illustrated by other embodiments of the present invention, below).

Alternatively or additionally, the controlling component may be configured to bias the at least one of the mounting magnets that is moveable toward the object to be mounted. Thus, in FIG. 1, the controlling component 60 may be configured to bias the mounting magnet 40 toward the object 99, so that the engagement member 14 is correspondingly biased toward the extended state, also as illustrated and described in greater detail with respect to other embodiments of the present invention, below.

Furthermore, the controlling component may be configured such that the controlling force is adjustable. In some embodiments, the controlling force may be physically adjustable, such that the controlling component (e.g., magnet, spring, etc.) is configured to be moved toward or away from the at least one of the mounting magnets that is movable. This may be accomplished via, e.g., a lever, crank, etc. within the mounting apparatus that has an extending portion that may be available to the user, for example, along one side of the outer perimeter of the apparatus. Alternatively, the controlling component may be configured to be movable within the apparatus relative to the line of engagement (e.g., supported by a movable member that may, for example, be similar to the engagement member). Moving the controlling component may adjust the controlling force applied to the mounting magnet(s) (e.g., make the controlling force stronger or weaker depending upon the direction of movement) as the controlling component moves nearer or further away from the mounting magnet(s) that is movable and may cause the movable magnet(s) to move as a result. Furthermore, the controlling component may also be configured to be physically adjustable by, for example, being supported on a structure within the apparatus that may rotate or swivel such that the controlling component may have a different orientation with respect to the mounting magnet(s) (depending upon how the controlling component is adjusted).

Thus, in some embodiments, for example, the controlling component may be a magnet that produces a magnetic field (e.g., has a north pole and a south pole) that may have an orientation relative to the mounting magnet(s) such that the mounting magnet(s) are biased toward the controlling component. In such an embodiment, the controlling component may be, for example, supported on a swiveling structure within the apparatus that may be manipulated to swivel the controlling component 180 degrees so that the controlling component's orientation, relative to the mounting magnet(s), may be effectively reversed, thereby causing the controlling force to also be effectively reversed and causing the mounting magnet(s) to be biased away from the controlling component.

For example, referring again to FIG. 1, the base surface 80 may be configured to rotate (e.g., swivel) and may, therefore, comprise an extension that is made accessible to a user beyond the housing 82 of the mounting apparatus 10 by a hole in the housing 82 so that the extension may be accessible to a user for adjustment of the base surface 80 and, in turn, the controlling component 60. The controlling component 60 may be a rare earth magnet, and the base surface 80 may be rotated by 180 degrees by the user to produce a substantially opposite magnetic controlling force that may act on the second mounting magnet 40 in a substantially opposite manner relative to the magnetic controlling force that may have acted on the second mounting magnet 40 prior to the rotation of the base surface 80. Thus, the engagement member 14, as a result of the input by the user, may be made to partially or fully extend from the mounting apparatus 10 or may be made to partially or fully retract depending upon the strength of the controlling force.

Alternatively, the controlling component may be adjustable by other means. In some embodiments, the controlling component may be an electromagnet such that the controlling force may be adjustable via manipulation of the flow of an electric current. Therefore, the controlling force may be strengthened by degrees, weakened by degrees, removed entirely (e.g., by stopping the flow of the electric current to the electromagnet), or reversed (e.g., by reversing the poles/polarity of the electromagnet) via manipulation of the electric current associated with the electromagnet. In other embodiments, the controlling component may be a programmable magnet and the corresponding first or second mounting magnet may be suitably configured to cooperate with the programmable magnet. Therefore, in either case, the controlling component may be configured to move the engagement member (and/or the intermediate surface in some embodiments) between a retracted position and an extended position (e.g., may be configured to move the at least one of the mounting magnets that is moveable between its respective outer limit position and its respective base limit position), and/or the controlling component may be configured to maintain the engagement member in an extended position (one possible extended position is shown in FIG. 5; e.g., the extended state). Accordingly, the controlling component may be configured to dictate a specific position of at least one of the first or second mounting magnets (and, correspondingly, at least one of the intermediate surface or the engagement member), between the outer limit position OL and the base limit position BL prior to engagement of the object, and/or the controlling component may be configured to alter (e.g., customize) the target mounting area of the apparatus. For example, in the embodiment of FIG. 1, the controlling component 60 may be configured to apply a controlling force to the second mounting magnet 40 (e.g., a repelling force) such that the engagement member 14 may be held in an extended position in the extended state (e.g., the second mounting magnet 40 held in the outer limit position OL), and this may effectively define the first engagement position (as described above) of the first stage of engagement that would occur when the object 99 is mounted. In the same way, the engagement member 14 (supporting the second mounting magnet 40 in the second plane P2) may be held in an extended position, for example, midway between the extended state and the retracted state (as depicted in FIG. 2 by the second plane P2), thus altering the appearance and/or shape of the target mounting area. Altering the appearance and/or shape of a target mounting area on a mounting apparatus may provide an aesthetic benefit, may make the target mounting area more obvious to the user (making the mounting apparatus more intuitive to use), or may substantially adapt the target mounting area to an object to be mounted (e.g., matching the shape of the object to be mounted or making the target mounting area more agreeable with respect to the shape of an object to be mounted). Thus, as described above, the controlling component, or the plurality of controlling components, may be configured to be dynamically adjusted so as to define a respective holding position of the at least one of the mounting magnets that is movable between the respective outer limit position and the respective base limit position of the at least one of the mounting magnets that is movable. In some embodiments, such as those described below, defining the holding position(s) of the mounting magnet(s) may dictate a prescribed order of the stages of engagement and/or disengagement of the object. Correspondingly, an object may achieve a total engagement force with the mounting apparatus via different means (e.g., engaging P1, then engaging P2 vs. engaging P2, then engaging P1) or may engage the mounting apparatus differently (e.g., engaging more or fewer planes) as a result of, and depending upon, the adjustment(s) made to the controlling force(s) via the controlling component(s). Additionally, the holding position(s) of the mounting magnets may be dynamically arranged by the controlling force(s) relative to one another so that the second attraction force (which may be produced as a result of the first stage of engagement in the first engagement position, as described above) is produced or is not produced as prescribed (e.g., the unengaged mounting magnet is, or is not, within the required proximity of the object upon the happening of the first stage of engagement in the first engagement position for the second attraction force to be produced). Thus, the relative positions of the mounting magnets (and, correspondingly, the relative positions of the engagement member and/or intermediate surface that is movable) as determined by the adjustment(s) of the controlling force(s) may produce or preclude the automatic succession of stages of engagement that produces the total engagement force. If the automatic succession of stages of engagement is precluded, the total engagement force between the object and the mounting apparatus may still be produced by the continued application of an engaging force to the object (e.g., continued movement of the object toward the mounting apparatus by, for example, the user) to mount the object. Also, it is important to note that the adjustment(s) to the controlling force(s) may be made when the mounting apparatus is disengaged with the object (e.g., idle) or when the mounting apparatus is engaged with the object.

When an object is engaged (e.g., mounted) with the mounting apparatus, the controlling force may be dynamically adjusted to enhance the functionality of the mounting apparatus, to move the object, and/or to interact with the object or a component or device associated with the object. For example, in FIG. 1, when the object 99 is mounted to the mounting apparatus 10 such that a total engagement force is produced between the object 99 and the mounting apparatus, the controlling component 60 may be adjusted so that the controlling force (in this example, an attraction force) between the second mounting magnet 40 and the controlling component 60 may be strengthened. Strengthening of the controlling force may cause the engagement force between the second mounting magnet 40 and the object 99 to be strengthened such that the total engagement force between the object 99 and the mounting apparatus 10 is strengthened. Strengthening of the total engagement force may cause the object 99 to be more securely engaged with the mounting apparatus 10 (e.g., the object 99 is less likely to be unintentionally disengaged) and may cause the object 99 to be more stable against unintended impacts (e.g., swipes, bumps, etc.) that may otherwise affect or reposition the object 99 on the mounting apparatus 10. Furthermore, the controlling force may be strengthened to a degree such that the total engagement force is too great for a user to overcome (using ordinary and reasonable force) to disengage the object 99. Thus, the object 99 may effectively be "locked" to the mounting apparatus until the controlling force is further adjusted (e.g., weakened) to allow for disengagement of the object 99 from the mounting apparatus 10 by the user.

Additionally, referring again to FIG. 1, the engagement force between the first mounting magnet 30 and the object 99, when the object 99 is mounted to the mounting apparatus 10, may be significantly stronger than the engagement force between the second mounting magnet 40 and the object 99 such that the first stage of disengagement (e.g., disengagement of the first mounting magnet 30 and the object 99, in FIG. 1) requires a significantly stronger disengaging force applied by the user than does the second stage of disengagement (e.g., disengagement of the second mounting magnet 40 and the object 99). In this case, to make disengagement of the object 99 easier for the user, the controlling force (applied by the controlling component 60) may be adjusted so that it biases the second mounting magnet 40 toward the outer limit position OL (e.g., a repelling force) and may be of sufficient strength to move the engagement member 14 and the object 99 beyond the first plane P1 (and, correspondingly, the intermediate surface 12) such that the first stage of disengagement may be accomplished by the controlling force (e.g., partial disengagement) rather than by the user. The user may then disengage the object 99 by overcoming a lesser total engagement force, such as the engagement force between the second mounting magnet 40 and the object 99 (e.g., the second stage of disengagement) to disengage the object 99 from the mounting apparatus 10. Furthermore, the controlling force may be configured to be managed remotely. Remote management of the controlling force may be accomplished, for example, in one of the following ways: by configuring the apparatus to receive a wireless signal, radio frequency, etc. transmitted by an external device to a receiving device which is configured to adjust the controlling component; via a physical interface on the device configured to adjust the controlling force (e.g., a button, touch interface, crank, lever, etc.) that is built into an exposed surface of the mounting apparatus or extending from the mounting apparatus and that may be manipulated by a user to produce a desired effect; or via a wired connection to the apparatus configured to connect the controlling component with a management interface (e.g., a wall switch, volume knob, etc.) so that the strength of the controlling component may be managed by degrees and/or may be turned on/off. Therefore, if the engagement force between the second mounting magnet 40 (in the embodiment of FIG. 1) is not sufficient for supporting the weight of the object 99 on its own (such that the user must grasp the object 99 during the second stage of disengagement in order to prevent the object from an unintentional fall from the engagement member 14), the object may be grasped by the user prior to the first stage of disengagement (e.g., when the object 99 is fully engaged with the mounting apparatus 10), and the adjustment of the controlling force may be effected remotely such that the object 99 is ejected beyond the more difficult stage of disengagement by the engagement member 14 while the user grasps the object 99 so that the object 99 is supported and so that the user may disengage the object 99 from the mounting apparatus 10. However, in some cases, it may be desirable for the object to automatically disengage (e.g., fall from) the mounting apparatus when the controlling force is used to eject the object from the engagement member or the intermediate surface (e.g. such as during the manufacturing of parts). Therefore, some embodiments may be configured to intentionally produce this result.

The ejection process described above may also be effected to allow for manipulation of an object engaged with the mounting apparatus. Referring again to the embodiment of FIG. 1, the second mounting magnet 40 may be configured to bear the weight of the object 99 such that the object 99 may be ejected from the intermediate surface 12 (as described above) so that the object 99 may be repositioned (e.g., rotated to achieve a desired orientation, spun, slid, etc. in this embodiment). After repositioning, the controlling force may be further adjusted so that the engagement member 14 retracts and the object 99 is again fully engaged with the mounting apparatus via the total engagement force. In other embodiments, repositioning the object may involve tilting or otherwise adjusting the pitch, yaw, and roll of the object, among other means, in which case the one of the engagement member or intermediate surface that is movable may remain extended until the adjusted or adjustable position is no longer desired.

Adjustment of the controlling force via the controlling component may also be used to redefine the base limit position BL of the at least one of the first or second mounting magnets that is moveable (and, correspondingly, the retracted state of the at least one of the engagement member or the intermediate surface that is movable) by effectively serving as a stop feature of the apparatus. Additionally, in some embodiments, the controlling component of the apparatus may be configured to serve as a stop feature without adjustment. Referring again to the embodiment of FIG. 1, the controlling component 60 may be configured to bias the second mounting magnet 40 toward the outer limit position OL via the controlling force (for example, a repelling force that interacts with the mounting magnet 40), and the controlling component 60 may be adjusted so that the controlling force is strengthened. The first mounting magnet 30 may apply an attraction force to the object 99 that is stronger than the bias of the controlling force at the outer limit position OL of the second mounting magnet 40. Thus, when the object 99 is engaged with the engagement member 14 (which may be in an extended position—e.g., the extended state, as shown in FIG. 5—prior to engagement due to the bias of the controlling force on the second mounting magnet 40), the attraction of the object 99 to the first mounting magnet 30 may move the object 99 and the second mounting magnet 40 toward the controlling component 60 until a position may be reached such that the attraction force between the first mounting magnet 30 and the object 99 is substantially equivalent to the repelling force between the controlling component 60 and the second mounting magnet 40, thus limiting movement of the second mounting magnet 40 along the line of engagement $L_e$ and effectively redefining the base limit position BL of the second mounting magnet 40 and, correspondingly, limiting the total engagement force (e.g., relative to the total engagement force inherent to the configuration of the mounting apparatus 10 prior to the adjustment of the controlling force) between the object 99 and the mounting apparatus 10.

In addition to the functions that may be served by the controlling component(s) of the invention as described above, in some embodiments similar to the embodiment of FIG. 1, additional controlling components 60 (Group 1) may be supported by the inner perimeter of the extension 98 of the engagement member 14 that may be configured to cooperate with the first mounting magnet 30 of the intermediate surface 12 (or may be configured to cooperate with additional controlling components 60 (Group 2) supported by the guide surface 96 of the intermediate surface 12) such that a friction force between the engagement member 14 and the guide surface 96 of the intermediate surface 12 may be limited (e.g., reduced) or eliminated as the engagement member 14 moves between the retracted state and the extended state. The cooperation referenced above may result by means of Group 1 and the mounting magnet 30 (or Group 1 and Group 2) being configured to have substantially opposite magnetic forces that repel one another and effectively serve to create a repelling force between the extension 98 of the engagement member 14 and the guide surface 96 of the intermediate member 12.

Furthermore, the controlling component may be configured such that the controlling force is removable. Removing the controlling force may involve adjustment of the controlling force, such that the strength of the controlling force is decreased until the controlling force is removed altogether. In other embodiments, the controlling force may be removed by physically removing, re-positioning, or blocking the controlling component. This may be accomplished by use of a movable rod, strip, plate, etc. on which the controlling component is attached and that may be inserted into and removed from the apparatus, or a similar result may be accomplished by making the apparatus accessible to a blocking component (e.g., a magnetic shielding component) that may be inserted to block or otherwise hinder the controlling force.

Additionally, the controlling component may be configured such that the engagement member automatically retracts after the object is disengaged from the apparatus. Referring again to FIG. 1, the controlling component 60 may be configured to bias the engagement member 14 toward the retracted state by applying a controlling force (e.g., an attraction force) to the second mounting magnet 40. The controlling force may be of sufficient strength to bias the second mounting magnet 40 toward the base limit position BL when the second mounting magnet 40 is in the outer limit position OL (e.g., when the engagement member 14 is in the extended state). Thus, the mounting apparatus 10 may have a disengaged (e.g., idle) configuration when no object is engaged with the mounting apparatus 10 wherein the engagement member 14 may be in the retracted state (and the second mounting magnet 40 may be in the base limit position BL). Therefore, the engagement member 14 may be automatically retracted by the controlling force applied by the controlling component 60 when the object 99 is disengaged from the mounting apparatus 10 as the mounting apparatus 10 returns to the disengaged (e.g., idle) configuration.

In still other embodiments, additional components or devices may be provided (e.g., used in conjunction with, attached to, or integrated with the mounting apparatus) to enhance a user's experience with the object to be mounted. For example, in some embodiments, at least one short-range wireless data transfer device may be positioned in proximity to a target mounting area (e.g., the vicinity of the mounting surface in which the object is to be mounted) and may be supported by the intermediate surface or the engagement member. The at least one short-range wireless data transfer device may be capable of wirelessly communicating with an electronic device that is brought into proximity with the short-range wireless data transfer device, and it may be capable of wirelessly communicating with the electronic device when the object is fully engaged with the apparatus and may be incapable of wirelessly communicating with the electronic device when the object is partially disengaged or fully disengaged from the apparatus. For example, with reference to the embodiment of FIG. 1 which may comprise a short-range wireless transfer device (not shown) mounted to the inner surface 86 of the intermediate surface 12 and wherein the object 99 may comprise an attached mobile phone (not shown), the mobile phone may be capable of communicating with the short-range wireless data transfer device of the mounting apparatus 10 when the object 99 is fully engaged with the apparatus 10. Therefore, the controlling force produced by the controlling component 60 may be adjusted to eject the object 99 and the mobile phone beyond the intermediate surface 12 to a distance from the short-range wireless data transfer device so that communication between the mobile phone and the short-range wireless data transfer device may be stopped. The controlling force may further be adjusted so that the engagement member 14 is retracted so that the object 99 is again fully engaged with the mounting apparatus 10 such that the mobile phone is once again capable of communicating with the short-range wireless data transfer device supported by the inner surface 86 of the intermediate surface 12.

Additionally, some embodiments may comprise at least one wireless charging device supported by the intermediate surface or the engagement member. The at least one wireless charging device may be supported by the intermediate surface and may be capable of wirelessly charging an electronic device that may be brought into proximity with the wireless charging device. In this regard, the receiving component (e.g., a receiving device configured to receive the wireless charging device signal) may be any component of the object (e.g., integral to or otherwise attached to the object) that is configured to be charged and/or recharged (such as a rechargeable power cell or battery) for serving as a power source to the object. The charging range may be a range of distances within which the wireless charging device may (e.g., remotely) charge the receiving component. Referring again to the embodiment depicted in FIG. 1 which may comprise a wireless charging device (not shown) supported by the inner surface 86 of the intermediate surface 12 and wherein the object 99 may comprise an attached mobile phone (not shown), engaging the object 99 with the mounting apparatus 10 may result in the mobile phone being wirelessly charged by the wireless charging device that is supported by the intermediate surface 12.

In still other embodiments, at least one connection interface may be supported in at least one of the first or second planes (e.g., the planes P1, P2 shown in FIG. 1). The connection interface may be any interface between the object and some other component or device (which may, in some cases, be a like or similar embodiment of the mounting apparatus) that allows a connection to be made. For example, the connection interface may, in some cases, be an electrical connector that is configured to connect the object or a component thereof to a source of electricity (such as a source of electricity in the mounting surface).

Various embodiments may be configured such that at least one of the mounting magnets may receive a portion of the object to be mounted. Receiving a portion of the object to be mounted may comprise structurally supporting the object, limiting movement of the object to a single direction along a single axis relative to the mounting apparatus, and/or at least partially supporting a weight of the object. In the depicted embodiment of FIG. 1, the object 99 may define a third plane P3, and the third plane P3 may be a nominal plane such that the object 99 may be defined by a curved surface and, correspondingly, a depth $d_o$. Alternatively or additionally, the object 99 may define the depth $d_o$ by having multiple engageable surfaces (e.g., surfaces that respond to magnetism) that may be engaged by the mounting apparatus that may be spaced apart, and the engageable surfaces may be joined by an extension so that the object 99 is similar to the object 99a depicted in FIG. 5. The depth $d_o$ may be less than the depth $d_a$, defined by the distance between the first plane P1 and the second plane P2 when each of the respective mounting magnets is in its respective outer limit position OL (shown in FIG. 5). Therefore, the engagement member 14 of the mounting apparatus 10 in FIG. 1 may be configured to receive the object 99a (also a nominal object that inherently responds to magnetism, in this example) via engagement of the object extension 76 (by way of the object surface opening 78 of the object 99a) with at least a portion of the extension 98 of the engagement member 14. The extension 98 may be configured to bear at least a portion of the weight of the object 99a, and engagement of the object 99a with the portion of the extension 98 may limit movement of the object 99a to a direction along a single axis relative to the mounting apparatus 10, which may make the object 99a more stable and/or secure than a substantially flat object 99 mounted to the mounting apparatus 10 in a similar manner. Therefore, the first mounting magnet 30 and second mounting magnet 40 and, correspondingly, the total engagement force may each be of a strength that is less than the strength of the mounting magnets and the total engagement force required for supporting the object 99. Thus, smaller and/or less powerful magnets may be used to provide substantially the same functionality (e.g., weight-bearing, stability, security, etc.), as the role and importance of the mounting magnets may change to that of providing a holding force (e.g., total engagement force) suited for attachment rather than a holding force fully responsible for bearing the weight of the object and/or stably securing the object. Moreover, the smaller and/or less powerful magnets may be less expensive to procure or manufacture, which may provide an additional benefit. Furthermore, limiting movement of the object 99a to a single direction along a single axis may protect the object 99a against unintentional disengagement (e.g., via accidental bumps, swipes, vibration, or other jarring or disruptive forces that may influence the object) and may require that any unintentional disengaging force must overcome the engagement forces associated with the various stages of disengagement to completely disengage the object 99a. Thus, even an unintentional disengaging force that is forceful enough to overcome one engagement force (e.g., the engagement force between the first mounting magnet 30 and the object 99a within the first plane P1) may be substantially reduced or may cause the object to lose momentum so that a subsequent engagement force (e.g., between the second mounting magnet 40 and the object 99a within the second plane P2) may not be overcome. Additionally, embodiments that are configured to produce the automatic succession of stages of engagement (described previously) may effectively reverse the movement of the object caused by the unintentional disengaging force (if the force is not substantial enough to overcome all of the stages of disengagement) and thus may effectively re-engage the object automatically (e.g., without external intervention) to re-establish the total engagement force between the object and the mounting apparatus.

As described above and as shown in FIG. 5, the object 99a has multiple engageable surfaces that are spaced from one another so that the distance between the surfaces defines a depth. Engagement of the mounting apparatus 10 (shown in FIG. 1) with an object of this type may occur in a similar manner to the staged engagement process previously described with respect to object 99 of FIG. 1 (e.g., the engagement member 14 may extend in response to proximity of the object 99a, the second mounting magnet 40 may engage the object 99a first, and the first mounting magnet 30 may draw the object 99a toward the mounting apparatus 10 to fully engage the object 99a; e.g., staged engagement in an order P2, P1). Alternatively, depending on factors such as the strength of the mounting magnets (30, 40), the depth $d_o$ of the object 99a, and the type and strength of the controlling force as applied by the controlling component, proximity of the object 99a may cause the object 99a to be drawn to the first mounting magnet 30 such that the first mounting magnet 30 engages the object 99a first (e.g., the first stage of engagement), and the engagement member 14 may subsequently, or simultaneously, be drawn toward the object 99a and may engage the object 99a last (e.g., the second stage of engagement) to produce a total engagement force (e.g., staged engagement in an order P1, P2).

The distance between the outer limit positions OL of the first and second mounting magnets may define a depth $d_a$. As shown in FIG. 5, the depth $d_a$ may be greater than the depth $d_o$ such that the object 99a may be engaged with the mounting apparatus 10 via successive stages of engagement, as described above. Thus, the object 99a may be dismounted from the mounting apparatus 10 via successive stages of disengagement. In the embodiment of FIG. 5, regardless of the order of the stages of engagement (e.g., P1, then P2 vs. P2, then P1), if the depth of the object 99a ($d_o$) is less than the depth between the outer limit positions OL of the second mounting magnet 40 and the first mounting magnet 30 ($d_a$), the engagement member 14 may automatically adapt to the depth of the object 99a during the second (in this case) stage of engagement of the mounting process (e.g., the engagement member 14 may engage the object 99a first and retract during the second stage of engagement, or the engagement member may extend to produce the second stage of engagement with the object 99a), and the object 99a may be disengaged from the mounting apparatus 10 in multiple stages. It is important to note, however, that, if $d_o$ is greater than $d_a$, the second mounting magnet 40 may still engage the object 99a (e.g., by magnetic engagement if not also by physical engagement) depending upon the shape of the object 99a such that the engagement force between the second mounting magnet 40 and the object 99a contributes toward the total engagement force (e.g., increases the total engagement force) and, therefore, aids in facilitating mounting of the object 99a (the second mounting magnet 40 and its corresponding stage of engagement and engagement force still have the same role in the mounting process even if not physically engaged with the object, though the engagement force associated with the second mounting magnet 40 may be of a lesser strength), but the benefits of staged disengagement may not apply (e.g., the object 99a may not disengage the mounting apparatus 10 in a staged manner if $d_o$ is greater than $d_a$).

Furthermore, the mounting apparatus 10 of FIG. 1 may be configured such that the engagement member 14 is substantially flush with the intermediate surface 12 (as described above). This may be beneficial for mounting an object such as object 99a because the outer surface of the object 99a (e.g., the surface closest to the mounting apparatus 10) may be initially misaligned with the engagement member 14 when engaged with the intermediate surface 12. In this case, the user may slide the object 99a across the flush surface of the mounting apparatus 10 and, when the engagement member 14 is properly aligned with the object surface opening 78, the engagement member 14 may automatically extend to engage the object 99a by an attraction force produced between the second mounting magnet 40 and the object 99a (specifically, the surface of object 99a that is furthest from the mounting apparatus 10) that is no longer blocked by the outer surface of the object 99a (e.g., the surface closest to the mounting apparatus 10, as noted above). Thus, the object 99a may be easier to mount to the mounting apparatus 10, or the object 99a may be mounted in a less precise manner, than would be the case if the user were required to initially align the object 99a properly in order to mount the object.

Additionally, if $d_o$ is less than $d_a$ (as described above), the engagement member 14 may be configured to produce audible feedback (e.g., a click, tone, or other sound) upon engagement of the object 99a that may provide notification that the object 99a is fully engaged with the mounting apparatus 10. Configuring the audible feedback that may occur may include choosing a material for the face 88 of the engagement member 14 that produces such feedback when engaged with another surface or may include supporting a sensor in the face 88 of the engagement member 14 that may be configured to be attached to a noise-making device (e.g., a small speaker) within the mounting apparatus 10.

Also, the mounting apparatus 10 may be configured such that the object is aligned properly with respect to the apparatus prior to engagement. As such, at least one of the engagement member or the intermediate surface may be configured to bias the object to be mounted to a predefined mounting orientation prior to engagement of the object with the apparatus, as will be shown by way of other embodiments and will be discussed in more detail below.

Turning now to FIG. 6A, another embodiment is shown that is similar to the embodiment depicted in FIG. 1 but comprises additional components and modifications that enhance the adaptability and functionality of the apparatus 10. The embodiment depicted in FIG. 6A may also support a first mounting magnet 30 (comprised of six magnets) in a first plane by an intermediate surface 12 and a second mounting magnet 40 in a second plane by a face 88 of the engagement member 14, and only the second mounting magnet 40 (and, correspondingly, the engagement member 14) may be movable. However, in this embodiment, the magnets 30 may be supported by the fixed intermediate surface 12 via support extensions 83 that extend from the inner surface 86 of the intermediate surface 12 and may be hollow to accommodate the magnets 30 and support the magnets 30 in the intermediate surface 12. Also, as may be similar to the embodiment of FIG. 1, in the embodiment of FIG. 6A, a portion of the intermediate surface 12 may define an opening 94 that is configured to slideably receive at least a first portion (which, in this case, may be a first portion 98' of the extension 98) of the engagement member 14 so as to substantially align the line of engagement $L_e$ along the central axis X of the engagement member 14 as the engagement member 14 is moved between the extended and retracted states. Additionally, however, as shown in FIG. 6A, the intermediate surface 12 of the mounting apparatus 10 may further comprise a chamber 90 that may extend from the portion of the intermediate surface that may define the opening 94 and that may contact the interior surface 84 of the base surface 80, and the chamber 90 may be configured to slideably receive a second portion of the engagement member 14 (which, in this case, may be a second portion 98" of the extension 98 that may extend beyond the stop feature 50 that is provided via the outward protrusion of the extension 98) via engagement of the second portion 98" with an inside surface 92 of the chamber 90. Adding this component (the chamber 90) may enhance the adaptability and functionality of the mounting apparatus 10, as the second mounting magnet 40 may not be limited to a base limit position BL that ensures that the extension 98 of the engagement member 14 remains in contact with the guide surface 96 of the intermediate surface 12 to keep the line of engagement $L_e$ substantially aligned along the central axis X (as may be required in the mounting apparatus 10 in FIG. 1). This may be the case, in fact, because the chamber 90 (configured as noted above) may also align the line of engagement $L_e$ along the central axis X of the engagement member 14 by means of its engagement with the second portion 98" of engagement member 14. As such, the engagement member 14 may be configured (e.g., modified, as compared to the embodiment shown in FIG. 1) such that the area of contact between the second portion 98" and the inside surface 92 of the chamber 90 is increased, which may further ensure the stability of the engagement member 14 along the central axis X and the line of engagement $L_e$. The area of contact may be increased by extending the second portion 98" of the extension 98 toward the face 88 of the engagement member 14 (and, thus, changing the position of the stop feature 50), which may, in turn, affect the outer limit position OL of the second mounting magnet 40 if no other changes are made with respect to the outer limit position OL, or the area of contact may be increased by extending the second portion 98" of the extension 98 away from the face 88, which may, in turn, affect the base limit position BL of the second mounting magnet 40 if no other changes are made with respect to the base limit position BL. Depending on the dimensions chosen for the lengths of the first and second portions 98', 98" with respect to the length of the chamber 90, the total length of the engagement member 14 may be shorter than the length of the chamber (as shown in FIG. 6B). Thus, as shown, the chamber 90 may define a first depth and the engagement member 14 may define a second depth, with the first depth being greater than the second depth (which may, e.g., correspond to the thickness of a plate through which the opening is formed, in other embodiments).

With continued reference to FIG. 6B, because the chamber 90 may keep the engagement member in proper alignment with the line of engagement $L_e$, as described previously, and may have a depth greater than the depth of the engagement member 14, as described above, the base limit position BL of the second mounting magnet 40 may be configured to be at a position within the mounting apparatus 10 (e.g., between the intermediate surface 12 and the base surface 80) such that the engagement member 14 may move along and within the chamber 90. Therefore, the second mounting magnet 40 may be moved beyond the intermediate surface 12 in a direction away from an object to be mounted (e.g., the engagement member 14 may be retracted), and the interior surface 84 of the base surface 80 may act as a stop feature (as described previously with reference to the embodiment of FIG. 1) and may define the base limit position BL of the second mounting magnet 40 (and, accordingly, the retracted state of the engagement member 14).

FIG. 6C shows the presently described embodiment of the apparatus 10 in the retracted state and, accordingly, shows the base limit position BL of the second mounting magnet 40. As is also shown in FIG. 6C, when the engagement member 14 is in the retracted state, a portion of the chamber farthest from the base limit position BL may be configured to align with the opening 94 of the intermediate surface to define a receiving cavity 91. Thus, the intermediate surface 12 may be configured to receive a portion of the object to be mounted (e.g., a portion of a suitably shaped object or an object interface configured to fit within the receiving cavity 91).

Accordingly, the embodiment depicted in FIG. 6A may be configured to have a surface that is substantially "male" (e.g., with the engagement member 14 extended) or substantially "female" (e.g., with the engagement member 14 retracted) with respect to the object to be mounted, and, so, accordingly, the mounting apparatus 10 of FIG. 6A may be able to engage objects that are deemed to be substantially male or substantially female. Furthermore, the mounting apparatus 10 may be configured so that it is adaptable between a substantially male configuration and a substantially female configuration depending on the substantially male or female configuration of the object to be mounted (e.g., the mounting apparatus 10 may adapt to the shape of the object to be mounted). Furthermore, an apparatus 10 configured to be substantially male when not engaged (e.g., idle), such as a mounting apparatus 10 configured such that the engagement member 14 is held in the extended state when idle by a controlling force applied by the controlling component 60 to the second mounting magnet 40, may adapt to engage an object to be mounted of the same orientation (e.g., male) via retraction of the engagement member 14 to a retracted state in response to engagement of the object during the mounting process. Likewise, an apparatus 10 configured to be substantially female when not engaged (e.g., idle), such as a mounting apparatus 10 configured such that the engagement member 14 is held in the retracted state when idle by a controlling force applied by the controlling component 60 to the second mounting magnet 40, may adapt to engage an object to be mounted of the same orientation (e.g., female) via extension of the engagement member 14 to an extended state in response to engagement of the object during the mounting process.

As noted above, the embodiment depicted in FIG. 6A may be very versatile, and various configurations of the embodiment (including like and unlike configurations) may be used in conjunction with one another in mounting and non-mounting (e.g., attachment) contexts per the application.

As described previously, at least one of the mounting magnets may be configured to receive a portion of the object to be mounted. Receiving a portion of the object to be mounted by the intermediate surface and/or the engagement member may further provide structural support to the object, may facilitate alignment of the object with the mounting apparatus, may guide the object, or may accomplish a combination of these. For example, the intermediate surface 12 may thus be configured to bear at least a portion of the weight of the object. In the embodiment of FIG. 6A, the object may be received via the opening 94 of the intermediate surface 12 (i.e. the first mounting magnet 30), and, in receiving a portion of the object, the intermediate surface 12 may structurally support the object, facilitate alignment of the object with the mounting apparatus 10, and/or guide engagement of the object (as noted above).

In some embodiments, structurally supporting the object may further include limiting movement of the object to a direction along a single axis relative to the mounting apparatus 10 in response to a disruptive or disengaging force applied to the object. For example, the engagement member and/or the intermediate surface may be configured to limit movement of the object to a direction along a single axis in response to the applied disengaging force. Said differently, the mounting apparatus 10 may be configured to resist unintentional disengagement of the object and/or object interface from the mounting apparatus, such as from an accidental hit or swipe (e.g., a force having a transverse component with respect to the direction of the line of engagement $L_e$). For example, a force applied at a downward angle to the mounting apparatus 10 may be resisted by the structural support provided by the engagement member 14 and/or intermediate surface 12, and only a disengaging force applied in a single direction along a single axis, such as the central axis X of the engagement member shown in FIG. 6A (e.g., knocking or pulling the object in a direction away from the mounting apparatus), would serve to disengage the object.

With continued reference to the depicted embodiment of FIG. 6A, the first portion 98' of the engagement member 14 may have a different width (e.g., diameter in the case of a cylindrical configuration as shown) than the second portion 98". In some cases, for example, the first portion 98' may have a narrower width than the second portion 98". In this regard, a width (e.g., diameter) of the opening 94 may correspond to the width of the first portion 98' and may thus be smaller than the width of the second portion 98" of the engagement member 14, such that the second portion 98" may be too large to pass through the opening 94 and may serve to limit the movement of the engagement member 14 in a direction away from the base surface 80 via contact of the stop feature 50 with the inner surface 86 of the intermediate surface 12. Thus, the width of the second portion 98" (e.g., the configuration of the stop feature 50) may, with respect to the depth of the first portion 98', define the outer limit position OL of the second mounting magnet 40 (and, accordingly, the extended state of the engagement member 14).

The mounting apparatus may be configured so that the target mounting area is substantially flush. Configuring the mounting apparatus such that the target mounting area (e.g., primary mounting surface) is substantially flush may be beneficial for many reasons. The flush surface may be aesthetically pleasing. A flush surface may allow for certain movements of the object prior to engagement (e.g., sliding, etc.) that may assist with self-alignment, may assist with engagement, or may generally make the mounting process easier or more enjoyable for a user. Additionally, a flush face may keep a component(s) of the mounting apparatus out of the way when not in use so as to avoid snags, impacts, or other unintentional engagement with the component(s). Furthermore, a flush configuration may serve to prevent debris from entering the mounting apparatus such that the components of the apparatus remain able to function properly. Particularly, the at least one of the engagement member or intermediate surface that is movable may be benefitted by a flush face because it (or they) may be exposed to dirt and debris less often, relative to a configuration in which it (they) may remain exposed when, for example, in a disengaged (e.g., idle) state. Accordingly, a flush surface may be achieved in a variety of ways depending on the configuration of the mounting apparatus and generally involves arranging the components of the mounting apparatus so that the multiple planes and/or surfaces of the apparatus coincide in the same plane.

In embodiments in which the first mounting magnet 30 is moveable and the second mounting magnet 40 is in a fixed position, for example, the first mounting magnet may be configured such that the respective base limit position BL substantially coincides with the second plane. Similarly, the first mounting magnet 30 may be configured such that its respective outer limit position OL of the first mounting magnet 30 substantially coincides with the second plane. Furthermore, in some embodiments in which the first mounting magnet and the second mounting magnet are moveable, the respective base limit positions BL of the first mounting magnet 30 and the second mounting magnet 40 may be configured such that the respective base limit positions are in substantially the same plane. Moreover, the outer limit position OL of the first mounting magnet 30 and the base limit position BL of the second mounting magnet 40 may be configured such that the outer limit position OL of the first mounting magnet and the base limit position BL of the second mounting magnet are in substantially the same plane.

As described above, a variety of different configurations are possible for providing the mounting apparatus. In some cases, such as in the embodiment depicted in FIG. 1, the object 99 that may engage the mounting apparatus may be a simple structure, such as a single surface that inherently responds to magnetism. In other cases, the object (such as object 99a depicted in FIG. 5) may have a depth $d_o$ that may correspond to a distance between two surfaces or may correspond to a depth defined by a curved surface of the object. As shown, embodiments of the mounting apparatus may be able to accommodate and engage an object (similar to either object 99 or object 99a) without having been specifically configured with respect to the object. And, in some cases, embodiments of the mounting apparatus may also be able to manipulate an object and/or provide further functionality without having been specifically configured with respect to the object. Additionally, embodiments that may be even more useful may be accomplished by configuring the mounting apparatus for a specific object, or for a particular object shape.

Moreover, a substantially greater degree of functionality may be achieved by concurrently configuring a mounting apparatus and an object interface relative to one another such that they may cooperate in an even more predictable and prescribed manner. The system may be configured to cooperate prior to engagement, during the engagement process, and/or while engaged. For example, turning to FIGS. 7A and 7B, a system 200 is provided that includes a mounting apparatus 210, such as embodiments of the mounting apparatus 10 described above. The system 200 may further include an object interface 220 configured to be attached to an object (not shown) to be mounted to the mounting apparatus 210.

The mounting apparatus 210 may include an intermediate surface 212 configured to respond to magnetism and an engagement member 214 configured to respond to magnetism (e.g., as described above). The intermediate surface 212 may be configured to respond to magnetism by supporting the first mounting magnet 230 (comprised of six magnets 230) in the first plane P1, and the engagement member may be configured to respond to magnetism by supporting the second mounting magnet 240 (comprised of one magnet 240) in the second plane P2. Thus, the intermediate surface 212 may define the first plane P1, and the engagement member 214 may define the second plane P2. The engagement member 214 may be configured to move along a line of engagement $L_e$ that intersects the first plane P1, as described above.

With respect to the object interface 220, a third mounting magnet may be supported in a third plane and may be configured to be attached to an object to be mounted to adapt the object to agree with at least one of the first or second mounting magnets. Additionally, the third mounting magnet may comprise a plurality of magnets. Moreover, the third mounting magnet may comprise a plurality of third mounting magnets in a plurality of third planes. Thus, the object interface 220 may include a central object surface 226 configured to respond to magnetism by supporting a third mounting magnet 241, comprised of one magnet 241, in a third plane P3 (one of a plurality of third planes in this embodiment) and may include a secondary object surface 224 spaced from the central object surface and configured to respond to magnetism by supporting a third mounting magnet 231, comprised of eight magnets 231, in a fourth plane P4 (another of the plurality of third planes, as noted above). The central object surface 226 may be configured to agree with at least one of the engagement member 214 or the intermediate surface 212. In the embodiment depicted in FIG. 7A, the central object surface 226 may define a third plane P3, and the secondary object surface 224 may define a fourth plane P4 (the fourth plane being one of a plurality of third planes, as noted above). A distance between the third and fourth planes P3, P4 may define an object interface depth $d_o$. At least one of the engagement member 214 or the intermediate surface 212 of the mounting apparatus 210 may be configured to move between a respective outer limit position OL and a respective base limit position BL. As such, when the at least one of the engagement member 214 or the intermediate surface 212 that is movable (the engagement member 214 in this embodiment) is in the respective outer limit position OL, a distance between the first and second planes P1, P2 may define an apparatus engagement depth $d_a$. The object interface 220 may thus be configured such that the object interface depth $d_o$ and the apparatus engagement depth $d_a$ are different. Correspondingly or additionally, the mounting apparatus 210 may be configured to engage the object interface 220 via respective engagement forces associated with the engagement member 214 and the intermediate surface 212 such that the overall engagement force increases by degrees until a total engagement force is produced for mounting the object to the mounting surface. Moreover, the object interface depth $d_o$ may be configured such that a disengaging force that is less than the total engagement force and that is applied to a mounted object attached to the object interface 220 is capable of disengaging the object interface 220 from the mounting apparatus 210 in stages by successively overcoming the respective engagement forces associated with the engagement member 214 and the intermediate surface 212.

As previously noted, the mounting apparatus 210, shown in FIG. 7A as part of the system 200, may be engaged in multiple ways. In FIG. 7A, an object interface 220 is provided for mounting an object to the mounting apparatus 210 and may be configured to agree with the opening 294 of the intermediate surface 212 and, correspondingly or additionally, the face 288 of the engagement member 214. As described previously, the mounting apparatus 210 may be configured such that it may act as substantially male, as substantially female, or as both male and female via movement of the engagement member 214 between two limit positions. In this embodiment, because the object interface 220 may be configured to define its depth $d_o$ in a substantially male configuration (e.g., the central object surface 226 may be configured to be received by the mounting apparatus 210), the apparatus 210 may be configured accordingly by configuring the outer limit position OL and the base limit position BL of the engagement member 214 so that the apparatus engagement depth $d_a$ may be less than the object interface depth $d_o$. As noted previously, the apparatus engagement depth $d_a$ may be defined by the distance between the first and second planes P1, P2 when the engagement member 214 (and, correspondingly, the second mounting magnet 240) is in the outer limit position OL, and the object interface depth $d_o$ may be defined by the distance between the plurality of third planes, which, in this case, may be the distance between the third and fourth planes P3, P4. By configuring the apparatus engagement depth $d_a$ to be less than the object interface depth $d_o$ when the apparatus 210 may be configured to receive a portion of the object interface 220 (e.g., when the object interface 220 is substantially male), engagement between the central object surface 226 and the engagement member 214 may be ensured. Furthermore, to ensure engagement between the intermediate surface 212 and the secondary object surface 224 (and, therefore, ensure a total engagement force), the base limit position BL of the engagement member 214 may be configured so that the distance between the first and second planes P1, P2 when the engagement member 214 is in the base limit position is greater than the object interface depth $d_o$. Thus, configuring the system 200, as depicted in FIG. 7A, as described above may facilitate engagement of the object interface 220 with the mounting apparatus 210 such that a total engagement force is produced for mounting the object to the mounting surface.

Thus configured, engagement of the object interface 220 with the mounting apparatus 210 within the system 200 may occur in two ways, both via multiple stages of engagement. Placing the object interface 220 in proximity to the target mounting area (as described above) of the mounting apparatus 210 may produce a first attraction force between the object interface 220 and the mounting apparatus 210. The first attraction force may draw the engagement member 214 toward the central object surface 226 such that the second mounting magnet 240 in the second plane P2 and the third mounting magnet 241 in the third plane P3 are engaged for a first stage of engagement between the object interface 220 and the mounting apparatus 210. As a result of the first stage of engagement, proximity of the third mounting magnet 231 (the second of the plurality of third mounting magnets, as noted above) in the fourth plane P4 and the first mounting magnet 230 in the first plane P1 may create a second attraction force between the secondary object surface 224 and the intermediate surface 212 such that the third mounting magnet 231 and the first mounting magnet 230 are engaged to produce a second stage of engagement and a total engagement force for mounting the object interface 220 to the mounting apparatus 210 and, correspondingly, for mounting the object to the mounting surface. Alternatively, placement of the object interface 220 in proximity to the target mounting area of the mounting apparatus 210 may produce a first attraction force between the third mounting magnet 231 in the fourth plane P4 and the first mounting magnet 230 in the first plane P1. The first attraction force may draw the secondary object surface 224 toward the intermediate surface 212 such that the third mounting magnet 231 and the first mounting magnet 230 are engaged for a first stage of engagement. As a result of the first stage of engagement, proximity of the third mounting magnet 241 in the third plane P3 and the second mounting magnet 240 in the second plane P2 may draw the engagement member 214 toward the central object surface 226 such that the second mounting magnet 240 and the third mounting magnet 241 are engaged for a second stage of engagement and a total engagement force for mounting the object interface 220 to the mounting apparatus 210 and, correspondingly, for mounting the object to the mounting surface.

Also, it is important to note that, referring again to the system 200 depicted in FIG. 7A, the surface face 222 of the central object surface 226 may engage the face 288 of the engagement member 214 for a first stage of engagement when the engagement member 214 is extended from the intermediate surface 212 of the mounting apparatus 210 (e.g., a male-to-male engagement) in which case the engagement member 214 may retract beyond the intermediate surface 212 in a direction toward the base surface 280 such that the second stage of engagement between the intermediate surface 212 and the secondary object surface 224 may occur. Additionally, the engagement member 214 may be configured to be substantially flush with the intermediate surface 212 when in a disengaged (e.g., idle) state (this may occur as a result of a controlling force being applied by the controlling component 260 that may bias the engagement member 214 away from the controlling component 260 and toward the outer limit position OL, with the outer limit position OL of the engagement member 214 being configured such that the first plane P1 and the second plane P2 substantially coincide). In such a configuration, the object interface 220 depicted in FIG. 7A may engage the engagement member 214 via the surface face 222 of the central object surface for a first stage of engagement, and proximity of the secondary object surface 224 to the intermediate surface 212 may cause an attraction force between the secondary object surface 224 and the intermediate surface 212 that is greater than the controlling force applied to the engagement member 214 by the controlling component 260 such that the engagement member 214 may effectively be pushed into a retracted position beyond the intermediate surface 212 and into the chamber 290 of the mounting apparatus 210 that may allow the second stage of engagement to occur for a total engagement force that mounts the object interface 220 to the mounting apparatus 210 and, correspondingly, mounts the object to the mounting surface.

Turning now to another embodiment of the system 200, the embodiment depicted in FIG. 7B shows the mounting apparatus 210 of the system 200 in the extended state with respect to an object interface 220 that may be configured such that it may act as substantially female within the system 200. The mounting apparatus 210 may be configured relative to a substantially female object interface 220 such as the one depicted in FIG. 7B in the following manner. The outer limit position OL of the engagement member 214 may be configured such that the apparatus engagement depth $d_a$ is greater than the object interface depth $d_o$ to ensure engagement between the second mounting magnet 240 of the engagement member 214 and the third mounting magnet 241 of the central object surface during the mounting process. Furthermore, the base limit position of the engagement member 214 may be configured relative to the object interface depth $d_o$ and the strengths of the second mounting magnet 240 and the third mounting magnet 241 depending on the preferred configuration for the mounting apparatus 210. If the preferred configuration does not require a depth between the intermediate surface 212 and the engagement member 214 when the engagement member is retracted (e.g., the mounting apparatus 210 is not desired to have the flexibility of acting as male or female), the base limit position BL may be configured such that the distance between the first plane P1 and the second plane P2 when the engagement member is in the base limit position is less than the object interface depth $d_o$. If a male-female configuration is preferred for the mounting apparatus 210 (e.g., the interior of the mounting apparatus 210 defines a depth when the engagement member is in the base limit position BL, and the engagement member 214 protrudes from the intermediate surface 212 when in the outer limit position OL), the base limit position BL of the engagement member 214 may be configured with respect to the strengths of the first mounting magnet 240 and the third mounting magnet 241 and with further respect to the proximity required between the respective mounting magnets to produce an attraction force capable of moving the second mounting magnet 240 toward the third mounting magnet 241 during the mounting process.

The staged engagement of the object interface 220 shown in FIG. 7B may occur in substantially the same orders between the respective planes of the system 200 as those depicted in FIG. 7A and as described with respect to FIG. 7A (e.g., P2, P3 then P1, P4; or P1, P4 then P2, P3). However, rather than the surface face 222 of the central object surface 226 being drawn into the mounting apparatus 210 by way of the opening 294 of the intermediate surface 212, the engagement member 214 (referring now to FIG. 7B) may be drawn into a cavity 275 of the central object surface 226 for the P1, P3 stage of engagement to occur.

The staged disengagement process may occur in a variety of ways as well, depending on the configuration of the mounting apparatus 210. In FIG. 7A, a disengaging force applied to the mounted object that is less than the total engagement force may disengage the secondary object surface 224 from the intermediate surface 212 for a first stage of disengagement. Prior to, and during, the first stage of disengagement, the engagement member 214 may move away from the base surface 280 and may be still engaged with the central object surface 226 of the object interface. Therefore, having completed the first stage of disengagement, a continued disengaging force may continue to move the engagement member 214 until the engagement member 214 reaches its outer limit position OL. At the outer limit position, the central object surface 226 and the engagement member 214 may disengage for a second stage of disengagement. Thus, a user that may apply a disengaging force to an object mounted to the mounting apparatus 210 may need only to apply a disengaging force of sufficient strength to overcome the first stage of disengagement. Each subsequent stage of engagement may require more or less force to overcome than did the first stage of disengagement, but each successive stage of release may be less than the total engagement force, such that the object is able to be disengaged more gradually, with the total engagement force split amongst multiple tiers of release, for an experience that may be easier and more enjoyable for the user.

Disengagement of the system 210 shown in FIG. 7B may follow substantially the same order. In both of the systems described in the FIGS. 7A-7B, the point at which the stages of release occur depends on the location of the outer limit position OL of the engagement member 214. The first stage of disengagement may occur within the mounting apparatus 210 between the central object surface 226 and the engagement member 214 if, in FIG. 7A, the outer limit position of the engagement member 214 (and, correspondingly, the second mounting magnet 240) is configured to be between the base surface 280 and the intermediate surface 212.

As depicted in FIGS. 7A-7C and as described above, the relative depths of the object interface 220 and the mounting apparatus 210 may produce substantial surface area contact between the components of the system such that the system may be well suited to bearing the weights of mounted objects. Indeed, a substantial benefit of the mounting apparatus 210 and the mounting system 200 is the weight-bearing capability of the apparatus/system achieved in conjunction with the flexibility and ease of use of magnetic attachment and release. The configuration of the mounting apparatus 210 and the system 200 may be tailored to emphasize the weight-bearing aspects of the embodiments per the application such that a majority of the weight-bearing responsibility of the apparatus/system may be transferred from the magnetic engagements between planes to the structure of the apparatus/system, allowing users the benefits of magnetic attachment and release with lesser risk (e.g. risk of a fall, an unintended movement, or other unintended consequences related to unintentional disengagement). Accordingly, smaller and/or less expensive magnets may be required for the apparatus/system to function suitably as compared with other magnetic mounts that may support the same weight(s), such that the apparatus/system may be less expensive to manufacture and may be more affordable for users while providing the same functionality and benefits.

As mentioned above, configuring the mounting apparatus with respect to an object or with respect to an object interface, as shown in the system 200 of FIG. 7A, may provide a greater degree of functionality and may, in turn, additionally benefit a user of the mounting apparatus. Also as noted above, the number, strength, and arrangement of the mounting magnets may be selected to enhance the functionality of the mounting apparatus in certain ways. For example, in some embodiments, at least one of the engagement member or the intermediate surface may be configured to bias the object to be mounted to a predefined mounting orientation prior to engagement of the object with the apparatus. Correspondingly, in some embodiments, the first mounting magnet may be configured to have a first magnetic force, and the second mounting magnet may be configured to have a second magnetic force that is substantially opposite the first magnetic force. In a system, the third mounting magnets may also be configured such that they agree with the arrangement of first and second mounting magnets prior to engagement. In this way, unintentional and incorrect engagement between mounting magnets may be avoided.

As shown in FIG. 7A, the magnets 231 of the secondary object surface 224 may be substantially aligned with corresponding magnets 230 supported by the intermediate surface 212, and magnet 240 of the engagement member 214 may be substantially aligned with magnet 241 of the central object surface 226. Furthermore, each set of corresponding mounting magnets may be configured so that the magnetic poles facing one another during the mounting process may be substantially opposite. In the configuration shown in FIG. 7A, the mounting apparatus 210 may be substantially female for the purposes of engagement (e.g., the engagement member 214 is capable of retracting within the mounting apparatus 210), as described above, and as will be described in more detail below. Accordingly, the positions of the mounting magnets, as shown, may facilitate engagement of the object interface 226 with the mounting apparatus 210 provided that the perimeter of the surface face 222 of the central object surface 226 (and, accordingly, the extension surface 223) aligns with the opening 294 of the intermediate surface 212. The components of system 200 may further be configured so that the magnetic interaction between the object interface 220 and the mounting apparatus 210 prior to engagement helps facilitate proper engagement. This may be accomplished by configuring the third mounting magnets 231, 241 of the object interface 220 relative to the first and second mounting magnets 230, 240 of the mounting apparatus 210 so that the object interface 220 may substantially self-align with the mounting apparatus 210 prior to engagement with the mounting apparatus 210 to produce a predefined mounting orientation for aligning the object interface 220, and, specifically the central object surface 226 in this embodiment, with the apparatus 210. For example, magnets 231 of the secondary object surface 224 may be permanent magnets, and the magnets 231 may be oriented so that the north pole (N) of each magnet may be facing the mounting apparatus 210 during the mounting process. Correspondingly, magnets 230 of the intermediate surface 212, which may also be permanent magnets, may be oriented so that the south pole (S) of each magnet may be facing the object interface 220 during the mounting process. Additionally, magnet 241 of the central object surface 226 may be oriented so that the south pole (S) of the magnet may be facing the mounting apparatus during the mounting process, and magnet 240 of the intermediate surface 214 may be oriented so that its north pole (N) faces the object interface 220 during the mounting process. Thus, the magnetic forces being configured as such, the central object surface 226 (e.g., magnet 241), upon being brought into proximity with the mounting apparatus 210, may repel the intermediate surface 212 (e.g., magnets 230 being of the same polarity as magnet 241) so as to avoid improper engagement with the mounting apparatus 210; and, further, the repelling force between magnets 230 and magnet 241 may serve to guide the central object surface 226 toward alignment with the opening 294 of the intermediate surface 212 because the opening 294 may be the path of least resistance.

An attraction force between the corresponding mounting magnets in a system may also serve to self-align the object interface 220 with the mounting apparatus 210. FIG. 7B shows a system in which the mounting apparatus 210 may act as male, such that a cavity 275 of the object interface 220 may receive the engagement member 214 during engagement of the object interface 220 with the mounting apparatus 210. Thus, the cavity 275 may need to be aligned with the engagement member 214 and/or the opening 294 of the intermediate surface 212 (e.g., if the engagement member 214 is retracted and/or recessed when the mounting apparatus 210 is idle), and alignment may be easier for a user if the system 200 is configured to self-align during mounting. With continued reference to FIG. 7B, placing the object interface 220 into proximity of the target mounting area (e.g., which may be the facade 285 of the intermediate surface 212, in this embodiment) of the mounting apparatus 210 may cause an attraction force between the magnets 231 of the secondary object surface 224 and the magnets 230 of the intermediate surface 212 such that six of the magnets 231 and six of the magnets 230 (i.e., all of them, in this embodiment) are attracted to one another and orient the object interface 220 (and, thus, the object) in a predefined way, as well as positioning the cavity 275 relative to the opening 294 such that the engagement member 214 may be received by the object interface 220. It should be noted, as well, that the configuration of magnets 231 in FIGS. 7A-7B may serve to facilitate an easier mounting process for the user, particularly with respect to the circular cross-section that may be chosen for other components of these embodiments, in that the "extra" magnets (e.g., two of the eight magnets 231 that may remain unused in the mounted configuration) may provide that all six magnets 230 of the intermediate surface are engaged by the object interface 220 during the mounting process regardless of the orientation of the object (and, correspondingly, the object interface 220) as positioned by the user. This may provide a better experience for the user, because the user may not need to align the object in a particular fashion in order to achieve an intended result (e.g., mounting the object). For example, a user may wish to mount her phone in the car for use as a GPS device using a system similar to the system 200 in FIG. 7B, and she may wish to mount the phone without having to look at the mounting apparatus so that she may concentrate on her driving. Therefore, she may mount the phone without looking, so that the way she positions the phone during mounting may happen to be askew relative to her preferred orientation for the device. The presence of eight magnets 231 in a circular configuration on the secondary object surface 224, rather than six magnets 231 in a configuration matching that of the intermediate surface 212, may ensure that the device is mounted and secured to the mounting apparatus properly (e.g., safely and via a total engagement force) even if it may not be of the targeted orientation of the user, and this may be preferable to the user versus not being able to mount the device at all due to the mistake in orientation, having to risk looking at the mounting apparatus while driving in order to properly align the device, and/or having the device mounted incorrectly so that the device may be prone to an accidental fall. Furthermore, as described above, the configuration of components of the system 200 shown in FIG. 7B may provide a guiding and self-aligning influence for proper mounting of the device with respect to the engagement member 214 and/or other components of the system 200 in addition to accommodating the mistake in orientation of the device. Moreover, the configuration of the system 200 as shown in FIG. 7B, in the above example, may allow the user to easily correct her mistake. The flush contact of the surfaces of the system 200 shown in FIGS. 7A-7B (e.g., the substantially flat secondary object surface 224 and the substantially flat intermediate surface 212, which may be in contact in a mounted and engaged configuration), along with the flexibility of rotational movement via the cylindrical shape of the engagement member 214 in FIGS. 7A-7B (and the accommodating size/shape of the opening 294 of the intermediate surface 212), the configuration of magnets 230 and 231 discussed above, and other features, may allow the user to easily adjust the orientation of the mounted device. The user may accomplish this by applying a rotational force to the phone (e.g., the object) that may be strong enough to overcome the engagement forces between the magnets 231 and the magnets 230 (which may be a lesser force than that required to disengage the magnets 231, 230 in the direction of the line of engagement $L_e$) while the engagement force between magnet 240 and magnet 241 remains substantially unchanged as the engagement member 214 is rotated about the central axis X. Thus, the system 200 may remain partially disengaged momentarily (e.g. magnets 231 and magnets 230 being temporarily out of alignment) until the continued rotational movement causes an attraction between the magnets 230 of the intermediate surface 212 and a second configuration of the magnets 231 (which may be adjacent to those magnets 231 which were previously engaged, such that the second configuration may include one magnet 231 that may have been previously unengaged) that is stronger than the attraction between the magnets 230 and the first configuration of the magnets 231 (e.g., the magnets 231 having been disengaged). This attraction (between magnets 230 and the second configuration of the magnets 231) may re-align the object according to the second configuration of the magnets 231 relative to the magnets 230, producing a new total engagement force. Thus, the user may only need to rotate the object just further than halfway between the adjacent magnets 231 to accomplish the change in orientation rather than being required to disengage the object (by providing a disengaging force along the line of engagement $L_e$) and re-engage the object with the apparatus (again, along the line of engagement $L_e$) in order to accomplish the same change in orientation.

Embodiments which may allow a user to manipulate an object (e.g., slideably, as described above, or otherwise) and/or cause the object or object interface to interact with the magnetic forces present within the apparatus or system while the object is engaged or partially engaged with the mounting apparatus (and, particularly, when those interactions change the state of engagement and/or the state of the object or object interface)—whether within a system, as in the example above, or without (as described previously)—may allow the mounting apparatus to have functionality in addition to, or that may complement, the mounting functionality of the apparatus or system; and this additional functionality may be very valuable to the user. For example, in the system depicted in FIG. 7C, an intermediate surface 212 may be provided that includes a first mounting magnet 230 comprised of six magnets 230b, 230c, 230d, 230f (not shown), 230g (not shown), 230h and a second object surface 224 that may include a third mounting magnet 231 comprised of eight magnets 231a, 231b, 231c, 231d, 231e, 231f (not shown), 231g (not shown), 231h, wherein six magnets 231b, 231c, 231d, 231f, 231g, 231h of the eight magnets of the second object surface 224 may correspond to the six magnets 230b, 230c, 230d, 230f, 230g, 230h of the intermediate surface 12 when a mounted object is in a preferred mounted orientation (e.g., in this embodiment, the rotational orientation of the object relative to the central axis X of the mounting apparatus 210 that a user may wish the object to be in when fully mounted, such as when a user may wish a television to be in a position such that the bottom edge of the television's screen is substantially level instead of being rotationally askew—e.g., crooked—relative to the central axis X). In the embodiment depicted in FIG. 7C, the preferred mounted orientation may correspond to the pre-engagement (e.g., disengaged) orientation shown and described above. Furthermore, the system 200 shown may be configured such that magnets 231c and 230c and magnets 231g (not shown) and 230g (not shown) are correlated magnets and such that magnets 231a, 231b, 231d, 231e, 231f (not shown), 231h and magnets 230b, 230d, 230f (not shown), 230h are permanent magnets. The correlated magnets 231c, 230c, 231g, 230g may be configured to engage the permanent magnets 230b, 231d, 230h, 231f in substantially the same way as would permanent magnets (e.g., in substantially the same way as the magnets 231c, 230c, 231g, 230g may engage the magnets 230b, 231d, 230h, 231f if the magnets 231c, 230c, 231g, 230g were permanent magnets of respective polarities opposite the respective polarities of the magnets 230b, 231d, 230h, 231f) during the mounting process (e.g., along respective engagement axes that correspond to the central axis X and, accordingly, the line of engagement $L_e$) and, also, when engaged rotationally in a mounted configuration (as described above). Furthermore, the correlated magnets 231c, 230c may be configured with respect to one another such that they may engage one another rotationally when the object interface 220 is engaged with the mounting apparatus via a clockwise movement about the central axis X with respect to the facade 285 of the intermediate surface 212 such that magnet 231c is moved from a position of engagement with magnet 230b (e.g., disengaged from magnet 230b via the clockwise movement) to a position of engagement with 230c (e.g., engaged with magnet 230c via the clockwise movement). Likewise, the correlated magnets 231g, 230g may be configured with respect to one another such that they may engage one another rotationally when the object interface 220 is engaged with the mounting apparatus via the same clockwise movement described above such that magnet 231g is moved from a position of engagement with magnet 230f (e.g., disengaged from magnet 230f via the clockwise movement) to a position of engagement with 230g (e.g., engaged with magnet 230g via the clockwise movement). Thus, the engagements between the respective correlated magnet pairs may occur substantially simultaneously in response to the same clockwise rotational movement described above. Furthermore, the respective configurations of the correlated magnet pairs 231c, 230c and 231g, 230g may provide that, in the engaged state, the correlated magnet pairs 231c, 230c and 231g, 230g may be disengaged, respectively, via a substantially opposite rotational movement (e.g., counterclockwise) only, such that the respective correlated magnet pairs may not be able to be reasonably disengaged (e.g., disengaged by means other than by an extreme or unusual force) in a direction along the line of engagement $L_e$ in response to a disengaging force applied in a direction along the line of engagement $L_e$. Thus, the object interface 220 may be able to be fully disengaged from the mounting apparatus 210 only after the substantially opposite rotational movement has occurred.

Therefore, being configured as described above, a user may mount an object to a mounting surface using system 200 shown in FIG. 7C by rotating the object slightly counterclockwise when facing the mounting apparatus 210 such that magnets 231a and 231c, for example, of the object interface 220 are substantially aligned with magnets 230h and 230b of the mounting apparatus. The object may thus be placed into proximity of the mounting apparatus 210 and engaged with the mounting apparatus 210, as described above. After engagement, the user may rotate the object clockwise, sliding the second object surface 224 against the intermediate surface 212, until the correlated magnet pairs 231c, 230c and 231g, 230g are engaged. The user may know the correlated magnet pairs are engaged because the object may not be able to be further rotated in the clockwise direction as a result of the respective engagements and/or also because the object may be in the preferred mounted orientation. To disengage the object, the user may rotate the object counterclockwise until the correlated magnet pairs are disengaged and, correspondingly, the magnets adjacent the correlated magnets are engaged. The user may thus disengage the object by applying a disengaging force that is less than the total engagement force between the object interface 220 and the mounting apparatus 210, as previously described. The configuration of the system 200 described with respect to FIG. 7C is one of many possible configurations using correlated magnets, and configurations wherein the correlated magnet pairs are in closer proximity when fully engaged (e.g., supported on the facade 285 of the intermediate surface 212 rather than on the inner surface 286, and configured in a like manner on the second object surface 224, for example) may be even more advantageous in producing the desired result.

Furthermore, correlated magnets may be coded (e.g., programmed) such that they may only respond to other coded magnets. For example, in the embodiment described above, the correlated magnets may be configured to interact with permanent magnets in a substantially similar fashion as would a permanent magnet in the place of the correlated magnet (as described). Alternatively, embodiments may be configured such that the correlated magnets may effectively "ignore" some components of the embodiment, such as the permanent magnets described above, and may respond only to other coded magnets that may be configured specifically to interact with them magnetically. Thus, coded magnets may provide a substantial degree of customization with respect to the desired functionality of the system.

Configuring the mounting system 200 as described above may be very beneficial to a user in that the security and stability of the object may be greatly enhanced. For instance, in some embodiments, a user may be able to mount a television or other visual display to a wall in a boat, valuing the additional security that may be afforded the device against the unpredictable and sudden forces (e.g., yaw, etc.) that may act on the device when the boat is at sea. Additionally, a theatre company may value the system for being able to quickly and easily mount temporary lighting systems from the ceiling between performances and may use the mounting system knowing that the force of gravity may act in a direction substantially aligned with the line of engagement $L_e$ of the mounting apparatus 210 such that the lighting system is secure against the force of gravity when mounted to the ceiling.

Similar advantages may result from a system 200, again with reference to FIG. 7C, that may be configured to use electromagnets in place of, or in addition to, the correlated magnets described above. For example, in a system 200 that is configured to use electromagnets for providing additional security to the mounting system, the magnets 230c, 230d, 230f (not shown), 230g (not shown), 230h may be electromagnets that may be managed by an electric current such that they may be strengthened or weakened in response to a signal. The magnets 231 of the second object surface 224 may be permanent magnets, and the system 200 may contain only seven third mounting magnets 231 such that the system does not contain the magnet 231c shown in FIG. 7C. Additionally, component 230b of the intermediate surface 212 in FIG. 7C may be a circuit that responds to magnetism by producing a signal, such as a Hall Effect sensor. The circuit may respond to the presence or absence of a magnet by producing one or more signals, and the circuit may be configured to effectively control the strength of the electromagnets 230 of the mounting apparatus 210 by sending a signal to an electrical device within the mounting apparatus (not shown) that may receive the signal from the circuit and may adjust the forces of the electromagnets 230 accordingly. Furthermore, the circuit may be configured to be adjustable such that it may be enabled or disabled by a user. When enabled, a user may mount an object to the mounting apparatus 210 in a slightly askew orientation, as described above, so that the magnets 231a and 231d, for example, of the secondary object surface 224 may be aligned with magnets 230h and 230c, respectively, of the intermediate surface 212. When mounted in this way, the circuit may be aligned with the area of magnet 231c shown in FIG. 7C (which, again, is not present in the described configuration) such that no signal is generated during mounting. Thus, the total engagement force resulting from the initial (e.g. skewed) engagement may be of a level L. The user may rotate the object clockwise, as described above, and the clockwise movement may align the magnet 231b with the circuit such that the circuit sends a first signal to the electrical device. The electrical device may be configured to effectively strengthen the magnetic force of the electromagnets 230 in response to the first signal. The increased magnetic strength of the electromagnets 230 may increase the total engagement force of the system 200 to a level H. The level H total engagement force may prevent the object from being disengaged in a direction that may substantially correspond with a direction of the line of engagement $L_e$. Thus, a user wishing to disengage the object may need to first rotate the object in a counterclockwise manner, as described above, and the force required to rotate the object may be less than the total engagement force H. The counterclockwise movement may move the magnet 231b out of proximity of the circuit such that the circuit sends a second signal to the electrical device. The electrical device may be configured to effectively weaken the magnetic force of the electromagnets 230 in response to the second signal. The reduced magnetic strength of the electromagnets 230 may decrease the total engagement force of the system 200 to the level L. Thus, the user may be able to apply a disengaging force to dismount the object via successive stages of disengagement, as previously described.

It is important to note that the corresponding mounting magnets in systems such as system 200 may act in a similar fashion to that of a controlling component, described previously. Systems are also contemplated and may be configured such that all of the mounting magnets and controlling components are electromagnets, correlated magnets, programmable correlated magnets, etc. These components may be configured to interact with one another and with other controlling components to move, reorient, or otherwise reposition the object mounted to the mounting apparatus. For example, referring again to the system 200 in FIG. 7A, magnets 230, 231, 240, 241 may be configured to be electromagnets that may be adjustable via previously-described methods. Thus, the object itself, via the object interface, may be able to influence its own state of movement or position by being configured to send signals to the apparatus, either interactively (e.g. dynamically) by a user or in a pre-programmed fashion, to manipulate the magnetic forces for the benefit of the user. Thus, an apparatus 210 in a system may produce an apparatus controlling force, and an object interface may produce an object controlling force via the configured magnets. Therefore, an object interface may be able to eject itself by applying a controlling force to the apparatus. Additionally, the object interface may apply a controlling force to partially disengage the object so that the object may be adjusted. The depth of adjustment may be a depth from the intermediate surface, and the depth of adjustment may be less than the apparatus engagement depth such that the object is only partially disengaged from the apparatus when it is able to be adjusted. To facilitate such functionality, any of the central object surface or the plurality of secondary object surfaces may be configured with at least one electromagnet, at least one correlated magnet, or at least one programmable magnet. In addition, the engagement member and/or the intermediate surface may be configured with at least one electromagnet, at least one correlated magnet, or at least one programmable magnet.

Although FIGS. 7A-7C depict an object interface having two planes of engagement, the object interface may be configured (depending upon the number of planes of the mounting apparatus, for example) to have 3, 4, 5, or more planes of engagement to accommodate additional tiers of engagement/disengagement provided by the mounting apparatus.

For purposes of explanation, certain external components of the embodiments of the mounting apparatus 10, 210 described above and illustrated in FIGS. 7A-7C are not shown to allow other described components to be shown. As such, the mounting apparatus 10, 210 may be embodied in various ways. For example, one or more of the engagement member, intermediate surface, magnets, etc. may be disposed and/or movable within a housing. The housing itself may be configured in various ways to accommodate attachment of the mounting apparatus to various types and configurations of mounting surfaces.

Although the embodiments described above involve the use of two tiers of magnets (e.g., two planes P1, P2), the same principles may be applied to create a mounting apparatus 10 having 3, 4, 5, or more stages of engagement and/or disengagement. Indeed, the greater the number of planes that are provided for magnetic engagement, the smaller the required incremental engagement and/or disengagement force that is needed as the total engagement force may be distributed among a greater number of planes. In addition, the engagement/disengagement force required for each plane may be distributed substantially equally (e.g., by dividing the total engagement force required to support the intended object by the total number of planes), or may be distributed unevenly, such as, for example, in an embodiment in which the initial disengaging force required is greater than the subsequent incremental disengaging forces required for release of subsequent stages.

In some embodiments of the invention, the second mounting magnet may be movable, and a plurality of second mounting magnets may be supported in a plurality of respective second planes. In addition, the second mounting magnets may be arranged in a nested configuration and/or a telescoping configuration. Accordingly, in some embodiments, the engagement member may comprise a plurality of engagement member components, and at least one of the engagement member components may be configured to respond to magnetism. Referring now to the embodiment depicted in FIG. 8A, the engagement member 14 may comprise a plurality of engagement member components 14', 14", and each of the plurality of second mounting magnets 40', 40" may be supported in a respective second plane by a respective engagement member component.

Dividing the engagement force of a second mounting magnet 40 amongst a plurality of second mounting magnets 40', 40" in a plurality of respective second planes may allow the engagement force of the second mounting magnet to be overcome over a greater distance and via a greater number of respective engagement forces. Therefore, each engagement force associated with each respective second plane may be of a lesser force than that of the second mounting magnet supported in a single second plane, so the respective engagement forces may each require a lesser respective disengaging force such that the total engagement force may be overcome more gradually. Overcoming the total engagement force of the second mounting magnet more gradually over a greater distance may allow the object to be more easily and smoothly disengaged from the mounting apparatus while preserving substantially the same total engagement force for maintaining engagement of the object with the mounting apparatus when engaged.

Figure 8A:
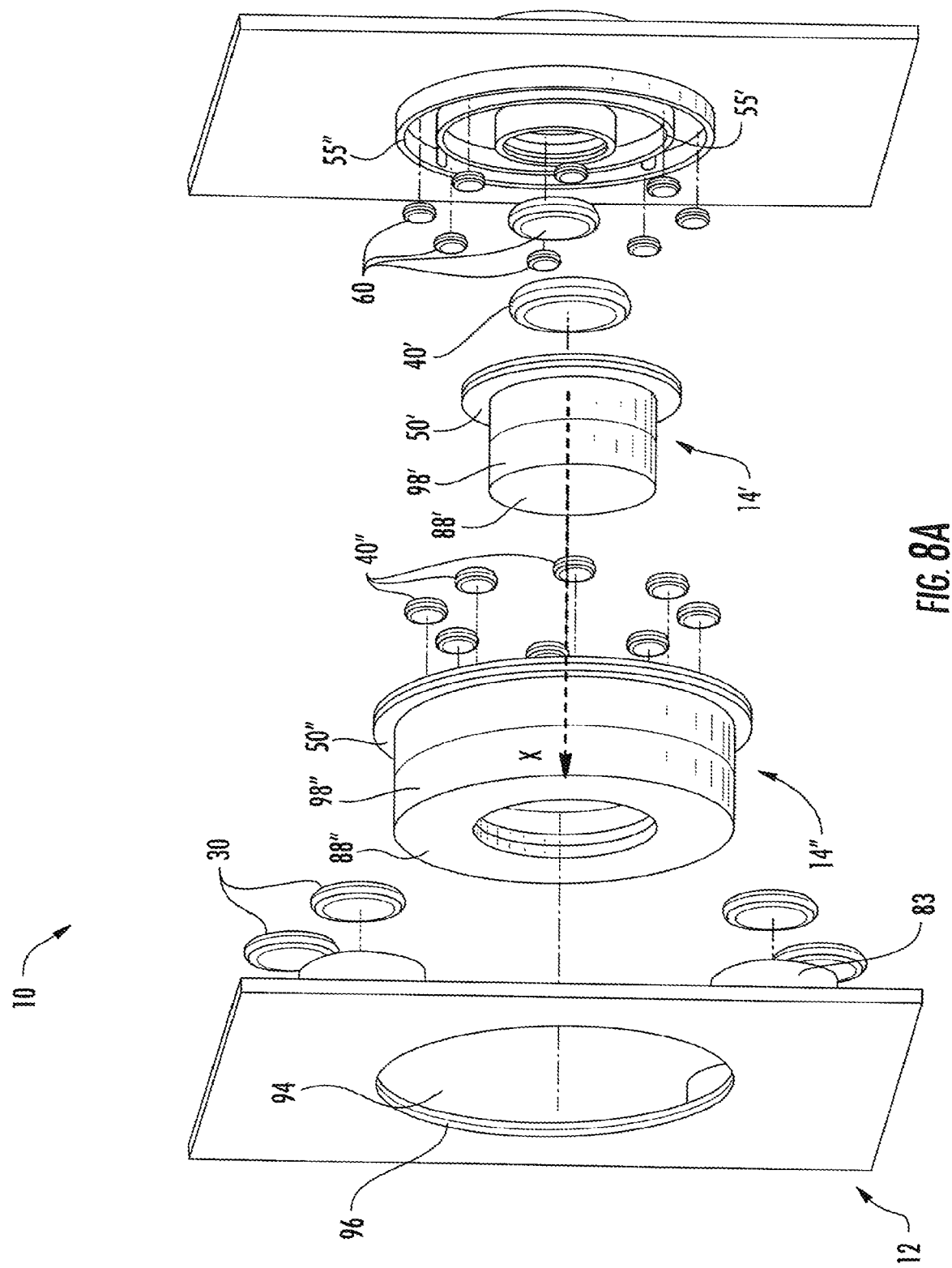
Figure 8B:
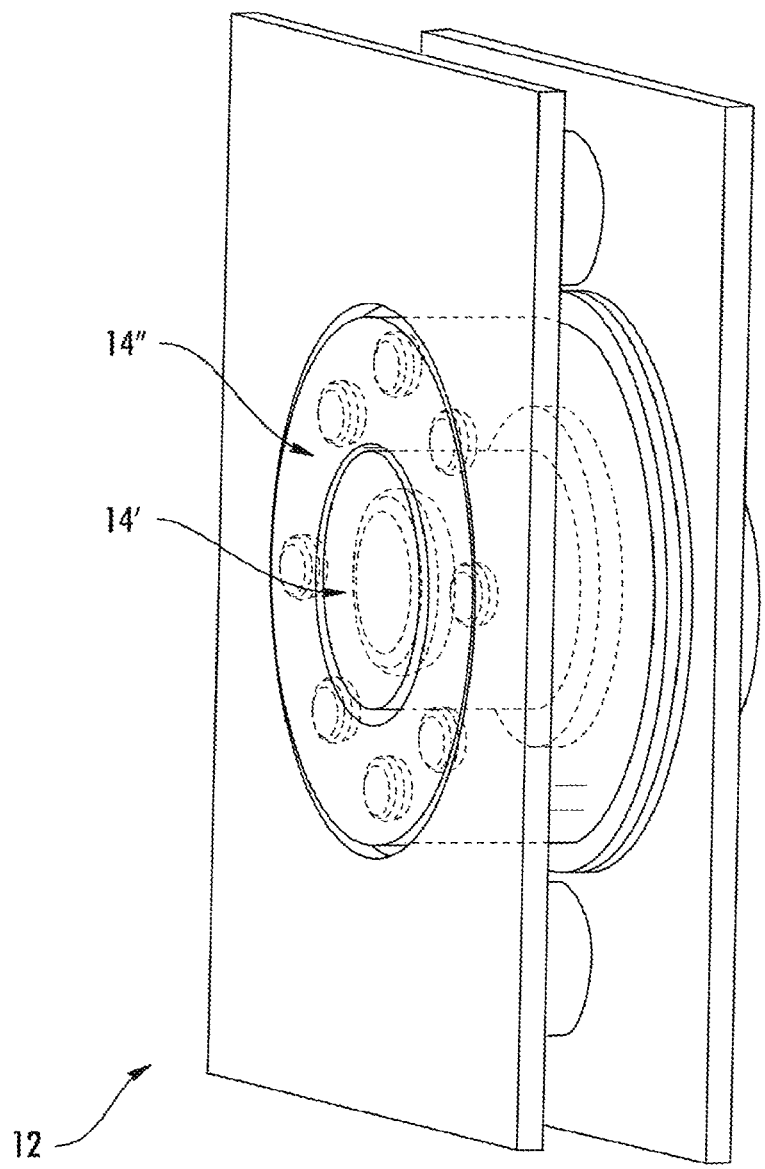

The plurality of engagement member components (14', 14") may be configured relative to one another such that, in the retracted state, the plurality of engagement member components are in a nested configuration that is substantially flush with the intermediate surface 12, as illustrated in FIG. 8B. Thus, the embodiment depicted in FIG. 8A may provide a smoother and more gradual release of an object while retaining the visually appealing aesthetic of the flush surface of the mounting apparatus.

In the extended state, the plurality of engagement member components 14', 14" may form a telescoping engagement member extending toward an object to be mounted along an engagement member axis (e.g., axis X). An additional benefit of arranging the engagement member components 14', 14" in a nested and/or telescoping configuration may be that the engagement member components 14', 14" may adapt to various surfaces that may have substantially differing depths. As such, embodiments such as the apparatus 10 depicted in FIGS. 8A-D may be used as mounting apparatuses and/or may be attached to objects for mounting the objects to other surfaces. Moreover, like apparatuses with nested configurations may attach to one another and may provide a high degree of flexibility and ease of detachment.

Furthermore, a nested configuration of engagement member components may be configured to selectively extend in response to differing attraction forces. For example, the embodiment depicted in FIG. 8A may be configured to accommodate a relatively smaller object with the smaller engagement member 14' and may be configured to accommodate a relatively larger object with engagement member 14". As such, the components may be configured with differing weights with respect to one another and with respect to the apparatus 10 such that the smaller engagement member 14' may extend in response to relatively lesser attraction forces, and the larger engagement member 14" may require a stronger attraction force to be extended from the apparatus 10. Thus, in one example, a user may wish to use one mounting apparatus for mounting two devices, a mobile phone and a tablet computer. The user may accomplish this with the apparatus 10 as shown in FIG. 8A, as the smaller engagement member 14' may be configured to extend in response to a magnetic attraction brought about by proximity of the mobile phone for mounting the mobile phone, but the attraction force between the phone and the mounting apparatus may not be strong enough to move the larger engagement member 14" as configured. However, the larger engagement member 14" may be configured to extend when the larger tablet computer is brought into proximity, as the tablet computer may apply a larger attraction force (either due to the metal content of the device as compared to the mobile phone, or because the device may be fitted with an object interface). Correspondingly, object interfaces may be configured for use with the nested apparatuses so as to produce the selective tier mechanism consistently as an added benefit of the device.

In some cases, the mounting apparatus 10 may be configured such that at least one of the engagement member components is configured to respond to magnetism (e.g., at least one of the engagement member components comprises a respective second mounting magnet 40), as noted above. The plurality of engagement member components may be configured relative to one another, however, such that, in the retracted state, the plurality of engagement member components (three engagement member components 14', 14", 14''' in the embodiment of FIGS. 9A-9C) are in a nested configuration that forms a telescoping receptacle 190 that is configured to receive at least a portion of an object to be mounted, as shown in FIG. 9A. In the extended state, the plurality of engagement member components 14', 14'', 14''' may form a telescoping engagement member 14 extending toward the object to be mounted, as shown in FIG. 9B. An exploded view of the embodiment of FIGS. 9A and 9B is shown in FIG. 9C.

Accordingly, the planes, strengths, sizes, arrangement, distances, depths, allowable movements, etc. associated with the first and second mounting magnets with respect to each other, other components of the mounting apparatus, and the object may be configured in various ways to achieve particular desired functions, capabilities, and/or aesthetics. For example (with reference to FIGS. 2-4), in some embodiments, the respective limit positions of the at least one of the mounting magnets that is moveable may be configured such that the first and second mounting magnets are movable to a position in which the first and second planes substantially coincide.

Moreover, as shown in FIG. 10, although embodiments of the engagement member 14, 214 described above are depicted as having a flat outer face (e.g., face 88 of FIG. 6A), embodiments of mounting apparatus 10 are contemplated in which the outer face 45 is curved or otherwise angled. In this regard, in some embodiments, one or more of the planes of engagement (e.g., one or more of the first or second planes) may be defined by a curved surface. Said differently, one or more of the intermediate surface or the engagement member may be defined by a curved surface, as shown in FIG. 10 with respect to the engagement member 14. In this way, the engagement member 14 may be configured to engage a correspondingly curved component of an object interface. Moreover, curvature of the engagement member 14 (or intermediate surface, in some embodiments) may allow for an additional degree of freedom in the engagement of the object interface with the mounting apparatus, such as to allow the object interface to be attached at an angle (e.g., not necessarily aligned with the central axis of the engagement member).

Referring now to FIG. 11A, a system 300 is provided that may include a mounting apparatus 310 comprising an intermediate surface 312 that may be configured to respond to magnetism and an engagement member 314 that may also be configured to respond to magnetism. The intermediate surface 312 may define a first plane, and the engagement member 314 may define a second plane and may be configured to move along a line of engagement $L_e$ that intersects the first plane. As shown, the second plane may be defined by a curved surface. The system 300 may further include an object interface 320 configured to be attached to an object (not shown) to be mounted and to the mounting apparatus 310, and the object interface may comprise a central object surface 322 that may define a third plane. The central object surface 322 may be configured to respond to magnetism and may be configured to agree with the engagement member 314.

The engagement member 314 may be configured to move between an outer limit position OL and a base limit position BL. Additionally, the engagement member 314 may comprise an extension 398 and a face 388 joined to the extension 398 and may support a second mounting magnet 340 in the second plane. In the embodiment shown in FIG. 11A, the face 388 of the engagement member 314 may be the curved surface of the second mounting magnet 340. The extension 398 may provide a stop feature 350 by means of an outward protrusion of the extension 398 that has a greater diameter than the opening 394 of the intermediate surface. A portion of the extension 398 may be slideably received by the guide surface 396 of the intermediate member 312 such that the stop feature 350 may limit the engagement member 314 in a direction away from the intermediate surface 312 along the line of engagement $L_e$ by contacting an inner surface 386 of the intermediate surface 312 and, thus, may define the outer limit position OL of the engagement member 314. When the engagement member 314 is in the outer limit position, the distance between the first and second planes may define an apparatus engagement depth $d_a$.

The intermediate surface 312 may support the first mounting magnet 330 in the first plane, and the first mounting magnet 330 may limit the engagement member 314 in a direction away from the central object surface 322 by contact with the second mounting magnet 340 of the engagement member 314 and, thus, may define the base limit position of the engagement member 314.

As mentioned above, the central object surface 322 may be configured to agree with the engagement member 314 by way of a surface opening 304 and a contact surface 302 of the surface opening 304 that may be configured (e.g., shaped) to substantially flushly engage the face 388 of the engagement member 314 and, correspondingly, the second mounting magnet 340. The diameter of the surface opening 304 may be less than the diameter of the face 388 of the engagement member 314 (and, correspondingly, may be less than the diameter of the second mounting magnet 340). The diameter of the surface opening 304 and the depth (e.g., thickness) of the central object surface 322 may be configured relative to the object (not shown) and relative to the diameter of the face 388 (and e.g., the diameter of the second mounting magnet 340) such that the contact surface 302 substantially flushly engages the face 388 of the engagement member 314. For example, a substantially flat object, or a substantially flat portion of the object, that may attach to the object interface 320 on the surface of the central object surface 322 that is furthest from the mounting apparatus 310 and may block or otherwise occupy a portion of the opening 304 that may be occupied by the engagement member 314 when engaged with the central object surface 322, may require a greater depth (e.g., thickness) of the central object surface 322 than would an object that does not block or otherwise occupy the portion of the opening 304.

The intermediate surface 312 may be attached to a mounting surface (e.g., a wall) via fasteners by way of countersunk holes 307. The central object surface 322 may attach to an object (not shown) to be mounted via fasteners by way of countersunk openings 355. The intermediate surface 312 may apply an attraction force (via the first mounting magnet 330) to the engagement member 314 such that the engagement member 314 is in the base limit position (e.g., retracted) when the mounting apparatus 310 is disengaged (e.g., idle).

Therefore, an object to be mounted to the mounting surface may be put in proximity of the mounting apparatus 310, and an attraction force between the engagement member 314 and the central object surface 322 may be greater than the attraction force applied to the engagement member 314 by the intermediate surface 312 such that the engagement member is moved toward the outer limit position OL. If the central object surface 322 is not within the apparatus engagement depth $d_a$, the engagement member 314 may reach the outer limit position OL and be held in the outer limit position by the attraction force between the central object surface 322 and the engagement member 314 until the central object surface 322 may be moved within the apparatus engagement depth $d_a$. When the central object surface 322 is within the apparatus engagement depth $d_a$, the engagement member 314 may engage the central object surface 322 (e.g., a first stage of engagement). Proximity of the central object surface 322 to the intermediate surface 312 may result in an attraction force between the central object surface 322 and the intermediate surface 312. The engagement member 314, the central object surface 322, and the object may move toward the intermediate surface 312, and the overall engagement force between the mounting apparatus 310 and the object interface 320 may increase by degrees until such time that the engagement member 314 may move to the base limit position BL. In the base limit position BL, an engagement force between the central object surface 322 and the intermediate surface 312 may be produced (e.g., a second stage of engagement) such that the overall engagement force becomes a total engagement force for mounting the object to the mounting surface.

As shown in FIG. 11A, the central object surface may not physically engage the facade 385 of the intermediate surface 312, and the engagement force produced between the intermediate surface 312 and the central object surface 322 may be a magnetic engagement force. As such, the object may be free to move about the face 388 of the engagement member 314 (e.g., rotationally, pivotally, etc.) such that the object may be manipulated to a preferred orientation (FIG. 11B) when securely mounted via the total engagement force of the mounting apparatus 10.

The mounting apparatus 310 may be configured such that a disengaging force that may be less than the total engagement force and that may be applied to the object attached to the object interface 320 may be capable of disengaging the object interface from the mounting apparatus in stages by successively overcoming the respective engagement forces associated with the engagement member and the intermediate surface.

With respect to the embodiment depicted in FIG. 11A, a disengaging force applied to the object may be of a sufficient strength to disengage the mounted object if the disengaging force is greater than the engagement force between the intermediate surface 312 and the central object surface 322 because the total engagement force may be overcome by degrees over the distance defined by the apparatus engagement depth $d_a$ as the disengaging force first overcomes the engagement force between the intermediate surface 312 and the central object surface 322 which may begin movement of the engagement member 314 and the object toward the outer limit position OL. In the outer limit position, the disengaging force may need to be of a strength greater than the engagement force between the central object surface 322 and the engagement member 314 to disengage the object from the mounting surface.

Turning now to FIG. 12, an embodiment of a mounting apparatus 10 is shown. The mounting apparatus 10 shown in FIG. 12 may comprise a first mounting magnet 30 supported in a first plane and a second mounting magnet 40 supported in a second plane. The first mounting magnet 30 may be comprised of six magnets 30 supported by an intermediate surface 12, and the second mounting magnet 40 may be comprised of one magnet 40 supported by an engagement member 14.

The engagement member 14 may be configured to be movable along a line of engagement $L_e$ that intersects the first and second planes. The engagement member 14 may comprise an extension 98 and a face 88 joined to the extension.

The intermediate surface 12 may be in a fixed position. The intermediate surface 12 may be configured to receive a portion of the extension 98 of the engagement member 14 via a guide surface 96 of an opening 94 defined by a portion of the intermediate surface 12, and two protrusions of the inner surface 86 of the intermediate surface 12 may encroach on the opening 94 and may be received by a groove 58 of the extension 98 of the engagement member 14 which may further guide movement of the engagement member 14 and may prevent rotation of the engagement member 14 as the engagement member 14 is moved between the extended state and the retracted state.

The engagement member 14 may be configured to move between a base limit position BL and an outer limit position OL. Movement of the engagement member 14 may be limited in the direction of the outer limit position OL by a stop feature 50 that may be provided by an outward protrusion of the extension 98 of the engagement member 14, and the stop feature 50 may contact an inner surface 86 of the intermediate surface 12 by way of the groove 58 when the engagement member 14 is in the extended state. When in the retracted state, an inner face 59 of the engagement member 14 may be in contact with a guide stop 87 that may limit movement of the engagement member 14 toward the base limit position BL. When in the retracted state, the facade 85 of the intermediate surface and the face 88 of the engagement member 14 may be substantially flush, as the depth between the facade 85 and the guide stop 87 may be substantially the same as the depth between the face 88 and the inner face 59 of the engagement member 14.

The stop feature 50 of the engagement member 14 may support a plurality of controlling components 60 (six, in this embodiment) which may substantially align with the first mounting magnet 30 (equally six, in this embodiment) supported by the intermediate surface. Thus, the controlling component 60 may be movable, and the movement of the controlling component 60 may substantially correspond with the movement of the second mounting magnet 40. Said differently, the plurality of controlling components 60 may be supported in a third plane that is movable with respect to the engagement member 14 that may be substantially parallel to the second plane.

The controlling component 60 may apply a force to the mounting magnet 30 (six magnets in FIG. 12) that may bias the engagement member 14 toward the retracted state (e.g., a repelling force). Movement of the engagement member 14 toward the retracted state may be stopped by guide stop 87 of the intermediate surface 12 as the inner face 59 of the engagement member 14 contacts the guide stop 87. Thus, the target mounting area (described previously) may be flush when the mounting apparatus 10 is disengaged (e.g., idle), as described above.

The mounting apparatus 10 may be configured to attach to a mounting surface (not shown) via four attachment supports 107. An object to be mounted to the mounting surface may be put in proximity of the mounting apparatus 10 which may produce at least one attraction force between the object and at least one of the mounting magnets 30, 40. The at least one attraction force may be greater than the controlling force applied to the intermediate surface 12 by the controlling component 60 such that the engagement member 14 moves toward the object to engage the object. The object and the second mounting magnet 40 may produce an engagement force (e.g., a first stage of engagement), and the object may be in such proximity to the intermediate surface 12 that the object moves toward the intermediate surface 12. The object may engage the first mounting magnet 30 (and, correspondingly, the intermediate surface 12) for a second stage of engagement that may produce a total engagement force for mounting the object to the mounting surface.

The object may be disengaged from the mounting apparatus 10 by application of a disengaging force that is less than the total engagement force, as the total engagement force may be overcome in stages by successively overcoming the respective engagement forces associated with the first and second mounting magnets to disengage the object.

The controlling component 60 may also be configured to apply a force to the intermediate surface 12 that may bias the engagement member 14 toward the extended state. In fact, the engagement member 14 may be positioned at any point along the line of engagement $L_e$ that may be between the outer limit position OL and the base limit position BL by configuring the controlling component 60 (e.g., size, strength, shape, type, etc.) and the first mounting magnet 30 relative to one another such that a desired position of the engagement member 14 is achieved. For example, the controlling component and first mounting magnet may be configured relative to one another such that the face of the engagement member is substantially flush with the intermediate surface when the apparatus is idle (e.g. in a disengaged state). Also, the controlling component and first mounting magnet may be configured relative to one another such that the engagement member is extended when the mounting apparatus is idle (e.g. the face 88 of the engagement member 14 may be in a position that is further along the line of engagement in the direction of the object to be mounted than is the intermediate surface 12, such that the face 88 may be positioned between the object and the intermediate surface 12 when the mounting apparatus is in a disengaged state). Alternatively, in some embodiments, the controlling component and first mounting magnet may be configured relative to one another such that the engagement member is retracted when the mounting apparatus is idle (e.g. the intermediate surface 12 may be in a position that is further along the line of engagement in the direction of the object to be mounted than is the face 88 of the engagement member 14 when the mounting apparatus is in a disengaged state).

Various magnets may be chosen for the mounting apparatus to facilitate this or other desired functionality of the apparatus and/or its components, and any of the first mounting magnet 30, the second mounting magnet 40, and/or the controlling component 60 may be an electromagnet, a programmable magnet, a correlated magnet, etc. For example, the first mounting magnet may comprise at least one programmable magnet and the controlling component may comprise at least one programmable magnet. Thus, the first mounting magnet and the controlling component may each be programmed such that they cooperate to produce a desired position of the engagement member when the mounting apparatus is in a disengaged state (e.g. when the mounting apparatus is idle).

Additionally or alternatively, magnets may be chosen so that the mounting apparatus provides additional functionality. Referring again to FIG. 12, in some embodiments of the mounting apparatus 10, the second mounting magnet 40 may be a correlated magnet. Additionally, an object interface (not shown) may comprise a corresponding correlated magnet that may substantially align with the second mounting magnet 40 during engagement. The correlated magnets may be configured such that, once engaged (i.e. mounted via a total engagement force, as described previously), rotation of the object interface (e.g. clockwise rotation) causes the pair of correlated magnets to interact to produce a locking engagement force such that the object may not be disengaged from the mounting apparatus 10 in a direction corresponding to the line of engagement $L_e$. The locking engagement force may be an engagement force in addition to the total engagement force achieved during mounting of the object interface to the mounting apparatus. Correspondingly, when the user wishes to disengage the object from the mounting apparatus, the user may rotate the object in a substantially opposite fashion (e.g. counterclockwise) to release the locking engagement force, and the user may then go about applying a disengaging force to the object that may be less than the total engagement force to disengage the object in stages, as previously described.

Embodiments using pairs of correlated magnets in this way may be very beneficial to the user due to the degree of additional security and functionality provided. For example, the locking engagement force may resist the force of gravity on the object when the force of gravity is substantially aligned with the line of engagement $L_e$ in a disengaging direction, whereas the total engagement force (absent the locking engagement force) may not. Thus, the additional rotation performed by the user (e.g. clockwise, in the example above) may prevent unintentional disengagement with the mounting apparatus when the object and apparatus are moved into a position in which gravity would otherwise produce unintentional disengagement. Also, because the locking engagement force may resist movement of the object in a disengaging direction along the line of engagement $L_e$, a user may rotate the object and/or object interface to create the locking engagement force when he wishes to manipulate or adjust the object without disengaging the object from the apparatus, such as when repositioning the object for continued use. Said differently, when the user's intention is to move the mounted object toward himself rather than disengage the object, the user may rotate the object/object interface beforehand to "lock" it to the mounting apparatus and prevent unintentional disengagement while interacting with the object. Thus, the user may freely move the object in the direction of the line of engagement $L_e$ without worry of unintentional disengagement.

The locking functionality described above may be created via many types of magnets and/or various configurations of magnets in different embodiments.

Turning now to FIG. 13, a system 400 is shown for mounting an object interface 420 to a mounting apparatus 410. The system 400 may include a mounting apparatus 410 which may comprise an intermediate surface 412 configured to respond to magnetism and an engagement member 414 configured to respond to magnetism. The intermediate surface 412 may define a first plane, and the engagement member 414 may define a second plane. Additionally, the engagement member 414 may be movable along a line of engagement $L_e$ that intersects the first plane and may support a second mounting magnet 440 in the second plane. The intermediate surface may support a first mounting magnet 430 in the first plane, and the first mounting magnet 430 may be comprised of six magnets 30. The system 400 may also include an object interface 420 that may be configured to be attached to an object to be mounted (not shown) and to the mounting apparatus 410. The object interface 420 may comprise a central object surface 426 that may be configured to respond to magnetism and may define a third plane. And the object interface 420 may also comprise a secondary object surface 424 that may be spaced from the central object surface 426 and may define a fourth plane. The secondary object surface 424 may support a respective third mounting magnet 431 (which may be one of a plurality of third mounting magnets in a plurality of third planes in this embodiment), and the third mounting magnet 431 may be comprised of two magnets 431 supported in a respective third plane. The central object surface 426 may support a respective third mounting magnet 441, which may be comprised of one magnet 441, in a respective third plane.

At least one of the engagement member 414 or the intermediate surface 412 may be movable between an outer limit position OL and a base limit position BL. An apparatus engagement depth $d_a$ may be defined by a distance between the first and second planes when the at least one of the engagement member 414 or the intermediate surface 412 that is movable is in the respective outer limit position.

In the depicted embodiment of FIG. 13, the engagement member 414 may be movable between an outer limit position OL and a base limit position BL and may be slideably received by the intermediate surface 412 along a guide surface 496 by way of an opening 494, and extension 498 may slide along the guide surface 496 of the intermediate surface 412. The intermediate surface 412 may have a fixed position. The engagement member 414 may further comprise an extension 498 and a face 488 joined to the extension, and movement of the engagement member 414 may be limited in the direction of an object to be mounted by a stop feature 450 formed by an outward protrusion of the extension 498. The stop feature 450 may contact the inner surface 486 of the intermediate surface and, thus, may serve to define the outer limit position of the second mounting magnet 440. Additionally, the stop feature 450 may support a plurality of apparatus controlling components 460 (six magnets 460 in this embodiment) in a plane that moves relative to the second plane. Movement of the engagement member 414 toward the retracted state may be limited by the inner face 459 of the engagement member 414 by contact with a facade 485 of the intermediate surface.

The central object surface 426 may have a lead face 429 and may be configured to engage the face 488 of the engagement member 414 during the mounting process. The secondary object surface 424 may comprise a frontage 427 and a hanger 477 attached to the frontage 427. Additionally, the second object surface may have fastener holes 479 for attaching to the object to be mounted (e.g., a picture frame, etc.).

In the embodiment shown in FIG. 13, magnets 431, 441, 430, 440, 460 may be rare earth magnets. Mounting magnets 431, supported by the secondary object surface 424, may have north (N) poles facing the mounting apparatus 410. Mounting magnets 430, supported by the intermediate surface 412, may have south (S) poles facing the object interface 420 and may have north (N) poles facing the controlling components 460 supported by the stop feature 450 of the intermediate member 414. Controlling components 460 may have north (N) poles facing the object interface. Mounting magnet 440 may be supported by the face 488 of the intermediate surface and may have a south (S) pole facing the object interface 420. Mounting magnet 441 may be supported by the central object surface 426 and may have a north (N) pole facing the mounting apparatus 410.

Therefore, the controlling components 460 may be configured to be weakly repelled by the magnets 430 such that the engagement member 414 may be in the retracted position when disengaged (e.g., idle), and its movement in a direction away from the object interface 420 may be stopped by contact with the facade 485 of the intermediate surface by the inner face 459 of the engagement member. Magnets 431 may be configured to be moderately attracted to the magnets 430, and the magnet 441 may be configured to be strongly attracted to the magnet 440.

The object interface 420 may be brought into proximity with the mounting apparatus 410 by a user such that an attraction force between the magnet 441 of the central object surface 426 and the magnet 440 of the engagement member 414 moves the engagement member 414 against the repelling force of the magnets 430 of the intermediate surface and toward the object interface. The magnet 440 may engage the magnet 441 for a first stage of engagement. The depth between the first and second planes when the engagement member 414 is extended and engaged may be substantially equivalent to the depth between the lead face 429 of the central object surface 426 and the facade 485 of the intermediate surface such that the secondary object surface 424 of the object interface 420 may be pressed substantially flush against the facade 485 of the intermediate surface 412 as a result of the first engagement force. The hanger 477 may thus be positioned over the extension 498 of the engagement member 414. The magnets 430 of the intermediate surface may be physically lower than magnets 431 (e.g., not aligned) in the engagement position for the magnets 441, 440. The user may let go of the hanger 477 to allow it to engage the extension 498 of the engagement member. The weight of the object may lower the object and object interface such that the magnets 431 are aligned with the magnets 430, and a second stage of engagement may be produced for a total engagement force between the object interface 420 and the mounting apparatus 410. However, the lowering of the object may disengage the magnets 440, 441 and engagement of the magnets 430, 431 may strengthen the repelling force applied to the controlling components 460 which may repel the engagement member 414 such that the engagement member 414 retracts in response to the repelling force issued by the magnets 430, 431. Thus, the inner face 459 of the engagement member may contact the hanger 477 of the secondary object surface 424, effectively holding the hanger 477 against the facade 485 of the intermediate surface.

The user may apply a disengaging force by lifting the object which may slide the frontage 427 of the secondary object surface against the facade 485 of the intermediate member 412 and disengage the magnets 430, 431. The lifting force may be less than the total engagement force between the magnets 430, 431 if the magnets 430, 431 were to have been pulled in a direction along the line of engagement $L_e$. Disengaging the magnets 430, 431 may cause the repelling force applied to the controlling components 60 to be reduced. Proximity of the magnet 441 upon the lifting of the object may cause the engagement member 414 to extend and release the hanger 477. Thus, the object may be fully disengaged from the mounting surface.

For example, in some embodiments, the second mounting magnet may be moveable, and a plurality of second mounting magnets may be supported in a plurality of respective second planes. In this regard, turning to FIG. 14, in some embodiments, the engagement member 14 may comprise a plurality of engagement members, such as four engagement members 14a, 14b, 14c, 14d in the depicted embodiment. At least one of the engagement members 14a, 14b, 14c, 14d may be configured to respond to magnetism (e.g., one or more may support a respective second mounting magnet), and each engagement member may be configured to move independently along a respective line of engagement with respect to other engagement members. Thus, each engagement member 14a, 14b, 14c, 14d may be configured to move between a respective base limit position BL and a respective outer limit position OL that is substantially independent of the other engagement members.

Moreover, the second mounting magnets may be configured such that the respective base limit position BL of each second mounting magnet is in substantially the same plane. With respect to the embodiment of FIG. 14, for example, a base surface 80 may be provided that includes stop features 55*a*, 55*b*, 55*c*, 55*d* corresponding to a particular engagement member component 14*a*, 14*b*, 14*c*, 14*d*. Each stop feature 55*a*, 55*b*, 55*c*, 55*d* may have a height (e.g., length of extension away from the base surface 80) substantially corresponding to the depth of its corresponding engagement member component 14*a*, 14*b*, 14*c*, 14*d*. For example, the deepest engagement member component 14*d* in the embodiment of FIG. 14 may be configured to correspond to the stop feature 55*d* with the smallest height, whereas the shallowest engagement member component 14*a* may be configured to correspond to the stop feature 55*a* with the greatest height. By configuring the stop feature heights and the corresponding engagement member depths to add up to the same dimension across all of the engagement member components, the respective base limit position BL of each of the second mounting magnets may lie in substantially the same plane (e.g., the assembled outer face of the engagement member may be substantially flush).

Each engagement member component 14*a*, 14*b*, 14*c*, 14*d* may comprise an extension 98*a*, 98*b*, 98*c*, 98*d* and a face 88*a*, 88*b*, 88*c*, 88*d* joined to the extension, and each extension may be configured to limit movement of the object to a direction along a single axis in response to a disruptive or disengaging force applied to the object, as described above. Thus, the extension 98*a*, 98*b*, 98*c*, 98*d* of each engagement member component 14*a*, 14*b*, 14*c*, 14*d* may define a depth, as noted above, and the depth of at least two of the engagement member components may be different, as illustrated in the embodiment of FIG. 14.

In other embodiments, however, such as the embodiment depicted in FIG. 15, each engagement member 14*n* may define substantially the same depth, and a plurality of engagement members may be arranged in close proximity to form a set. For example, a plurality of engagement members 14*n* comprising a plurality of second mounting magnets 40*n* in a plurality of second planes may be arranged in relatively close proximity to form a set 140, as shown. Each engagement member 14*n* may comprise an extension 98*n* and a face 88*n* joined to the extension, and each engagement member 14*n* in the set 140 may be configured to move independently of the other engagement members. Thus, each engagement member 14*n* may be slideably received by an intermediate surface 12 by way of an opening 94*n* and may move along a guide surface 96*n* of the opening 94*n*. As such, movement of the engagement member 14*n* may be limited between a base limit position BL and an outer limit position OL, and movement of the engagement member 14*n* in a direction toward the object to be mounted may be limited by a stop feature 50*n* formed by an outward protrusion of the extension 98*n* that contacts an inner surface 86 of the intermediate surface 12. The base limit position BL of the engagement member 14*n* may be defined by the depth of the extension 98*n* of the engagement member 14*n* relative to the base surface 80.

Additionally or alternatively, the base limit position BL of each respective engagement member 14*n* may be defined by a controlling component 60 that may be configured to apply a controlling force to the set 140 or, in some embodiments, separate controlling forces specific to each engagement member 14*n*. For example, the controlling component 60 may be comprised of a programmable magnet which may have an array of magnets corresponding in number to the number of engagement members 14*n*. Thus, the controlling component 60 may be able to produce multiple attraction and repulsion forces simultaneously that may act separately on each engagement member 14*n* in the set 140 and may cause some engagement members 14*n* to be retracted while other engagement members 14*n* are extended. Furthermore, the extended engagement members 14*n* may be extended by degrees (e.g., at differing lengths depending on the configuration of the programmable magnet) such that the set 140 may be able to take a variety of shapes. As such, the set 140 may be adapted to the shape of an object or may accommodate a mounted object in a particular way.

Additionally, in some embodiments which may or may not include a controlling component 60, the set 140 may allow for engagement of the mounting apparatus 10 with an object having an irregular surface (e.g., non-perpendicular or sloped lines or curves), such that the pin set 140 conforms to the shape of the object (or an object interface) and may mount the object and/or support at least a portion of the weight of the object without having been configured for the object. Thus, an apparatus 10 comprising a set 140 may be able to accommodate the mounting of objects that other embodiments could not.

The apparatus 10 comprising the set 140, as shown in FIG. 15, may engage an object in stages, as described above, such that a portion of the object is engaged with the intermediate surface 12. The portion of the object engaged with the intermediate surface 12 may compress (e.g., fully retract) the engagement members 14*n* in contact with the portion of the object, and the non-compressed engagement members 14*n* may be attracted to multiple depths of the object to substantially "fill in" cavities of the object not engaged with the intermediate surface 12 such that the object may be engaged and supported over a larger surface area in proportion to the object's overall surface area as compared to other embodiments.

Furthermore, the mounting apparatus 10 comprising the set 140 of engagement members 14*n* may be attached to a mountable object so that the object may engage irregularly-shaped surfaces that are configured to respond to magnetism.

As noted, the disclosed method may be embodied in various ways. FIGS. 16A and 16B show an embodiment of a mounting apparatus that may use a minimal number of components to apply the method of invention. In the embodiment shown, a controlling component may be suspended from a structure that may comprise the intermediate surface in other embodiments, and the controlling component may be movable with respect to the apparatus and to the engagement member. The engagement member may be configured in a similar manner to the engagement member 14 in FIG. 12.

In FIGS. 17A-17B, a housing 500 is shown with respect to an embodiment of the mounting apparatus 10 similar to the embodiment of FIG. 1. The housing 500 is defined by a front portion 510 and a rear portion 520. The front portion 510 and the rear portion 520 may fit together in a clamshell configuration, as shown in FIG. 17B. In addition, the front portion 510 may accommodate movement therethrough of the engagement member 514, while the rear portion 520 may be configured to attach to a mounting surface comprising a ball joint-type attachment member 550 via a socket component 540 of the mounting apparatus (shown in FIG. 17A). The socket component 540 may, for example, be defined by a component of the rear portion 520 of the mounting apparatus 500, as depicted. In such embodiments, the ball and socket attachment 550-540 may allow the mounting apparatus 500 to be movable with respect to the mounting surface, such as rotationally (e.g., pitch, yaw, roll, etc.). For example, the ball joint-type attachment member 550 may allow the mounted object (not shown) to be manually adjusted by a user (up, down, left, right, etc.) as desired. In this regard, the ball joint-type attachment member 550 may be provided as an extension from a wall, a table, or other surface, and adjustment by the user of the ball and socket attachment 550-540 may facilitate a user's viewing angle of a screen (for example) of the mounted object via adjustment of the position of the mounting apparatus with respect to the ball joint-type attachment member 550.

With reference to FIG. 17B, for example, the rear portion 520 may serve as the base surface in the embodiment of FIG. 1, the front portion 510 may serve as the intermediate surface, and the engagement member 514 may be configured to be movable therebetween. The front and rear portions 510, 520 may be configured to be attached to each other via corner flanges 530 and fasteners (not shown).

Referring now to FIG. 17C, which shows a front view of the housing 500, the intermediate surface of the mounting apparatus may be configured to have a close edge P and a far edge Q. A close edge P may be defined relative to a far edge Q by a minimum short distance $D_S$, measured from a close edge P to the engagement member 514, that is less than a minimum long distance $D_L$, measured from a far edge Q to the engagement member 514. In some embodiments, the minimum short distance $D_S$ and the minimum long distance $D_L$ may be equivalent (i.e., $D_S=D_L$, as in a circular configuration of the intermediate surface). For the purposes of this disclosure, an embodiment of the mounting apparatus having a minimum short distance $D_S$ that is equal to a minimum long distance $D_L$ will be deemed to have at least one far edge Q and no close edge P.

In some embodiments, an apparatus and/or system may be configured so that an object may be pivotally disengaged from the mounting apparatus. Thus, an edge of the intermediate surface may define at least one pivot axis, and a disengaging force applied to the object may cause the object (and/or the object interface) to be pivotally engaged with a contact area of an edge of the intermediate surface so that the object may be moved about a pivot axis of the edge of the intermediate surface. Movement of the object about the pivot axis may cause the object to be pivotally disengaged from the mounting apparatus along an arc of disengagement. FIG. 17C shows a pivot axis $P_a$ defined by the close edge P of the front portion 510 (the intermediate surface) of the housing 500 (the mounting apparatus).

Therefore, a pivotal disengagement of the object along the arc of disengagement $A_{de}$ may be optional in some embodiments (e.g., available as an alternative disengagement path in addition to a disengagement path along the line of engagement $L_e$) and may be preferred to a disengagement along the line of engagement $L_e$, because a disengaging force required to produce a pivotal disengagement of a mounted object along an arc of disengagement $A_{de}$ may be less than the disengaging force required to disengage the object from the mounting apparatus along the line of engagement $L_e$. Regardless of the path of disengagement (e.g., along an arc of disengagement $A_{de}$ or along the line of engagement $L_e$), disengagement of the object from the mounting apparatus may occur in stages.

With reference to FIG. 17D, which shows a side view of a system comprised by the housing 500 and a partially-disengaged object interface 570 that is configured to agree with the engagement member 514 via a cavity 575, the object interface 570 may be configured relative to the mounting apparatus (i.e., the housing 500) so that it may be pivotally disengaged from the mounting apparatus. The object interface 570 may be configured so that a disengaging force that is applied to the object (or the object interface 570) in a direction that is substantially perpendicular to a pivot axis $P_a$ defined by an edge of the intermediate surface may cause the object interface 570 to be pivotally engaged with a contact area of the edge defining the pivot axis $P_a$ (e.g., the close edge P of the front portion 510, in this embodiment) so that the object interface 570 may be moved about the pivot axis $P_a$ and may be pivotally disengaged from the mounting apparatus along an arc of disengagement $A_{de}$. Therefore, a disengaging force may be applied in either of the two directions defined by the line of engagement $L_e$ in this embodiment (e.g., a direction toward the base limit position of the engagement member 514 or a direction away from the base limit position of the engagement member 514) to produce a pivotal disengagement of the object interface 570.

Furthermore, a pivotal disengagement may be produced by a plurality of disengaging forces applied in substantially opposite directions corresponding to the line of engagement $L_e$ to portions of the object interface 570 (or the object) that are substantially opposite to one another relative to a close edge P. For example, a user wishing to pivotally disengage an object from a mounting apparatus may apply a disengaging force to a top portion of the object interface in a direction away from the mounting apparatus (away from the base limit position of the engagement member 514) and may, at the same time, apply a disengaging force to a bottom portion of the object interface in a direction toward the mounting apparatus (toward the base limit position of the engagement member 514) to pivotally disengage the object from the mounting apparatus.

Embodiments of the mounting apparatus and/or system may be configured to facilitate (e.g., make easier) a pivotal disengagement along one or more edges of the mounting apparatus, configured to impede (e.g., make more difficult) a pivotal disengagement along one or more edges of the mounting apparatus, or configured so that a pivotal disengagement of the object (or the object interface) is not possible. For example, the minimum short distance $D_S$, the minimum long distance $D_L$, the apparatus engagement depth $d_a$, the object interface depth $d_o$, the shape of the engagement member, and/or the placement of the first mounting magnet may be configured to facilitate or to prevent a pivotal disengagement of the object from the mounting apparatus.

In one embodiment, the object interface depth $d_o$ may be configured relative to the depth of the engagement member 514 so that a pivotal disengagement of the object is not possible. Said differently, the engagement member 514 may be too long relative to the object interface depth $d_o$ for the object to be pivotally disengaged.

In other embodiments, the width and/or size of the intermediate surface (i.e., $D_L$ and $D_S$) may be configured relative to the size of the object (or the object interface) to facilitate or to prevent a pivotal disengagement of the object. A greater distance $D_L$ or $D_S$ between the engagement member 514 and a respective edge Q or P of the intermediate surface may require a greater (e.g. stronger) disengaging force to produce a pivotal disengagement along the respective edge Q or P (i.e. may make a pivotal disengagement of the object interface more difficult), and a lesser distance between the engagement member 514 and an edge Q or P of the intermediate surface may require a lesser (e.g. weaker) disengaging force to produce a pivotal disengagement along the respective edge Q or P (i.e. may make a pivotal disengagement of the object interface less difficult). Correspondingly, a pivotal disengagement along a far edge Q may require a relatively greater disengaging force than a pivotal disengagement along a close edge P.

Additionally or alternatively, the mounting apparatus may be configured (e.g., shaped) so that a contact area between the object interface and an edge of the intermediate surface defining a pivot axis is decreased, and a decreased (e.g., smaller) contact area defining the pivot axis may make a pivotal disengagement of the object less likely and/or more difficult. For example, as shown in FIGS. 17A-17C, some embodiments of the mounting apparatus may comprise an intermediate surface that is configured so that the minimum long distance $D_L$ is constant along the far edge Q. Embodiments with a constant minimum long distance $D_L$ may comprise a curved far edge Q.

A curved far edge Q may make a pivotal disengagement along the far edge Q more difficult (and the possibility of unintentional disengagement less likely), because the curved far edge Q may produce a smaller contact area along a pivot axis than would a substantially flat (e.g., straight) far edge Q, and a smaller contact area occupying a smaller portion of the pivot axis may not provide the same leverage and/or stability for a pivotal disengagement as that provided via a substantially flat (e.g., straight) far edge Q along a substantially identical pivot axis. For example, an object that is pivoted about a curved far edge Q may engage only a portion of the far edge Q in response to a disengaging force and, therefore, may not be stable along a pivot axis associated with the far edge Q as the total engagement force between the object and the mounting apparatus is overcome. In contrast, an object that is pivoted about a substantially flat far edge Q may engage the entire far edge Q in response to a disengaging force and, therefore, may be more stable along a pivot axis associated with the far edge Q. A relative lack of stability along the curved far edge Q may require a concentrated (e.g., more deliberate, steady, and/or targeted) disengaging force to overcome the total engagement force of the mounting apparatus or system to produce a pivotal disengagement, so the likelihood of unintentional disengagement may be reduced. Furthermore, because such a concentrated disengaging force may be required, a user may find that a pivotal disengagement along a curved edge of the mounting apparatus may produce an experience that is less desirable (e.g., more difficult) than the experience associated with a pivotal disengagement along a substantially flat (e.g., straight) edge of the mounting apparatus.

Correspondingly, the minimum short distance $D_S$, minimum long distance $D_L$, and/or the shape(s) of the edge(s) of a mounting apparatus may be configured so that the easiest means of pivotal disengagement (e.g., the path of least resistance) is more obvious (e.g., intuitive) for a user of the mounting apparatus or system. Therefore, the intermediate surface of the mounting apparatus may be configured to facilitate a pivotal disengagement of the object or to substantially impede a pivotal disengagement of the object along one or more edges of the mounting apparatus per the application.

The object interface also may be configured to facilitate, to prevent, or to alter a pivotal disengagement of the object from the mounting apparatus. For example, in some embodiments, the arc of disengagement $A_{de}$ may be altered by a gap depth $G_d$ between the object interface 570 and the intermediate surface of the mounting apparatus when the object interface and the mounting apparatus are in an engaged and mounted configuration. For example, in an embodiment of the system wherein the object interface comprises a protruding dial (as shown in FIG. 29, described below), a gap depth $G_d$ may be defined between the intermediate surface and the central object surface of the object interface, and the gap depth $G_d$ may cause a greater divergence between the arc of disengagement $A_{de}$ and the line of engagement $L_e$ over a disengagement distance (e.g., the distance required to fully disengage the object interface from the mounting apparatus) during a pivotal disengagement of the object than would occur if the gap depth $G_d$ were substantially null. In the embodiment of FIG. 17D, a gap depth $G_d$ is substantially null (i.e., there is no gap depth $G_d$) because the object interface 570 is configured to be substantially flushly engaged with the intermediate surface—the front portion 510—when fully engaged with the mounting apparatus. In either case (e.g., whether or not a system defines a gap depth $G_d$ between the central object surface and the mounting apparatus when the system is engaged), components and/or features of the mounting apparatus and the object interface (such as the apparatus engagement depth $d_a$, the depth and/or shape of the engagement member; the depths and/or diameters of engagement member components; the depth of the dial; the diameter of the cavity of the object interface; etc.) may be configured relative to the minimum short distance $D_S$ to facilitate a disengagement path corresponding to a desired arc of disengagement $A_{de}$. For example, as shown in FIG. 17D, one or more front edges of the engagement member 514 may be shaped to facilitate a pivotal disengagement along a desired arc of disengagement $A_{de}$.

Referring now to FIG. 18, another embodiment of a mounting apparatus 10 is shown for engaging and attaching to an object. In the depicted embodiment of FIG. 18, the object is an object interface 20 that is configured to be attached to the object to be mounted.

The mounting apparatus 10 may be configured such that a first mounting magnet is supported in a first plane P1 and a second mounting magnet is supported in a second plane P2. The first plane P1 may be a nominal plane that is defined by an intermediate surface 12 of the mounting apparatus 10, whereas the second plane P2 may be a nominal plane that is defined by an engagement member 14 of the mounting apparatus, as described previously. Accordingly, the intermediate surface 12 and the engagement member 14 may each be configured to respond to magnetism.

The first mounting magnet may comprise a plurality of magnets in some embodiments. Likewise, the second mounting magnet may comprise a plurality of magnets. In the depicted embodiment of FIG. 18, a first mounting magnet comprised of one magnet 30 and a second mounting magnet comprised of four magnets 40 arranged as shown are provided. The quantity, type, strength, arrangement, spacing, etc. of the mounting magnets with respect to each other and with respect to other components of the mounting apparatus may be selected to accommodate the object to be mounted and the requirements of the user.

At least one of the mounting magnets (or group(s) of magnets comprising the mounting magnet(s), as is the case in the depicted embodiment) may be configured to move independently of the other mounting magnet along a line of engagement $L_e$ that intersects the first and second planes P1, P2. In this regard, the movement of the mounting magnet(s) that is moveable (which, in some embodiments, may be both the first and second mounting magnets) may be limited, such that each mounting magnet that is moveable is only able to move between a respective outer limit position OL and a respective base limit position BL.

The outer limit position OL may be defined, for example, by stops 56 that extend from a component of the mounting apparatus 10. In the depicted embodiment of FIG. 18, the engagement member 14 is configured to be movable with respect to a fixed intermediate surface 12. The engagement member 14 is slideably received by cylinder 35 of the intermediate surface 12 via contact with block surface 36, and stops 56 are provided as inward extensions from a sidewall 52 of the intermediate surface. The stops 56 are, in turn, configured to contact a corresponding ledge 51 defined by the engagement member 14 to stop movement of the engagement member 14. Thus, the outer limit position OL is defined by the position of the second mounting magnet 40 when the ledge 51 is in contact with the stops 56. In other embodiments, however, the stops 56, base limit position BL, outer limit position OL, and length of the line of engagement $L_e$ may be defined by other components of the mounting apparatus 10 and/or other structures of those components.

The mounting magnets 30, 40 may be configured to cooperate to engage the object to be mounted (e.g., the object interface 20), such that a total engagement force is produced between the mounting magnets and the object interface that serves to hold the object to the mounting apparatus. Accordingly, the respective outer limit positions of the mounting magnets that are moveable (e.g., the second mounting magnet 40 in the depicted embodiment of FIG. 18) may be configured such that a disengaging force that is less than the total engagement force and that is applied to a mounted object overcomes the total engagement force in stages by successively overcoming the respective engagement forces associated with the first and second mounting magnets to disengage the object.

As illustrated in FIG. 18, at least one of the engagement member 14 or the intermediate surface 12 may be configured to be movable between an extended state and a retracted state. In the retracted state, the at least one of the engagement member or the intermediate surface that is moveable may be biased away from the object to be mounted (e.g., may be biased toward the base limit position BL). In the extended state, the at least one of the engagement member or the intermediate surface that is movable may be biased toward the object to be mounted (e.g., may be biased toward the outer limit position OL). In this way, proximity of the object (e.g., the object interface 20) to the engagement member 14 may produce an attraction force between the object and the engagement member that causes engagement of the object with the engagement member. Likewise, proximity of the object (e.g., the object interface 20) to the intermediate surface 12 may produce an attraction force between the object and the intermediate surface that causes engagement of the object with the intermediate surface, such that the mounting apparatus 10 may be configured to engage the object to be mounted in stages via the respective attraction forces.

In the depicted embodiment of FIG. 18, for example, the object interface 20 may include a first object magnet 31 and a second object magnet 41 (or, as in the illustrated example, the second object magnet may be comprised of a plurality of magnets). The first object magnet 31 and the second object magnet 41 may be configured (e.g., positioned and sized) to attract or be attracted to a corresponding one of the first or second mounting magnets 30, 40 of the mounting apparatus 10. In the depicted embodiment, the first object magnet 31 is configured to respond to and interact with the first mounting magnet 30, and the second object magnets 41 are configured to respond to and interact with the magnets comprising the second mounting magnet 40. Although in FIG. 18 the first and second object magnets 31, 41 are positioned in substantially the same plane (e.g., are arranged on a single object surface 22), in some embodiments, the object interface 20 may comprise a central object surface configured to respond to magnetism and a secondary object surface spaced from the central object surface and configured to respond to magnetism. In such embodiments, the central object surface may define a third plane, and the secondary object surface may define a fourth plane, as described previously.

Various embodiments of the mounting system may allow users to selectively interact with a mounted object (e.g. choosing to move the object to intentionally disengage it versus choosing to move the object to intentionally interact with it) via relatively subtle adjustments to the object (such as by creating a locking engagement force, as previously described). In some embodiments, the mounting apparatus and object interface may be configured to agree such that a user may selectively manipulate the object without the need to create a locking engagement force.

Referring now to FIG. 19, a system 600 is provided comprising a mounting apparatus 610 and an object interface 620. In this embodiment, the engagement member 614 is shown in the extended state, and the central object surface 626 is configured to agree with the engagement member 614 such that the central object surface 626 may receive at least a portion of the engagement member 614. Additionally, the extension 698 of the engagement member 614 may comprise a channel 608, and the central object surface 626 of the object interface 620 may comprise a lip 609. The engagement member 614 and the central object surface 626 may be configured relative to one another such that a portion of the lip 609 may be seated within the channel 608 when the object interface 620 is fully engaged with (i.e. mounted to) the mounting apparatus 610 and when the mounting apparatus is in an orientation in which the line of engagement $L_e$ is not in alignment with the force of gravity. The seating of the lip 609 may be ensured by configuring the strength of the first mounting magnet 630 (comprised of six magnets in the embodiment of FIG. 19) and the strength of the third mounting magnet 641 (comprised of a ferrous metal plate and an attached, permanent ring magnet in this embodiment) such that the final movement of the object interface 620 during the mounting process may be a movement in the direction of the force of gravity that seats the lip 609 within the channel 608 (i.e. configuring the mounting magnets to ensure that the total engagement force is less than the force of gravity in a direction substantially perpendicular to the line of engagement $L_e$). Also, the base surface 680 of the mounting apparatus 610 may be configured to be attached to a movable support arm (not shown) so that the apparatus is movable. Thus, when the object is mounted and the lip 609 is seated, a user may move the object (and the apparatus) in a direction along the line of engagement $L_e$ without disengaging the object, because the object interface 620 may be structurally engaged with the mounting apparatus 610 in both directions along the line of engagement—via the channel 608 in a direction away from the mounting apparatus (i.e., a direction that would normally be a disengaging direction) and via the facade 685 of the intermediate surface 612 in a direction toward the mounting apparatus (i.e. the direction of engagement). Therefore, a user may manipulate the object both toward and away from herself (and in various other directions due to the structural support of the mounting apparatus 610 relative to the object interface 620, as previously described) without disengaging the object. Furthermore, when the user does wish to disengage the object, she may move the object in a direction opposite the force of gravity to unseat the lip 609 from the channel 608 prior to providing a disengaging force that is less than the total engagement force to disengage the object in stages (as previously described). In this way, the user may selectively interact with a mounted object and determine whether or not the object remains engaged with the mounting apparatus via subtle, yet intentional, movements of the object relative to the mounting apparatus.

The system 600 may also be configured to provide charging functionality for an object to be mounted. Correspondingly, a system may be configured so that an electrical connection may be established between the mounting apparatus and an object to be mounted. The system may be configured so that electricity and/or data may be exchanged between the object, the mounting apparatus, the object interface, and/or the mounting surface (or any combination thereof). Correspondingly, a system may be configured to support a plurality of electrical connections and/or a plurality of electrical connection types (e.g. a DC power connection, a USB connection, a micro-USB connection, etc.), and a mounting apparatus and/or an object interface may be configured to support more than one type of electrical connection.

Referring to FIG. 20A, a system 600 is provided for mounting an object to a mounting surface. The system 600 may comprise a mounting apparatus 610 and an object interface 620 and may be configured so that an electrical connection may be established between the mounting apparatus 610 and the object to be mounted (not shown). The object to be mounted may be a mobile electronic device (such as a tablet computer, a smartphone, a GPS device, etc.), and the object interface 620 may be a case that may be configured to be attached to the mobile electronic device and to the mounting apparatus 610 (a front enclosure of the mobile device case is not shown in the figure for purposes of illustration). The mounting apparatus 610 may be configured to be attached to a mounting surface (such as a wall, a windshield, a stand, etc.; also not shown).

The mounting apparatus 610 shown in FIG. 20A may comprise an intermediate surface 612, an engagement member 614, and a base surface 680 that may be configured to be attached to a mounting surface (not shown). The intermediate surface 612 may define a first plane and may be configured to respond to magnetism by supporting a first mounting magnet, comprised of six magnets 630, in the first plane. The engagement member 614 may comprise a plurality of engagement member components (614', 614"), and at least one of the plurality of engagement member components may be configured to respond to magnetism. The plurality of engagement member components may be arranged in a telescoping and/or nested configuration. As shown in FIG. 20A, the engagement member 614 may comprise two engagement member components 614' and 614" that may be configured to respond to magnetism via a plurality of second mounting magnets (magnets 640' and 640", respectively) in a plurality of respective second planes (two, in this embodiment), and the engagement member components 614' and 614" may be arranged in a nested and telescoping configuration. The engagement member 614 may be configured to be movable between an outer limit position (an extended state) and a base limit position (a retracted state) along a line of engagement $L_e$ that intersects the first plane. A portion of the intermediate surface 612 may define an opening configured to slideably receive the engagement member 614 and may substantially align the line of engagement $L_e$ along a central axis X of the engagement member 614 as the engagement member 614 is moved between the extended state and the retracted state. The base surface 680 may support an apparatus controlling component 660 that may be configured to apply an apparatus controlling force to the engagement member 614 to bias the engagement member 614 toward the retracted state. The engagement member 614 is shown in the extended state in FIG. 20A.

The object interface 620 shown in FIG. 20A may comprise a central object surface 626 that may be configured to respond to magnetism by supporting a third mounting magnet 641 in a third plane. The third mounting magnet 641 may comprise a plurality of magnets (a ferrous metal plate and an attached permanent magnet) in this embodiment. The central object surface 626 may be configured to agree with the engagement member 614 via a cavity 675 and by the configuration of magnet 641 relative to magnets 630, 640' and 640" (i.e. when the object interface 620 is brought into proximity with the mounting apparatus 610, an attraction force is produced between magnet 641 and magnets 630, 640', and 640"). Correspondingly, the central object surface 626 may be configured to receive at least a portion of the engagement member 614 via the cavity 675 when the object interface 620 is fully engaged with (i.e. mounted to) the mounting apparatus 614. Each engagement member component (614', 614") may comprise an extension (698', 698") and a face (688', 688") joined to the extension, and the extension(s) may be configured to bear at least a portion of a weight of the object. In this embodiment, an extension surface 623 of the central object surface 626 may be configured to engage the extension 698" of the engagement member component 614". Thus, the engagement member 614 may be configured to bear at least a portion of the weight of the object in this embodiment.

The object interface may be configured to substantially self-align with the mounting apparatus prior to engagement. In this embodiment, the third mounting magnet 641 and the cavity 675 of the object interface 620 may be configured relative to the second mounting magnet 640' and the engagement member 614 of the mounting apparatus 610 so that the cavity 675 may be substantially self-aligned with the central axis X of the engagement member 614 prior to engagement with the engagement member 614 during the mounting process. Moreover, the object interface may be configured relative to an axis of symmetry of the object to be mounted, and the object to be mounted may be substantially symmetrically disposed about a central axis of at least one of the engagement member or the intermediate surface of the mounting apparatus when the object interface is partially or fully engaged with the mounting apparatus. The axis of symmetry may intersect the center of gravity of the object (or the center of gravity of the combination of the object interface and the object, if different than the center of gravity of the object). In the embodiment of FIG. 20A, the object interface 620 may be configured relative to an axis of symmetry Y of the object to be mounted. The axis of symmetry Y may align with the central axis X of the engagement member 614 when the object interface 620 is engaged with the mounting apparatus 610. Therefore, the object may be rotated about the central axis X of the engagement member 614 when the object is engaged with the mounting apparatus 610, and a user may find that the object rotates more freely and in response to less effort than would be the case if the object interface 620 were not aligned with an axis of symmetry Y of the object. Furthermore, the system 600 may require a lesser total engagement force to maintain (e.g. hold) the object in one of a variety of reorientation positions that may be brought about by rotation of the object relative to the total engagement force required to maintain the object in an equivalent reorientation position if the object interface 620 were not configured relative to an axis of symmetry Y of the object.

As noted, the system may be configured so that an electrical connection may be established between the object and the mounting apparatus when the object interface is engaged with the mounting apparatus. Accordingly, at least one of the engagement member or the intermediate surface may comprise at least one connection interface, and the central object surface may comprise at least one connection interface in some embodiments. The at least one connection interface comprised by the mounting apparatus may be configured to transmit at least data or electricity to the object when the object is engaged with the mounting apparatus. Thus, the mounting apparatus may comprise at least one electrical connector, and the object interface may comprise at least one electrical connector. Each of the at least one electrical connector comprised by the object interface may be configured to agree with a corresponding one of the at least one electrical connector comprised by the mounting apparatus when the object interface is engaged with the mounting apparatus. In other embodiments, the system may be configured so that at least data or electricity may be transmitted between the mounting apparatus and the object interface only (e.g., to power only a feature of the object interface and not the object). Therefore, the connection interfaces comprised by the system may be embodied in various ways.

With continued reference to FIG. 20A, the central object surface 626 may be configured to support a charger support 601 in addition to the third mounting magnet 641. The central object surface 626 may comprise a surface opening 678 configured to slideably receive the charger support 601, and the charger support 601 may be positioned between the third mounting magnet 641 and the cavity 675 of the central object surface 626 when the charger support 601 is fully received by the central object surface 626. Therefore, the object interface may have modular and/or removable components. Likewise, the charger support may be configured to be removable in some embodiments. When the charger support 601 is fully received by the central object surface 626, the charger support 601 may occupy a portion of the cavity 675. Correspondingly, the object interface depth $d_o$ may be reduced. Therefore, in some embodiments, the object interface depth may be adjustable. Furthermore, with continued reference to FIG. 20A, the charger support 601 may intersect an axis of symmetry Y of the object to be mounted when fully received by the object interface 620, and the charger support 601 may intersect the line of engagement $L_e$ and the central axis X of the engagement member 614 when the central object surface 626 is engaged with the mounting apparatus 610.

The object interface may comprise at least one interface connector, and the at least one interface connector may be an electrical connector. Moreover, the object interface may comprise a plurality of interface connectors. Additionally, the object interface may comprise a common plug (e.g. micro-USB connector, etc.) configured to be attached to a port of the object to be mounted. The object interface may also comprise an interface transmission path that is configured to be attached to the common plug and to the interface connector(s) to connect the common plug and the interface connector(s). Thus, the interface transmission path may be configured to transmit at least data or electricity between the interface connector(s) and the common plug. For example, the object interface may be a case for a table computer and may comprise a micro-USB connector that is configured to attach to a micro-USB port of the tablet computer (e.g., in lieu of a micro-USB cable). The interface transmission path of the object interface may comprise a plurality of conductive paths, and each of the plurality of conductive paths may correspond to one of a plurality of wires comprising a common micro-USB cable. Thus configured, the interface transmission path may transmit at least data or electricity between the micro-USB port and the interface connectors of the object interface. Correspondingly, at least a portion of the plurality of apparatus connectors and the apparatus transmission path of the mounting apparatus may be configured to be compatible with the micro-USB power/data standard so that the tablet computer may be charged via the mounting apparatus and/or may exchange data with the mounting apparatus when the object interface is engaged with the mounting apparatus.

In the embodiment of FIG. 20A, the charger support 601 of the object interface 620 may comprise three interface connectors 606 and a common plug 604 configured to attach to a port of the object to be mounted (not shown). Each of the plurality of interface connectors 606 may comprise a connector pin (a plurality of which will be hereinafter referred to as a "connector pin grouping"), and each of the plurality of interface connectors 606 (each connector pin) may be configured to move between a respective extended connector position and a retracted connector position. The charger support 601 may be configured so that each of the plurality of interface connectors 606 (each connector pin) may be biased toward a respective extended connector position (e.g. away from the charger support 601 and toward the mounting apparatus 610) by a respective connector extension force applied by a respective connector extension component (e.g., a spring, etc.). (The connector pin grouping comprised by the charger support 601 is shown in FIG. 20B.) An interface transmission path 607 may connect the common plug 604 and the interface connectors 606, and the interface transmission path 607 may comprise a plurality of conductive paths (e.g. wires, etc.). Each conductive path comprised by the interface transmission path 607 may be configured to be attached to a respective one of the plurality of interface connectors 606 (three, in this embodiment) and a corresponding electrical contact point (e.g., connector or equivalent) comprised by the common plug 604. The interface transmission path 607 may be embedded within the charger support 601, and the charger support 601 may be partially comprised a non-conductive material and may insulate each conductive path of the interface transmission path 607 relative to one another and relative to the other components of the object interface 620. In other embodiments, the interface transmission path 607 may be a separate component of the object interface and may comprise an insulated wire or wire bundle, etc. The charger support 601 may be configured so that the common plug 604 is substantially in alignment with the port of the object to be mounted when the charger support 601 is slideably received by the surface opening 678 of the central object surface 626 so that the common plug 604 may be received by the object to be mounted when the charger support 601 is fully received by the central object surface 626. Additionally, the charger support 601 may comprise an adapter port 603, and the adapter port 603 may be configured to receive an external common connection cable (e.g. USB, micro-USB, etc.; not shown) that may be used to transmit at least data or electricity to the object via the charger support 601 when the common plug 604 is received by (e.g. connected to) the object. The charger support 601 may be configured so that the object receives data and/or electricity from only one of the external common connection cable or the mounting apparatus 610 when both the external common connection cable and the mounting apparatus 610 are connected to the charger support 601. The adapter port 603 may be configured to be substantially identical to the port of the object (e.g. if the object has a micro-USB port, the adapter port 603 may be a micro-USB port), or the adapter port 603 may be configured to support a different connection type than the port of the object (e.g. if the object has a micro-USB port, the adapter port 603 may be a USB port, etc.). If the adapter port 603 is configured to support a different connection type than the port of the object, the charger support 601 may serve as an adapter for the object so that the object may be compatible with the different connection type via the charger support 601. This may provide an additional benefit to a user, because a user may prefer to use a different type of external common connector cable for charging the object than that which is natively compatible with the port of the object. Whether or not the adapter port 603 of the object interface is substantially identical to the port of the object, the adapter port 603 may provide a benefit to a user in that the user may connect an external common connection cable, for example, for transmitting electricity and/or data to the object without having to remove the charger support 601 from the object interface 620 to do so.

Alternatively or additionally, the charger support 601 may be configured so that the common plug 604 may be removed from the port of the object while the position of the charger support 601 remains substantially unchanged relative to the cavity 675 and the mounting apparatus 610 (i.e., while the position of the interface connectors 606 relative to the cavity 675 remains unchanged). For example, the charger support 601 may comprise a joint 602, and the joint 602 may be flexible. The joint 602 may be a mechanical joint or may be a portion of the charger support 601 that is comprised of a flexible material (e.g. rubber, silicone, etc.). Thus, the common plug 604 may be removed from the port of the object and may be pivotally moved via the joint 602 to allow access to the port of the object. Such functionality may be desirable when a user wishes to quickly and easily gain access to the object's port without having to remove the charger support 601 from the object interface 620.

Moreover, in some embodiments, the charger support 601 may be configured to be flexible (e.g. wholly comprised of a flexible material) and, thus, may be configured to be at least partially adaptable to the shape and/or contours of the object and/or the object interface. For example, the body of the charger support 601 may be comprised of one or more flexible materials (e.g. rubber, silicone, etc.), and the interface transmission path 607 may be configured to be flexible. Thus, the common plug 604 may be connected to the object and the charger support 601 may be substantially wrapped around the perimeter (e.g., a corner) of the object as desired. Additionally, in some embodiments, the charger support 601 may be configured with an adhesive material (e.g. a nanofoam layer, a micro-suction pad, a non-permanent sticky adhesive, etc.) so that the charger support 601 may releasably adhere to the object or to the object interface.

In still other embodiments, the charger support may comprise adapter contacts (in addition to or in lieu of the common plug 604), and the adapter contacts may be configured to be attached to an external port adapter that is compatible with (i.e., configured to be attached to) the port of the object to be mounted. Referring to FIG. 21, a system 700 is shown that may comprise a mounting apparatus 710 and an object interface 720, and the object interface 720 may comprise a charger support 701. The charger support 701 may comprise adapter contacts 703 that may be configured to be attached to an external port adapter (not shown). The external port adapter may be configured to be attached to a port of the object to be mounted (e.g. via a plug that may be similar to the common plug 604) and may comprise receiving contacts configured to attach to the adapter contacts 703 of the charger support.

Additionally, in some embodiments, the adapter contacts of the charger support and the receiving contacts of the external port adapter may be configured to be attached magnetically. Thus, the adapter contacts of the object interface may comprise one or more magnets. Furthermore, in another embodiment, the central object surface may be configured relative to the object and to an external port adapter (attached to the object's port) so that the adapter contacts of the charger support and the receiving contacts of the external port adapter magnetically attach when the charger support is received by the central object surface. Magnetic attachment of the adapter contacts (of the charger support) with the receiving contacts (of the external port adapter) may establish an electrical connection between the object interface and the object (and, correspondingly, between the object and the mounting apparatus when the object interface is engaged with the mounting apparatus).

Referring again to FIG. 20A, the engagement member 614 of the mounting apparatus 610 may be configured to support a plurality of apparatus connectors 605. Correspondingly, one or more of the plurality of engagement member components (614', 614") may be configured to support at least one electrical connector (i.e., at least one of the plurality of apparatus connectors) in various embodiments. Thus, the apparatus connectors 605 may be electrical connectors. In the embodiment depicted in FIG. 20A, the apparatus connectors 605 may be supported by the face 688' of the engagement member component 614' that may define the outer limit position OL of the engagement member 614 when the engagement member 614 is in the extended state (i.e., the engagement member component that is furthest from the base surface 680 when the engagement member is in the extended state). The apparatus connectors 605 may comprise a plurality of ring contacts arranged in a concentric configuration and made of an electrically conductive material (hereinafter referred to as a "concentric ring set"), and the face 688' may be comprised of non-conductive material. The concentric ring set may be flush with the face of the engagement member, may be recessed within the face of the engagement member, may protrude from the face of the engagement member, or may define a curved surface in different embodiments. (The ring contacts are configured to be substantially flush with the face 688' of the engagement member in FIG. 20A, and FIG. 26 shows a concentric ring set defined by a curved surface.) The mounting apparatus 610 may comprise an apparatus transmission path 689 that may be configured to be attached to the apparatus connectors 605 and to a nominal component 681. The nominal component 681 may be a power adapter, a charging device, an electrical and/or data port, a printed circuit board, etc. The apparatus transmission path 689 may comprise one or more conductive paths (e.g. wires comprising a wire bundle in FIG. 20A), and each conductive path may be attached to a respective one of the plurality of apparatus connectors 605. The apparatus transmission path 689 may connect the apparatus connectors 605 to one or more electrical contact points (e.g., electrical pins or similar, etc.) of the nominal component 681. The plurality of second mounting magnets 640', 640" in the embodiment shown in FIG. 20A are ring-shaped to accommodate passage therethrough of the apparatus transmission path 689 to the nominal component 681. The apparatus transmission path 689 may be flexible (e.g. a wire bundle) and may be configured to minimize its influence on the engagement member 614 as the engagement member 614 is moved between the outer limit position OL (extended state) and the base limit position BL (retracted state) along the line of engagement $L_e$ (e.g. the apparatus transmission path 689 may be configured to be slack).

As noted, the interface connectors of the object interface may be configured relative to the apparatus connectors of the mounting apparatus so that an electrical connection may be established between the object interface and the mounting apparatus when the object interface is engaged with the mounting apparatus. Accordingly, the object interface may be configured so that the interface connectors are available to the mounting apparatus via a cavity of the central object surface. Referring again to FIG. 20A, the interface connectors 606 comprised by the charger support 601 may be available to the mounting apparatus 610 via the cavity 675 of the central object surface 626 when the charger support 601 is fully received by the central object surface 626. The interface connectors 606 may be configured to agree with the apparatus connectors 605 supported by the face 688' of the engagement member 614 of the mounting apparatus 610. When the object interface 620 is engaged with the mounting apparatus 610, the central object surface 626 may receive at least a portion of the engagement member 614 via the cavity 675. An attraction force produced between the second mounting magnet 640' and the third mounting magnet 641 may cause the interface connectors 606 and the apparatus connectors 605 to engage, and engagement of the interface connectors 606 and the apparatus connectors 605 may establish an electrical connection between the mounting apparatus 610 and the object interface 620 (and, correspondingly, the object to be mounted).

As noted, the system 600 may be configured so that each of the plurality of apparatus connectors 605 may engage a corresponding one of the plurality of interface connectors 606 of the object interface 620 so that an electrical connection may be established between the object interface 620 and the mounting apparatus 610 when the object interface 620 is engaged with the mounting apparatus 610. The components of the object interface and the mounting apparatus that may engage to establish the electrical connection may be embodied in various ways.

In the embodiment depicted in FIG. 20A, the apparatus connectors 605 may be comprised by a concentric ring set (as described above), and the interface connectors 606 may be comprised by a connector pin grouping (as described above and as shown in FIG. 20B) that may be supported by a charger support 601. When the object interface 620 is engaged with the mounting apparatus 610, each of the plurality of interface connectors 606 (each connector pin of the connector pin grouping) may engage a corresponding one of the apparatus connectors 605 (a corresponding contact ring of the concentric ring set) so that an electrical connection may be established between the object interface 620 and the mounting apparatus 610. An attraction force produced between the second mounting magnet 640' of the engagement member 614 and the third mounting magnet 641 of the object interface 620 may cause the engagement member 614 and the charger support 601 to be engaged, and the engagement force produced between the second mounting magnet 640' and the third mounting magnet 641 may be configured to be greater than the plurality of connector extension forces applied to each of the plurality of interface connectors 606 (each connector pin) comprised by the charger support 601 so that each of the plurality of interface connectors 606 may be moved toward a retracted connector position when the engagement member 614 (via the engagement member component 614') is engaged with the charger support 601. Said differently, the engagement force produced between the charger support 601 and the face 688' of the engagement member 614 may compress the interface connectors 606 between the charger support 601 and the apparatus connectors 605. Therefore, when the object interface 620 is fully engaged with (e.g., mounted to) the mounting apparatus 610, the apparatus connectors 605 (the concentric ring set) and the interface connectors 606 (the connector pin grouping) may be engaged so that an electrical connection is produced between the mounting apparatus 610 and the object interface 620, and the system 600 may be configured so that the electrical connection produced between the object interface 620 and the mounting apparatus may be maintained during a rotational movement of at least one of the object interface 620 or the mounting apparatus 610 relative to the other of the at least one of the object interface 620 or the mounting apparatus 610.

Correspondingly, in other embodiments, the roles of the system's components may be effectively reversed: the apparatus connectors may comprise a connector pin grouping, and the interface connectors may comprise a corresponding concentric ring set. In either case, the interface connectors 606 and the apparatus connectors 605 may be configured so that an electrical connection that has been established between the object interface and the mounting apparatus may be maintained when at least one of the object interface or the mounting apparatus is rotated relative to the other of the at least one of the object interface or the mounting apparatus.

Some embodiments of the system 600 shown in FIG. 20A may be configured so that the engagement member component comprising the apparatus connectors 605 may be rotated about the central axis X of the engagement member 614. In such embodiments, the mounting apparatus 610 may comprise a slip ring 6890 configured to be attached to the apparatus transmission path 689, and the slip ring 6890 may be configured so that the apparatus transmission path 689 does not become tangled or twisted during a rotational movement of the engagement member 614 relative to the base surface 680. In other embodiments, the engagement member 614 may be configured to have a fixed position relative to intermediate surface 612 and/or the base surface 680, so the mounting apparatus 610 may be configured without a slip ring 6890.

Furthermore, in some embodiments, the apparatus connector(s) and/or the interface connector(s) may be configured to respond to magnetism. Therefore, the apparatus connector(s) and/or the interface connector(s) may be moved between a respective retracted connector position and a respective extended connector position by one or more connector controlling forces applied by one or more magnetic components of the system. For example, in the embodiment shown in FIGS. 20A and 20B, the interface connectors 606 may be configured to respond to magnetism and may moved toward a retracted connector position by an attraction force produced between the interface connectors 606 and the third mounting magnet 641. (Correspondingly, in some embodiments, the interface connectors 606 may be flush with or recessed within the charger support 601 when the charger support 601 is fully received by the central object surface 626.) An attraction force produced between the second mounting magnet 640' and the interface connectors 606 may be configured to be stronger than the attraction force produced between the interface connectors 606 and the third mounting magnet 641, so the interface connectors 606 may be moved toward an extended connector position and may engage the apparatus connectors 605 when the object interface 620 is engaged with the mounting apparatus 610.

Moreover, in some embodiments, the interface connectors 606 and the apparatus connectors 605 may be configured relative to one another so that an electrical connection may be maintained (e.g., substantially uninterrupted or undisturbed) when the object interface 620 slides or slips, etc. relative to the mounting apparatus 610. Such a slip movement may define a linear slip distance and may occur in response to the application of an external force to the system (whether intentional or unintentional). For example, a user of an object may intentionally apply an external force to the system when interacting with the object to cause a slip movement of the object interface relative to the mounting apparatus (as described relative to FIG. 19 above), or a slip movement may be produced in response to an unintentional external force (e.g., jarring, etc.) applied to the system 600 via an unintentional hit or swipe. Furthermore, the system 600 may be configured so that a slip movement may occur in response to the force of gravity in embodiments of the system wherein such a slip movement may be a preferred and measured form of functionality (also described relative to FIG. 19 above). Thus, a maximum linear slip distance S (depicted in FIG. 22) may be predictable (i.e. calculable) with respect to other chosen components and tolerances of the system (e.g., by measuring the difference between the circumference of the cavity 675 vs. the circumference of the engagement member 614). Therefore, the widths of the ring contact(s) comprised by the object interface and/or the mounting apparatus may be configured relative to a maximum linear slip distance S—and relative to the widths (e.g. contacting surface areas) of the corresponding connector pin(s)—so that an electrical connection may be maintained (e.g., substantially uninterrupted or undisturbed) throughout a slip movement of the object interface when the object interface is engaged with the mounting apparatus.

In other embodiments, the apparatus connectors 605 may comprise a connector pin grouping, and the interface connectors 606 may comprise a concentric ring set. Referring to FIG. 23, the interface connectors 606 (concentric ring set) may be supported by a fore surface 6015 of an interface disc 6013, and the charger support 601 may be configured to receive the interface disc 6013 so that the interface disc 6013 may be rotated independently of the charger support 601 and the object interface. The object interface 620 may be configured so that the interface disc 6013 may be aligned with the cavity 675 of the central object surface 626 when the charger support 601 is fully received by the central object surface 626 so that the interface disc 6013 may be engaged with the engagement member 614 of the mounting apparatus 610 when the object interface 620 is mounted to the mounting apparatus 610. The interface disc 6013 may comprise a plurality of throughpins (not shown in the figure), and each of the plurality of throughpins may be configured to attach to a corresponding one of the interface connectors 606 and may protrude from an aft surface 6017 of the interface disc 6013. The charger support 601 may further comprise at least one wide ring (which may be configured in a similar manner to a ring contact), and a plurality of wide rings 6060 may be arranged in a concentric configuration. Each of the plurality of throughpins of the interface disc 6013 may be configured to contact a corresponding one of the wide rings 6060. Furthermore, each of the plurality of wide rings 6060 may define a width that is greater than the width of a corresponding one of the interface connectors 606 (comprised by ring contacts in this embodiment), and each of the plurality of wide rings 6060 may be configured to be attached to a corresponding conductive path of the interface transmission path 607.

The interface disc 6013 may be configured to be movable within a thin chamber 6065 of the charger support 601. Accordingly, a fore surface 6015 of the interface disc 6013 may be configured to be movable within a range of motion defined by a boundary edge 6069 of the charger support 601, and movement of the interface disc 6013 may be limited by engagement between the boundary edge 6069 of the charger support 601 and a raised edge 6016 of the interface disc 6013. Thus, the interface disc 6013 may be configured to be movable (rotationally, laterally, etc.) relative to the charger support 601. The boundary edge 6069, the raised edge 6016, and the respective widths of each of the plurality of wide rings 6060 may be configured relative to a preferred or allowable maximum linear slip distance S (as described above) so that an electrical connection that has been established between the interface connectors 606 and the apparatus connectors 605 may be maintained throughout a slip movement of the object interface 620 relative to the mounting apparatus 610. Therefore, the interface disc 6013 may be engaged with the engagement member 614 in when the object interface 620 is fully engaged with (e.g. mounted to) the mounting apparatus 610 and may move in accordance with the engagement member 614 (or an engagement member component, in some embodiments). For example, the interface disc 6013 (and the interface connectors 606) may move in accordance with the engagement member 614 (and the apparatus connectors 605) throughout a slip movement. Correspondingly, the throughpins comprised by the interface disc 6013 may be configured to maintain contact with the wide rings 6060 throughout a slip movement, a rotational movement, etc. so that an electrical connection may be maintained between the object interface 620 and the mounting apparatus 610 throughout the slip movement, rotational movement, etc. Because the concentric ring set defined by the wide rings 6060 may be configured relative to a maximum linear slip distance S (e.g., rather than the concentric ring set comprised by the interface connectors 606), the surface area defined by each of the plurality of interface connectors 606 may be smaller. Therefore, each of the plurality of interface connectors 606 may be arranged in proximity so that the footprint (e.g., the portion of the interface disc 6013 occupied by the plurality of interface connectors 606, in this embodiment) defined by the plurality of interface connectors 606 may be smaller, because each of the respective ring contacts comprised by the interface connectors 606 may not define (e.g., require) a respective width that is configured to accommodate the maximum linear slip distance S. Correspondingly, the footprint defined by a corresponding plurality of apparatus connectors 605 may be smaller, because the apparatus connectors 605 (e.g., the connector pins) may be arranged in proximity to correspond with the positions of the plurality of interface connectors 606. Furthermore, because the surface area defined by each of the plurality of interface connectors 606 may be smaller, the interface disc 6013 may comprise (e.g., may have room for) a greater plurality of interface connectors 606 (i.e., more total ring contacts). Likewise, the engagement member 614 may comprise a greater plurality of apparatus connectors 605 (e.g., within the same available space).

Additionally, in some embodiments, the interface disc 6013 may be configured to respond to magnetism and may be configured relative to the engagement member 614 so that proximity of the interface disc 6013 to the engagement member 614 causes the interface connectors 606 to substantially self-align with the apparatus connectors 605 so that an electrical connection may be established when the interface disc 6013 is engaged with the engagement member 614. Thus, the engagement member 614 (or an engagement member component thereof, in some embodiments) may comprise magnets configured to facilitate the alignment of the interface connectors 606 and the apparatus connectors 605.

Magnetic alignment of the interface connectors 606 and the apparatus connectors 605 may be desired in other embodiments of the system as well. For example, in some embodiments, the apparatus connectors 605 and the interface connectors 606 may each comprise a connector pin grouping, and the connector pin grouping comprised by the interface connectors 606 may be configured to agree with the connector pin grouping comprised by the apparatus connectors 605 when the object interface 620 is engaged with the mounting apparatus 610. Referring to FIG. 24, which shows the charger support 601 of the object interface 620 and (only) a portion of the mounting apparatus 610, the apparatus connectors 605 of the mounting apparatus 610 may comprise a connector pin grouping that may be supported by a face 688' of the engagement member 614, and the interface connectors 606 of the object interface may comprise a connector pin grouping that may be supported by an interface disc 6013. The interface disc 6013 may be configured to be received by a charger support 601, and the interface disc 6013 may be configured to be movable (rotationally, laterally, etc.) relative to the charger support 601 (as described above). The face 688' of the engagement member 614 may comprise a depression 689, and the apparatus connectors 605 may be substantially recessed within the depression 689. Correspondingly, the interface connectors 606 may be supported by a fore surface 6015 of the interface disc 6013, and the fore surface 6015 may be configured (e.g. shaped) to agree with the depression 689 of the engagement member 614 so that the apparatus connectors 605 may engage the interface connectors 606 when the fore surface 6015 is received by the depression 689.

The interface disc 6013 shown in FIG. 24 may be movable relative to the charger support 601, so the object interface 620 may rotate about a central axis X of the engagement member 614 when the interface disc 6013 is fully engaged with the face 688' of the engagement member 614 (i.e. when the fore surface 6015 of the interface disc 6013 is received by the depression 689 and an electrical connection has been established between the interface connectors 606 and the apparatus connectors 605). Furthermore, each of the interface disc 6013 and the face 688' of the engagement member 614 shown in FIG. 24 may be configured to respond to magnetism, so the interface connectors 606 and the apparatus connectors 605 may be configured (e.g., relative to one another) to substantially self-align prior to engagement of the interface disc 6013 and the engagement member 614.

In some embodiments, the interface disc 6013 may support at least one correlated magnet, and the face 688' of the engagement member 614 may support at least one correlated magnet. The at least one correlated magnet supported by the interface disc 6013 may be configured relative to the at least one correlated magnet supported by the face 688' of the engagement member 614 so that proximity of the interface disc 6013 to the face 688' may cause the interface disc 6013 to be moved to a position in which the interface connectors 606 and the fore surface 6015 may be aligned with the apparatus connectors 605 and the depression 689 so that the interface connectors 606 and the apparatus connectors 605 may engage so that an electrical connection may be established between the object interface and the mounting apparatus.

Additionally, in some embodiments, the face 688' of the engagement member 614 may be configured to be movable (e.g., rotationally; or rotationally, laterally, etc. in a configuration similar to that of the interface disc 6013, as described above) and may be configured to respond to magnetism so that the apparatus connectors 605 and the interface connectors 606 substantially self-align during the mounting process. Therefore, the object interface may be configured relative to the mounting apparatus so that the interface connectors and the apparatus connectors may substantially self-align prior to engagement of the interface connectors and the apparatus connectors.

Correspondingly, the system may be configured so that an electrical connection may be established between the mounting apparatus and the object interface regardless of the orientation of the object interface when the object interface is engaged with the mounting apparatus along the line of engagement.

In still other embodiments, an object interface may be engaged with a mounting apparatus so that a first engagement position is established, and an electrical connection may not be established between the object interface and the mounting apparatus in the first engagement position. The mounted object may be moved so that a second engagement position may be established, and an electrical connection may be established between the object interface and the mounting apparatus in the second engagement position. For example, the charger support 601 may comprise a connector pin grouping supported by a fore surface of the charger support 601 (which may be identical to the fore surface 6015 shown in FIG. 24), and, thus, the interface connectors 606 may be in a fixed position (e.g. not movable) relative to the charger support 601. Therefore, each of the plurality of interface connectors 606 may be attached to a corresponding conductive path of the interface transmission path 607. In such an embodiment, the charger support 601 and the face 688' of the engagement member 614 (which may be identical to the engagement member shown in FIG. 24) may be engaged in a first engagement position, and the fore surface of the charger support 601 and the depression 689 may not be aligned in the first engagement position. Thus, the object interface 620 (and the charger support 601) may be rotated about a central axis X of the engagement member 614 so that a second engagement position is established, and the fore surface of the charger support 601 may be aligned with the depression 689 in the second engagement position so that the fore surface may be received by the depression 689 (i.e., rotated to a position in which the fore surface fits the depression 689). Thus, the interface connectors 606 and the apparatus connectors 605 may be engaged in the second engagement position, and an electrical connection may be established between the object interface and the mounting apparatus. Correspondingly, in such embodiments, the fore surface of the charger support 601 may be configured relative to the depression 689 so that one of the object interface or the mounting apparatus may be rotated relative to the other of the object interface or the mounting apparatus to move the system from a first engagement position to a second engagement position so that an electrical connection may be established. For example, shapes may be chosen for the fore surface of the charger support 601 and the depression 689 that allow for a rotational movement to take place (e.g., from a first engagement position to a second engagement position) until such an alignment and fit is established for establishing an electrical connection.

Placement of the apparatus connectors and the interface connectors may differ in various embodiments of the system. Referring to FIG. 25, the apparatus connectors 605 of the mounting apparatus may be supported by an extension 698 of the engagement member 614 (shown in the extended state), and the interface connectors 606 of the object interface may be supported by an extension surface 623 of the central object surface 626. (Some components of the object interface are not shown in the figure for purposes of illustration.) The interface connectors 606 may comprise a plurality of connector pins (three in this embodiment), and each of the plurality of interface connectors 606 (i.e., each connector pin) may be configured to be movable between a respective extended connector position and a retracted connector position (as described previously). Each of the plurality of interface connectors 606 may be biased toward a respective extended connector position (e.g. away from a supporting surface of the extension surface 623 and toward an opposite portion of the extension surface 623) by a respective connector extension force applied by a respective connector extension component (e.g., a spring).

When the object is engaged with the mounting apparatus, the engagement member 614 may be received by the extension surface 623 of the object interface 620, and the interface connectors 606 may be moved toward a retracted position via contact with the face 688 of the engagement member 614 when the engagement member 614 is received by the extension surface 623. Therefore, an edge of the face 688 (i.e. the meeting place between the face 688 and the extension 698) of the engagement member 614 may be configured (e.g. shaped, rounded, etc.) to facilitate movement of the interface connectors 606 toward a retracted position during engagement in some embodiments.

Furthermore, in some embodiments, each of the plurality of interface connectors 606 may define a respective extended position, and each of the respective extended positions defined the interface connectors 606 may be different. Correspondingly, each of the plurality of apparatus connectors 605 may be recessed within a respective channel of the extension 698 (each channel may be similar to the channel 608 shown in FIG. 19). Each channel may define a depth, and the depth of each respective channel may correspond to a depth of a corresponding apparatus connector. Furthermore, the depths of each of the channels (and, correspondingly, the depths of each of the plurality of apparatus connectors) may be different. The respective extended positions of the interface connectors 606 may be configured relative to the respective depths of the channels of the extension 698 so that an electrical connection may be established between the object interface and the mounting apparatus when the object interface is engaged with the mounting apparatus. Such a recessed and staggered configuration of the apparatus connectors 605 may prevent undesirable contact and/or connection between components of the object interface (e.g. certain interface connectors) and components of the mounting apparatus (e.g. certain apparatus connectors) as a portion of the plurality of interface connectors 606 may be moved past a portion of the plurality of apparatus connectors 605 during engagement.

In the embodiment of FIG. 25, the central object surface 626 may comprise the interface transmission path 607 (not shown) and the common plug 604. In other embodiments, a charger support may be configured to support the interface connectors 606 in the configuration shown in FIG. 25. And in some embodiments, the interface transmission path 607 may be configured to be attached to a circuit board or other electrical component comprised by the object, such as in an embodiment wherein the object interface 620 is built into the casing or enclosure of an electronic device (e.g., a tablet computer, a smartphone, etc.).

In still other embodiments, a portion of the face of the engagement member may define a curved surface, and the curved surface may support at least one apparatus connector. Referring to FIG. 26, a mounting apparatus is shown in an idle (e.g. unengaged) configuration with an engagement member in a retracted position. A portion of the face of the engagement member of the mounting apparatus may define a curved surface, and the curved surface may support a plurality of apparatus connectors arranged in a concentric configuration (e.g., as a concentric ring set). An object interface may be configured relative to the mounting apparatus shown in FIG. 26 so that a charger support, a central object surface, or another component of the object interface may support a corresponding curved surface that is configured to agree with the curved surface comprised by the engagement member, and the corresponding curved surface supported by the charger support, the central object surface, or another component of the object interface may support a corresponding plurality of interface connectors (e.g., a concentric ring set, a pin grouping, etc.) so that an electrical connection may be established between the object interface and the mounting apparatus when the object interface is engaged with the mounting apparatus.

As previously noted, the mounting apparatus may comprise at least one wireless charging device. Accordingly, the disclosed system for mounting an object to a mounting surface comprising a mounting apparatus and an object interface may be configured so that a wireless charging relationship may be established between the object to be mounted and the mounting apparatus when the object is engaged with the mounting apparatus. Furthermore, a system for mounting an object to a mounting surface comprising a mounting apparatus and an object interface may be configured so that a wireless charging relationship may be established between the object interface and the mounting apparatus for charging the object when the object is engaged with the mounting apparatus.

The configuration of an object interface comprised by the system may be varied according to the wireless charging compatibility of the object to be mounted (i.e., whether or not the object comprises a wireless charging component; e.g., a coil object vs. a non-coil object) as well as the configuration of the object (e.g., where the wireless charging component is located, whether or not the object is configured to respond to magnetism, etc.). For example, an object interface may be configured to add wireless charging functionality, mounting functionality (e.g., for an object that is not configured to respond to magnetism), or both wireless charging functionality and mounting functionality to an object depending upon the configuration of the object. Furthermore, in some embodiments, an object interface may be configured to adapt the wireless charging functionality of an object to be mounted in various ways.

Referring to FIG. 27A, a system 800 is provided for mounting and wirelessly charging an object. The system 800 may comprise a mounting apparatus 810 and an object interface 820. The mounting apparatus 810 may comprise an intermediate surface 812, a base surface 880 (shown in FIG. 27B), and an engagement member 814. The engagement member 814 may comprise a plurality of engagement member components, 814' and 814", arranged in a nested and telescoping configuration, and the engagement member 814 may be configured to be moved between an extended state and a retracted state. FIG. 27A shows the engagement member 814 in the extended state.

As shown in FIG. 27B, which depicts a cross-sectional view of the system 800 when the mounting apparatus 810 is fully engaged with the object interface 820, a plurality of second mounting magnets, 840' and 840", may be supported by the engagement member components 814' and 814", respectively. The second mounting magnet 840' may be comprised by a ring of ferrous metal, and the second mounting magnet 840" may be comprised by a permanent ring magnet. The intermediate surface 812 may support a first mounting magnet comprised of four magnets 830. The base surface 880 may support a controlling component (not shown), and the controlling component may be configured to bias the engagement member 814 (i.e., each of the engagement member components 814' and 814") toward the retracted state.

The mounting apparatus 810 may comprise a wireless charging device, and the wireless charging device may be positioned in proximity to a target mounting area so that the wireless charging device may be within a charging range of a compatible wireless charging component when the object is engaged with the mounting apparatus. In some embodiments, the wireless charging device comprised by the mounting apparatus may comprise a plurality of components. In the embodiment depicted in FIGS. 27A & 27B, the wireless charging device may comprise a transmitter coil component 8401 and a transmitter circuit board (not shown). Therefore, the wireless charging device supported by the mounting apparatus 810 may be capable of wirelessly charging a compatible electronic device that is brought into proximity with the wireless charging device. The transmitter coil component 8401 may be supported by the engagement member 814, the transmitter circuit board (not shown) may be supported by the base surface 880, and the transmitter coil component 8401 and the transmitter circuit board may be connected via an apparatus transmission path 889 (e.g., a wire or wire bundle).

The mounting apparatus 810 may comprise a first shielding component 8411, and the first shielding component 8411 may be supported by the engagement member 814. The first shielding component 8411 may be configured so that the transmitter coil component 8401 may be partially enclosed by the first shielding component 8411.

The object interface 820 may be a case for a mobile electronic device (e.g., a tablet computer, etc.) that is not configured to participate in a wireless charging relationship (i.e., a non-coil object), and the object interface 820 may comprise a central object surface 826 that is configured to attach to the mobile electronic device (i.e., the object to be mounted). The central object surface 826 may be configured to support a third mounting magnet, and the third mounting magnet may comprise a plurality of magnets, 831 and 841. Magnet 831 may comprise a round, ferrous metal plate with a center opening (i.e., a hole in the center of the plate), and magnet 841 may be a permanent ring magnet that is configured to be attached to the ferrous metal plate in this embodiment. The object interface 820 may comprise a second shielding component 8412, and the second shielding component 8412 may be configured to be attached to the third mounting magnet, 831 & 841, in this embodiment.

The object interface 820 may comprise a wireless charging device, and the wireless charging device comprised by the object interface 820 may comprise a plurality of components. In this embodiment, the wireless charging device may comprise a receiver coil component 8402 and a receiver circuit board (not shown), and an interface transmission path 807 (e.g., a wire) may be configured to connect the receiver coil component 8402 and the receiver circuit board. The second shielding component 8412 may be configured so that the receiver coil component 8402 may be partially enclosed by the second shielding component 8412.

The wireless charging device comprised by the object interface 820 may be configured relative to the wireless charging device comprised by the mounting apparatus 810 so that a wireless charging relationship may be established between the object interface 820 and the mounting apparatus 810 when the object is engaged with the mounting apparatus 810. Said differently, the wireless charging device comprised by the object interface 820 may be configured to be compatible with the wireless charging device comprised by the mounting apparatus 810. For example, each wireless charging device may be configured according to a wireless charging specification (e.g., Qi, Powermat, etc.) to ensure compatibility.

The wireless charging device comprised by the object interface may be configured relative to the wireless charging device comprised by the mounting apparatus so that a wireless charging relationship may be maintained between the mounting apparatus and the object when at least one of the object interface or the mounting apparatus is rotated relative to the other of the at least one of the object interface or the mounting apparatus. For example, the receiver coil component 8402 comprised by the object interface 820 and the transmitter coil component 8401 comprised by the mounting apparatus 810 may be configured to be substantially symmetrically disposed about a central axis of the engagement member 814 when the object interface 820 is engaged with the mounting apparatus 810.

Magnet 831 may be configured relative to magnets 830 and magnets 840" so that an attraction force may be produced between magnet 831 and magnets 830 and 840" when the object interface 820 is brought into proximity with the mounting apparatus 810, and magnet 841 may be configured relative to magnet 840' so that an attraction force may be produced between magnet 841 and magnet 840' when the object interface 820 is brought into proximity with the mounting apparatus 810. Therefore, as shown in FIG. 27B, an attraction force produced between the second mounting magnet 840' (one of a plurality of second mounting magnets in this embodiment) and the third mounting magnet (specifically, magnet 841 in this embodiment) may cause engagement between the second mounting magnet 840' and the third mounting magnet, and a depth defined by the engagement member 814' may be configured relative to a charging range defined by the transmitter coil component 8401 so that the receiver coil component 8402 may be within the charging range of the transmitter coil component 8401 when the second mounting magnet 840' and the third mounting magnet are engaged. Proximity of the receiver coil component 8402 to the transmitter coil component 8401 within the charging range of the transmitter coil component 8401 may establish a wireless charging relationship between the transmitter coil component 8401 and the receiver coil component 8402. The wireless charging relationship established between the transmitter coil component 8401 and the receiver coil component 8402 may be an inductive charging relationship, and an engagement force produced between the second mounting magnet 840' and the third mounting magnet may maintain the position of the receiver coil component 8402 within the charging range of the transmitter coil component 8401.

The central object surface 826 may be configured to support the receiver circuit board (not shown) and a common plug (e.g., a micro-USB plug, etc.; not shown), and the common plug may be configured to be attached to a port of the object to be mounted when the object interface 820 is attached to the object. The interface transmission path 807 may be configured to be attached to each of the receiver coil component 8402, the circuit board, and the common plug. Thus, the object interface 820 may be configured so that energy transferred via the wireless charging relationship may be converted to an electric current by the receiver circuit board and may be transferred to the object via the common plug to charge the object. In this way, the object interface 820 may function as a wireless charging adapter for the object in some embodiments.

As shown in FIGS. 27A and 27B, the second shielding component 8412 may be configured to agree with the first shielding component 8411 so that the receiver coil component 8402 and the transmitter coil component 8401 may be substantially fully enclosed by the second shielding component 8412 and the first shielding component 8411 when the object interface 820 is fully engaged with the mounting apparatus 810. Substantially fully enclosing the receiver coil component 8402 and the transmitter coil component 8401 within an enclosure comprised by the second shielding component 8412 and the first shielding component 8411 may isolate a wireless charging field (e.g., a magnetic field) that is associated with the wireless charging relationship relative to other ferromagnetic components and/or magnetic fields supported by or associated with the mounting apparatus 810 and/or the object interface 820. Said differently, the second shielding component 8412 and the first shielding component 8411 may be configured so that the enclosure comprised by the second shielding component 8412 and the first shielding component 8411 may be configured to guide, block, divert, etc. magnetic fields and/or lines of flux associated with ferromagnetic components of the mounting apparatus (e.g., a mounting magnet, etc.) that may interfere with the wireless charging field so that the wireless charging relationship may be established between the object and the mounting apparatus 810 when the object is engaged with the mounting apparatus 810. Thus, the enclosure comprised by the second shielding component 8412 and the first shielding component 8411 may protect the integrity of the wireless charging field associated with the wireless charging relationship.

In other embodiments of the system, the wireless charging device comprised by the mounting apparatus may be a receiver device (e.g., may comprise a receiver coil component), and the wireless charging device comprised by the object interface may be a transmitter device (e.g., may comprise a transmitter coil component).

In another embodiment, an object interface may be configured to attach to a coil object. The object interface may be configured relative to the mounting apparatus so that a compatible wireless charging component comprised by the object may be positioned within a charging range of the at least one wireless charging device comprised by the mounting apparatus when the object is partially or fully engaged with the mounting apparatus.

In still other embodiments, an object interface may be configured to be attached to a coil object and may comprise a plurality of wireless charging components configured to adapt the functionality of the wireless component comprised by the coil object to a desired position on the object interface. For example, if the object to be mounted is a coil object comprising a receiver coil component that is not in alignment with an axis of symmetry of the coil object, the object interface may comprise a first wireless charging device and a second wireless charging device. The first wireless charging device may be a wireless transmitter device and may be aligned with the receiver component comprised by the coil object, and the second wireless charging device may be a wireless receiver device that is configured to be attached to the first wireless charging device. Thus, the second wireless charging device may be configured to emulate the functionality of the receiver coil component comprised by the coil object while occupying the desired position relative to, for example, a wireless charging device comprised by the mounting apparatus.

In another embodiment, an object interface may be configured to adapt a coil object to a non-wireless charging mounting apparatus, such as the mounting apparatus 610 depicted in FIG. 20A. For example, the object interface may support a charger support, and a first side of the charger support may comprise a wireless transmitter device. The wireless transmitter device may be configured to be in proximity to a wireless receiver component comprised by the coil object when the object interface is attached to the coil object. A second side of the charger support may comprise a plurality of interface connectors, and the plurality of interface connectors may be configured relative to a plurality of apparatus connectors comprised by the mounting apparatus so that an electrical connection may be established between the mounting apparatus and the object interface when the object interface is engaged with the mounting apparatus. Thus, when the object interface is engaged with the mounting apparatus and an electrical connection is established, the charger support may be configured to wirelessly charge the coil object, and the wireless transmitter device comprised by the charger support may be powered by the electrical connection. Such functionality may be desirable when, for example, a mobile electronic device comprises no charging port and a wireless charging and mounting solution is unavailable.

In various embodiments, magnets comprised by the mounting apparatus or the object interface (e.g., via a mounting magnet, a controlling component, a nominal ferrous metal component, etc.) may be configured relative to the at least one wireless charging device so that a wireless charging relationship may be established between the object and the mounting apparatus when the object is engaged with the mounting apparatus. Said differently, components of the mounting apparatus that may interfere with a wireless charging field (e.g., an electromagnetic field) associated with the at least one wireless charging device may be configured relative to the at least one wireless charging device so that the wireless charging field is undisturbed (i.e., functions properly). For example, a first mounting magnet and a second mounting magnet may be positioned relative to the at least one wireless charging device so that a magnetic field associated with a respective one of the first mounting magnet or the second mounting magnet does not substantially interfere with (e.g., overlap) the wireless charging field associated with the at least one wireless charging device. Alternatively or additionally, a mounting apparatus and/or an object interface may be configured (e.g., via the configuration of shielding materials, flux guides, caps, etc.) so that interference from ferromagnetic components and/or magnetic fields comprised by the mounting apparatus and/or the object interface may be substantially prevented.

In still other embodiments, the mounting apparatus may comprise a plurality of wireless charging devices, and each of the plurality of wireless charging devices may be configured according to a wireless charging specification (e.g., Qi, Powermat, etc.). Therefore, a mounting apparatus comprising a plurality of wireless charging devices may support a plurality of wireless charging standards (e.g., the mounting apparatus may be compatible with both Qi and Powermat devices). For example, a wireless charging device supported by the engagement member may be configured according to a first wireless charging specification (e.g., Qi), and a wireless charging device supported by the intermediate surface may be configured according to a second wireless charging specification (e.g., Powermat).

In some embodiments, each of the plurality of wireless charging devices may be positioned relative to a respective one of a plurality of target mounting areas so that a plurality of wireless charging relationships may be established between the mounting apparatus and a plurality of objects to be mounted. Said differently, the mounting apparatus may be configured so that a plurality of objects may be mounted and wirelessly charged simultaneously, and each object may be compatible with a different wireless charging standard.

And in other embodiments, components of the disclosed mounting apparatus may be built into or around an existing wireless charging base station to add mounting functionality to the wireless charging base station.

The mounting apparatus or system may comprise modular components. Thus, in some embodiments, the mounting apparatus may comprise at least one modular component. Likewise, the object interface may comprise at least one modular component.

Any component, feature, group of components, portion, etc. of the mounting apparatus may be configured to be modular. For example, an engagement member, an intermediate surface, a base surface, a controlling component, a first mounting magnet, a second mounting magnet, a housing, a plurality of apparatus connectors, and/or a nominal component may be configured to be a modular component of the mounting apparatus. Likewise, any component, feature, group of components, portion, etc. of the object interface may be configured to be modular in various embodiments. For example, a charger support, a dial (described in more detail below), an interface controlling component, a third mounting magnet, a central object surface, a secondary object surface, a plurality of interface connectors, and/or a nominal component may be configured to be a modular component of the object interface.

The functionality of a mounting apparatus, an object interface, or a system may differ depending on the number and/or type of modular components present with the mounting apparatus, object interface, or system as well as the configuration(s) (e.g., relative positioning, etc.) of the modular component(s). For example, a mounting apparatus comprising a first modular apparatus component may have a first apparatus functionality. The first modular apparatus component comprised by the mounting apparatus may be removed and replaced by a second modular apparatus component, and the second modular apparatus component may be different from the first modular apparatus component. Therefore, the mounting apparatus (i.e., the same mounting apparatus) comprising the second modular apparatus component may have a second apparatus functionality, and the second apparatus functionality may be different from the first apparatus functionality. Likewise, an object interface comprising a first modular interface component may have a first interface functionality, and the object interface comprising a second modular interface component may have a second interface functionality. Moreover, a system comprised by the mounting apparatus and the object interface (as described above) may have a first system functionality (e.g., a mounting functionality resulting from engagement of a mounting apparatus having a first apparatus functionality and an object interface having a first interface functionality), a second system functionality (e.g., resulting from a first apparatus functionality and a second interface functionality), a third system functionality (e.g., resulting from a second apparatus functionality and a first interface functionality), or a fourth system functionality (e.g., resulting from a second apparatus functionality and a second interface functionality) depending on the configurations of the mounting apparatus and the object interface comprising the system.

In one embodiment, a first system functionality may correspond to a first total engagement force between the object interface and the mounting apparatus when the object interface is engaged with (mounted to) the mounting apparatus, a second system functionality may correspond to a second total engagement force, a third system functionality may correspond to a third total engagement force, etc. Therefore, the total engagement force of the system may be adjustable. Likewise, the total engagement force of a mounting apparatus may be adjustable.

Furthermore, in some embodiments, the mounting apparatus may function without the at least one modular apparatus component (e.g. usefully, desirably, and/or in a prescribed manner; though the functionality of the mounting apparatus, including the mounting functionality, may be different). Likewise, in some embodiments, the object interface may function without the at least one modular interface component. Moreover, the system may function without the at least one modular apparatus component and/or without the at least one modular interface component.

In some embodiments, the mounting apparatus may comprise at least one modular component. The engagement member may be configured to be a modular component of the mounting apparatus. Alternatively or additionally, a face of an engagement member or a face of an engagement member component may be configured to be a modular component of the mounting apparatus. In some embodiments, an engagement member component may be configured to be a modular component of the mounting apparatus. For example, at least a portion of a modular engagement member, such as an engagement member component, may comprise a mesh material, such as a mesh configuration of metal chain links or a fabric, and the mesh material may be configured to allow movement of the face of the engagement member and/or the second mounting magnet that a substantially fixed configuration an engagement member component may not.

Moreover, the second mounting magnet may be configured to be a modular component of the mounting apparatus. In some embodiments, the second mounting magnet may be configured to be a modular component of the engagement member. Moreover, the first mounting magnet may be configured to be a modular component of the mounting apparatus. In some embodiments, the first mounting magnet may be configured to be a modular component of the intermediate surface.

Furthermore, in some embodiments, the base surface may be configured to be a modular component of the mounting apparatus. Additionally or alternatively, a controlling component may be configured to be a modular component of the mounting apparatus. The controlling component may be configured to be a fastener in some embodiments.

The mounting apparatus may comprise a bay, and the bay may be configured to be a modular component of the mounting apparatus. Moreover, the mounting apparatus may comprise a plurality of bays in some embodiments.

The mounting apparatus may comprise a modular housing. In some embodiments, the modular housing may be configured to be slideably received by at least a portion of the mounting apparatus, and the modular housing may be configured relative to the at least a portion of the mounting apparatus so that a friction force is produced between the modular housing and the at least a portion of the mounting apparatus when the modular housing is attached to the at least a portion of the mounting apparatus. Moreover, the friction force may be configured so that the modular housing may be releasably attached to the at least a portion of the mounting apparatus without fasteners.

Referring to FIG. 28A, a mounting apparatus 910 is shown, and the mounting apparatus 910 may comprise a plurality of modular components. The mounting apparatus 910 may comprise a modular engagement member 914, and the engagement member 914 may be configured to be releasably attached to an intermediate surface 912. For example, the modular engagement member 914 may be configured to be slideably received by the intermediate surface 912 via a first top opening 991 of the intermediate surface 912 when the engagement member 914 is in the retracted state. Likewise, the engagement member 914 may be removable via the first top opening 991. Alternatively, in some embodiments, the engagement member 914 may be screwed into, snapped into, etc. the intermediate surface 912.

As shown in FIGS. 28A and 28B, the engagement member 914 may be comprised of a plurality of engagement member components (five, in this embodiment) arranged in a nested and telescoping configuration, and a second mounting magnet 940 may be supported by a face 988' of an engagement member component. Therefore, the second mounting magnet 940 may be removable in this embodiment, because it is supported by the engagement member 914, which is configured to be a modular component of the mounting apparatus 910, as noted above.

In some embodiments, the mounting apparatus may comprise a modular second mounting magnet, so the second mounting magnet may be configured to be releasably attached to the engagement member. For example, an engagement member component comprising a second mounting magnet may be configured to be releasably attached to another of the plurality of engagement member components comprising the engagement member. Alternatively or additionally, a face of an engagement member component supporting a second mounting magnet may be configured to be a modular component of the mounting apparatus. For example, the modular face may be screwed, snapped, etc. into and out of an extension of an engagement member component.

The intermediate surface 912 of the mounting apparatus 910 may support a modular first mounting magnet 930, and the first mounting magnet 930 may comprise a holding plate configured to support a plurality of magnets (six, in this embodiment). The holding plate may be comprised of a material that does not respond to magnetism in this embodiment (e.g., rubber, plastic, etc.). The intermediate surface 912 may be configured to slideably receive the first mounting magnet 930 via the first top opening 991 of the intermediate surface 912. Therefore, the first mounting magnet 930 may be removable via the first top opening 991, and, correspondingly, the first mounting magnet 930 may be configured to be a modular component of the mounting apparatus 910 in this embodiment. In other embodiments, the first mounting magnet may comprise a plurality of modular holding plates supporting a plurality of magnets.

The mounting apparatus 910 may comprise a bay 913 that is configured to be releasably attached to the intermediate surface 912 in this embodiment. Correspondingly, the bay 913 may be configured to be a modular component of the mounting apparatus 910. The mounting apparatus 910 may comprise a modular base surface 980, and the base surface 980 may be configured to be releasably attached to the bay 913. In the embodiment depicted in FIG. 28A, the base surface 980 is configured to be releasably attached to the bay 913 via a controlling component 960. Therefore, in this embodiment, the controlling component 960 may be configured to be a fastener. Additionally, the controlling component 960 may be configured to apply a controlling force to the second mounting magnet 940 that is configured to bias the engagement member 914 toward the retracted state.

The mounting apparatus 910 shown in FIG. 28A may comprise a modular housing 982. The modular housing may be configured to fully or partially enclose other components of the mounting apparatus per the application. FIG. 28B shows the mounting apparatus 910 when the engagement member 914 is in the extended state and other components of the mounting apparatus 910 are substantially fully enclosed by the housing 982. The face 988' of the engagement member may be configured to be flush with the housing 982 when the engagement member 914 is in the retracted state. Additional modular housings may be configured in various ways per the application. For example, the modular housing may be configured to define at least one access opening so that the modular housing is configured to allow access to one or more features or components (e.g., ports, input devices, etc.) supported by the mounting apparatus. In some embodiments, the modular housing may support additional features, functionality, and/or components of the mounting apparatus such as wireless data antennas, wireless radios, input devices, and/or additional components that may be substantially similar to or may be configured to support the functionality of the components of the mounting apparatus (e.g., any feature or component of the mounting apparatus, listed in greater detail below). In other embodiments, the modular housing may be comprised of a relatively soft and pliable material, such as rubber, so that the modular housing is configured to protect the mounting apparatus against sudden impacts such as drops, knocks, or vibrations. And in still other embodiments, the modular housing may be configured to support fasteners for attaching the mounting apparatus to the mounting surface per the application.

Referring again to FIG. 28A, the bay 913 may be configured to support an interchangeable component 981, and the bay 913 may be configured to slideably receive the interchangeable component 981 via a second top opening 992 of the bay 913. Therefore, the interchangeable component 981 may be configured to be removable via the second top opening 992 (the interchangeable component 981 is shown in a partially-inserted state in FIG. 28A for purpose of illustration). In some embodiments, the bay may be configured to support a plurality of interchangeable components. In one embodiment, the bay may be configured to receive any of a field manipulation component, a card, or the first mounting magnet, and the bay may adapt the interchangeable component to one or more components of the mounting apparatus. For example, the bay may comprise a plurality of electrical connectors to support the functionality of an interchangeable component that requires an electrical connection with the apparatus transmission path (e.g., a card, etc.). Moreover, the bay may be configured to support plugs, connectors, input-output ports, etc. per the application. Other interchangeable components that do not require an electrical connection, such as a field manipulation component or a first mounting magnet, may be configured to avoid contact with the plurality of electrical connectors comprised by the bay or may be configured using nonconductive components or materials so that the functionality of the apparatus transmission path of the mounting apparatus is substantially unaffected by attachment of the non-electrical interchangeable. In some embodiments, an interchangeable modular apparatus component may be a common component of the mounting system. Accordingly, an object interface may be configured to support the interchangeable modular apparatus component. Likewise, in some embodiments, the mounting apparatus may be configured to support an interchangeable modular interface component. For example, the mounting apparatus may be configured to support a modular charger support, and the modular charger support may be a common component of the mounting system.

The interchangeable component 981 may be configured so that the total engagement force associated with the mounting apparatus or system is changed when the interchangeable component 981 is attached to the mounting apparatus 910 (i.e., when received by the second top opening 992 in this embodiment). For example, the interchangeable component 981 may be a field manipulation component, and the type of the field manipulation component may vary per the application. For example, the field manipulation component may comprise a ferrous metal plate, a plastic plate that is configured to support at least one magnet, an aluminum plate that is configured to support a plurality of ferrous metal caps, etc. per the application. Therefore, the interchangeable component 981 may be configured relative to the first mounting magnet 930 so that the magnetic field associated with the first mounting magnet 930 is substantially changed when the interchangeable component 981 is received by the second top opening 992, and a substantial change in the magnetic field associated with the first mounting magnet 930 may correspond to a change in the total engagement force of the mounting apparatus or the system when the object or the object interface is engaged with the mounting apparatus. In other embodiments, the interchangeable component 981 may be configured relative to other components of the mounting apparatus 910 (e.g., the second mounting magnet 940, the controlling component 960, etc.) and may be configured to alter the functionality of said components (e.g., the movement of the engagement member 914, the strength of the controlling force, etc.).

In some embodiments, the interchangeable component 981 may be configured to be movable between a front limit position and a rear limit position along the line of engagement $L_e$. For example, the interchangeable component that is configured to be movable may be a field manipulation component. When the object is fully engaged with the mounting apparatus 910 and the field manipulation component is in the front limit position, an engagement force produced between the first mounting magnet 930 and the object (or the object interface) may be greater than an engagement force produced between the first mounting magnet 930 and the object (or the object interface) when the object is fully engaged with the mounting apparatus 910 and the field manipulation component is in the rear limit position. Therefore, in some embodiments, the total engagement force may be adjustable via movement of an interchangeable component 981 between a front limit position and a rear limit position. Furthermore, the mounting apparatus 910 may be configured so that the interchangeable component 981 may be movable when the object is engaged with the mounting apparatus 910. Thus configured, a user may, for example, move the field manipulation component to the front limit position so that the object is more securely attached to the mounting apparatus (e.g., so that the total engagement force may be greater, so that a locking engagement force may be created, etc.), and the user may move the field manipulation component to the rear limit position prior to disengaging the object so that disengagement of the object from the mounting apparatus 910 may require less effort.

The mounting apparatus and/or the object interface may comprise at least one card, input device, field manipulation component, battery, power source, power adapter, plug adapter, power port, electromechanical machine, door latch, audio speaker, and/or light (e.g., LED, etc.), and the at least one card, card component, input device, field manipulation component, battery, power source, power adapter, plug adapter, power port, electromechanical machine, door latch, audio speaker, and/or light (e.g., LED, etc.) may be configured to be a modular component of the mounting apparatus or the object interface or may be supported by a modular component of the mounting apparatus and/or the object interface. Correspondingly, a mounting apparatus, an object interface, and/or a mounting system may be configured to be smart in some embodiments. Also, any modular component of a mounting apparatus, an object interface, and/or a mounting system may be configured to be smart per the application.

For example, in the embodiment shown in FIGS. 28A and 28B, the interchangeable component 981 may comprise a battery, a power source, a power supply, a power adapter, a card, a card component, a storage drive, a memory card reader, a data port, a power port, a wireless data module (e.g., WiFi module, Bluetooth module, cellular module, etc.), and/or a field manipulation component (as noted above); the base surface 980 may be configured to support a power adapter, a plug adapter, a battery, a power source, a power supply, a memory card reader, a data port, a power port, a mounting fastener, and/or a mounting adapter; the engagement member 914 may be configured to support at least one wireless data component, wireless data module, tactile sensor, and/or light; the intermediate surface 912 may be configured to support at least one proximity sensor, tactile sensor, motion detector, digital camera, wireless data component, cellular data component, wireless data module, ambient light sensor, and/or light; the first mounting magnet 930 may be configured to support at least one wireless data component; and the housing 982 may be configured to support at least one proximity sensor, tactile sensor, motion detector, digital camera, wireless data component, wireless data module, ambient light sensor, and/or light.

Furthermore, the mounting apparatus and/or the object interface may be configured so that a first modular component comprising a first functionality may be interchangeable with a second modular component comprising a second functionality. For example, each of the first top opening 991 and the second top opening 992 may be configured to receive either of the first mounting magnet 930 or an interchangeable component 981. Accordingly, in some embodiments, the intermediate surface 912, the bay 913, and/or the interchangeable component 981 may be a field manipulation component configured to shield a card or a card component from the magnetic influence of the first mounting magnet 930, the second mounting magnet 940, and/or other components of the mounting apparatus 910. Likewise, an object interface may comprise a field manipulation component, and the field manipulation component may be configured so that the object, such as an audio speaker, is shielded from the magnetic influence of the mounting apparatus.

Some modular components of a mounting apparatus or an object interface may require electricity. Therefore, a modular apparatus component may be configured relative to the mounting apparatus so that an electrical connection may be established between the modular apparatus component and the mounting apparatus when the modular apparatus component is attached to the mounting apparatus. Likewise, a modular interface component may be configured relative to the object interface so that an electrical connection may be established between the modular interface component and the object interface when the modular interface component is attached to the object interface. Correspondingly, a modular apparatus component or a modular interface component may comprise at least one electrical connector, and a mounting apparatus or an object interface may comprise at least one corresponding electrical connector. Alternatively or additionally, a modular apparatus component or a modular interface component may be configured to be powered or charged wirelessly. For example, a modular apparatus component or a modular interface component may comprise a receiver coil component so that the modular apparatus component or the modular interface component may participate in an wireless charging relationship, such as an inductive charging relationship. Moreover, as noted, a mounting apparatus or an object interface may comprise a transmitter coil component, and the transmitter coil component comprised by the mounting apparatus or the object interface may be configured to wirelessly charge modular apparatus components and/or modular interface components comprised by the mounting apparatus, the object interface, and/or the mounting system.

In some embodiments, a modular apparatus component or a modular interface component may be configured to be a common modular component of the mounting system. The mounting apparatus and the object interface may be configured relative to one another and relative to the configuration of the common modular component so that the common modular component may be releasably attached to either of the mounting apparatus or the object interface. Correspondingly, the common modular component may be, for example, removed from the object interface and attached to the mounting apparatus and vice versa. For example, a modular card, a modular mounting magnet, and/or a modular charger support may be a common modular component of the mounting system in some embodiments.

Furthermore, a modular card may be configured so that the modular card may be releasably attached to a substantially identical modular card, and a bay, which may be supported by the mounting apparatus and/or by the object interface (e.g., if a common bay), may be configured to receive one modular card and/or a plurality of modular cards in a releasably-attached configuration. For example, each of a plurality of modular cards may comprise at least one plurality of electrical connectors that is configured to be attached to a corresponding plurality of electrical connectors supported by a substantially identical modular card. In some embodiments, the pluralities of electrical connectors may be configured to be releasably attached magnetically.

Likewise, in some embodiments, each of a plurality of modular apparatus components may be configured to be releasably attached magnetically.

A modular charger support may comprise a card, a transmission path, and a plurality of electrical connectors in some embodiments, and the modular charger support comprising the card, the transmission path, and the plurality of electrical connectors may be configured to be a common modular component of the mounting system. For example, the common charger support may be configured to be an interchangeable component of the object interface and the mounting apparatus, and the common charger support may be supported by the central object surface of the object interface and may be supported by the base surface of the mounting apparatus.

Modular components of the mounting apparatus, the object interface, or the mounting system may be configured to change the functionality of the mounting apparatus, the object interface, or the system per the application. For example, the housing 982 may be comprised of a material that neither influences nor responds to magnetism (such as aluminum, plastic, etc.). Alternatively, in some embodiments, the housing 982 may be configured to respond to magnetism. In either case, the housing 982 may be configured to influence the functionality of the mounting apparatus in a prescribed manner per the application.

For example, the housing 982 may be configured relative to the first mounting magnet 930 so that the magnetic field associated with the first mounting magnet 930 is substantially changed (e.g., a change in the magnetic lines of flux, force curve, strength, etc.). In one embodiment, a plastic housing 982 may support at least one magnet, and the at least one magnet supported by the housing 982 may cooperate with the first mounting magnet 930 so that an attraction force produced between the first mounting magnet 930 and the object (or the object interface) when the housing 982 is attached to the mounting apparatus 910 is greater than an attraction force produced between the first mounting magnet 930 and the object (or the object interface) when the housing is not attached to the mounting apparatus 910. Correspondingly, the total engagement force of the mounting apparatus or system may be greater.

Alternatively, some configurations of the housing 982 may produce a lesser total engagement force between the mounting apparatus and the object. For example, a relatively thicker housing 982 may increase a distance between the first mounting magnet 930 and the object (or the object interface) when the object is engaged with the mounting apparatus 910, and a greater distance between the first mounting magnet 930 and the object may result in a lesser (i.e., weaker) total engagement force. Likewise, the housing 982 may define a curved surface, and the curved surface defined by the housing 982 may increase a distance between the first mounting magnet 930 and the object (or the object interface) when the object is engaged with the mounting apparatus 910. Said differently, a modular housing may be configured so that an air gap between a magnet supported by the mounting apparatus and a magnet supported by the object or the object interface is larger. In still other embodiments, the housing 982 may be comprised of a material that responds to magnetism (e.g., a ferrous metal) so that the housing 982 is a magnet, as previously defined. Additionally or alternatively, the housing 982 may comprise ferrous metal caps that are configured to partially enclose the first mounting magnet 930 (or at least one of a plurality of magnets comprising the first mounting magnet 930). Therefore, the total engagement force of a mounting apparatus and/or a mounting system may be adjustable via the attachment, detachment, or replacement of a modular housing 982.

In fact, because the total engagement force produced between the mounting apparatus and the object (or the object interface) may be determined, in whole or in part, by the relative proximity of the magnets comprised by the mounting apparatus or the mounting system (for example, the distances, depths, air gaps, etc. between the magnets) as well as the respective magnetic field(s) associated with the magnets (e.g., the relative strength, shape, etc. of the magnetic field(s) associated with a magnet and/or group of magnets), the total engagement force of a mounting apparatus or mounting system may be substantially changed via the attachment, detachment, or replacement of any modular component of the mounting apparatus or mounting system.

The mounting apparatus and/or the object interface may be configured so that a first modular component comprising a first functionality may be interchangeable with a second modular component comprising a second functionality. In one embodiment, each of the first top opening 991 and the second top opening 992 may be configured to receive either of the first mounting magnet 930 or an interchangeable component 981. Accordingly, the intermediate surface 912, the bay 913, and/or the interchangeable component 981 may be configured to shield a card or card component from the magnetic influence of the first mounting magnet 930, the second mounting magnet 940, and/or other components of the mounting apparatus 910 in some embodiments.

In this way, the total engagement force of a mounting apparatus or system may be changed by the attachment, detachment, or replacement of any or all of a modular first mounting magnet 930, a modular second mounting magnet 940, a modular controlling component 960, or an interchangeable component 981 in some embodiments.

Various embodiments of an engagement member or a modular engagement member may be configured to enhance the functionality of a mounting apparatus or a mounting system, and a mounting system may be configured so that the mounting process and associated functionality of the mounting apparatus or mounting system may be carried out in various ways per the application. As such, a system for mounting an object to a mounting surface is provided. The system may comprise a mounting apparatus and an object interface, and the object interface may be configured to be attached to an object to be mounted and to the mounting apparatus. The mounting apparatus may comprise an intermediate surface, and the intermediate surface may define a first plane. The mounting apparatus may further comprise an electromechanical engagement member, and the electromechanical engagement member may comprise at least one engagement member component arranged in a nested and telescoping configuration. The at least one engagement member component may define a second plane. The electromechanical engagement member may further comprise an apparatus engagement latch. The object interface may comprise a central object surface, and the central object surface may define an alignment target and an interface latch cavity.

The at least one engagement member component comprised by the electromechanical engagement member of the mounting apparatus may be configured to be movable between an extended state and a retracted state along a line of engagement that intersects the first plane, and the mounting apparatus may be configured so that proximity of the object interface to the mounting apparatus and substantial alignment of the at least one engagement member component and the alignment target defined by the central object surface causes the electromechanical engagement member to bias the at least one engagement member component along the line of engagement.

In one embodiment, proximity of the object interface to the mounting apparatus and substantial alignment of the at least one engagement member component and the alignment target defined by the central object surface may cause the electromechanical engagement member to bias the at least one engagement member component toward the extended state along the line of engagement. Alternatively, in some embodiments, proximity of the object interface to the mounting apparatus and substantial alignment of the at least one engagement member component and the alignment target defined by the central object surface may cause the electromechanical engagement member to bias the at least one engagement member component toward the retracted state along the line of engagement.

The apparatus engagement latch supported by the electromechanical engagement member may be configured to be movable between an extended apparatus engagement latch position and a retracted apparatus engagement latch position along an apparatus latch engagement line. The mounting apparatus may be configured so that the apparatus engagement latch is biased toward the retracted apparatus engagement latch position when the apparatus engagement latch and the interface latch cavity are not substantially aligned along the apparatus latch engagement line, and the mounting apparatus may be configured so that the apparatus engagement latch is biased toward the extended apparatus engagement latch position when the apparatus engagement latch and the interface latch cavity are substantially aligned along the apparatus latch engagement line.

Movement of the at least one engagement member component along the line of engagement may cause the apparatus engagement latch and the interface latch cavity to be substantially aligned so that the object interface and the mounting apparatus may be lockably engaged to produce a first engagement force for mounting the object to the mounting surface.

In some embodiments, the first engagement force may cause the electromechanical engagement member to bias the at least one engagement member component toward the retracted state to produce a second engagement force for mounting the object to the mounting surface. For example, the at least one engagement member may be configured to bias the object interface to engage the intermediate surface of the mounting apparatus to produce the second engagement force.

The at least one engagement member component comprised by the electromechanical engagement member may comprise an extension and a face joined to the extension. In some embodiments, the face of the at least one engagement member component may be configured to support a plurality of apparatus connectors. Alternatively or additionally, the extension of the at least one engagement member component may be configured to support a plurality of apparatus connectors.

Furthermore, in some embodiments, the apparatus engagement latch may be configured to support a plurality of apparatus connectors.

Moreover, in some embodiments, the at least one engagement member component may define a plurality of second planes. Said differently, the electromechanical engagement member may comprise a plurality of engagement member components; the plurality of engagement member components may be arranged in a nested and telescoping configuration; and the plurality of engagement member components may define a plurality of second planes.

The electromechanical engagement member may define an apparatus engagement depth, and the electromechanical engagement member may define the apparatus engagement depth in at least one of the extended state or the retracted state.

In some embodiments of the mounting system, the central object surface may define a cavity, and the cavity may define the alignment target. Also, the cavity may define an object interface depth. Furthermore, the interface latch cavity may be disposed relative to the cavity so that the interface latch cavity may be accessible via the cavity. For example, the object interface may be configured so that the interface latch cavity is accessible to the apparatus engagement latch via the cavity when the mounting apparatus is engaged with the object interface. In other embodiments, the central object surface may comprise an object extension comprising a substantially male configuration, and the object extension comprised by the central object surface may define the alignment target. The object extension comprised by the central object surface may define an object interface depth.

The mounting apparatus may further comprise at least one apparatus input device, and the at least one apparatus input device may be configured to communicate with the electromechanical engagement member. Communication with the electromechanical engagement member may define controlling at least the movement or the functionality of the at least one engagement member component.

The at least one apparatus input device may be a proximity sensor, a camera, etc. And the at least one apparatus input device may be supported by the at least one engagement member component.

The mounting apparatus may be configured so that the at least one apparatus input device detects the substantial alignment of the at least one engagement member component and the alignment target, and the mounting apparatus may be configured to coordinate movement of the electromechanical engagement member relative to input received by the at least one apparatus input device so that the at least one engagement member component may define a predefined apparatus engagement depth relative to the object interface depth defined by the object interface.

Furthermore, the mounting apparatus may be configured to coordinate movement of the electromechanical engagement member relative to input received by the at least one apparatus input device so that the apparatus engagement latch and the interface latch cavity are substantially aligned along the apparatus latch engagement line during the engagement process.

In some embodiments, the apparatus engagement latch may define a latch plane. The latch plane defined by the apparatus engagement latch may be configured to be substantially parallel to the second plane defined by the at least one engagement member component. In some embodiments, the apparatus engagement latch may be configured to be movable in a direction that corresponds to the line of engagement.

The mounting apparatus may be configured so that the latch plane defined by the apparatus engagement latch is movable to a position wherein the latch plane defined by the apparatus engagement latch and the second plane defined by the at least one engagement member component substantially coincide.

In some embodiments, the apparatus engagement latch may comprise a plurality of engagement member latches. Each of the plurality of engagement member latches may be configured to be movable between a respective extended apparatus engagement latch position and a respective retracted apparatus engagement latch position along a respective apparatus latch engagement line.

The object interface may be configured relative to the mounting apparatus so that the apparatus engagement latch is magnetically biased toward the extended apparatus engagement latch position when the apparatus engagement latch and the interface latch cavity are substantially aligned.

The object interface may be configured relative to the mounting apparatus so that the apparatus engagement latch is mechanically biased toward the extended apparatus engagement latch position when the apparatus engagement latch and the interface latch cavity are substantially aligned. For example, the electromechanical engagement member may be configured to mechanically bias the apparatus engagement latch toward the extended apparatus engagement latch position when the apparatus engagement latch and the interface latch cavity are substantially aligned so that the object interface and the mounting apparatus are lockably engaged.

The mounting apparatus may be configured to support a first mounting magnet, and the first mounting magnet may be supported by the intermediate surface. The first mounting magnet may comprise a plurality of electromagnets. The magnetic field produced by the first mounting magnet may be configured to be adjustable. For example, the magnetic force produced by the first mounting magnet may be configured to be dynamically strengthened or weakened. Additionally or alternatively, the first mounting magnet may be configured to be switched on and off.

Moreover, the electromechanical engagement member may be configured to support a second mounting magnet. The second mounting magnet supported by the electromechanical engagement member may comprise at least one electromagnet. The magnetic field produced by the second mounting magnet supported by the electromechanical engagement member may be configured to be adjustable. For example, the magnetic force produced by the second mounting magnet may be configured to be dynamically strengthened or weakened. Additionally or alternatively, the second mounting magnet may be configured to be switched on and off.

The electromechanical engagement member may be configured to be a modular component of the mounting apparatus. Likewise, the first mounting magnet may be configured to be a modular component of the mounting apparatus, and the second mounting magnet may be configured to be a modular component of the mounting apparatus.

At least one of the first mounting magnet or the second mounting magnet may be configured to guide the substantial alignment of the at least one engagement member component and the alignment target.

As previously noted, in some embodiments, the mounting apparatus or the mounting system may be configured to ready the mounting apparatus for engagement and/or change the way the mounting apparatus may be engaged.

The object interface may further comprise at least one short-range wireless data transfer device. Likewise, the mounting apparatus may further comprise at least one short-range wireless data transfer device. The at least one short-range wireless data transfer device comprised by the object interface may be an NFC device. Alternatively or additionally, the at least one short-range wireless data transfer device comprised by the object interface may be a Bluetooth device. The mounting apparatus may configured to be smart, and the mounting apparatus may be configured to communicate with the at least one short-range wireless transfer device comprised by the object interface (or the object).

In some embodiments, the mounting apparatus may be configured to wake from a low-power state in response to proximity of at least one of the object interface, the object to be mounted, or a peripheral device.

Furthermore, the object interface may be configured relative to the mounting apparatus so that proximity of the object interface activates at least one of the first mounting magnet or the second mounting magnet so that the at least one of the first mounting magnet or the second mounting magnet is configured to respond to magnetism.

Thus, the at least one of the first mounting magnet or the second mounting magnet may be configured to guide substantial alignment of the alignment target and the at least one engagement member component in response to proximity of the object interface to the mounting apparatus.

The mounting apparatus and the object interface may be configured relative to one another so that the mounting apparatus may identify the object to be mounted (e.g., the object interface depth $d_o$, the weight of the object, etc.) based on input from the at least one short-range wireless data transfer device comprised by the object interface. For example, the object interface (or the object) may be configured to produce a persistent coded signal that identifies the object interface (or the object) to the mounting apparatus, and the mounting apparatus may be configured to adjust a magnetic force associated with at least one of the first mounting magnet or the second mounting magnet to a predefined level relative to the object to be mounted as defined by the coded signal.

The mounting apparatus may be configured so that substantial alignment of the alignment target and the at least one engagement member causes the mounting apparatus to dynamically adjust a magnetic force associated with at least one of the first mounting magnet or the second mounting magnet to a predefined level relative to the object to be mounted.

In some embodiments, the mounting apparatus may be configured so that proximity of the object interface to the mounting apparatus causes the mounting apparatus to dynamically adjust a magnetic force associated with at least one of the first mounting magnet or the second mounting magnet to a predefined level relative to the object to be mounted.

And in some embodiments, the mounting apparatus may be configured so that engagement between the object interface and the mounting apparatus causes the mounting apparatus to dynamically adjust a magnetic force associated with at least one of the first mounting magnet or the second mounting magnet to a predefined level relative to the object to be mounted.

The electromechanical engagement member comprised by the mounting apparatus may be configured to support a plurality of apparatus connectors. The plurality of apparatus connectors supported by the electromechanical engagement member may comprise a plurality of apparatus connector subsets. Correspondingly, the mounting apparatus may be configured to support a plurality of electrical connections.

The object interface may be configured to support a plurality of interface connectors. The plurality of interface connectors supported by the object interface may comprise a plurality of interface connector subsets. Correspondingly, the object interface may be configured to support a plurality of electrical connections. Likewise, the mounting system may be configured to facilitate a plurality of electrical connections between the object and the mounting apparatus.

The mounting apparatus may be configured to coordinate movement of the at least one engagement member component comprised by the electromechanical engagement member relative to input received by the at least one apparatus input device so that the plurality of apparatus connectors and the plurality of interface connectors are substantially engaged and at least one electrical connection is established between the mounting apparatus and the object interface when the object is mounted to the mounting apparatus.

The mounting apparatus may be configured to be smart. Accordingly, the electromechanical engagement member may be configured to be smart. Additionally or alternatively, the mounting apparatus may be configured to support a card.

The mounting apparatus may be configured so that at least one authentication communication is required for disengagement of the object interface from the mounting apparatus to occur. For example, the mounting apparatus may configured to lock the apparatus engagement latch in the extended apparatus engagement latch position until a first authentication communication is received. Said differently, the mounting system may be configured so that the object is lockably engaged with the mounting surface until the at least one authentication communication is received by the mounting apparatus, and the mounting apparatus may be readied for disengagement by receipt of the at least one authentication communication so that the mounting apparatus is effectively unlocked by the at least one authentication communication. The at least one authentication communication may be produced by the object, the object interface, and/or a peripheral object per the application.

For example, in one embodiment, the object interface may support a short-range wireless data transfer device, and the short-range wireless data transfer device may be configured to provide a first authentication communication to the mounting apparatus when the short-range wireless data transfer device is within a predefined range of the mounting apparatus. The short-range wireless data transfer device may be a Bluetooth device. In other embodiments, the short-range wireless data transfer device may be an NFC device or a similar technology per the application.

Furthermore, the object interface may support an interface input device, and the interface input device may be configured to provide a second authentication communication to the mounting apparatus when the interface input device receives a predefined input. For example, the interface input device supported by the object interface may be a tactile sensor, and the second authentication communication may be transmitted via an electrical connection established between the object interface and the mounting apparatus.

The second authentication communication may be a persistent signal configured to be persistently transmitted by the object interface in coordination with a persistent tactile input. For example, the persistent signal comprising the second authentication communication may occur when a user touches the object interface (e.g., in anticipation of disengaging the object from the mounting apparatus).

The mounting apparatus may comprise a card, and the card comprised by the mounting apparatus may be configured to receive a plurality of authentication communications from the object interface. The card comprised by the mounting apparatus may be configured to communicate with the electromechanical engagement member to control at least the movement or the functionality of the electromechanical engagement member. In some embodiments, the card comprised by the mounting apparatus may be configured to communicate with the apparatus engagement latch to control at least the movement or the functionality of the apparatus engagement latch. For example, the mounting apparatus may be configured to unlock the apparatus engagement latch when the second authentication communication is received so that the apparatus engagement latch may be movable along the apparatus latch engagement line.

In some embodiments, the electromechanical engagement member may be configured to be smart.

The mounting apparatus may be configured so that a persistent disengaging force applied to the mounted object causes the apparatus engagement latch to be biased toward the retracted apparatus engagement latch position so that the object may be disengaged from the mounting apparatus. In some embodiments, the electromechanical engagement member may be configured to mechanically bias the apparatus engagement latch toward the retracted apparatus engagement latch position in response to the persistent disengaging force.

Thus, the mounting apparatus may be configured to differentiate between a persistent disengaging force and a non-persistent disengaging force, such as a sudden disengaging force caused by a knock, hit, or other unintentional disengaging force applied to the object (e.g., by accident). Said differently, a smart mounting apparatus and/or a smart electromechanical engagement member may be configured to recognize the intention of, for example, a user to disengage the object.

The duration of the persistent disengaging force required to disengage the object may be configured per the application. For example, a mounting system configured for a relatively fragile object may be configured so that the persistent disengaging force required to disengage the object must be applied for ten seconds so that unintentional disengagement is less likely. Alternatively, a mounting system configured for an object that may need to be dismounted as quickly and effortlessly as possible may be configured so that the persistent disengaging force required to disengage the object must be applied for a half-second so that disengagement is a relatively seamless experience for a user.

When an object has been disengaged from the mounting apparatus, the mounting apparatus may be configured to return the at least one engagement member component to an idle state. For example, the electromechanical engagement member may be configured to bias the at least one engagement member component toward the retracted state after the apparatus engagement latch is moved from the extended apparatus engagement latch position to the retracted apparatus engagement latch position. Said differently, the electromechanical engagement member may be configured to be automatically retracted during disengagement.

Thus configured, an object may be lockably engaged with a mounting surface, and a user wearing a peripheral device, such as a wearable device, may approach the mounted object, and proximity of the peripheral device to the mounting apparatus may provide a first authentication communication to the mounting apparatus. When the user touches a tactile input device supported by the object interface in the process of grasping the object, the mounting apparatus may receive a second authentication communication and may unlock the apparatus engagement latch. Thus, the user may apply a disengaging force to disengage the object from the mounting surface. Alternatively, the mounting apparatus may be configured to automatically retract the apparatus engagement latch in and/or eject the object interface from the intermediate surface of the mounting apparatus in response to the second authentication communication.

Moreover, in some embodiments, the mounting apparatus may be configured to bias the apparatus engagement latch toward the retracted apparatus engagement latch position when the second authentication communication and the persistent disengaging force are concurrently received.

In some embodiments, the mounting apparatus may be configured to ready the electromechanical engagement member for disengagement in response to proximity of at least one of the object interface, the object to be mounted, or a peripheral device.

Furthermore, in some embodiments, a portion of the interface latch cavity may be comprised by an object interface latch, and the object interface latch may be configured to be movable along an object interface latch engagement line.

The object interface latch may be configured to be movable along the interface latch engagement line to a position that prevents lockable engagement between the object interface and the mounting apparatus in some embodiments. For example, movement of the object interface latch may effectively close or block the interface latch cavity in some embodiments.

Also, in some embodiments, the mounting apparatus may be configured to be flush when not engaged. Thus, the mounting apparatus may be configured so that the first plane and the second plane substantially coincide when the mounting apparatus is in a disengaged state (e.g., idle).

And in some embodiments, the first plane may be a nominal plane and the intermediate surface may define a curved surface. Likewise, the second plane may be a nominal plane and the face of the at least one engagement member component may define a curved surface in some embodiments.

Referring to FIGS. 28A and 28C, the mounting apparatus 910 may be configured so that the engagement member 914 is interchangeable with an electromechanical engagement member 914R. As noted, the mounting apparatus may be configured so that the apparatus transmission path is integrated throughout the structure of the mounting apparatus so that an electrical connection may be established between each of a plurality of modular apparatus components and the mounting apparatus. Said differently, the plurality of modular apparatus components comprised by the mounting apparatus may be configured relative to one another so that an electrical connection required by any one of the plurality of modular apparatus components may be supported by the mounting apparatus. Correspondingly, the mounting apparatus may be configured so that each of the plurality of modular apparatus components may communicate with any other of the plurality of modular apparatus components. Referring again to FIG. 28A, the mounting apparatus 910 may be configured so that an electrical connection may be established between the electromechanical engagement member 914R and the mounting apparatus when the electromechanical engagement member 914R is attached to the mounting apparatus. In the depicted embodiment, the intermediate surface 912 may support at least one electrical connector configured to establish an electrical connection with a corresponding at least one electrical connector supported by the electromechanical engagement member 914R.

As shown in FIG. 28C, the electromechanical engagement member 914R may comprise an electromechanical assembly of a plurality of engagement member components arranged in a nested and telescoping configuration. For example, the electromechanical engagement member 914R may be configured in a similar manner to that of a motorized telescoping zoom assembly of a digital camera, and the electromechanical engagement member 914R may be configured to support a predefined maximum weight per the application. The face 988'R of one of the plurality of engagement member components may support an apparatus input device, such as a proximity sensor.

The electromechanical engagement member 914R may be configured to be smart and may be configured to respond in a predefined manner to input from the apparatus input device. Input received by the apparatus input device may be processed by a card (an interchangeable component 981) supported by the mounting apparatus 910.

The face 988'R of the electromechanical engagement member 914R may support a plurality of apparatus connectors 905, and the plurality of apparatus connectors 905 may be configured to support/facilitate a plurality of electrical connections between an object to be mounted and the mounting apparatus 910. In one embodiment, the plurality of apparatus connectors 905 may be configured to dynamically adjust the electrical connection type relative to an object interface per the application. In some embodiments, the plurality of apparatus connectors may comprise a plurality of apparatus connector subsets. For example, the plurality of apparatus connectors may comprise a first apparatus connector subset and a second apparatus connector subset. The first apparatus connector subset may be configured to support the passthrough of, for example, a USB Type C connection, and the second apparatus connector subset may be configured to support a mains electrical connection (e.g., AC power). Correspondingly, the electromechanical engagement member may be configured to establish an electrical connection with a plurality of object interfaces supporting interface connectors and/or interface connector subsets that are configured relative to the first apparatus connector subset, the second apparatus connector subset, or both.

The mounting apparatus 910 may be configured so that the position of the electromechanical engagement member 914R may be automatically and dynamically adjusted relative to the proximity of an object to be mounted.

The electromechanical engagement member 914R may comprise an apparatus engagement latch 915, and the apparatus engagement latch 915 may be configured to be motorized and may be configured to be movable between the retracted apparatus engagement latch position and the extended apparatus engagement latch position in response to an electrical signal produced by the mounting apparatus 910. The apparatus engagement latch 915 is shown in the extended apparatus engagement latch position in FIGS. 28C and 28D. Also as shown in FIG. 28D, an object interface 920 (a portion of which is shown in the figure) may define a cavity 975 and an interface latch cavity 974, and the interface latch cavity 974 may be disposed relative to the cavity 975 so that the interface latch cavity 974 may be accessible via the cavity 975.

Additionally, in some embodiments, an electromechanical engagement member, whether modular or non-modular, may be configured to be movable between the extended state and the retracted state in response to an electrical signal only, and the electrical signal may be transmitted by a card supported by the mounting apparatus. For example, the electromechanical engagement member may be configured to be movable only as a result of the electrical signal produced by the card rather than any other influence, including an attraction force produced between the engagement member and the object caused by proximity of the object, as described in previous embodiments. Said differently, though an electromechanical engagement member may be configured to respond to magnetism in some embodiments, the electromechanical engagement member may be configured to resist movement that would, in other embodiments, occur in response to an attraction force produced between the electromechanical engagement member and the object, such that the electromechanical engagement member may be configured to be only electrically operated.

As described, the functionality and configuration of a modular engagement member may vary greatly per the application. Accordingly, a modular configuration of the mounting apparatus may allow a user to switch between a first apparatus functionality and a second apparatus functionality via the exchange of a first modular engagement member and a second modular engagement member per the application.

A modular configuration of the mounting apparatus and/or object interface may provide additional flexibility and benefits as well. For example, the apparatus engagement depth $d_a$, the object interface depth $d_o$, and/or the structural orientation (e.g., a substantially male or female configuration, etc.) of the mounting apparatus or the object interface may be changed per the application via the replacement or interchange of modular apparatus components and/or modular interface components. Additionally or alternatively, the size and/or shape of components or features of the mounting apparatus or object interface; the visual aesthetic of the mounting apparatus or the object interface; and/or the functionality of the mounting apparatus and/or object interface; etc. may be modified via a modular configuration.

In one embodiment, a first modular housing defining a first opening may be replaced with a second modular housing defining a second opening, and a width (e.g. diameter, area of a cross-section, etc.) of the second opening may be different than a width of the first opening. Therefore, the depth, width, functionality, and/or shape of a protruding portion of the engagement member when the engagement member is in the extended state may be changed via attachment of the second modular housing. For example, the second modular housing may be configured so that at least one of a plurality of engagement member components defining the engagement member may be substantially restrained (e.g., not movable) by the second modular housing when the second modular housing is attached to the mounting apparatus, and restraint of the at least one of the engagement member components by the second modular housing may change the depth, width, functionality, and/or shape, of the engagement member when the engagement member is biased toward the extended state. Said differently, the second modular housing may act as a stop feature to the at least one of the plurality of engagement member components, obstructing movement of the at least one of the engagement member components along the line of engagement $L_e$. In other embodiments, a second modular housing may be configured to change the functionality of the mounting apparatus via interaction with at least one of a plurality of engagement members supported by the mounting apparatus. For example, the second modular housing may be configured to substantially restrain, block, cover, engage, etc. at least one of a plurality of engagement members per the application to substantially change the functionality of the mounting apparatus. Additionally or alternatively, attachment of the second modular housing may change the outer limit position OL of the second mounting magnet and, correspondingly, the apparatus engagement depth da of the mounting apparatus in some embodiments. Furthermore, the visual aesthetic of the mounting apparatus (e.g. the color, the material—aluminum vs. plastic vs. wood—etc.) may be changed by the replacement of the first modular housing with the second modular housing.

In another embodiment, a first modular engagement member comprising a substantially male configuration, wherein the engagement member is configured to be substantially flush with the intermediate surface when in the retracted state, may be replaced with a second modular engagement member comprising a substantially female configuration, wherein the engagement member may be configured to form a telescoping receptacle when in the retracted state.

In still other embodiments, the functionality of the mounting apparatus or the mounting system may be substantially changed by the replacement of a modular mounting magnet. For example, a first mounting magnet comprising a plurality of permanent magnets may be replaced with a first mounting magnet comprising a plurality of electromagnets, so the functionality of the mounting apparatus may be substantially changed via the exchange of modular components. For example, the second configuration, including a first mounting magnet comprising a plurality of electromagnets, may allow a magnetic field associated with the first mounting magnet 930 to be adjusted—made stronger, made weaker, turned on and off, etc.—while the first configuration, including a first mounting magnet comprising a plurality of permanent magnets, may not. Moreover, a modular configuration of a mounting apparatus or an object interface may allow components or features, such as electronic components or features, to be upgradeable, which may enhance the value of the mounting apparatus or the object interface over the life of the mounting apparatus or the object interface.

One of skill in the art will appreciate the many embodiments and associated functionalities that may be achieved in a mounting apparatus and/or a mounting system via various configurations of modular components that are like or similar to those disclosed herein.

Moreover, in some embodiments, the mounting apparatus may comprise a door latch component, and the door latch component may be configured so that an extending portion of the door latch component may be movable along a door latch engagement line. An engagement member may be configured relative to the door latch component so that a rotational movement (e.g., clockwise, counterclockwise) of the engagement member is configured to move the extending portion of the door latch along the door latch engagement line. The engagement member may be configured to respond to magnetism and may be configured to be movable between an extended state and a retracted state along a line of engagement. The mounting apparatus may be configured so that the engagement member is biased toward the retracted state so that the engagement member does not protrude from the mounting apparatus when the mounting apparatus is not engaged. An object interface may be configured to be attached to a knob and to the mounting apparatus. The object interface may be configured to respond to magnetism and may define a cavity, and the cavity may be configured relative to the engagement member so that the engagement member may be moved rotationally (e.g., clockwise and/or counterclockwise) when the object interface is engaged with the mounting apparatus. For example, the engagement member may comprise an octagonal extension and a face joined to the extension, and the cavity may comprise a reciprocal octagonal structure that is configured to receive the engagement member when the knob is mounted to the mounting apparatus. An attraction force produced between the object interface and the mounting apparatus may be configured so that proximity of the knob to the mounting apparatus causes engagement between the knob and the mounting apparatus to mount the knob to the mounting apparatus. When the knob is engaged with the mounting apparatus, a torqueing force applied to the knob may operate the door latch component and may move the extending portion of the door latch component along the door latch engagement line. Correspondingly, in one embodiment, the mounting apparatus may be configured relative to a door so that the door latch component functions in a like or similar manner to a standard door latch assembly when the knob is engaged with the mounting apparatus. In another embodiment, the mounting apparatus may be configured relative to a cabinet door so that the door latch component functions in a like or similar manner to a child-proof lock when the extending portion of the door latch is positioned along the door latch engagement line so that the extending portion of the door latch is engaged with an inner portion of the cabinet. In either embodiment, the door latch component may be configured to be operable only when the knob is engaged with the mounting apparatus, and the mounting apparatus may be configured to be flush when the knob is not engaged with the mounting apparatus. Correspondingly, the door latch component comprised by the mounting apparatus may be substantially inoperable (e.g., the door cannot be opened, the cabinet cannot be opened, etc.) when the mounting apparatus is in a disengaged state. Thus, a user may wish to stow, hide, put out of reach, etc. the knob when the user wishes the door, cabinet, etc. to remain inaccessible.

Also, as noted, some embodiments of the object interface may be configured to support modular components that may add functionality to or increase the versatility of the object interface and/or the mounting system. For example, as illustrated above, a charger support may be configured to be a modular component of an object interface. Likewise, an object interface may comprise a variety of other modular components that may influence or change the functionality of a system in various ways.

Referring to FIG. 29, an object interface 620 is shown, and the object interface 620 may be a case for a mobile electronic device. The object interface 620 may comprise a modular dial 6230, and the dial 6230 may be supported by the central object surface 626. The dial 6230 may be configured to be attached to an extension surface 623 of the central object surface. The dial 6230 may be permanently attached or releasably attached to the object interface 620. Thus, the dial 6230 may be configured to be removable (e.g. screwed in/out, snapped in/out, joined by fasteners, etc.). In the embodiment of FIG. 29, the dial 6230 may be threaded on an outside surface 6232 so that the dial 6230 may be releasably attached to (e.g. capable of being screwed into and out of) the extension surface 623, and the extension surface 623 may be correspondingly threaded so that it may receive the dial 6230.

Whether releasably attached or permanently attached, the dial 6230 may be configured to be movable between an outermost limit position OLP and an innermost limit position ILP along a line of movement $L_m$. Thus, the object interface may be configured so that the object interface depth do is adjustable. Likewise, the object interface may be configured so that the total engagement force of the system is adjustable. (The terms outermost limit position and innermost limit position do not make reference to whether a position of the dial 6230 is inside or outside of the object interface 620.) For example, when the dial 6230 is in the outermost limit position OLP, a distance between the third mounting magnet and at least one of the first mounting magnet or the second mounting magnet may be greater than a distance between the third mounting magnet and the at least one of the first mounting magnet or the second mounting magnet when the dial 6230 is in the innermost limit position ILP, and a greater distance between the third mounting magnet and the at least one of the first mounting magnet or the second mounting magnet may correspond with a lesser (e.g. weaker) total engagement force between the object interface and the mounting apparatus when the object interface is fully engaged with (e.g. fully mounted to) the mounting apparatus.

In some embodiments, the dial 6230 may be configured to be moved between the outermost limit position OLP and the innermost limit position ILP via a rotational movement of the dial 6230. For example, a rotational movement of the dial 6230 in a clockwise direction may move the dial toward its outermost limit position OLP, and rotation of the dial 6230 in a counter-clockwise direction may move the dial toward its innermost limit position ILP. The dial 6230 may be configured so that a friction force between the dial 6230 and the central object surface 626 (e.g. produced between the corresponding threading of the outside surface 6232 of the dial 6230 and the extension surface 623 of the central object surface 626 in FIG. 29) may maintain the dial 6230 in a position between the outermost limit position OLP and the innermost limit position ILP (i.e. the dial 6230 may occupy any position between the outermost limit position OLP and the innermost limit position ILP along the line of movement $L_m$). Furthermore, the dial 6230 may be configured so that a torque force required to produce a rotational movement of the dial is greater than a torque force applied by a friction force produced between the dial 6230 and the mounting apparatus when the object interface (or object) is rotated when engaged with the mounting apparatus. Therefore, a dial 6230 that is configured to be movable may be configured so that the dial 6230 may maintain a fixed position when one of the object interface 620 or the mounting apparatus 610 is rotated relative to the other of the object interface 620 or the mounting apparatus 610 when the object interface 620 is engaged with the mounting apparatus 610. For example, the corresponding threading of the dial 6230 and the extension surface 623 may be configured so that a torque force required to produce a rotational movement of the dial 6230 is greater than a torque force applied by a friction force produced between the dial 6230 and the mounting apparatus during a rotational movement of the object interface relative to the mounting apparatus. Thus configured, the dial 6230 may not be movable toward the outermost limit position or the innermost limit position by a friction force produced by rotational movement of the object interface when engaged with the mounting apparatus. Thus, the dial may be configured to maintain a fixed position along the line of movement $L_m$ (e.g. at the innermost limit position, the outermost limit position, or a position therebetween) throughout a rotational movement the object interface when the object interface is engaged with the mounting apparatus.

In other embodiments, the torque force required to produce a rotational movement of the dial 6230 may be configured so that the dial 6230 may be rotated (and, correspondingly, be moved toward the innermost limit position or the outermost limit position) in response to a friction force produced between the dial 6230 and the mounting apparatus during a rotational movement of the object interface (or object) when engaged with the mounting apparatus. Such a configuration may be desired so that the total engagement force of the system may be dynamically increased or decreased in response to the rotational movement of the object and/or object interface when engaged with the mounting apparatus.

In still other embodiments, the dial 6230 may be configured to have a retaining force and/or an extension force, and the retaining force and/or extension force may influence movement of the dial along the line of movement $L_m$. The retaining force may bias the dial 6230 toward the innermost limit position ILP, and the extension force may bias the dial 6230 toward the outermost limit position OLP. In one embodiment, the dial 6230 may be configured to have a spring-loaded catch mechanism. The spring-loaded catch mechanism may be configured to produce the retaining force in response to a first application of an interaction force to the dial 6230 and may be configured to produce the extension force in response to a second application of the interaction force to the dial 6230. Therefore, the dial 6230 may be moved (e.g. toggled) between the innermost limit position ILP and the outermost limit position OLP in response to successive applications of an interaction force to the dial 6230. An interaction force may be applied directly to the dial 6230 by a user when the object interface is not engaged with the mounting apparatus, or, in some embodiments, an interaction force may be applied directly to the dial 6230 by a user when the object interface is engaged with the mounting apparatus. Also, an interaction force may be applied indirectly to the dial 6230 when the object interface is engaged with the mounting apparatus. For example, an interaction force may be applied to a mounted object (or to the object interface), and the interaction force may compress the dial 6230 between the object interface and the mounting apparatus so that the spring-loaded catch mechanism may be activated and may move the dial 6230 to one of the innermost limit position ILP or the outermost limit position OLP. When activation of the spring-loaded catch mechanism causes the dial 6230 to be moved to the innermost limit position ILP in an engaged (e.g. mounted) configuration, the total engagement force may be increased (because the distance between the third mounting magnet and at least one of the first mounting magnet or the second mounting magnet may be decreased). When activation of the spring-loaded catch mechanism causes the dial 6230 to be moved to the outermost limit position OLP in an engaged configuration, the total engagement force may be decreased (because the distance between the third mounting magnet and at least one of the first mounting magnet or the second mounting magnet may be increased). Therefore, the total engagement force of the system may be dynamically changed via an interaction force applied to the object interface (or the object) when the object interface is engaged with the mounting apparatus.

Furthermore, in some embodiments, the spring-loaded catch mechanism comprised by the dial 6230 may be configured to assist, enhance, or otherwise facilitate disengagement of the object from the mounting apparatus. For example, an extension force produced by activation of the spring-loaded catch mechanism of the dial 6230 may effectively serve as an ejection force that may overcome at least a portion of the disengaging force required for disengaging (i.e. dismounting) the object from the mounting apparatus. Therefore, in some embodiments, the dial 6230 may be configured to produce an ejection force.

By adjusting the dial 6230 between the outermost limit position and the innermost limit position ILP, users of the system (in the embodiment shown in FIG. 29, users of a tablet or smartphone case relative to a mounting apparatus) may be able to adjust the strength of the total engagement force produced between the mounting apparatus and the object interface. Therefore, a user who values security (e.g. the peace of mind of a greater total engagement force for holding her tablet computer to the mounting apparatus) and desires a relatively strong total engagement force for holding the object interface to the mounting apparatus may adjust the dial 6230 toward its innermost limit position ILP to facilitate the relatively strong total engagement force. Alternatively, a user who values ease of use (e.g. a more effortless detachment of a tablet computer) and desires a relatively weak total engagement force may adjust the dial 6230 toward its outermost limit position to facilitate the relatively weak total engagement force between the object interface and the mounting apparatus.

In still other embodiments, the dial 6230 may be configured so that the structure (e.g. shape, etc.) of the object interface 620 may be altered. For example, a dial 6230 configured to move between an outermost limit position OLP and an innermost limit position ILP (as described above) may be movable to a position in which a portion of the dial 6230 protrudes from the object interface. The protruding dial 6230 may increase the object interface depth do, and, thus, the object interface may receive a relatively larger portion of the engagement member when engaged with the mounting apparatus. Therefore, the object interface may be configured so that the object interface depth is adjustable. Correspondingly or additionally, one or more engagement member components that may have been retracted when fully engaged with the object interface (e.g. before the dial was moved to the protruding position) may be extended when fully engaged with the object interface when the dial is in a protruding position.

In embodiments wherein the dial 6230 is removable, the structure of the object interface 620 may be altered by removal of the dial 6230, as removal of the dial 6230 may increase the size (e.g., diameter, volume, etc.) of the cavity 675 and/or may alter the structure (e.g. configuration, shape, etc.) of a substantially female receptacle comprised by the object interface. Moreover, the dial 6230 may comprise a plurality of dial components, and each of the plurality of dial components may be configured to be removable. Thus, the structure of the object interface 620 may be altered by the attachment of additional dial components, and the attachment of one or more dial components may decrease the size of the cavity 675, an opening defined by the cavity 675, and/or may alter the structure of the substantially female receptacle. (Like the dial 6230, additional dial components may be permanently or releasably attached.) In some embodiments, the plurality of dial components may be arranged in a nested configuration. For example, referring again to FIG. 29, the dial 6230 may be supported by the object interface 620 as described above, and the dial 6230 may be configured to receive a dial component 6231 that is configured to be releasably attached to an inner surface 6238 of the dial 6230 (e.g. both surfaces may threaded, as described above) so that the dial 6230 and the dial component 6231 are arranged in a nested configuration. Thus, attachment of the dial component 6231 may change the size of the cavity 675 and/or the structure of the female receptacle. Therefore, more or fewer tiers of the mounting apparatus (i.e. engagement member components) may be received by the object interface as a result of the configuration of the dial and/or dial component(s).

In another embodiment, the dial 6230 may comprise a shutter assembly that is configured to change the diameter of the cavity 675 or an opening defined by the cavity 675 (e.g. partially or fully close the cavity 675) when the dial 6230 is rotated. The shutter assembly may function in a like or similar manner to that of an aperture mechanism of a camera. Therefore, the dial 6230 may be configured so that the cavity 675 of the object interface 620 is adjustable. In some embodiments, the dial 6230 and the shutter assembly may be configured relative to a channel 608 of the engagement member 614 of the mounting apparatus 610 (such as that shown in FIG. 19), and the dial 6230 may be configured to be moved (e.g. rotated) so that the shutter assembly may engage the channel 608 when the object interface is engaged with the mounting apparatus.

The additional dial component(s) may define a depth, and the depth of the additional dial component(s) may be different than the depth of the dial 6230. If the depth defined by the additional dial component(s) is less than the depth of the dial 6230, the structure of the cavity may be altered to that of a tiered female receptacle in a telescoping configuration in some embodiments. If the depth defined by the additional dial component(s) is greater than the depth of the dial 6230, the structure of the cavity may be altered to that of a tiered male telescope in a telescoping configuration (for example, a shape that may be similar to that of the engagement member of the mounting apparatus when the engagement member comprises a plurality of engagement member components and is in the extended state, as shown in previous embodiments). Thus, the attachment of additional dial component(s) may alter (e.g. increase/strengthen or decrease/weaken) the total engagement force of the system because the distance(s) between the third mounting magnet and at least one of the first or second mounting magnets may be altered, as described above, depending on the configuration of the additional dial component(s). Furthermore, each of a plurality of dial components may be configured to be movable between a respective innermost limit position and a respective outermost limit position.

Importantly, the dial (and, optionally, additional dial components) of the object interface 620 may also be configured in a like or similar manner to an engagement member (including those embodiments of the engagement member that comprise engagement member components), because each of a plurality of dial components may be configured to respond to magnetism and may be configured to be movable between a respective innermost limit position and a respective outermost limit position (as described above). Also, as noted, the plurality of dial components may be arranged in a nested configuration and/or a telescoping configuration. Thus, in some embodiments, the object interface may comprise some or all of the components of a mounting apparatus and/or may function in similar manner to a mounting apparatus. Accordingly, and as previously noted, like or similar embodiments of the mounting apparatus may be applied to two or more bodies (e.g., a mounting surface and a mobile device case, in the above example) and may be attached one to the other to join the bodies together, as is evident in consideration of many of the disclosed embodiments.

In still other embodiments, the facing surface 6235 of the dial 6230 may be configured to rotate independently of the central object surface 626 (or independently of all other components of the object interface 620, in some embodiments), and the facing surface 6235 may be configured to rotate about the axis of symmetry Y of the object. (In some embodiments, the axis of symmetry Y may substantially correspond to the central axis X of the engagement member of the mounting apparatus when the object interface is engaged with the mounting apparatus.) Therefore, the object interface 620 may be configured to reduce kinetic friction between the object interface 620 and at least one of the engagement member or the intermediate surface when the object interface 620 is rotated about the axis of symmetry Y of the object when the object interface 620 is engaged with the mounting apparatus. Said differently, the facing surface 6235 of the dial 6230 may be configured to maintain a fixed position when engaged with the mounting apparatus via a static friction force produced between the facing surface 6235 of the dial 6230 and at least one of the intermediate surface or the engagement member of the mounting apparatus when the object interface is rotated about the axis of symmetry Y. Therefore, the object interface may be configured to reduce or substantially eliminate frictional wear on at least one of the object interface or the at least one of the intermediate surface or the engagement member of the mounting apparatus when the object interface is rotated relative to the mounting apparatus when engaged with the mounting apparatus.

Additionally, in some embodiments, the dial 6230 may be configured to respond to magnetism. For example, the dial 6230 may support at least one magnet, and the at least one magnet may be configured to attract (or to repel) one or more components of the mounting apparatus. In some embodiments, the dial 6230 may support the third mounting magnet of the object interface 620.

In still other embodiments, the object interface 620 may be configured to attach to a substantially flush surface that is configured to respond to magnetism. The substantially flush surface may be a surface of the mounting apparatus and/or may be a piece of ferrous metal, a refrigerator, a wall, etc.

The third mounting magnet may be configured relative to the substantially flush surface so that it may support the weight of the object interface 620 and the object when the dial 6230 is engaged with the substantially flush surface. In one embodiment, the facing surface 6235 of the dial 6230 may support the third mounting magnet, and the third mounting magnet may comprise at least one correlated magnet. The at least one correlated magnet may be configured to resist a sliding movement (e.g. a substantially parallel movement relative to the plane of the substantially flush surface that may be aligned with the force of gravity, in some embodiments) when the facing surface 6235 of the dial 6230 is engaged with the substantially flush surface, and resistance to the sliding movement may support the weight of the object interface 620 and the object against the force of gravity when the dial 6230 is engaged with the substantially flush surface. In such embodiments, the holding strength (e.g. resistance to the sliding movement) of the at least one correlated magnet may be configured relative to the substantially flush surface and to the weight of the object (and object interface) so that the object interface supports the weight of the object when engaged with the substantially flush surface.

Therefore, in some embodiments, the object interface 620 may comprise a third mounting magnet that is configured to support the weight of the object when the object interface 620 is substantially flushly engaged with the mounting apparatus (i.e. when the engagement member is substantially flush with, or recessed within, the intermediate surface and/or is otherwise not received by the cavity 675 of the object interface 620).

Moreover, a dial 6230 comprising the at least one correlated magnet may be configured to rotate independently of the central object surface 620. Thus, an object interface 620 comprising a third mounting magnet (e.g., a correlated magnet) that is configured to support the weight of an object may facilitate a rotational movement of the object when the object interface 620 is engaged with a substantially flush surface. In such an embodiment, the dial 6230 may occupy a substantially fixed position relative to the substantially flush surface via engagement of the at least one correlated magnet with the substantially flush surface, and the object interface 620 may rotate about the substantially fixed position of the dial 6230 when the object interface 620 is engaged with (e.g., mounted to) the substantially flush surface.

In still other embodiments, the object interface 620 may be configured to have a substantially flush surface that is configured to attach to the engagement member 614 of the mounting apparatus 610 when the engagement member 614 is in the retracted state, and the engagement member 614 may support at least one correlated magnet that is configured to engage the substantially flush surface of the object interface 620. The at least one correlated magnet comprised by the engagement member 614 may be configured to support the weight of the object interface and the object (i.e. resist a sliding force, as described above) when the object interface 620 is engaged with the mounting apparatus 610. Furthermore, the engagement member 614 may be configured to rotate about a central axis X when in the retracted state. Therefore, a mounted object may be rotated about the central axis X of the engagement member 614 when engaged with the at least one correlated magnet of the engagement member 614.

Configurations of the system, the mounting apparatus, and/or the object interface that allow for a rotational movement of a mounted object may be desirable, because many modern portable electronic devices (tablet computers, smartphones, displays, etc.) feature automatic reorientation of displayed content in response to a change in orientation (e.g. a rotational movement) of the devices. Therefore, users of modern portable electronic devices may be accustomed to routinely rotating the devices during normal use, so configurations of the system, mounting apparatus, and/or object interface that allow for easy and convenient rotation of the mounted object may provide a more seamless use experience for portable device users.

Furthermore, in some embodiments, the dial 6230 may be joined to the third mounting magnet 641, and the dial 6230 and the third mounting magnet 641 may be configured to rotate independently of the central object surface 626 (and/or independently of all other components of the object interface 620, in some embodiments). In still other embodiments, the dial 6230 may be configured to be attached to the third mounting magnet 641 and the central object surface 626 so that the dial 6230 may rotate independently of the third mounting magnet 641 and may rotate independently of the central object surface 626 (e.g. the dial, the third mounting magnet, and the central object surface all may move independently of one another despite being attached to one another). In other embodiments, the dial 6230 may be configured to be joined to the third mounting magnet 641 so that rotation of the dial 6230 substantially corresponds to rotation of the third mounting magnet 641 (i.e. they rotate together, or the object interface 620 may be rotated while the dial 6230 and the third mounting magnet 641 remain stationary when engaged with the mounting apparatus 610). Such a configuration (e.g. corresponding rotation between the dial and the third mounting magnet) may be desired when, for example, the third mounting magnet 641 comprises a plurality of magnets that are configured to substantially align with a corresponding plurality of magnets comprised by the first mounting magnet supported by the intermediate surface of the mounting apparatus, and wherein alignment of the plurality of third mounting magnets and the plurality of first mounting magnets may be required to produce a total engagement force when the object interface is mounted to the mounting apparatus.

Although the dial 6230 and additional dial component 6231 shown in FIG. 29 have a circular cross section, a dial and/or additional dial component(s) may have a rectangular, hexagonal, etc. cross section in various embodiments.

Referring to FIG. 30, a system 1000 is provided for mounting an object to a mounting surface. The system 1000 may comprise a mounting apparatus 1010 and an object interface 1020. The mounting apparatus 1010 may be configured to be attached to a mounting surface, such as a VESA mount that is configured to support a television, and the object interface 1020 may be configured to be attached to an object to be mounted, such as a television that is configured to attach to the VESA mount, via four attachment supports 1007.

The mounting apparatus 1010 may comprise an intermediate surface 1012 that is configured to respond to magnetism by supporting a first mounting magnet in a first plane. The first mounting magnet may comprise a plurality of magnets in this embodiment. Also, as shown, the mounting apparatus 1010 may comprise a plurality of engagement members.

A first engagement member may comprise a plurality of engagement member components, 1014' and 1014", arranged in a nested configuration. A second engagement member 1014 may be configured to be movable between an extended state and a retracted state along a line of engagement that intersects the first plane. The second engagement member 1014 may support a second mounting magnet (one of a plurality of second mounting magnets in this embodiment). The second mounting magnet may define an outer limit position when the second engagement member 1014 is in the extended state, and the second mounting magnet may define a base limit position when the second engagement member 1014 is in the retracted state. A controlling component (not shown) may be supported by a base surface (not shown) of the mounting apparatus 1010, and the controlling component may be configured to apply a controlling force to the second mounting magnet supported by the second engagement member 1014 that may bias the second engagement member 1014 toward the retracted state.

The second engagement member 1014 may comprise an extension 1098 and a face 1088 joined to the extension 1098. The extension 1098 comprised by the second engagement member 1014 may comprise a first extension portion 1098' and a second extension portion 1098", and the second engagement member 1014 may be configured to structurally support the object via engagement of the object interface 1020 with at least a portion of the extension, 1098' or 1098". The extension 1098 may be configured to bear at least a portion of the weight of the object to be mounted. Furthermore, the extension 1098 comprised by the first extension portion 1098' and the second extension portion 1098" may be configured to have stop features 1050, and the stop features 1050 may be configured relative to the intermediate surface 1012 and the base surface (not shown) so as to define the outer limit position and the base limit position of the second mounting magnet supported by the second engagement member 1014 (and, likewise, the extended state and the retracted state of the engagement member 1014).

The object interface 1020 may comprise a central object surface 1026 and a secondary object surface 1024 that is spaced from the central object surface 1026. The object interface 1020 may support a plurality of third mounting magnets. Accordingly, the central object surface 1026 may support a third mounting magnet in a third plane, and the secondary object surface may be configured to respond to magnetism by supporting a third mounting magnet in a fourth plane. In this embodiment, one of the plurality of third mounting magnets may be the secondary object surface 1024, because the secondary object surface 1024 may comprise a ferrous metal plate. Likewise, the central object surface 1026 may be one of the plurality of third mounting magnets in this embodiment, because the central object surface 1026 may comprise a ferrous metal plate and a permanent magnet attached to the ferrous metal plate.

The central object surface 1026 may comprise an extension surface 1023, and the extension surface 1023 may be comprised of a first extension surface portion 1023' and a second extension surface portion 1023". The extension surface 1023 may be configured to be attached to the secondary object surface 1024 so that the secondary object surface 1024 and the central object surface 1026 may be joined by the extension surface 1023. A width (e.g., a diameter, in this embodiment) of the first extension surface portion 1023' may be different from a width of the second extension surface portion 1023". In this embodiment, the width of the second extension surface portion 1023" may be less than the width of the first extension surface portion 1023' (i.e., the diameter of the second extension surface portion 1023" may be less than the diameter of the first extension surface portion 1023').

When the object is mounted to the mounting apparatus 1010, proximity of the central object surface 1026 to the mounting apparatus 1010 may produce an attraction force between the central object surface 1026 and each of the plurality of engagement member components, 1014' and 1014", that may cause engagement between the central object surface 1026 and the first engagement member, and proximity of the secondary object surface 1024 to the mounting apparatus 1010 may produce an attraction force between the secondary object surface 1024 and the second engagement member 1014 that may cause engagement between the secondary object surface 1024 and the second engagement member 1014.

The third mounting magnet supported by the central object surface 1026 may be configured relative to the second mounting magnets supported by the first engagement member, 1014' and 1014", so that the object interface 1020 may substantially self-align with the mounting apparatus 1010 prior to engagement.

The mounting apparatus 1010 may be configured so that a front surface of the mounting apparatus 1010 (e.g., a target mounting area comprised by the intermediate surface 1012 and the plurality of engagement members) is substantially flush when the first engagement member, 1014' and 1014", and the second engagement member 1014 are in the retracted state, and the mounting apparatus 1010 may be configured so that the first engagement member, 1014' and 1014", and the second engagement member 1014 are in the retracted state when the mounting apparatus 1010 is idle. The mounting apparatus 1010 may be configured so that a second apparatus engagement depth $d_a$ is defined between the second engagement member 1014 and the first engagement member, 1014' and 1014", (and, correspondingly, the intermediate surface 1012 in this embodiment) when the second engagement member 1014 is in a respective extended state and the first engagement member, 1014' and 1014", is in a respective retracted state. The object interface 1020 may be configured so that an object interface depth $d_o$ is defined, and a depth between the central object surface 1026 and the secondary object surface 1024 may define the object interface depth $d_o$. The central object surface 1026— the depths defined by the first extension surface portion 1023' and the second extension surface portion 1023" of the central object surface as well as the width (e.g., diameter) defined by the central object surface 1026—and the object interface depth d$_o$ may be configured relative to the second engagement member 1014—the depths defined by the first extension portion 1098' and the second extension portion 1098" of the second engagement member 1014—and the second apparatus engagement depth d$_a$ so that the central object surface 1026 may be received by the second engagement member 1014 when the second engagement member 1014 is in the extended state, wherein receiving the central object surface 1026 may cause the object interface 1020 to be seated by the mounting apparatus 1010. Seating of the object interface 1020 may comprise structurally supporting the object, and the mounting apparatus 1010 may be configured to structurally support the object via engagement of the first extension surface portion 1023' of the central object surface 1026 with the second extension portion 1098" of the second engagement member 1014 and/or via engagement of the second extension surface portion 1023" of the central object surface 1026 with the first extension portion 1098' of the second engagement member 1014.

Furthermore, the first mounting magnet and the second mounting magnet may be configured relative to the plurality of third mounting magnets so that a total engagement force produced between the mounting apparatus 1010 and the object interface 1020 may facilitate a movement of the object interface 1010 in a direction corresponding to the force of gravity during the mounting process so that the central object surface 1026 may be received by the second engagement member 1014 and, correspondingly, the object interface 1020 may be seated by the mounting apparatus 1010 when the object interface 1020 is engaged with the mounting apparatus 1010. Said differently, the total engagement force may be configured relative to the weight of the object to be mounted so that the object interface 1020 may be slideably moved along the target mounting area of the mounting apparatus 1010 so that the central object surface 1026 may be received by the second engagement member 1014 and, correspondingly, the object interface 1020 may be seated by the mounting apparatus 1010 when the object interface 1020 is fully engaged with the mounting apparatus 1010.

Therefore, in the embodiment depicted in FIG. 30, when the object is mounted to the mounting apparatus 1010, proximity of the central object surface 1026 to the mounting apparatus 1010 may cause the central object surface 1026 to substantially self-align with the first engagement member so that a central axis of the central object surface 1026 may be substantially aligned with a central axis of the engagement member component 1014'. Also, proximity of the central object surface 1026 to the mounting apparatus 1010 may produce an attraction force between the central object surface 1026 (e.g., a third mounting magnet) and the first engagement member (e.g., a second mounting magnet) that may cause engagement between the surface face 1022 of the central object surface 1026 and the engagement member component 1014'. Additionally, proximity of the secondary object surface 1024 to the second engagement member 1014 may produce an attraction force between the secondary object surface 1024 (e.g., a third mounting magnet) and the second engagement member 1014 (e.g., a second mounting magnet) that may cause engagement between the secondary object surface 1024 and the face 1088 of the second engagement member 1014 (e.g., the second engagement member 1014 may be moved toward the extended state so that engagement occurs). Moreover, proximity of the secondary object surface 1024 to the intermediate surface 1012 may cause an attraction force to be produced between the secondary object surface 1024 (e.g., a third mounting magnet) and the intermediate surface 1012 (e.g., the first mounting magnet), and the object interface 1020 may be moved further along the line of engagement in a direction toward the intermediate surface 1012. Further movement of the object interface 1020 in a direction toward the intermediate surface 1012 may cause the first engagement member, 1014' and 1014", to be moved toward the retracted state. Furthermore, the object interface 1020 may be slideably moved so that the central object surface 1026 may be received by the second engagement member 1014 and, correspondingly, the object interface 1020 may be seated by the mounting apparatus 1010. The object interface 1020 may be slideably moved by a user and/or by the force of gravity until the object interface 1020 is seated by and, therefore, structurally engaged with the mounting apparatus 1010.

When seated, the object interface 1020 may resist a disengaging movement in a direction corresponding to the line of engagement until the weight of the object is offset (e.g., the object is lifted) by application of a lifting force (e.g., that is substantially opposite the force of gravity) that may unseat the object interface 1020 from the mounting apparatus 1010 so that the object interface 1020 may then be disengaged from the mounting apparatus 1010 along the line of engagement in stages, as previously described. Thus, the system 1000 may be configured so that a weight of the object to be mounted may be utilized to provide additional security (i.e., structural security) to a mounted object. Furthermore, as shown in FIG. 30, whether seated via engagement of the first extension surface portion 1023' with the second extension portion 1098" of the second engagement member 1014 or via engagement of the second extension surface portion 1023" with the first extension portion 1098' of the second engagement member 1014, the mounted object may be rotated about the central axis of the central object surface when the object interface 1020 is fully engaged with (i.e., engaged and seated, in this embodiment) the mounting apparatus 1010.

The mounting apparatus 1010 may be engaged by a wide variety of object interfaces and, thus, may be utilized within a variety of systems in addition to the system 1000. For example, in addition to the object interface 1020, the mounting apparatus 1010 may be compatible with a like or similar embodiment of the object interface 620 shown in FIG. 19. Thus, the object interface 620 may engage and disengage the mounting apparatus 1010 via the engagement member component 1014' in a like or similar manner to the engagement and disengagement of the object interface 620 with the engagement member 614 shown in FIG. 19, because the cavity 675 comprised by the central object surface 626 may be configured to agree with only the engagement member component 1014'. Therefore, the object interface 620 may be configured to receive only the engagement member component 1014' during the mounting process, and the other components of the mounting apparatus (e.g., the second engagement member 1014 and the engagement member component 1014") may be substantially retracted relative to the engagement member component 1014' when the object interface 620 is fully engaged with the mounting apparatus 1010. Furthermore, in another embodiment, an object interface may be configured to receive the engagement member component 1014" and the second engagement member 1014, together, and the engagement member component 1014' may be substantially retracted relative to the engagement member component 1014" and the second engagement member 1014 when the object interface is fully engaged with the mounting apparatus 1010.

Moreover, in a like or similar embodiment to that depicted in FIG. 30, the roles of the mounting apparatus 1010 and the object interface 1020 may be effectively reversed. For example, the object interface 1020 may be configured to be attached to a VESA mount, and the mounting apparatus 1010 may be substantially inverted relative to the orientation shown in FIG. 30 and, thus, may be configured to be attached to a television for mounting the television to the VESA mount. Thus configured, the second engagement member 1014 comprised by the mounting apparatus 1010 may function in a similar manner to the hanger 477 depicted in FIG. 13 when fully engaged with the object interface 1020.

As noted, a mounting apparatus, an object interface, and/or a mounting system may be configured to support the exchange of data via one or more wireless data transfer devices and/or electrical connections and may be configured to be smart in various embodiments. Accordingly, a plurality of mounting apparatuses may comprise an apparatus communication system. Referring to FIG. 31, an embodiment of an apparatus communication system 1100 is provided.

Also as previously noted, the mounting method disclosed herein may be applied to an existing body, or a portion of an existing body, so that the body is modified to achieve the desired functionality of the mounting apparatus. Also as previously noted, and as previously illustrated in FIGS. 17A and 17B, embodiments of the mounting apparatus may themselves be mounted to other, known mounting apparatuses to enhance the functionality of the known mounting apparatuses so that the mounting apparatus may be considered to be a mounting interface for the known mounting apparatus. The system depicted in FIG. 31 shows two such examples/embodiments.

As shown in FIG. 31, the mounting method may be applied to a device box (i.e., switch box, pattress box, etc.) so that the device box is modified to achieve the desired functionality of the mounting apparatus and to enhance the functionality of the device box. Accordingly, a mounting apparatus 1110A is provided, and the mounting apparatus 1110A may comprise an intermediate surface and a plurality of engagement members, shown in the retracted state, configured relative to a device box housing 1182.

Also as shown in FIG. 31, an embodiment of the mounting apparatus may be mounted to another, known mounting apparatus (e.g., an Edison screw, in this embodiment) to enhance the functionality of the known mounting apparatus so that the mounting apparatus may be considered to be a mounting interface for the known mounting apparatus. Accordingly, a mounting apparatus 1110B is provided, and the mounting apparatus 1110B may be configured in like or similar manner to the mounting apparatus 910 and may comprise a modular engagement member, shown in the extended state, and a modular Edison screw configured to be releasably attached to the base surface of the mounting apparatus 1110B. The mounting apparatus 1110B may comprise a heat diffuser or a modular heat diffuser component in some embodiments.

Said differently, the mounting method may be applied to an electric lamp, or a portion of an electric lamp (e.g., an Edison screw, in FIG. 31), so that the electric lamp is modified to achieve the desired functionality of the mounting apparatus. For example, in one embodiment, a mounting system may comprise a mounting apparatus, configured in a like or similar manner to the mounting apparatus 1110B, and an object interface configured to be attached to the object to be mounted (e.g., the lamp portion of the electric lamp) and to the mounting apparatus so that the electric lamp is modified to achieve the desired functionality of the mounting apparatus. Such a configuration of a mounting system may allow a user to quickly and easily attach and detach a lamp from a standard, electric lamp mounting socket. Furthermore, such a configuration may allow other objects that are configured with compatible object interfaces to be mounted to the standard, electric lamp mounting socket and receive electricity and data via the standard, electric lamp mounting socket in some embodiments.

Communication amongst a plurality of mounting apparatuses comprising an apparatus communication system may range from relatively simple communication to relatively complex communication per the application and relative to the respective configurations of each of the plurality of mounting apparatuses comprising the system. For example, the mounting apparatuses comprising an apparatus communication system may be configured to communicate via wired (e.g., Ethernet, powerline, etc.) or wireless connections; via simplex, duplex, multiplex, etc. communication; via one or more networks; and/or via any feasible connection or combination of connections per the application. In some embodiments, one or more of the mounting apparatuses comprising the apparatus communication system may be configured to be smart.

Referring again to FIG. 31, the apparatus communication system 1100 may be configured for simplex communication between the mounting apparatus 1110A and the mounting apparatus 1110B. The engagement member 1114c comprised by the mounting apparatus 1110A may be configured to function as a tactile input device (e.g., a push-button, a push switch, a resistive or capacitive touch sensor, etc.). For example, the mounting apparatus 1110A may comprise a push-button switch component positioned relative to the engagement member 1114c, and the mounting apparatus 1110A may be configured so that a tactile input received by the engagement member 1114c may be communicated to the mounting apparatus 1110B in a prescribed manner. In this embodiment, the apparatus communication system 1100 may be configured so that a tactile input received by the engagement member 1114c is configured to initiate a task by the mounting apparatus 1110B.

The relative complexity of a task performed within the apparatus communication system may vary per the application and relative to the respective configurations of each of the plurality of mounting apparatuses comprising the apparatus communication system. In the embodiment shown in FIG. 31, the mounting apparatus 1110A may be configured to communicate with the mounting apparatus 1110B via powerline communication, and successive tactile inputs received by the engagement member 1114c may be configured to successively open and close a circuit comprised by the mounting apparatus 1110B so that an electrical connection established between the mounting apparatus 1110B and a mounted object may be effectively connected and disconnected—and the object effectively turned on/off—via successive tactile inputs applied to the engagement member 1114c.

Alternatively or additionally, the mounting apparatus 1110A and the mounting apparatus 1110B may be configured to communicate wirelessly, and, in some embodiments, the mounting apparatus 1110A and the mounting apparatus 1110B may be configured to be smart. For example, in one embodiment, an input received by the mounting apparatus 1110A may be transmitted to the mounting apparatus 1110B via a WiFi network and may cause the mounting apparatus 1110B to run a software program. For example, the software program may be configured to control the variable intensity and color of an LED lamp that is mounted to the mounting apparatus 1110B in a predefined manner.

Referring again to FIG. 31, alternatively or additionally, the mounting apparatus 1110A may be configured to communicate with and/or control one or more peripheral objects. For example, a device box housing 1182 supported by the mounting apparatus 1110A may be configured to be attached to a wiring infrastructure (e.g., in a home or building) that is attached to a peripheral object, such as a three-speed ceiling fan. The mounting apparatus 1110A may be configured to control the three-speed ceiling fan via the wiring infrastructure. Accordingly, in some embodiments, the engagement member 1114c may be configured to function as a control knob. For example, the mounting apparatus 1110A may comprise a second controlling component, such as a spring-loaded catch mechanism, and a portion of the second controlling component may be configured to be movable between an extended position and a retracted position. When the portion of the second controlling component is in the retracted position, the engagement member 1114c may be configured to be movable between an extended state and a retracted state along a line of engagement and may be biased toward the retracted state by a first controlling component, as described and illustrated in other embodiments. Also as described in previous embodiments, the engagement member 1114c may comprise an extension and a face joined to the extension. The second controlling component may be positioned relative to the engagement member 1114c so that application of a first tactile input to the engagement member 1114c may actuate the second controlling component and cause the second controlling component to bias the movable portion of the second controlling component toward the extended position. When the portion of the second controlling component is biased toward the extended position, the second controlling component may apply a persistent ejection force to the engagement member 1114c that is configured to bias the engagement member 1114c toward the extended state. Thus, the second controlling component may be configured to effectively eject the engagement member 1114c toward the extended state in response to the first tactile input, and the persistent ejection force may be configured to persistently bias the engagement member 1114c toward the extended state so that the extension of the engagement member 1114c is exposed and may be grasped for use as a control knob.

Furthermore, the mounting apparatus 1110A may be configured so that the application of a torqueing force to the engagement member 1114c causes the mounting apparatus 1110A to communicate with the peripheral object in a prescribed manner. For example, a user may depress the engagement member 1114c (e.g., a first tactile input) to effectively eject the engagement member 1114c to an extended state, and the user may grasp the engagement member 1114c and torque the engagement member 1114c in a substantially clockwise direction to sequentially increase the speed of the three-speed ceiling fan. Likewise, the user may torque the engagement member 1114c in a substantially counterclockwise direction to sequentially decrease the speed of the three-speed ceiling fan. Additionally or alternatively, the mounting apparatus 1110A may be configured to control an object, such as an LED lamp, that is engaged with the mounting apparatus 1110B. In one embodiment, the mounting apparatus 1110A may be configured so that application of a persistent torqueing force to the engagement member 1114c in a counterclockwise direction may gradually decrease the brightness of the LED lamp and application of a persistent torqueing force to the engagement member 1114c in a clockwise direction may gradually intensify the brightness of the LED lamp.

Moreover, when interaction with the engagement member 1114c as a control knob is no longer desired, the mounting apparatus 1110A may be configured so that application of a second tactile input to the engagement member 1114c when the engagement member 1114c is persistently biased toward the extended state may actuate the second controlling component (e.g., the spring-loaded catch mechanism) and cause the second controlling component to bias the movable portion of the second controlling component toward the retracted position so that the persistent ejection force is eliminated. As a result, the engagement member 1114c may again be movable between an extended state and a retracted state along a line of engagement, effectively unencumbered by the second controlling component, and may be biased toward the retracted state by the first controlling component.

In some embodiments, the mounting apparatus may be configured so that engagement of the mounting apparatus with the object interface initiates a software function.

Furthermore, the mounting apparatus 1110A may be configured to facilitate a plurality of electrical connections between the mounting apparatus 1110A and an object to be mounted. As shown in FIG. 31, the mounting apparatus 1110A may be configured to support a plurality of apparatus connectors, and the plurality of apparatus connectors supported by the mounting apparatus 1110A may comprise a first apparatus connector subset 1105b and a second apparatus connector subset 1105e. Each of the apparatus connector subsets supported by the mounting apparatus 1110A may be configured to facilitate a mains power (e.g., AC power) connection with a compatible object interface, so the configuration of the first apparatus connector subset 1105b may be substantially the same as the configuration of the second apparatus connector subset 1105e in this embodiment. Each of the apparatus connector subsets may be configured so that a respective apparatus connector subset is live only when engaged with a corresponding plurality of interface connectors. Said differently, the plurality of apparatus connectors comprised by the mounting apparatus 1110A may be configured to be inactive when in a disengaged state. Thus, the plurality of apparatus connectors comprised by the mounting apparatus 1110A may be configured to be safe to touch (e.g., with human hands, with arbitrary pieces of metal, etc.) so that the apparatus connectors do not produce unintended shocks or arcs. For example, the mounting apparatus 1110A may be configured so that an authentication communication is required for each of the apparatus connector subsets to be live (i.e., electrically functional), and the authentication communication may be provided by a compatible object interface via wired or wireless means prior to or during engagement per the application.

As noted, in other embodiments, the mounting apparatus may facilitate a plurality of electrical connections (e.g., two, three, four, etc.) of various types and configurations per the application, so the respective configurations of each of the plurality of apparatus connector subsets may be different in some embodiments.

In some embodiments, the device box housing 1182 may be configured to be a modular component of the mounting apparatus 1110A. Said differently, the device box housing 1182 may be configured to be attached to (e.g., fastened to) a mounting surface, such as a wall, and the mounting apparatus 1110A may be configured to be releasably attached to the mounting surface via the modular device box housing 1182 so that the mounting apparatus 1110A effectively may be a modular component of the mounting surface by way of the modular device box housing 1182 when the device box housing 1182 is attached to the mounting surface.

In still other embodiments, the mounting apparatus may comprise a power plug or power socket. Correspondingly, additionally, or alternatively, an engagement member may comprise a power plug or power socket.

As previously noted, in some embodiments, a physical body may comprise a mounting apparatus and an object interface or may comprise components or features of both a mounting apparatus and an object interface.

For example, referring to FIG. 32, a portable power source is shown from two perspectives (e.g., a substantially front view and a substantially rear view), and the portable power source may be configured to define a cavity and may comprise an engagement member, a plurality of apparatus connectors, and a plurality of interface connectors. The portable power source may be configured to support a rechargeable battery, a supercapacitor, an ultracapacitor, a fuel cell, etc. per the application. The engagement member may be configured to be fixed (e.g., not movable) in some embodiments.

In one embodiment, the engagement member may be configured to support a plurality of apparatus connectors and a plurality of interface connectors. For example, the face of the engagement member (e.g., an outer portion of the face) may be configured to support a plurality of apparatus connectors, and the inner face of the engagement member (e.g., an inner portion of the face) may be configured to support a plurality of interface connectors, and the plurality of interface connectors and the plurality of apparatus connectors may be joined and supported via the face of the engagement member. Correspondingly, a substantially hollow configuration of the engagement member may define a cavity, and the cavity defined by the engagement member may be configured, and may function in a substantially similar manner, to a cavity defined by an object interface as disclosed in other embodiments. For example, the cavity depicted in FIG. 32 may be comprised by a substantially hollow portion of the engagement member as described above.

Moreover, as previously noted, an embodiment of a mounting apparatus may be applied separately to two or more bodies, and the mounting apparatuses may be attached one to another to join the bodies together; and like embodiments may be configured with connectors that are compatible when joined one to the other so that joining the mounting apparatuses may facilitate a connection between the bodies. FIG. 32 depicts one example of such an embodiment.

Correspondingly, in some embodiments, a plurality of mounting apparatuses may be configured to support a daisy chain configuration relative to a desired electrical connection per the application. Likewise, a plurality of mounting systems may be configured to support a daisy chain configuration relative to a desired electrical connection per the application.

With reference to FIGS. 33A and 33B, in some embodiments of the mounting apparatus, a supplemental engagement member may be configured relative to an engagement member of the mounting apparatus so that the supplemental engagement member may be attached to the engagement member, and attachment of the supplemental engagement member to the engagement member of the mounting apparatus may be configured to substantially change the functionality of the engagement member and/or the mounting apparatus per the application. A supplemental engagement member may be configured to be releasably engaged with the mounting apparatus via a total engagement force or may be configured to be lockably engaged with the mounting apparatus via a locking engagement force per the application. Furthermore, in some embodiments, the mounting apparatus may be configured so that a supplemental engagement member and/or an object interface may be optionally lockably engaged with the mounting apparatus when the supplemental engagement member or the object interface is engaged with the mounting apparatus so that a locking engagement force may be produced in addition to the total engagement force.

Referring to FIGS. 33A and 33B, a mounting apparatus 1210 and a supplemental engagement member 12140 are shown, and the supplemental engagement member 12140 may be configured to substantially change the functionality of the engagement member 1214 and the mounting apparatus 1210 by, for example, substantially changing the shape of the engagement member 1214, adding wireless charging functionality to the mounting apparatus 1210, and substantially changing an attraction force associated with the engagement member 1214 as well as the total engagement force associated with the mounting apparatus 1210 when an object interface is engaged with the mounting apparatus 1210. Furthermore, the supplemental engagement member 12140 may be configured so that the supplemental engagement member 12140 may be optionally lockably engaged with the mounting apparatus when the supplemental engagement member 12140 is engaged with the mounting apparatus 1210 so that a locking engagement force may be produced in addition to the total engagement force between the supplemental engagement member 12140 and the mounting apparatus 1210. Correspondingly, the supplemental engagement member 12140 may engage the mounting apparatus 1210 in a like or similar manner to an object interface and may substantially change the functionality of the mounting apparatus in a like or similar manner to a modular engagement member or a modular engagement member component.

The mounting apparatus 1210 may be configured to support an engagement member 1214 (shown in an extended state in the figure) comprising a plurality of apparatus connectors 1205 and an apparatus engagement latch 1215. The supplemental engagement member 12140 may be configured to define a cavity 12751 and may comprise a second mounting magnet 12400, a plurality of interface connectors (not shown), an interface transmission path (not shown), a transmitter coil component 12401, and an object interface latch 12251.

An attraction force produced between the mounting apparatus 1210 and the supplemental engagement member 12140 may cause the supplemental engagement member 12140 and the mounting apparatus 1210 to be engaged to produce a total engagement force. Said differently, the supplemental engagement member 12140 may be mounted to the mounting apparatus 1210 in a substantially similar fashion as would a compatible object, object interface, etc.

The supplemental engagement member 12140 may be configured relative to the mounting apparatus 1210 so that an electrical connection may be established between the mounting apparatus 1210 and the supplemental engagement member 12140 when the supplemental engagement member 12140 is engaged with the mounting apparatus 1210, and the electrical connection may be configured to support a transmitter coil component or a receiver coil component so that the mounting apparatus 1210 may be configured to participate in a wireless charging relationship when the supplemental engagement member 12140 is engaged with the mounting apparatus 1210.

In one embodiment, the supplemental engagement member 12140 may comprise a transmitter coil component 12401, and the mounting apparatus 1210 may be configured to wirelessly charge a compatible object, object interface, modular apparatus component, etc. when the supplemental engagement member 12140 is engaged with the mounting apparatus 1210.

In some embodiments, the supplemental engagement member 12140 may comprise a receiver coil component, and the mounting apparatus 1210 may be configured to be wirelessly charged by a compatible object, object interface, etc. when the supplemental engagement member 12140 is engaged with the mounting apparatus 1210. For example, the mounting apparatus may comprise a rechargeable battery, and the rechargeable battery may be wirelessly charged by a compatible object, etc. when the supplemental engagement member 12140 is engaged with the mounting apparatus 1210.

Furthermore, a supplemental engagement member may be configured to substantially change the mounting functionality of an engagement member and/or a mounting apparatus when the supplemental engagement member is engaged with the mounting apparatus. For example, in the embodiment depicted in FIG. 33B, the supplemental engagement member 12140 may be configured in a like or similar manner to the engagement member 14 depicted in FIG. 10 and/or the engagement member 314 depicted in FIGS. 11A and 11B. As such, a mounted object may be free to move about the face 12880 of the supplemental engagement member 12140 (e.g., rotationally, pivotally, etc.) such that the object may be manipulated to a preferred orientation when securely mounted via the total engagement force comprised by the mounting apparatus 1210 when the supplemental engagement member 12140 is engaged with the mounting apparatus 1210.

Moreover, in this and other embodiments, a supplemental engagement member may be configured to substantially change the magnetic field associated with a mounting apparatus in a predefined manner. For example, the supplemental engagement member may be configured to substantially adjust and/or fine tune the magnetic field relative to a particular object, object interface, range of object weights, etc.

In other embodiments, a supplemental engagement member may be configured to support one or more input devices, wireless data transfer devices, etc. per the application.

A supplemental engagement member may be configured to be releasably attached and/or lockably attached to a mounting apparatus per the application. For example, referring again to FIG. 33A, the mounting apparatus 1210 may comprise an apparatus engagement latch 1215 so that the supplemental engagement member 12140 may be optionally lockably engaged with the mounting apparatus 1210 when the supplemental engagement member 12140 is releasably attached (i.e., mounted) to the mounting apparatus 1210.

The apparatus engagement latch 1215 may be configured to be movable between an extended apparatus engagement latch position and a retracted apparatus engagement latch position along an apparatus latch engagement line. In the embodiment shown in FIG. 33A and FIG. 33B, the apparatus engagement latch may define an extended apparatus engagement latch position when the apparatus engagement latch is biased toward the object to be mounted (and/or the supplemental engagement member, in this embodiment), and the apparatus engagement latch may define a retracted apparatus engagement latch position when the apparatus engagement latch is biased away from the object to be mounted (e.g., biased toward the intermediate surface, base surface, etc. of the mounting apparatus in various embodiments).

The apparatus engagement latch 1215 may be configured to respond to magnetism, and the apparatus engagement latch 1215 may be biased toward the retracted apparatus engagement latch position by a controlling component comprised by the mounting apparatus 1210 when the engagement member 1214 is not engaged with an object to be mounted (e.g., an object, an object interface, a supplemental engagement member, etc.). The mounting apparatus 1210 may be configured so that the apparatus engagement latch 1215 may be biased toward the extended apparatus engagement latch position by an attraction force produced between the object to be mounted and the apparatus engagement latch 1215 when the object to be mounted is engaged with the engagement member 1214. For example, in the embodiment shown in FIGS. 33A and 33B, the mounting apparatus 1210 may be configured so that the apparatus engagement latch 1215 may be biased toward the cavity 12751 defined by the supplemental engagement member 12140 by an attraction force produced between the second mounting magnet 12400 and the apparatus engagement latch 1215 when the supplemental engagement member 12140 is engaged with the engagement member 1214. Correspondingly, in the embodiment shown in FIGS. 33A and 33B, the apparatus engagement line may correspond to the line of engagement of the mounting apparatus 1210.

At least a portion of the object interface latch may be configured to be movable between a closed object interface latch position and an open object interface latch position along an object interface latch engagement line. For example, referring to the supplemental engagement member 12140 shown in FIG. 33A, an outer portion (shown in the figure) of the object interface latch 12251 may be configured to move an inner portion (not shown) of the object interface latch 12251 between the closed object interface latch position and the open object interface latch position along the object interface latch engagement line.

The cavity 12751 defined by the supplemental engagement member 12140 may be configured to receive one or both of the engagement member 1214 and the apparatus engagement latch 1215 when the supplemental engagement member 12140 is engaged with the mounting apparatus 1210 depending upon the position of the object interface latch 12251.

The object interface latch 12251 may be configured relative to the cavity 12751 defined by the supplemental engagement member 12140 and relative to the apparatus engagement latch 1215 so that the cavity 12751 is substantially obstructed by at least a portion of the object interface latch 12251 relative to the apparatus engagement latch 1215 when the object interface latch 12251 is in the closed object interface latch position. Furthermore, the object interface latch 12251 may be configured so that the cavity 12751 is substantially unobstructed relative to the apparatus engagement latch 1215 when the object interface latch 12251 is in the open object interface latch position.

Said differently, the object interface latch 12251 may define the closed object interface latch position when the cavity 12751 is substantially obstructed by at least a portion of the object interface latch 12251 relative to the apparatus engagement latch 1215, and the cavity 12751 may not receive the apparatus engagement latch 1215 when the object interface latch 12251 defines the closed object interface latch position. Accordingly, the object interface latch 12251 may define the open object interface latch position when the cavity 12751 is substantially unobstructed by the object interface latch 12251 relative to the apparatus engagement latch 1215, and the cavity 12751 may receive the apparatus engagement latch 1215 when the supplemental engagement member 12140 is engaged with the engagement member 1214 and the object interface latch 12251 defines the open object interface latch position.

Furthermore, when the object interface latch 12251 defines the closed object interface latch position, a portion of the cavity 12751 may define an interface latch cavity.

In some embodiments, an object interface latch or a similar component of the object interface may be configured so that a cavity defined by the object interface is obstructed relative to one or more engagement members or engagement member components comprised by the mounting apparatus, including but not limited to an engagement member or an engagement member component that comprises an apparatus engagement latch.

The object interface latch may be configured so that application of an input force to at least a portion of the object interface latch is configured to bias the object interface latch toward one of the open object interface latch position or the closed object interface latch position. For example, in one embodiment, the object interface latch may be configured to support a capacitive sensor, and the object interface latch may be configured so that application of an input force to the capacitive sensor effectively toggles the object interface latch between the open object interface latch position and the closed object interface latch position.

Referring again to FIG. 33A, the object interface latch 12251 may be configured so that application of the input force to the outer portion (shown in the figure) of the object interface latch 12251 is configured to bias the inner portion (not shown) of the object interface latch 12251 toward the open object interface latch position, and the object interface latch 12251 may be configured so that the inner portion of the object interface latch 12251 is automatically biased toward the closed object interface latch position when the input force is removed. For example, depression of the outer portion of the object interface latch 12251 (i.e., the input force) may operate a spring assembly that is configured to bias the inner portion of the object interface latch 12251 toward the open object interface latch position until the input force is removed.

In such a configuration, the supplemental engagement member 12140 may be releasably engaged with the mounting apparatus 1210 when mounted to the mounting apparatus 1210. Furthermore, when the supplemental engagement member 12140 is mounted (i.e., releasably engaged) to the mounting apparatus 1210, application of the input force to the outer portion of the object interface latch 12251 may bias the inner portion of the object interface latch toward the open object interface latch position. When the object interface latch 12251 defines the open object interface latch position, the cavity 12751 may be unobstructed by the object interface latch 12251 relative to the apparatus engagement latch 1215; and an attraction force produced between the apparatus engagement latch 1215 and the second mounting magnet 12400 may cause the apparatus engagement latch 1215 to be received by the cavity 12751. Removal of the input force may cause the inner portion of the object interface latch 12251 to be automatically biased toward the closed object interface latch position, and, when the object interface latch 12251 defines the closed object interface latch position, a portion of the cavity 12751 may define an interface latch cavity relative to the apparatus engagement latch 1215; and the supplemental engagement member 12140 may be lockably engaged with the mounting apparatus 1210.

FIG. 33B shows the mounting apparatus 1210 and the supplemental engagement member 12140 when engaged via a locking engagement force.

In some embodiments, the apparatus engagement latch may be supported by the intermediate surface, a housing, or another component of the mounting apparatus. Also, the apparatus engagement latch may be configured to be flush with the intermediate surface, the housing, etc. when the mounting apparatus is not engaged.

Referring to FIG. 34, a modular object interface 1220 is provided, and the modular object interface 1220 may be configured to be attached to an object to be mounted, such as a mobile computing device (e.g., a tablet computer, a smartphone, etc.) in this embodiment. Moreover, the modular object interface 1220 may be configured to be attached to either of the engagement member 1214 or the supplemental engagement member 12140 of the mounting apparatus 1210.

The modular object interface 1220 may comprise an object interface latch 12252 so that the modular object interface 1220 may optionally lockably engage the mounting apparatus 1210. Also, the modular object interface 1220 may comprise a modular central object surface 1222, and the central object surface 1222 may be configured to agree with the supplemental engagement member 12140 by way of a surface opening 1204 and a contact surface 1202 of the surface opening 1204 that may be configured (e.g., shaped) to substantially flushly engage the face 12880 of the supplemental engagement member 12140 so that the object to be mounted may be free to move about the face 122880 of the supplemental engagement member 12140 (e.g., rotationally, pivotally, etc.) such that the object may be manipulated to a preferred orientation when securely mounted via the total engagement force comprised by the mounting apparatus 1210 when the supplemental engagement member 12140 is engaged with the mounting apparatus 1210.

The modular object interface 1220 may comprise a modular interface housing 1221, and the interface housing 1221 may be configured to support a plurality of modular interface components arranged in a tiered configuration. For example, a first portion of the interface housing 1221 may be configured to slideably receive each of the plurality of modular object interface components, and a second portion of the interface housing 1221 may be configured to slideably enclose an exposed portion of each of the plurality of modular object interface components that is slideably received by the first portion of the interface housing 1221.

Such a configuration may allow the modular object interface 1220 to be highly customizable so that modular object interface components may be easily interchangeable. Furthermore, such a configuration may allow the structural configuration of the modular object interface 1220 and/or structural features or components of the modular object interface 1220 to be fine-tuned per the application.

For example, FIG. 35 depicts a plurality of modular object interface components (only a portion of each of the plurality of modular object interface components is shown in the figure), and the plurality of modular object interface components may be arranged in a tiered configuration and may define a cavity 12753 of the object interface. Correspondingly, a modular object interface comprising a tiered configuration of a plurality of modular object interface components may be highly customizable and may provide a high degree of flexibility in dynamically custom-configuring the modular object interface relative to a variety of configurations of the mounting apparatus per the application. For example, the modular object interface components may be configured to change or dynamically adjust the object interface depth $d_o$; change or dynamically adjust the position of an object interface latch; change or dynamically adjust the position of one or more third mounting magnets so that the total engagement force between the object interface and the mounting apparatus is correspondingly changed; add, remove, or change the position of a modular charger support and/or, by association, the depth and/or configuration of a plurality interface connectors relative to the mounting apparatus; and/or change the way in which a modular object interface may be structurally engaged with the mounting apparatus. One of skill in the art will appreciate the various configurations made possible by a tiered configuration of a plurality of modular interface components as guided by the content of this disclosure.

In still other embodiments of the mounting apparatus or mounting system, a minimal number of components may be necessary to achieve the desired functionality of the mounting apparatus or mounting system per the application, because the mounting apparatus or the mounting system may be configured relative to the force of gravity to achieve the desired functionality.

For example, referring to FIG. 36, a mounting apparatus 1310 is shown, and the mounting apparatus 1310 may comprise an engagement member 1314 (shown in the extended state) and an intermediate surface 1312. In this embodiment, the engagement member 1314 (only) may be configured to respond to magnetism, and the mounting apparatus 1310 may be configured relative to the force of gravity so that the gravitational force provides further functionality that may be associated with other components of the mounting apparatus in other embodiments. For example, the mounting apparatus 1310 may be configured relative to the force of gravity so that engagement between an object interface or an object to be mounted and the intermediate surface 1312 may occur as a result of the gravitational force relative to the object to be mounted. In this way, the gravitational force may be utilized to provide substantially similar functionality to that of an attraction force produced by, for example, a first mounting magnet in another embodiment. Furthermore, the mounting apparatus 1310 may be configured relative to the force of gravity so that the engagement member 1314 automatically retracts after the object is disengaged from the apparatus. In this way, the gravitational force may be utilized to provide substantially similar functionality to a controlling component. Likewise, the mounting apparatus 1310 may be configured relative to the force of gravity so that the engagement member 1314 may be biased toward the retracted state by the gravitational force so that the engagement member 1314 is substantially flush relative to the intermediate surface 1312 when the mounting apparatus 1310 is not engaged with an object to be mounted.

In one embodiment, the mounting apparatus 1310 may comprise a stand when the base surface 1380 is substantially engaged with a substantially horizontal surface such as a tabletop. An object interface may be configured to be attached to the mounting apparatus 1310 and to an electronic device (e.g., a notebook computer, a TV set-top box, etc.). The engagement member 1314 comprised by the mounting apparatus 1310 may be configured to support a plurality of apparatus connectors, and the object interface may be configured to support a corresponding plurality of interface connectors so that an electrical connection may be established between the electronic device and the mounting apparatus 1310 when the object interface is engaged with the mounting apparatus 1310.

Furthermore, the intermediate surface 1312 of the mounting apparatus 1310 may be configured to support a modular first mounting magnet, and the modular first mounting magnet may be optionally attached to the mounting apparatus 1310 to enhance the total engagement force of the mounting system so that the mounting apparatus 1310 may support the object to be mounted when the base surface 1380 is attached to a substantially vertical surface such as a wall.

Referring to FIG. 37, a mounting apparatus 1410 is provided, and the mounting apparatus 1410 may be configured to support a plurality of electrical connections. For example, the plurality of electrical connections may comprise a plurality of audio-video connections (e.g., HDMI, composite video, component video, Toslink, etc.), and the mounting apparatus 1410 may support a plurality of audio-video ports that may be configured to be attached to a display, such as a television, per the application. A plurality of cables may be attached to the ports and are shown in the figure. Each of the plurality of engagement members may be configured to respond to magnetism and may be movable between a respective extended state and a respective retracted state. Each of the plurality of engagement members is shown in the retracted state in FIG. 37. Each of the plurality of engagement members may be configured to support one of a plurality of electrical connections supported by the mounting apparatus 1410. A corresponding object interface may be configured to be attached to an audio-video component (e.g., a DVD player, CD player, audio receiver, etc.) per the application, and the object interface may be configured relative to the mounting apparatus 1410 so that engagement between the object interface and the mounting apparatus 1410 may establish a plurality of electrical connections between the audio-video component and the display. In such a configuration, a user may quickly and easily connect and disconnect the audio-video component and the display without the need to insert or remove audio-video cables between the devices. Thus, the mounting system may be configured as a connection interface between the devices.

The mounting system may be applied in various embodiments to engage a plurality of physical bodies, and a plurality of mounting systems may be configured relative to one another to facilitate a continuous electrical connection between the physical bodies. For example, a flooring mounting apparatus may be configured to be attached to (i.e., integrated into) a flooring component (e.g., hardwood, tile, etc.) and to a wiring infrastructure in, for example, a building via an apparatus transmission path. A desk may be configured so that a bottom portion of a leg of the desk comprises a leg object interface that is configured relative to the flooring mounting apparatus so that the leg object interface may engage the flooring mounting apparatus. In such a configuration, the flooring mounting apparatus may effectively anchor the desk leg to a predefined position on the flooring so that the desk leg is not slideably movable across the surface of the flooring when engaged. The desk leg may be further configured to support a leg mounting apparatus on a top portion of the leg, and the desk may further be configured to support a desktop object interface that is configured to be attached to the leg mounting apparatus to mount the desk leg to the desktop (i.e., to join the furniture together). Moreover, the desk may be configured to support a desktop mounting apparatus in the top surface (e.g., the desktop) of the desk, and a monitor stand may be configured to support an object interface that is configured relative to the desktop mounting apparatus so that the monitor stand may be engaged with the desktop mounting apparatus. The monitor stand may be further configured to support a stand mounting apparatus, and a display panel may be configured to support a display object interface that is configured relative to the stand mounting apparatus so that the display panel may be mounted to the monitor stand. Furthermore, each of the plurality of mounting systems may be configured to support a corresponding and compatible electrical connection, and the desk and the monitor stand may each be configured to support a transmission path that connects each of the respective mounting apparatuses, object interfaces, and/or mounting systems supported by each of the desk and the monitor stand. In such a configuration, when each of the mounting systems is engaged, an electrical connection may be established between the wiring infrastructure and the display panel.

Correspondingly, in some embodiments, the mounting system may be highly functional when the intermediate surface comprised by the mounting apparatus is not configured to respond to magnetism. For example, an engagement member that is configured to respond to magnetism and that is effectively built into a countertop may be configured to engage an object interface supported by an appliance, such as a microwave. The object interface may define a cavity and may be configured to engage the engagement member when the cavity and the engagement member are substantially aligned, and engagement between the mounting apparatus and the object interface may substantially anchor the microwave relative to the surface of the countertop. Thus, when a user, for example, pulls open the door of the microwave, the microwave may be substantially anchored against the force applied by the user (e.g., a force which may otherwise cause the microwave to move across the surface of the countertop) and may not be movable along the surface of the countertop due to the engagement force between the mounting apparatus and the object interface.

FIG. 38 shows an embodiment of a mounting system comprising a plurality of mounting apparatuses that may be configured to be joined, and each of the plurality of mounting apparatuses may comprise components of a mounting apparatus and an object interface so that the plurality of mounting apparatuses may be joined one to another.

As noted above, the structures and components depicted in the figures have been simplified for clarity and ease of explanation. As such, one or more of the components, such as housings, fasteners, stands, swivels, etc., although described above, may not be shown in the figures. Those of ordinary skill in the art will understand and appreciate that the method, systems, and apparatuses provided herein may also describe means for joining, coupling, attaching, or otherwise magnetically associating one body with another, and that numerous alternate embodiments and adaptations may be executed as guided by the full content of this disclosure.

For example, although particular configurations and relative dimensions and spacings are illustrated in the accompanying drawings, it is to be understood that the particular configurations are depicted for purposes of explanation, and multiple other configurations are possible. As an example, although embodiments of the mounting apparatus are shown as having an engagement member with a circular cross-section, embodiments may include engagement members having a square, rectangular, triangular, etc. cross-section. Additionally or alternatively, the configuration of an outer face of the engagement member may include additional features for enhancing the interaction between the engagement member and the object interface. In this regard, the outer face of the engagement member may be keyed (e.g., defining openings configured and arranged to receive corresponding protrusions of the object interface) such that only particular object interfaces may be engaged, object interfaces may be engaged at only certain angles or orientations with respect to the mounting apparatus, and/or only particular electrical connectors comprised by the mounting apparatus and/or the object interface may be engaged. In other embodiments, an outer face of an engagement member may include holes or other openings for allowing wires or other components to be passed through from the mounting apparatus to the object interface or vice versa. Furthermore, one of ordinary skill in the art will recognize that there are many means available for manipulating the magnetic field associated with a magnet, a group of magnets, etc., and, correspondingly or additionally, the magnetic field associated with a mounting apparatus, an object interface, or an engaged system, in order to achieve a desired functionality. For example, ferrous metal caps, plates, flux guides, magnetic shielding materials, shielding cages, etc. may be configured relative to a magnet, a plurality of magnets, or groups of magnets to strengthen, weaken, shape, or otherwise affect the magnetic fields associated with the magnet(s); and similar components (modular or fixed) may be configured to influence the magnetic field associated with a mounting apparatus, an object interface, or an engaged system in a particular way.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for mounting an object to a mounting surface, comprising:

a bay;

a card;

a first mounting magnet configured to define a first plane; and an engagement member comprising a plurality of engagement member components, wherein at least one of the engagement member components is configured to respond to magnetism;

wherein the engagement member is disposed relative to the first mounting magnet along a line of engagement that intersects the first plane;

wherein the engagement member is configured so that at least one of the plurality of engagement member components is movable between an extended state and a retracted state along the line of engagement;

wherein the bay comprises an apparatus transmission path that is configured to provide an electrical connection to at least one of the engagement member and the card;

wherein at least one of the engagement member and the bay is configured to support at least one electrical connection interface;

wherein the first mounting magnet and the engagement member are configured to cooperate to engage an object to be mounted to produce a total engagement force, and wherein a disengaging force that is less than the total engagement force and that is applied to the mounted object overcomes the total engagement force in stages by successively overcoming the respective engagement forces associated with the first mounting magnet and the engagement member to disengage the object.

2. The apparatus of claim 1, wherein the apparatus is configured to support the pass-through of electricity and data relative to the USB 3.1 specification.

3. The apparatus of claim 1, wherein the engagement member is configured so that a charging relationship may be established with the object to be mounted.

4. The apparatus of claim 1, wherein the at least one electrical connection interface supported by the engagement member is configured so that a charging relationship is maintained between the apparatus and the object to be mounted when at least one of the object to be mounted and the apparatus is rotated relative to the other of the at least one of the object and the apparatus.

5. The apparatus of claim 1, wherein the bay is configured to structurally engage a plurality of modular base surfaces.

6. The apparatus of claim 1, wherein a portion of the bay is configured to receive a plurality of interchangeable modular components.

7. The apparatus of claim 6, wherein at least one of the plurality of interchangeable modular components is a modular card.

8. The apparatus of claim 6, wherein at least one of the plurality of interchangeable modular components is a modular power source.

9. The apparatus of claim 6, wherein at least one of the plurality of interchangeable modular components is a modular storage drive.

10. The apparatus of claim 1, further comprising a push-button switch.

11. The apparatus of claim 1, further comprising at least one input device, wherein the at least one input device is configured to communicate with the card.

12. The apparatus of claim 1, further comprising at least one power adapter, wherein a power adapter is configured to adapt mains power to the apparatus transmission path.

13. The apparatus of claim 1, wherein the engagement member comprises an electromechanical engagement member.

14. The apparatus of claim 1, further comprising at least one electromagnet, wherein at least one of the at least one electromagnet is connected with the card via the apparatus transmission path.

15. The apparatus of claim 1, further comprising at least one proximity sensor, wherein at least one of the at least one proximity sensor is configured to communicate with the card.

16. The apparatus of claim 1, wherein the apparatus is configured to communicate with at least one data network.

17. The apparatus of claim 1, wherein the bay is configured to support an Edison screw and a power adapter, wherein the Edison screw and the power adapter are configured to adapt mains power to the apparatus transmission path.

18. The apparatus of claim 1, further comprising at least one of a power source and a battery.

19. The apparatus of claim 1, wherein the apparatus is configured to support at least one of a proximity sensor, tactile sensor, motion detector, digital camera, wireless data component, cellular data component, wireless data module, ambient light sensor, and light, and the engagement member is configured to support at least one of a wireless data component, wireless data module, tactile sensor, and light.

20. The apparatus of claim 1, further comprising a gyroscope.

* * * * *